US012591804B2

(12) United States Patent
Akdeniz et al.

(10) Patent No.: US 12,591,804 B2
(45) Date of Patent: Mar. 31, 2026

(54) SYSTEMS AND METHODS FOR DISTRIBUTED LEARNING FOR WIRELESS EDGE DYNAMICS

(71) Applicant: Intel Corporation, Santa Clara, CA (US)

(72) Inventors: Mustafa Riza Akdeniz, San Jose, CA (US); Arjun Anand, Milpitas, CA (US); Nageen Himayat, Fremont, CA (US); Amir S. Avestimehr, Rancho Palos Verdes, CA (US); Ravikumar Balakrishnan, Beaverton, OR (US); Prashant Bhardwaj, Sunnyvale, CA (US); Jeongsik Choi, San Jose, CA (US); Yang-Seok Choi, Portland, OR (US); Sagar Dhakal, Los Altos, CA (US); Brandon Gary Edwards, Portland, OR (US); Saurav Prakash, Los Angeles, CA (US); Amit Solomon, Cambridge, MA (US); Shilpa Talwar, Cupertino, CA (US); Yair Eliyahu Yona, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 830 days.

(21) Appl. No.: 17/790,950

(22) PCT Filed: Dec. 26, 2020

(86) PCT No.: PCT/US2020/067068
§ 371 (c)(1),
(2) Date: Jul. 5, 2022

(87) PCT Pub. No.: WO2021/158313
PCT Pub. Date: Aug. 12, 2021

(65) Prior Publication Data
US 2023/0068386 A1     Mar. 2, 2023

Related U.S. Application Data

(60) Provisional application No. 63/121,852, filed on Dec. 4, 2020, provisional application No. 63/087,069, filed
(Continued)

(51) Int. Cl.
*G06N 20/00* (2019.01)

(52) U.S. Cl.
CPC .................................... *G06N 20/00* (2019.01)

(58) Field of Classification Search
None
See application file for complete search history.

(56) References Cited

U.S. PATENT DOCUMENTS 11,244,242 B2   2/2022   Prakash et al.
11,373,115 B2   6/2022   Kopp et al.
(Continued)

FOREIGN PATENT DOCUMENTS

CN          103369599 A    10/2013
JP        2019144642 A     8/2019
(Continued)

OTHER PUBLICATIONS

Li et al. "Fair Resource Allocation in Federated Learning" publication ICLR (Year: 2020).*
(Continued)

*Primary Examiner* — Amresh Singh
(74) *Attorney, Agent, or Firm* — Alliance IP, LLC

(57) ABSTRACT

The apparatus of an edge computing node, a system, a method and a machine-readable medium. The apparatus includes a processor to perform rounds of federated machine
(Continued)

learning training including: processing client reports from a plurality of clients of the edge computing network; selecting a candidate set of clients from the plurality of clients for an epoch of the federated machine learning training; causing a global model to be sent to the candidate set of clients; and performing the federated machine learning training on the candidate set of clients. The processor may perform rounds of federated machine learning training including: obtaining coded training data from each of the selected clients; and performing machine learning training on the coded training data.

25 Claims, 30 Drawing Sheets

Related U.S. Application Data on Oct. 2, 2020, provisional application No. 62/969,576, filed on Feb. 3, 2020, provisional application No. 62/969,583, filed on Feb. 3, 2020.

(56) References Cited

U.S. PATENT DOCUMENTS

| | | | |
|---|---|---|---|
| 11,611,457 | B2 | 3/2023 | D'Oro et al. |
| 12,086,208 | B2 | 9/2024 | Yang |
| 12,100,230 | B2 | 9/2024 | Wang et al. |
| 2014/0313908 | A1 | 10/2014 | Silva et al. |
| 2017/0279839 | A1 | 9/2017 | Vasseur et al. |
| 2018/0357566 | A1 | 12/2018 | Liu et al. |
| 2019/0042934 | A1 | 2/2019 | Arunachalam et al. |
| 2019/0138934 | A1 | 5/2019 | Prakash et al. |
| 2019/0171978 | A1 | 6/2019 | Bonawitz |
| 2019/0235940 | A1 | 8/2019 | Kegel et al. |
| 2019/0340534 | A1 | 11/2019 | McMahan et al. |
| 2020/0125926 | A1 | 4/2020 | Choudhury et al. |
| 2020/0202243 | A1 | 6/2020 | Guttmann |
| 2020/0280863 | A1 | 9/2020 | Cioffi et al. |
| 2021/0117780 | A1 | 4/2021 | Malik et al. |
| 2022/0014963 | A1 | 1/2022 | Yeh et al. |
| 2022/0021470 | A1 | 1/2022 | Callard et al. |
| 2022/0124543 | A1 | 4/2022 | Orhan et al. |
| 2022/0138568 | A1 | 5/2022 | Smolyanskiy et al. |
| 2022/0158907 | A1 | 5/2022 | Ghadimi et al. |
| 2022/0167236 | A1 | 5/2022 | Melodia et al. |
| 2022/0232531 | A1 | 7/2022 | Li et al. |
| 2022/0237515 | A1 | 7/2022 | Prakash et al. |
| 2022/0271999 | A1 | 8/2022 | Jeong et al. |
| 2022/0374685 | A1 | 11/2022 | Lee et al. |
| 2022/0377614 | A1 | 11/2022 | Balakrishnan et al. |
| 2022/0393729 | A1 | 12/2022 | Lee et al. |
| 2023/0048920 | A1 | 2/2023 | Bhose et al. |
| 2023/0179490 | A1 | 6/2023 | Huangfu et al. |
| 2023/0269606 | A1 | 8/2023 | Säily et al. |
| 2023/0284139 | A1 | 9/2023 | Ma et al. |
| 2023/0345317 | A1 | 10/2023 | Sarkar et al. |
| 2024/0056933 | A1 | 2/2024 | Lin et al. |
| 2024/0281654 | A1 | 8/2024 | Reed et al. |
| 2025/0031065 | A1 | 1/2025 | Kovács et al. |
| 2025/0063559 | A1 | 2/2025 | D'Oro et al. |

FOREIGN PATENT DOCUMENTS

| | | |
|---|---|---|
| KR | 20190032433 A | 3/2019 |
| WO | 2019211134 A1 | 11/2019 |
| WO | 2020121045 A1 | 6/2020 |
| WO | 2022075905 A1 | 4/2022 |

OTHER PUBLICATIONS

Rizk et al. "Optimal Importance Sampling for Federated Learning" publication arXiv (Year: 2020).*

Ren et al. "Scheduling for Cellular Federated Edge Learning with Importance and Channel Awareness" publication arXiv Jun. 2020 (Year: 2020).*

Prakash et al. "Coded Computing for Federated Learning at the Edge" Publication arXiv (Year: 2021).*

Nishio et al., "Client Selection for Federated Learning with Heterogeneous Resources in Mobile Edge" Pub. arXiv (Year: 2018).*

McMahan et al., "Learning Differentially Private Recurrent Language Models" pub. arXiv (Year: 2018).*

Showkatbakhsh et al., "Privacy-Utility Trade-off of Linear Regression under Random Projections and Additive Noise" pub arXiv (Year: 2019).*

USPTO; Notice of Allowance issued in U.S. Appl. No. 17/712,050, dated Apr. 30, 2025; 17 pages.

Balakrishnan, Ravikumar et al.; "Resource Management and Fairness for Federated Learning over Wireless Edge Networks"; IEEE 21st International Workshop on Signal Processing Advances in Wireless Communications (SPAWC) (May 2020); 5 pages.

Banerjee, Arindam, et al.; "Clustering with Bregman Divergences," Journal of Machine Learning Research 6, published Oct. 2005; 45 pages.

Bordes, Antoine, et al., "Fast Kernel Classifiers with Online and Active Learning," Journal of Machine Learning Research 6 (2005), pp. 1579-1619; 41 pages.

Calabrese, Francesco Davide, et al.; "Learning Radio Resource Management in RANs: Framework, Opportunities, and Challenges," arXiv:1611.10253v3; May 20, 2018; 8 pages.

Chelsea Finn, Pieter Abbeel, Sergey Levine, "Model-Agnostic Meta-Learning for Fast Adaptation of Deep Networks", ICML 2017.

Dhakal, Sagar et al.; "Coded computing for distributed machine learning in wireless edge network"; IEEE VTC, 2019; 6 pages. Retrieved from https://ieeexplore.ieee.org/abstract/document/8891198.

Dhakal, Sagar et al.; "Coded Federated Learning"; IEEE Globecom Workship 2019; 6 pages. Retrieved from https://ieeexplore.ieee.org/abstract/document/9024521.

Dwork, Cynthia, et al.; "The Algorithmic Foundations of Differential Privacy"; Foundations & Trends, Theoretical Computer Science, v. 9, n. 3-4, pp. 211-407, 2014; 281 pages.

Eisen, Mark, et al.; "Optimal Wireless Resource Allocation with Random Edge Graph Neural Networks," accessed at https://arxiv.org/abs/1909.01865; Mar. 5, 2020; 15 pages.

Frey, Brendan J., et al.; "Clustering by Passing Messages Between Data Points," Science, vol. 315; Feb. 16, 2007; 23 pages.

Goodfellow, I., et al., "Deep Learning;" the MIT Press, 2016; Genet Program Evolvable Mach (2018) 19:305-307; 3 pages.

Halbawi, Wael, et al. "Improving distributed gradient descent using reed-solomon codes." 2018 IEEE International Symposium on Information Theory (ISIT). IEEE, Jun. 17-22, 2018. (Year: 2018); 5 pages.

Katharopoulos, Angelos, et al.; "Not All Samples Are Created Equal: Deep Learning with Importance Sampling," accessed at arXiv:1803.00942; Oct. 28, 2019; 13 pages.

Lecun, Yann, et al.; "Gradient-Based Learning Applied to Document Recognition," Proceedings of the IEEE, Nov. 1998; 46 pages.

Li, Songze et al., "Polynomially Coded Regression: Optimal Straggler Mitigation via Data Encoding," Department of Electrical Engineering, University of Southern California, Los Angeles, CA, arXiv:1805.09934v1 [cs.IT] May 24, 2018 (11 pages).

Li, Songze, et al. "Near-optimal straggler mitigation for distributed gradient methods." 2018 IEEE International Parallel and Distributed Processing Symposium Workshops (IPDPSW). IEEE, 2018. (Year: 2018); 10 pages.

Li, Tian, et al.; "Federated Optimization for Heterogeneous Networks"; Conference on Machine Learning and Systems (MLSys), Apr. 2020; 22 pages.

Li, Tian, et al.; "Federated Optimization in Heterogeneous Networks," accessed at arXiv:1812.06127; Apr. 21, 2020; 22 pages.

McMahan, Brendan et al., "Federated Learning: Collaborative Machine Learning Without Centralized Training Data," Google Research Blog, Apr. 6, 2007 (5 pages).

(56) References Cited

OTHER PUBLICATIONS

McMahan, H. Brendan, et al., "Communication-Efficient Learning of Deep Networks from Decentralized Data," Google, Inc., Seattle, Washington, United States; Feb. 28, 2017; 11 pages.

Pandey, Shashi Raj, et al.; "A Crowdsourcing Framework for On-Device Federated Learning," arXiv:1911.01046v2; Feb. 3, 2020; 15 pages.

PCT International Preliminary Report on Patentability issued in PCT/US2021/035042, dated Dec. 15, 2022; 13 pages.

PCT International Preliminary Report on Patentability issued in PCT/US2021/039272, dated Jan. 26, 2023; 9 pages.

PCT International Search Report and Written Opinion issued in PCT/US2021/035042, dated Nov. 2, 2021; 18 pages.

PCT International Search Report and Written Opinion issued in PCT/US2021/039272, dated Oct. 15, 2021; 13 pages.

Rashid, Tabish, et al.; "QMIX: Monotonic Value Function Factorisation for Deep Multi-Agent Reinforcement Learning," International Conference on Machine Learning; Stockholm, Sweden; Jun. 6, 2018; 14 pages.

Ruder, S., "An overview of gradient descent optimization algorithms," Insight Centre for Data Analytics, Dublin; Jun. 15, 2017; arXiv preprint arXiv:1609.04747; 14 pages.

S. Prakash, S. Dhakal, M. Akdeniz, A. S. Avestimehr, and N. Himayat, "Coded computing for federated learning at the edge," International Workshop on Federated Learning for User Privacy and Data Confidentiality (FL-ICML 2020), Jul. 2020; 9 pages.

Sattler, Felix, et al.; "Clustered Federated Learning: Model-Agnostic Distributed Multi-Task Optimization under Privacy Constraints," retrieved from https://arxiv.org/abs/1910/01991v1; dated Oct. 2019; 17 pages.

Sattler, Felix, et al.; "Robust and Communication-Efficient Federated Learning from Non-IID Data," retrieved from https://arxiv.org/abs/1903.02891v1; dated Mar. 2019; 18 pages.

Schaul, Tom, et al.; "Prioritized Experience Replay"; ICLR, published 2016; 21 pages.

Showkatbakhsh, M., et al. "Privacy-Utility Trade-off of Linear Regression under Random Projections and Additive Noise", Arxiv 2019; https://arxiv.org/pdf/1902.04688.pdf; 7 pages.

Su, Han-I et al., "Quadratic Gaussian Gossiping," 2009 3rd IEEE International Workshop on Computational Advances in Multi-Sensor Adaptive Processing (2009) (4 pages).

Sunehag, Peter, et al.; "Value-Decomposition Networks for Cooperative Multi-Agent Learning," accessed at arXiv:1706.05296; Jun. 16, 2017; 17 pages.

Tandon, Rashish et al., "Gradient Coding: Avoiding Stragglers in Synchronous Gradient Descent," Department of Computer Science, UT Austin, Institute for Computational Engineering and Sciences, UT Austin, Department of Electrical and Computer Engineering, UT Austin, Microsoft, Mar. 9, 2017 (19 pages).

U.S. Appl. No. 17/920,839; filed Oct. 24, 2022.

U.S. Appl. No. 17/921,549; filed Oct. 26, 2022.

Wadu, Madhusanka Manimel, et al.; "Federated Learning under Channel Uncertainty: Joint Client Scheduling and Resource Allocation," arXiv:2002.00802v2; Feb. 6, 2020; 6 pages.

Wang, Shusen, et al.; "GIANT: Globally Improved Approximate Newton Method for Distributed Optimization," retrieved from https://arxiv.org/abs/1709.03528v5, dated Sep. 2018; 22 pages.

Y. Lecun, L. Bottou, Y. Bengio and P. Haffner, "Gradient-based learning applied to document recognition," in Proceedings of the IEEE, vol. 86, No. 11, pp. 2278-2324, Nov. 1998, doi: 10.1109/5.726791; 46 pages.

Yao, Xin, et al.; "Federated Learning with Unbiased Gradient Aggregation and Controllable Meta Updating," retrieved from https://arxiv.org/abs/1910.08234v1, dated Oct. 2019; 8 pages.

Zhao, Yue, et al.; "Federated Learning with Non-IID Data," accessed at arXiv:1806.00582; Jun. 2, 2018; 13 pages.

Zhou, Shuheng, et al.; "Differential Privacy with Compression"; arXiv, 0901.1365v1, Jan. 2009; 14 pages.

Li, Songze, Qian Yu, Mohammad Ali Maddah-Ali, and A. Salman Avestimehr. "A scalable framework for wireless distributed computing." IEEE/ACM Transactions on Networking 25, No. 5 (2017): 2643-2654. (Year: 2017).

Mohammadi, Mehdi, Ala Al-Fuqaha, Sameh Sorour, and Mohsen Guizani. "Deep learning for IoT big data and streaming analytics: A survey." IEEE Communications Surveys & Tutorials 20, No. 4 (2018): 2923-2960. (Year: 2018).

USPTO Non-Final OA in U.S. Appl. No. 17/665,025 mailed on Sep. 26, 2023 (18 pages).

D. Moming et al. : "Astraea: Self-Balancing Federated Learning for Improving Classification Accuracy of Mobile Deep Learning Applications", 2019 IEEE 37th International Conference on Computer Design (ICCD), Nov. 17, 2019 (Nov. 17, 2019), pp. 246-254, XP033710037, DOI: 10.1109/ICCD46524.2019.00038 [retrieved on Feb. 7, 2020] * section III*.

EESR European Search Report issued in EP Patent Application No. 20917584.3 issued on Feb. 9, 2024 (13 pages).

L. Huang et al.: "LoAdaBoost: Loss-Based AdaBoost Federated Machine Learning on medical Data" ,arxiv.org, Cornell University Library, 201 Olin Library Cornell University Ithaca, NY 14853, Nov. 30, 2018 (Nov. 30, 2018), XP081463644,* section LoAdaBoost FedAvg on p. 7-9 *.

T. Tuor et al. : "Data Selection for Federated Learning with Relevant and Irrelevant Data at Clients", arxiv.org, Cornell University Library, 201 Olin Library Cornell University Ithaca, NY 14853, Jan. 22, 2020 (Jan. 22, 2020), XP081584192, * section 4 *.

USPTO Notice of Allowance in U.S. Appl. No. 17/665,025 mailed on Feb. 15, 2024 (4 pages).

Verbraeken, Joost, Matthijs Waiting, Jonathan Katzy, Jeroen Kloppenburg, Tim Verbelen, and Jan S. Rellermeyer. "A survey on distributed machine learning." Acm computing surveys (csur) 53, No. 2 (2020): 1-33. (Year: 2020).

Y. Jiao et al. : "Toward an Automated Auction Framework for Wireless Federated Learning Services Market", arxiv.org, Cornell University Library, 201 Olin Library Cornell University Ithaca, NY 14853, Dec. 13, 2019 (Dec. 13, 2019), XP081558562 * section I and III-A to D * figure 1 *.

PCT International Search Report and Written Opinion issued in PCT/US2020/067068, dated Apr. 15, 2021; 13 pages.

"Mobile Edge Computing (MEC) Terminology", Mar. 2016, 7 pages, ETS GS MEC 001 v1.1.1.

"Mobile Edge Computing (MEC); Deployment of Mobile Edge Computing in an NFV environment", Feb. 2018, 32 pages, ETSI GR MEC 017 v1 .1.1.

"Mobile Edge Computing (MEC); Framework and Reference Architecture", Mar. 2016, 18 pages, ETS GS MEC 003, 1.1.1.

"Mobile Edge Computing (MEC); Mobile Edge Management; Part 1: System, host and platform management", Oct. 2017, 26 pages, ETSI GS MEC 010-1 v1.1.1.

"Mobile Edge Computing (MEC); Mobile Edge Management; Part 2: Application lifecycle, rules and requirements management", Jul. 2017, 48 pages, ETSI GS MEC 010-2 v1.1.1.

"Multi-access Edge Computing (MEC); Phase 2: Use Cases and Requirement", Oct. 2018, 66 pages, ETSI GS MEC 002 v2.1.1.

Chia-Yu Chang et al., "Analyzing MEC Architectural Implications for LTE/LTE-A", Feb. 2, 2016, 28 pages, EURECOM, RR-16-312, France.

Min Ye et al., "Communication-Computation Efficient Gradient Coding", Feb. 9, 2018, 20 pages.

PCT International Preliminary Report on Patentability issued in PCT/US2020/067068, dated Aug. 18, 2022; 10 pages.

Rashish Tandon et al., "Gradient Coding: Avoiding Stragglers in Distributed Learning", 2017, 9 pages.

USPTO Notice of Allowance in U.S. Appl. No. 16/235,682 mailed on Oct. 4, 2021 (11 pages).

EESR Notice of Extended European Search Report issued in EP Patent Application No. 21817091.8 issued on Jul. 5, 2024 (11 pages).

Fallah, Alireza, et al. Personalized Federated Learning: A Meta-Learning Approach. arXiv:2002.07948, arXiv, Oct. 22, 2020. arXiv.org, https://doi.org/10.48550/arXiv.2002.07948, 26 Pages.

(56)  References Cited

OTHER PUBLICATIONS

Nishio, Takayuki, and Ryo Yonetani. "Client Selection for Federated Learning with Heterogeneous Resources in Mobile Edge." ICC 2019—2019 IEEE International Conference on Communications (ICC), 2019, pp. 1-7, Apr. 2018, arXiv.org, https://doi.org/10.1109/ICC.2019.8761315, 7 Pages.

USPTO Non-Final OA for U.S. Appl. No. 17/921,549 (12 pages) received on Jul. 10, 2025.

Gargiani, Matilde. Hessian-CoCoA: a general parallel and distributed framework for non-strongly convex regularizers. MS thesis. ETH Zurich, 2017. (Year: 2017).

Mansour, Yishay, et al. "Three approaches for personalization with applications to federated learning." arXiv preprint arXiv: 2002. 10619 (2020). (Year: 2020).

Mu, Hong H., Y. P. Kakad, and B. G. Sherlock. "Application of Artificial Neural Networks in the Design of Control Systems." (2000). (Year: 2000).

USPTO Non-Final OA in U.S. Appl. No. 17/790,839 mailed on Jul. 28, 2025 (49 pages).

Zhu, Guangxu, Yong Wang, and Kaibin Huang. "Broadband analog aggregation for low-latency federated edge learning." IEEE transactions on wireless communications 19.1 (2019): 491-506. (Year: 2019).

USPTO Final OA for U.S. Appl. No. 17/921,549 (13 pages) received on Nov. 18, 2025.

\* cited by examiner

1000

ORBIT 1002   1001

MASSIVE MIMO
Antenna
1050

BACKHAUL

5G CN
1040

TERRESTRIAL
5G RAN
1030

UE
1020

1100

1300

2100

2400

SYSTEMS AND METHODS FOR DISTRIBUTED LEARNING FOR WIRELESS EDGE DYNAMICS

CROSS REFERENCE TO RELATED APPLICATIONS

This Application is a national stage application under 35 U.S.C. § 371 of PCT International Application Serial No. PCT/US2020/067068, filed on Dec. 26, 2020 and entitled SYSTEMS AND METHODS FOR DISTRIBUTED LEARNING FOR WIRELESS EDGE DYNAMICS, which application claims the benefit of, and priority from, U.S. Provisional Patent Application No. 62/969,576, entitled "JOINT COMPUTING, COMPUTE-COMMUNICATION AWARE AND DATA QUALITY CLIENT SELECTION AND IMPORTANCE SAMPLING METHODS IN FEDERATED LEARNING EDGE COMPUTING DEPLOYMENTS" and filed Feb. 3, 2020, U.S. Provisional Patent Application No. 62/969,583, entitled "DISTRIBUTED MACHINE LEARNING IN EDGE COMPUTING NETWORKS" and filed Feb. 3, 2020, U.S. Provisional Patent Application No. 63/087,069, entitled "DIFFERENTIALLY PRIVATE CODED FEDERATED LEARNING" and filed Oct. 2, 2020, and U.S. Provisional Patent Application No. 63/121,852, entitled "SYSTEMS AND METHODS FOR CODED FEDERATED LEARNING WITH IMPORTANCE SAMPLING AND/OR WITH DIFFERENT CODING REDUNDANCIES FOR CLIENTS IN EDGE COMPUTING DEPLOYMENTS" and filed Dec. 4, 2020. The disclosures of the prior applications are considered part of and are hereby incorporated by reference in their entirety in the disclosure of this application.

BACKGROUND

Edge computing, at a general level, refers to the implementation, coordination, and use of computing and resources at locations closer to the "edge" or collection of "edges" of the network. The purpose of this arrangement is to improve total cost of ownership, reduce application and network latency, reduce network backhaul traffic and associated energy consumption, improve service capabilities, and improve compliance with security or data privacy requirements (especially as compared to conventional cloud computing). Components that can perform edge computing operations ("edge nodes") can reside in whatever location needed by the system architecture or ad hoc service (e.g., in an high performance compute data center or cloud installation; a designated edge node server, an enterprise server, a roadside server, a telecom central office; or a local or peer at-the-edge device being served consuming edge services).

Applications that have been adapted for edge computing include but are not limited to virtualization of traditional network functions (e.g., to operate telecommunications or Internet services) and the introduction of next-generation features and services (e.g., to support 5G network services). Use-cases which are projected to extensively utilize edge computing include connected self-driving cars, surveillance, Internet of Things (IoT) device data analytics, video encoding and analytics, location aware services, device sensing in Smart Cities, among many other network and compute intensive services.

Edge computing may, in some scenarios, offer or host a cloud-like distributed service, to offer orchestration and management for applications, coordinated service instances and machine learning, such as federated machine learning, among many types of storage and compute resources. Edge computing is also expected to be closely integrated with existing use cases and technology developed for IoT and Fog/distributed networking configurations, as endpoint devices, clients, and gateways attempt to access network resources and applications at locations closer to the edge of the network.

Mechanisms are needed to address the challenges of developing globally accurate learning models over wireless edge networks with distributed data, and online, distributed algorithms deployed in real-time and using compute, communication and data resources that are heterogenous, mobile and that change dynamically.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Embodiments will focus on learning that is collaborative, hierarchical, and that uses distributed datasets/datapoints and processing while aiming to preserve privacy. Some embodiments advantageously draw on opportunities provided by resource rich, real-time compute environments offered by wireless edge networks to exploit sensing, compute, communication and storage resources, to lower latency and communication costs including by way of radio resource management, to increase privacy (for example by transferring results instead of raw data), to automate and scale ML training, to exploit wireless for computation including over the air combining, and to promote multi-stage learning.

Sections A through G. below will provide an overview of configurations for edge computing, such as wireless edge computing, including, respectively, overviews of edge computing, usage of containers in edge computing, mobility and multi-access edge computing (MEC) in edge computing settings, computing architectures and systems, machine readable medium and distributed software instructions, a satellite edge connectivity use case, software distribution in edge computing settings. Section H. provides an overview of machine learning in edge computing networks.

Sections H through P provide a detailed description of some respective demonstrative embodiments that address challenges of developing globally accurate learning models over wireless edge networks with distributed data. Aspects of embodiments described in any one of Sections H. through P. may be combined with other aspects described in any one of the same Sections as would be recognized by one skilled in the art. Embodiments of Sections H through P may be deployed or implemented using any of the configurations or environments described in any of Sections A through G described below.

a. Overviews of Edge Computing

Figure 1:
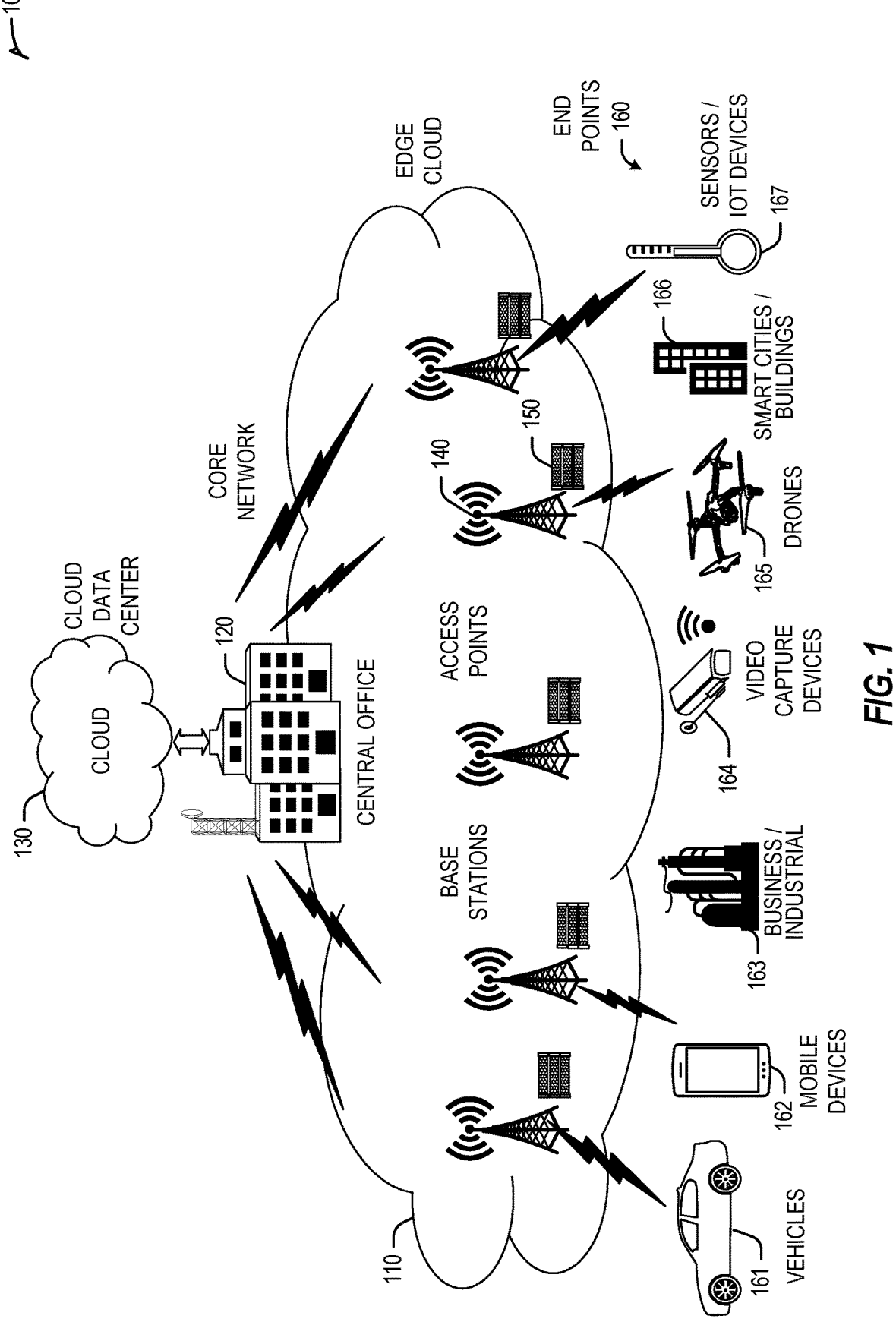
FIG. 1 illustrates an overview of an edge cloud configuration for edge computing.

FIG. 1 is a block diagram 100 showing an overview of a configuration for edge computing, which includes a layer of processing referred to in many of the following examples as an "edge cloud". As shown, the edge cloud 110 is co-located at an edge location, such as an access point or base station 140, a local processing hub 150, or a central office 120, and thus may include multiple entities, devices, and equipment instances. The edge cloud 110 is located much closer to the endpoint (consumer and producer) data sources 160 (e.g., autonomous vehicles 161, user equipment 162, business and industrial equipment 163, video capture devices 164, drones 165, smart cities and building devices 166, sensors and IoT devices 167, etc.) than the cloud data center 130. Compute, memory, and storage resources which are offered at the edges in the edge cloud 110 are critical to providing ultra-low latency response times for services and functions used by the endpoint data sources 160 as well as reduce network backhaul traffic from the edge cloud 110 toward cloud data center 130 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power might be constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, which may use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 2:
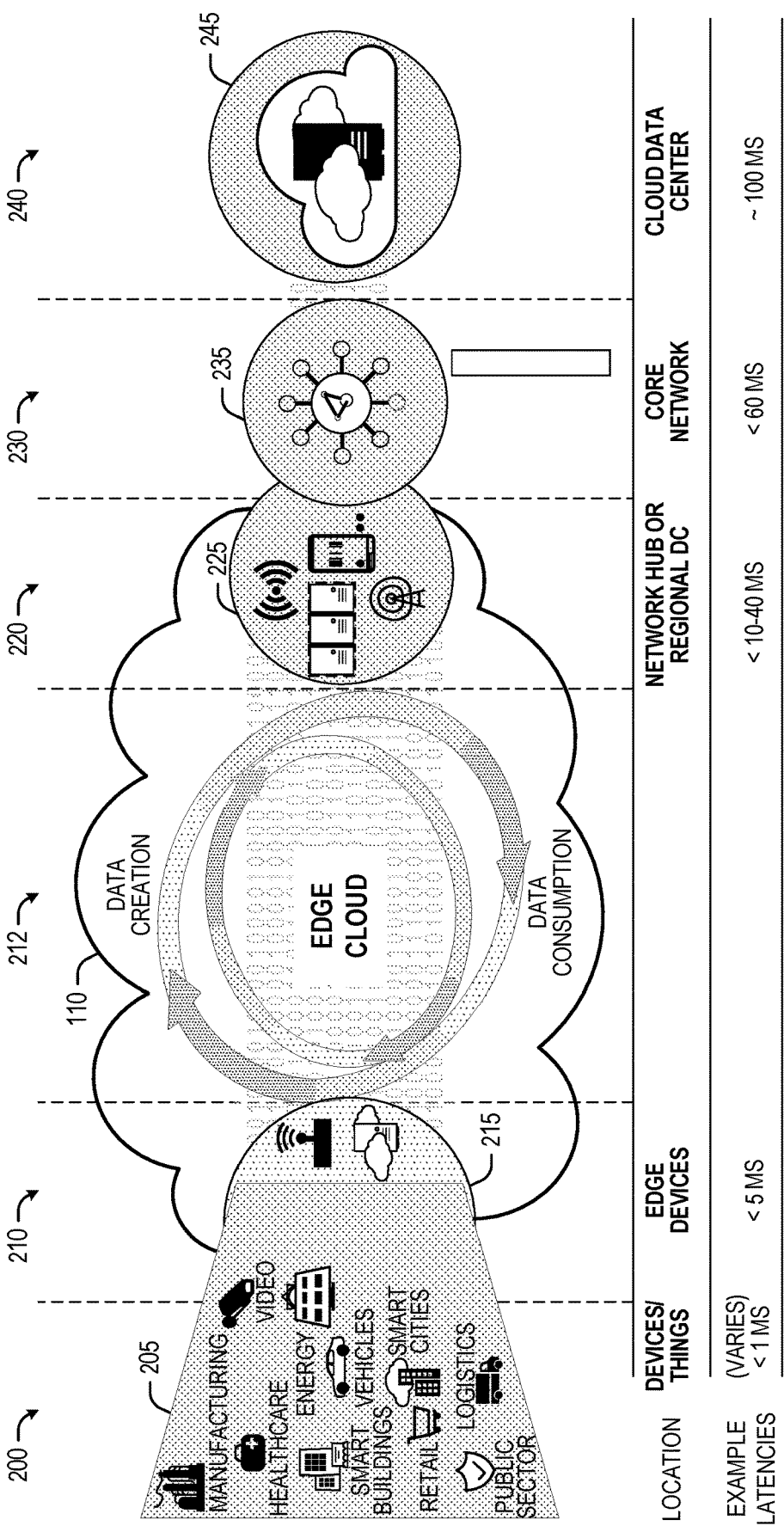
FIG. 2 illustrates operational layers among endpoints, an edge cloud, and cloud computing environments.

FIG. 2 illustrates operational layers among endpoints, an edge cloud, and cloud computing environments. Specifically, FIG. 2 depicts examples of computational use cases 205, utilizing the edge cloud 110 among multiple illustrative layers of network computing. The layers begin at an endpoint (devices and things) layer 200, which accesses the edge cloud 110 to conduct data creation, analysis, and data consumption activities. The edge cloud 110 may span multiple network layers, such as an edge devices layer 210 having gateways, on-premise servers, or network equipment (nodes 215) located in physically proximate edge systems; a network access layer 220, encompassing base stations, radio processing units, network hubs, regional data centers (DC), or local network equipment (equipment 225); and any equipment, devices, or nodes located therebetween (in layer 212, not illustrated in detail). The network communications within the edge cloud 110 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 200, under 5 ms at the edge devices layer 210, to even between 10 to 40 ms when communicating with nodes at the network access layer 220. Beyond the edge cloud 110 are core network 230 and cloud data center 240 layers, each with increasing latency (e.g., between 50-60 ms at the core network layer 230, to 100 or more ms at the cloud data center layer). As a result, operations at a core network data center 235 or a cloud data center 245, with latencies of at least 50 to 100 ms or more, will not be able to accomplish many time-critical functions of the use cases 205. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 235 or a cloud data center 245, a central office or content data network may be considered as being located within a "near edge" layer ("near" to the cloud, having high latency values when communicating with the devices and endpoints of the use cases 205), whereas an access point, base station, on-premise server, or network gateway may be considered as located within a "far edge" layer ("far" from the cloud, having low latency values when communicating with the devices and endpoints of the use cases 205). It will be understood that other categorizations of a particular network layer as constituting a "close", "local", "near", "middle", or "far" edge may be based on latency, distance, number of network hops, or other measurable characteristics, as measured from a source in any of the network layers 200-240.

The various use cases 205 may access resources under usage pressure from incoming streams, due to multiple services utilizing the edge cloud. To achieve results with low latency, the services executed within the edge cloud 110 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 110 may provide the ability to serve and respond to multiple applications of the use cases 205 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of edge computing comes the following caveats. The devices located at the edge may be resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 110 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 110 (network layers 200-240), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the Examples provided herein, a client computing node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 110.

As such, the edge cloud 110 is formed from network components and functional features operated by and within edge gateway nodes, edge aggregation nodes, or other edge computing nodes among network layers 210-230. The edge cloud 110 thus may be embodied as any type of network that provides edge computing and/or storage resources which are proximately located to radio access network (RAN) capable endpoint devices (e.g., mobile computing devices, IoT devices, smart devices, etc., which may be compatible with Open RAN (O-RAN) specifications promulgated by the O-RAN Alliance), which are discussed herein. In other words, the edge cloud 110 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 110 may be servers, multi-tenant servers, appliance computing devices, and/or any other type of computing devices. For example, the edge cloud 110 may include an appliance computing device that is a self-contained electronic device including a housing, a chassis, a case or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.) and/or racks (e.g., server racks, blade mounts, sleds, etc.). A server rack may refer to a structure that is designed specifically to house technical equipment including routers, switches, hubs, servers (including CPU and/or GPU-based compute devices), data storage devices (e.g., storage area network (SAN) devices), or other types of computing or networking devices. The rack may make it possible to securely hold multiple pieces of equipment in one area. In some cases, the rack may include one or more sleds. A sled may refer to a housing that allows for a number of various compute, GPU, and/or storage devices to be housed in a position of a rack (e.g., a 4 unit (4 U)-sized or other-sized unit). The sled may allow for the devices housed within it to be hot-swappable in some instances. Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 8. The edge cloud 110 may also include one or more servers and/or one or more multi-tenant servers. Such a server may include an operating system and implement a virtual computing environment. A virtual computing environment may include a hypervisor managing (e.g., spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 3:
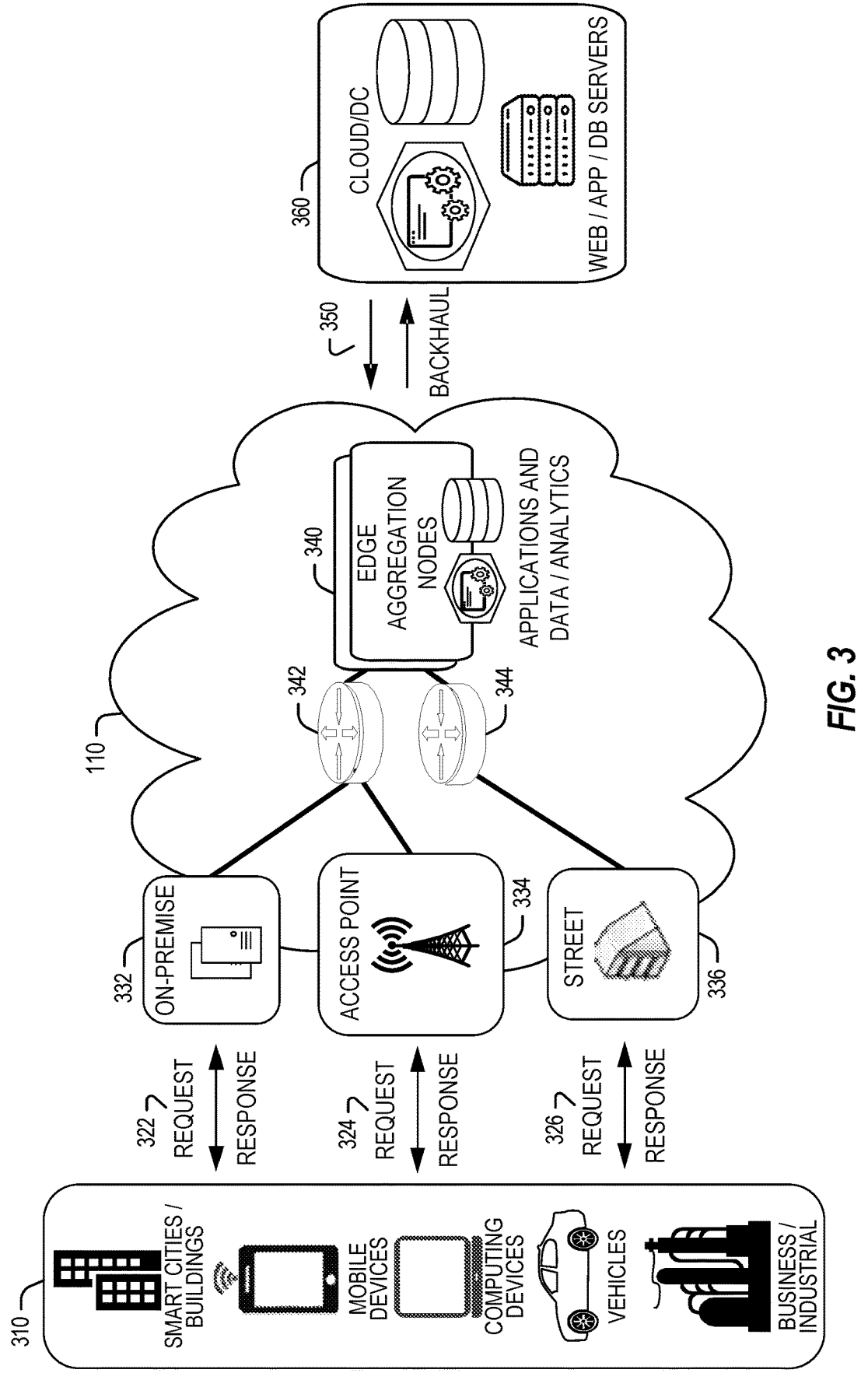
FIG. 3 illustrates an example approach for networking and services in an edge computing system.

In FIG. 3, various client endpoints 310 (in the form of mobile devices, computers, autonomous vehicles, business computing equipment, industrial processing equipment) exchange requests and responses that are specific to the type of endpoint network aggregation. For instance, client endpoints 310 may obtain network access via a wired broadband network, by exchanging requests and responses 322 through an on-premise network system 332. Some client endpoints 310, such as mobile computing devices, may obtain network access via a wireless broadband network, by exchanging requests and responses 324 through an access point (e.g., cellular network tower) 334. Some client endpoints 310, such as autonomous vehicles may obtain network access for requests and responses 326 via a wireless vehicular network through a street-located network system 336. However, regardless of the type of network access, the TSP may deploy aggregation points 342, 344 within the edge cloud 110 to aggregate traffic and requests. Thus, within the edge cloud 110, the TSP may deploy various compute and storage resources, such as at edge aggregation nodes 340, to provide requested content. The edge aggregation nodes 340 and other systems of the edge cloud 110 are connected to a cloud or data center 360, which uses a backhaul network 350 to fulfill higher-latency requests from a cloud/data center for websites, applications, database servers, etc. Additional or consolidated instances of the edge aggregation nodes 340 and the aggregation points 342, 344, including those deployed on a single server framework, may also be present within the edge cloud 110 or other areas of the TSP infrastructure.

B. Usage of Containers in Edge Computing

Figure 4:
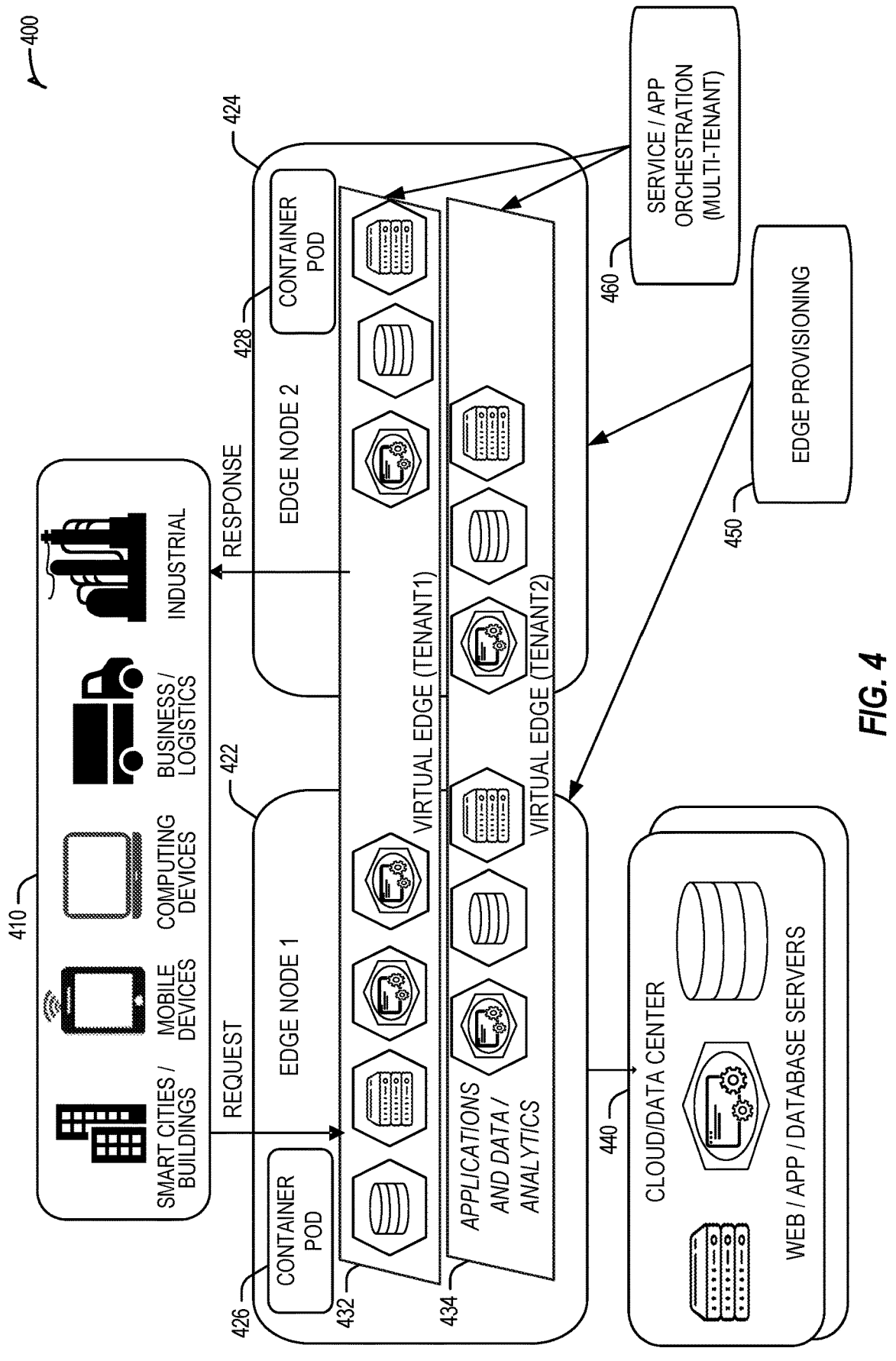
FIG. 4 illustrates deployment of a virtual edge configuration in an edge computing system operated among multiple edge nodes and multiple tenants.

FIG. 4 illustrates deployment and orchestration for virtualized and container-based edge configurations across an edge computing system operated among multiple edge nodes and multiple tenants (e.g., users, providers) which use such edge nodes. Specifically, FIG. 4 depicts coordination of a first edge node 422 and a second edge node 424 in an edge computing system 400, to fulfill requests and responses for various client endpoints 410 (e.g., smart cities/building systems, mobile devices, computing devices, business/logistics systems, industrial systems, etc.), which access various virtual edge instances. Here, the virtual edge instances 432, 434 provide edge compute capabilities and processing in an edge cloud, with access to a cloud/data center 440 for higher-latency requests for websites, applications, database servers, etc. However, the edge cloud enables coordination of processing among multiple edge nodes for multiple tenants or entities.

In the example of FIG. 4, these virtual edge instances include: a first virtual edge 432, offered to a first tenant (Tenant 1), which offers a first combination of edge storage, computing, and services; and a second virtual edge 434, offering a second combination of edge storage, computing, and services. The virtual edge instances 432, 434 are distributed among the edge nodes 422, 424, and may include scenarios in which a request and response are fulfilled from the same or different edge nodes. The configuration of the edge nodes 422, 424 to operate in a distributed yet coordinated fashion occurs based on edge provisioning functions 450. The functionality of the edge nodes 422, 424 to provide coordinated operation for applications and services, among multiple tenants, occurs based on orchestration functions 460.

It should be understood that some of the devices in 410 are multi-tenant devices where Tenant 1 may function within a tenant1 'slice' while a Tenant 2 may function within a tenant2 slice (and, in further examples, additional or sub-tenants may exist; and each tenant may even be specifically entitled and transactionally tied to a specific set of features all the way day to specific hardware features). A trusted multi-tenant device may further contain a tenant specific cryptographic key such that the combination of key and slice may be considered a "root of trust" (RoT) or tenant specific RoT. A RoT may further be computed dynamically composed using a DICE (Device Identity Composition Engine) architecture such that a single DICE hardware building block may be used to construct layered trusted computing base contexts for layering of device capabilities (such as a Field Programmable Gate Array (FPGA)). The RoT may further be used for a trusted computing context to enable a "fan-out" that is useful for supporting multi-tenancy. Within a multi-tenant environment, the respective edge nodes 422, 424 may operate as security feature enforcement points for local resources allocated to multiple tenants per node. Additionally, tenant runtime and application execution (e.g., in instances 432, 434) may serve as an enforcement point for a security feature that creates a virtual edge abstraction of resources spanning potentially multiple physical hosting platforms. Finally, the orchestration functions 460 at an orchestration entity may operate as a security feature enforcement point for marshalling resources along tenant boundaries.

Edge computing nodes may partition resources (memory, central processing unit (CPU), graphics processing unit (GPU), interrupt controller, input/output (1/O) controller, memory controller, bus controller, etc.) where respective partitionings may contain a RoT capability and where fan-out and layering according to a DICE model may further be applied to Edge Nodes. Cloud computing nodes may use containers, FaaS engines, Servlets, servers, or other computation abstraction that may be partitioned according to a DICE layering and fan-out structure to support a RoT context for each. Accordingly, the respective RoTs spanning devices 410, 422, and 440 may coordinate the establishment of a distributed trusted computing base (DTCB) such that a tenant-specific virtual trusted secure channel linking all elements end to end can be established.

Further, it will be understood that a container may have data or workload specific keys protecting its content from a previous edge node. As part of migration of a container, a pod controller at a source edge node may obtain a migration key from a target edge node pod controller where the migration key is used to wrap the container-specific keys. When the container/pod is migrated to the target edge node, the unwrapping key is exposed to the pod controller that then decrypts the wrapped keys. The keys may now be used to perform operations on container specific data. The migration functions may be gated by properly attested edge nodes and pod managers (as described above).

In further examples, an edge computing system is extended to provide for orchestration of multiple applications through the use of containers (a contained, deployable unit of software that provides code and needed dependencies) in a multi-owner, multi-tenant environment. A multi-tenant orchestrator may be used to perform key management, trust anchor management, and other security functions related to the provisioning and lifecycle of the trusted 'slice' concept in FIG. 4. For instance, an edge computing system may be configured to fulfill requests and responses for various client endpoints from multiple virtual edge instances (and, from a cloud or remote data center). The use of these virtual edge instances may support multiple tenants and multiple applications (e.g., augmented reality (AR)/virtual reality (VR), enterprise applications, content delivery, gaming, compute offload) simultaneously. Further, there may be multiple types of applications within the virtual edge instances (e.g., normal applications; latency sensitive applications; latency-critical applications; user plane applications; networking applications; etc.). The virtual edge instances may also be spanned across systems of multiple owners at different geographic locations (or, respective computing systems and resources which are co-owned or co-managed by multiple owners).

For instance, each edge node 422, 424 may implement the use of containers, such as with the use of a container "pod" 426, 428 providing a group of one or more containers. In a setting that uses one or more container pods, a pod controller or orchestrator is responsible for local control and orchestration of the containers in the pod. Various edge node resources (e.g., storage, compute, services, depicted with hexagons) provided for the respective edge slices 432, 434 are partitioned according to the needs of each container.

With the use of container pods, a pod controller oversees the partitioning and allocation of containers and resources. The pod controller receives instructions from an orchestrator (e.g., orchestrator 460) that instructs the controller on how best to partition physical resources and for what duration, such as by receiving key performance indicator (KPI) targets based on SLA contracts. The pod controller determines which container requires which resources and for how long in order to complete the workload and satisfy the SLA. The pod controller also manages container lifecycle operations such as: creating the container, provisioning it with resources and applications, coordinating intermediate results between multiple containers working on a distributed application together, dismantling containers when workload completes, and the like. Additionally, a pod controller may serve a security role that prevents assignment of resources until the right tenant authenticates or prevents provisioning of data or a workload to a container until an attestation result is satisfied.

Also, with the use of container pods, tenant boundaries can still exist but in the context of each pod of containers. If each tenant specific pod has a tenant specific pod controller, there will be a shared pod controller that consolidates resource allocation requests to avoid potential resource starvation situations. Further controls may be provided to ensure attestation and trustworthiness of the pod and pod controller. For instance, the orchestrator 460 may provision an attestation verification policy to local pod controllers that perform attestation verification. If an attestation satisfies a policy for a first tenant pod controller but not a second tenant pod controller, then the second pod could be migrated to a different edge node that does satisfy it. Alternatively, the first pod may be allowed to execute and a different shared pod controller is installed and invoked prior to the second pod executing.

Figure 5:
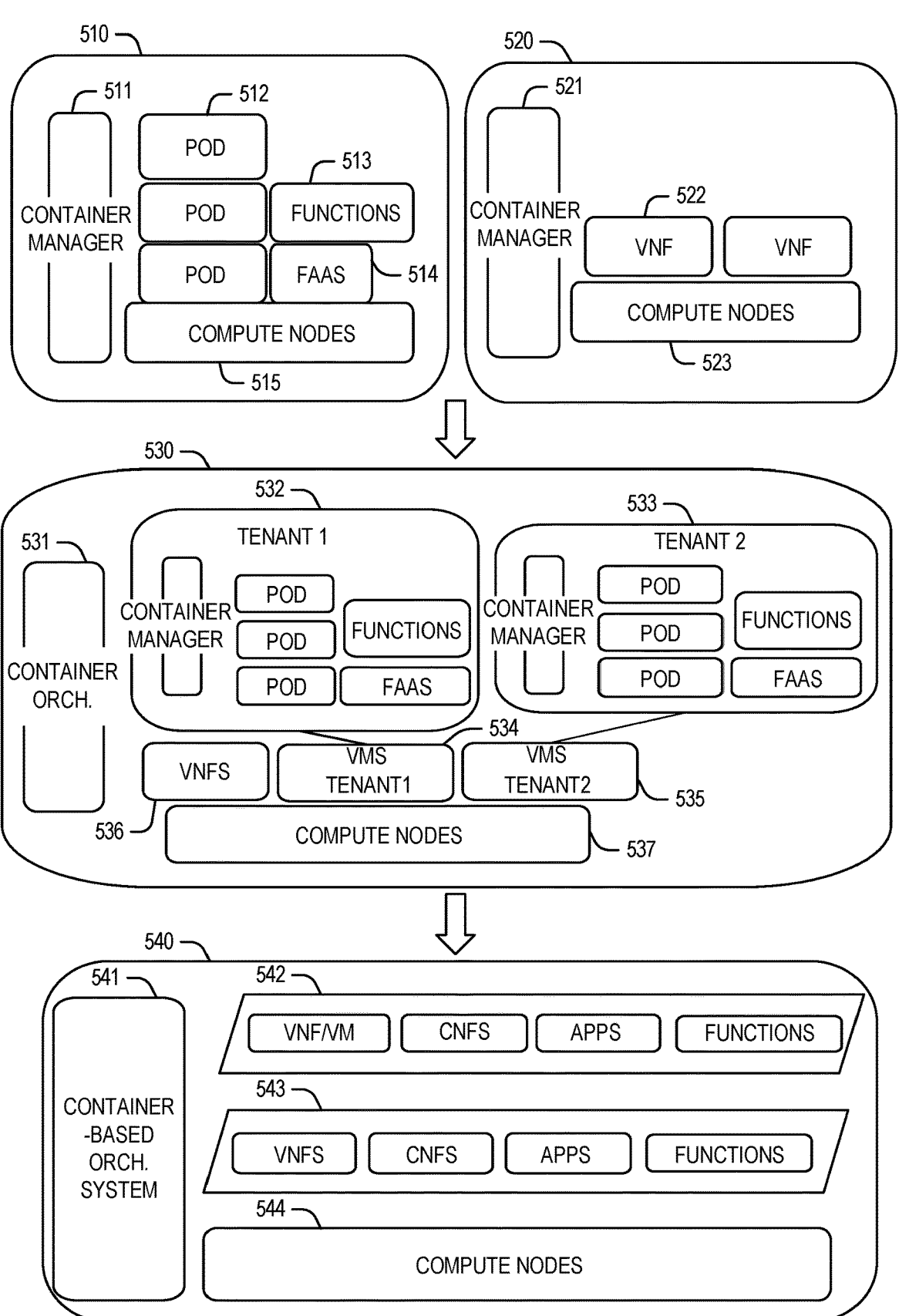
FIG. 5 illustrates various compute arrangements deploying containers in an edge computing system.

FIG. 5 illustrates additional compute arrangements deploying containers in an edge computing system. As a simplified example, system arrangements 510, 520 depict settings in which a pod controller (e.g., container managers 511, 521, and container orchestrator 531) is adapted to launch containerized pods, functions, and functions-as-a-service instances through execution via computing nodes (515 in arrangement 510), or to separately execute containerized virtualized network functions through execution via computing nodes (523 in arrangement 520). This arrangement is adapted for use of multiple tenants in system arrangement 530 (using computing nodes 537), where containerized pods (e.g., pods 512), functions (e.g., functions 513, VNFs 522, 536), and functions-as-a-service instances (e.g., FaaS instance 514) are launched within virtual machines (e.g., VMs 534, 535 for tenants 532, 533) specific to respective tenants (aside the execution of virtualized network functions). This arrangement is further adapted for use in system arrangement 540, which provides containers 542, 543, or execution of the various functions, applications, and functions on computing nodes 544, as coordinated by an container-based orchestration system 541.

The system arrangements of depicted in FIG. 5 provides an architecture that treats VMs, Containers, and Functions equally in terms of application composition (and resulting applications are combinations of these three ingredients). Each ingredient may involve use of one or more accelerator (FPGA, ASIC) components as a local backend. In this manner, applications can be split across multiple edge owners, coordinated by an orchestrator.

In the context of FIG. 5, the pod controller/container manager, container orchestrator, and individual nodes may provide a security enforcement point. However, tenant isolation may be orchestrated where the resources allocated to a tenant are distinct from resources allocated to a second tenant, but edge owners cooperate to ensure resource allocations are not shared across tenant boundaries. Or, resource allocations could be isolated across tenant boundaries, as tenants could allow "use" via a subscription or transaction/contract basis. In these contexts, virtualization, containerization, enclaves and hardware partitioning schemes may be used by edge owners to enforce tenancy. Other isolation environments may include: bare metal (dedicated) equipment, virtual machines, containers, virtual machines on containers, or combinations thereof.

In further examples, aspects of software-defined or controlled silicon hardware, and other configurable hardware, may integrate with the applications, functions, and services an edge computing system. Software defined silicon (SDSi) may be used to ensure the ability for some resource or hardware ingredient to fulfill a contract or service level agreement, based on the ingredient's ability to remediate a portion of itself or the workload (e.g., by an upgrade, reconfiguration, or provision of new features within the hardware configuration itself).

C. Mobility and Multi-Access Edge Computing (MEC) in Edge Computing Settings

Figure 6:
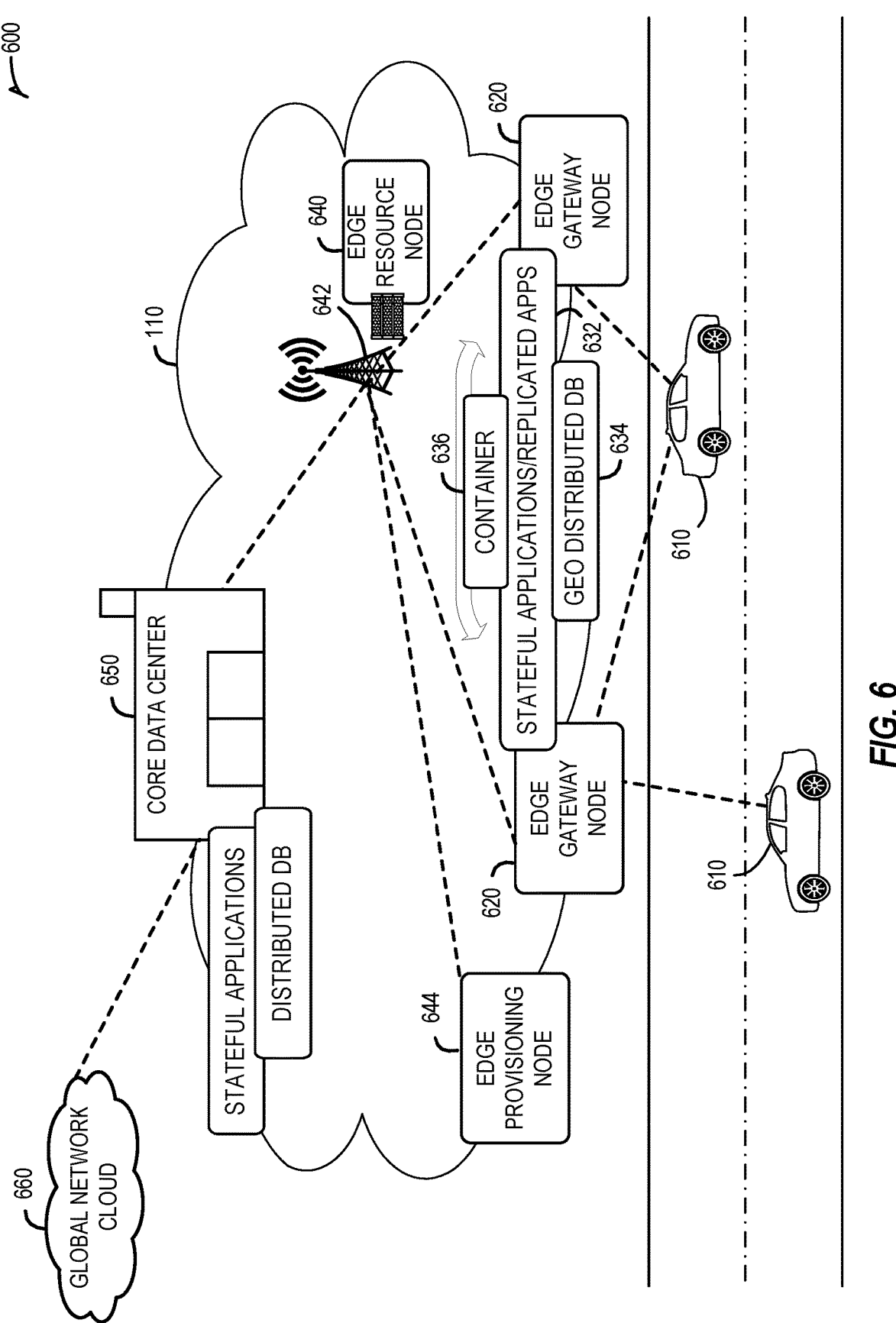
FIG. 6 illustrates a compute and communication use case involving mobile access to applications in an edge computing system.

It should be appreciated that the edge computing systems and arrangements discussed herein may be applicable in various solutions, services, and/or use cases involving mobility. As an example, FIG. 6 shows a simplified vehicle compute and communication use case involving mobile access to applications in an edge computing system 600 that implements an edge cloud 110. In this use case, respective client computing nodes 610 may be embodied as in-vehicle compute systems (e.g., in-vehicle navigation and/or infotainment systems) located in corresponding vehicles which communicate with the edge gateway nodes 620 during traversal of a roadway. For instance, the edge gateway nodes 620 may be located in a roadside cabinet or other enclosure built-into a structure having other, separate, mechanical utility, which may be placed along the roadway, at intersections of the roadway, or other locations near the roadway. As respective vehicles traverse along the roadway, the connection between its client computing node 610 and a particular edge gateway device 620 may propagate so as to maintain a consistent connection and context for the client computing node 610. Likewise, mobile edge nodes may aggregate at the high priority services or according to the throughput or latency resolution requirements for the underlying service(s) (e.g., in the case of drones). The respective edge gateway devices 620 include an amount of processing and storage capabilities and, as such, some processing and/or storage of data for the client computing nodes 610 may be performed on one or more of the edge gateway devices 620.

The edge gateway devices 620 may communicate with one or more edge resource nodes 640, which are illustratively embodied as compute servers, appliances or components located at or in a communication base station 642 (e.g., a base station of a cellular network). As discussed above, the respective edge resource nodes 640 include an amount of processing and storage capabilities and, as such, some processing and/or storage of data for the client computing nodes 610 may be performed on the edge resource node 640. For example, the processing of data that is less urgent or important may be performed by the edge resource node 640, while the processing of data that is of a higher urgency or importance may be performed by the edge gateway devices 620 (depending on, for example, the capabilities of each component, or information in the request indicating urgency or importance). Based on data access, data location or latency, work may continue on edge resource nodes when the processing priorities change during the processing activity. Likewise, configurable systems or hardware resources themselves can be activated (e.g., through a local orchestrator) to provide additional resources to meet the new demand (e.g., adapt the compute resources to the workload data).

The edge resource node(s) 640 also communicate with the core data center 650, which may include compute servers, appliances, and/or other components located in a central location (e.g., a central office of a cellular communication network). The core data center 650 may provide a gateway to the global network cloud 660 (e.g., the Internet) for the edge cloud 110 operations formed by the edge resource node(s) 640 and the edge gateway devices 620. Additionally, in some examples, the core data center 650 may include an amount of processing and storage capabilities and, as such, some processing and/or storage of data for the client compute devices may be performed on the core data center 650 (e.g., processing of low urgency or importance, or high complexity).

The edge gateway nodes 620 or the edge resource nodes 640 may offer the use of stateful applications 632 and a geographic distributed database 634. Although the applications 632 and database 634 are illustrated as being horizontally distributed at a layer of the edge cloud 110, it will be understood that resources, services, or other components of the application may be vertically distributed throughout the edge cloud (including, part of the application executed at the client computing node 610, other parts at the edge gateway nodes 620 or the edge resource nodes 640, etc.). Additionally, as stated previously, there can be peer relationships at any level to meet service objectives and obligations. Further, the data for a specific client or application can move from edge to edge based on changing conditions (e.g., based on acceleration resource availability, following the car movement, etc.). For instance, based on the "rate of decay" of access, prediction can be made to identify the next owner to continue, or when the data or computational access will no longer be viable. These and other services may be utilized to complete the work that is needed to keep the transaction compliant and lossless.

In further scenarios, a container 636 (or pod of containers) may be flexibly migrated from an edge node 620 to other edge nodes (e.g., 620, 640, etc.) such that the container with an application and workload does not need to be reconstituted, re-compiled, re-interpreted in order for migration to work. However, in such settings, there may be some remedial or "swizzling" translation operations applied. For example, the physical hardware at node 640 may differ from edge gateway node 620 and therefore, the hardware abstraction layer (HAL) that makes up the bottom edge of the container will be re-mapped to the physical layer of the target edge node. This may involve some form of late-binding technique, such as binary translation of the HAL from the container native format to the physical hardware format, or may involve mapping interfaces and operations. A pod controller may be used to drive the interface mapping as part of the container lifecycle, which includes migration to/from different hardware environments.

The scenarios encompassed by FIG. 6 may utilize various types of mobile edge nodes, such as an edge node hosted in a vehicle (car/truck/tram/train) or other mobile unit, as the edge node will move to other geographic locations along the platform hosting it. With vehicle-to-vehicle communications, individual vehicles may even act as network edge nodes for other cars, (e.g., to perform caching, reporting, data aggregation, etc.). Thus, it will be understood that the application components provided in various edge nodes may be distributed in static or mobile settings, including coordination between some functions or operations at individual endpoint devices or the edge gateway nodes 620, some others at the edge resource node 640, and others in the core data center 650 or global network cloud 660.

In further configurations, the edge computing system may implement FaaS computing capabilities through the use of respective executable applications and functions. In an example, a developer writes function code (e.g., "computer code" herein) representing one or more computer functions, and the function code is uploaded to a FaaS platform provided by, for example, an edge node or data center. A trigger such as, for example, a service use case or an edge processing event, initiates the execution of the function code with the FaaS platform.

In an example of FaaS, a container is used to provide an environment in which function code (e.g., an application which may be provided by a third party) is executed. The container may be any isolated-execution entity such as a process, a Docker or Kubernetes container, a virtual machine, etc. Within the edge computing system, various datacenter, edge, and endpoint (including mobile) devices are used to "spin up" functions (e.g., activate and/or allocate function actions) that are scaled on demand. The function code gets executed on the physical infrastructure (e.g., edge computing node) device and underlying virtualized containers. Finally, container is "spun down" (e.g., deactivated and/or deallocated) on the infrastructure in response to the execution being completed.

Further aspects of FaaS may enable deployment of edge functions in a service fashion, including a support of respective functions that support edge computing as a service (Edge-as-a-Service or "EaaS"). Additional features of FaaS may include: a granular billing component that enables customers (e.g., computer code developers) to pay only when their code gets executed; common data storage to store data for reuse by one or more functions; orchestration and management among individual functions; function execution management, parallelism, and consolidation; management of container and function memory spaces; coordination of acceleration resources available for functions; and distribution of functions between containers (including "warm" containers, already deployed or operating, versus "cold" which require initialization, deployment, or configuration).

The edge computing system 600 can include or be in communication with an edge provisioning node 644. The edge provisioning node 644 can distribute software such as the example computer readable instructions 882 of FIG. 8, to various receiving parties for implementing any of the methods described herein. The example edge provisioning node 644 may be implemented by any computer server, home server, content delivery network, virtual server, software distribution system, central facility, storage device, storage node, data facility, cloud service, etc., capable of storing and/or transmitting software instructions (e.g., code, scripts, executable binaries, containers, packages, compressed files, and/or derivatives thereof) to other computing devices. Component(s) of the example edge provisioning node 644 may be located in a cloud, in a local area network, in an edge network, in a wide area network, on the Internet, and/or any other location communicatively coupled with the receiving party(ies). The receiving parties may be customers, clients, associates, users, etc. of the entity owning and/or operating the edge provisioning node 644. For example, the entity that owns and/or operates the edge provisioning node 644 may be a developer, a seller, and/or a licensor (or a customer and/or consumer thereof) of software instructions such as the example computer readable instructions 882 of FIG. 8. The receiving parties may be consumers, service providers, users, retailers, OEMs, etc., who purchase and/or license the software instructions for use and/or re-sale and/or sub-licensing.

In an example, edge provisioning node 644 includes one or more servers and one or more storage devices. The storage devices host computer readable instructions such as the example computer readable instructions 882 of FIG. 8, as described below. Similarly to edge gateway devices 620 described above, the one or more servers of the edge provisioning node 644 are in communication with a base station 642 or other network communication entity. In some examples, the one or more servers are responsive to requests to transmit the software instructions to a requesting party as part of a commercial transaction. Payment for the delivery, sale, and/or license of the software instructions may be handled by the one or more servers of the software distribution platform and/or via a third-party payment entity. The servers enable purchasers and/or licensors to download the computer readable instructions 882 from the edge provisioning node 644. For example, the software instructions, which may correspond to the example computer readable instructions 882 of FIG. 8, may be downloaded to the example processor platform/s, which is to execute the computer readable instructions 882 to implement the methods described herein.

In some examples, the processor platform(s) that execute the computer readable instructions 882 can be physically located in different geographic locations, legal jurisdictions, etc. In some examples, one or more servers of the edge provisioning node 644 periodically offer, transmit, and/or force updates to the software instructions (e.g., the example computer readable instructions 882 of FIG. 8) to ensure improvements, patches, updates, etc. are distributed and applied to the software instructions implemented at the end user devices. In some examples, different components of the computer readable instructions 882 can be distributed from different sources and/or to different processor platforms; for example, different libraries, plug-ins, components, and other types of compute modules, whether compiled or interpreted, can be distributed from different sources and/or to different processor platforms. For example, a portion of the software instructions (e.g., a script that is not, in itself, executable) may be distributed from a first source while an interpreter (capable of executing the script) may be distributed from a second source.

Figure 7:
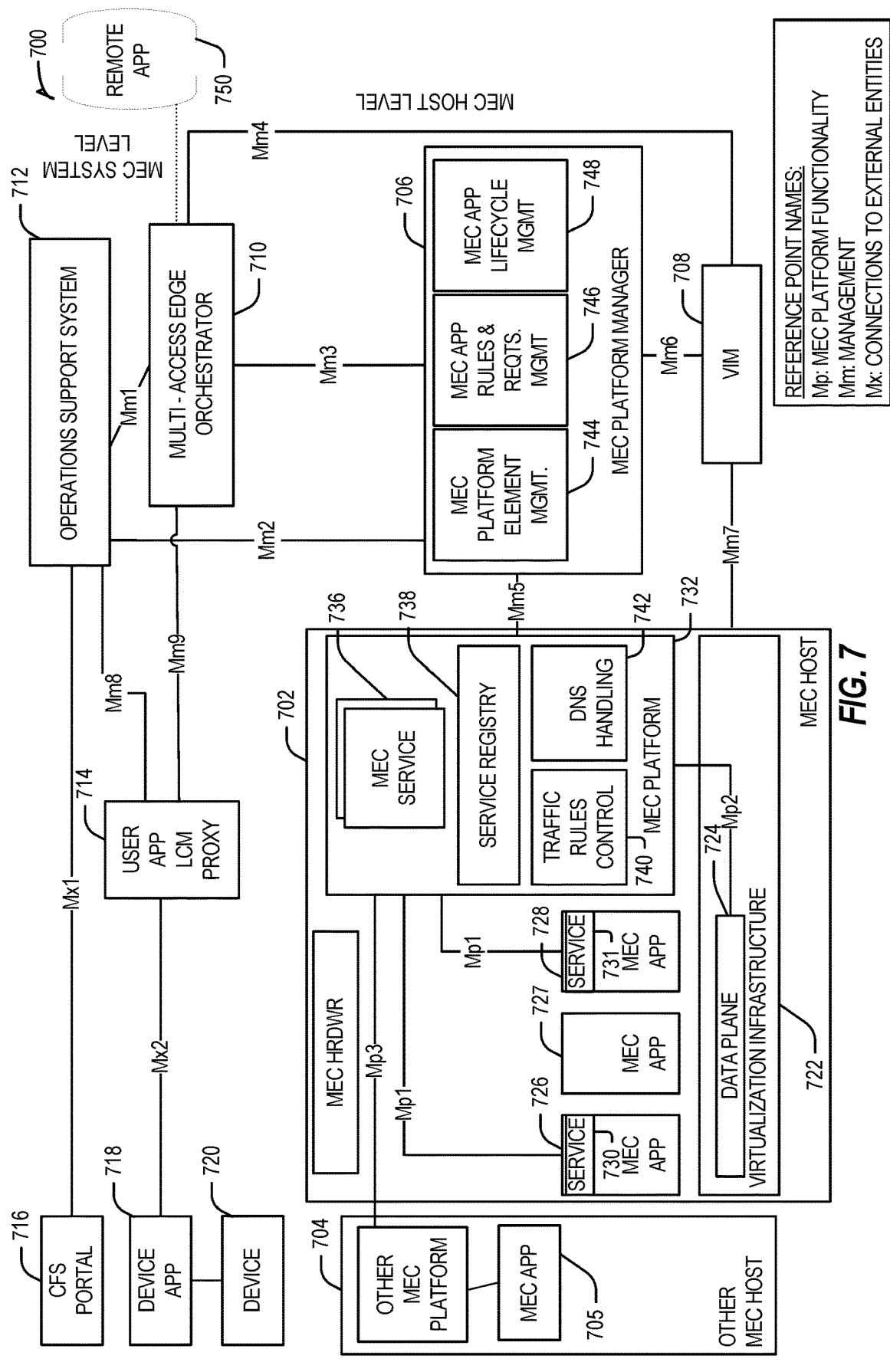
FIG. 7 illustrates an example mobile edge system reference architecture, arranged according to an ETSI Multi-Access Edge Computing (MEC) specification.

FIG. 7 illustrates a mobile edge system reference architecture (or MEC architecture) 700, such as is indicated by ETSI MEC specifications. FIG. 7 specifically illustrates a MEC architecture 700 with MEC hosts 702 and 704 providing functionalities in accordance with the ETSI GS MEC-003 specification. In some aspects, enhancements to the MEC platform 732 and the MEC platform manager 706 may be used for providing specific computing functions within the MEC architecture 700.

Referring to FIG. 7, the MEC network architecture 700 can include MEC hosts 702 and 704, a virtualization infrastructure manager (VIM) 708, an MEC platform manager 706, an MEC orchestrator 710, an operations support system 712, a user app proxy 714, a UE app 718 running on UE 720, and CFS portal 716. The MEC host 702 can include a MEC platform 732 with filtering rules control component 740, a DNS handling component 742, a service registry 738, and MEC services 736. The MEC services 736 can include at least one scheduler, which can be used to select resources for instantiating MEC apps (or NFVs) 726, 727, and 728 upon virtualization infrastructure 722. The MEC apps 726 and 728 can be configured to provide services 730 and 731, which can include processing network communications traffic of different types associated with one or more wireless connections (e.g., connections to one or more RAN (e.g., O-RAN) or telecom-core network entities). The MEC app 705 instantiated within MEC host 704 can be similar to the MEC apps 726-728 instantiated within MEC host 702. The virtualization infrastructure 722 includes a data plane 724 coupled to the MEC platform via an MP2 interface. Additional interfaces between various network entities of the MEC architecture 700 are illustrated in FIG. 7.

The MEC platform manager 706 can include MEC platform element management component 744, MEC app rules and requirements management component 746, and MEC app lifecycle management component 748. The various entities within the MEC architecture 700 can perform functionalities as disclosed by the ETSI GS MEC-003 specification.

In some aspects, the remote application (or app) 750 is configured to communicate with the MEC host 702 (e.g., with the MEC apps 726-728) via the MEC orchestrator 710 and the MEC platform manager 706.

D. Computing Architectures and Systems

In further examples, any of the computing nodes or devices discussed with reference to the present edge computing systems and environment may be fulfilled based on the components depicted in FIG. 8. Respective edge computing nodes may be embodied as a type of device, appliance, computer, or other "thing" capable of communicating with other edge, networking, or endpoint components. For example, an edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

Figure 8:
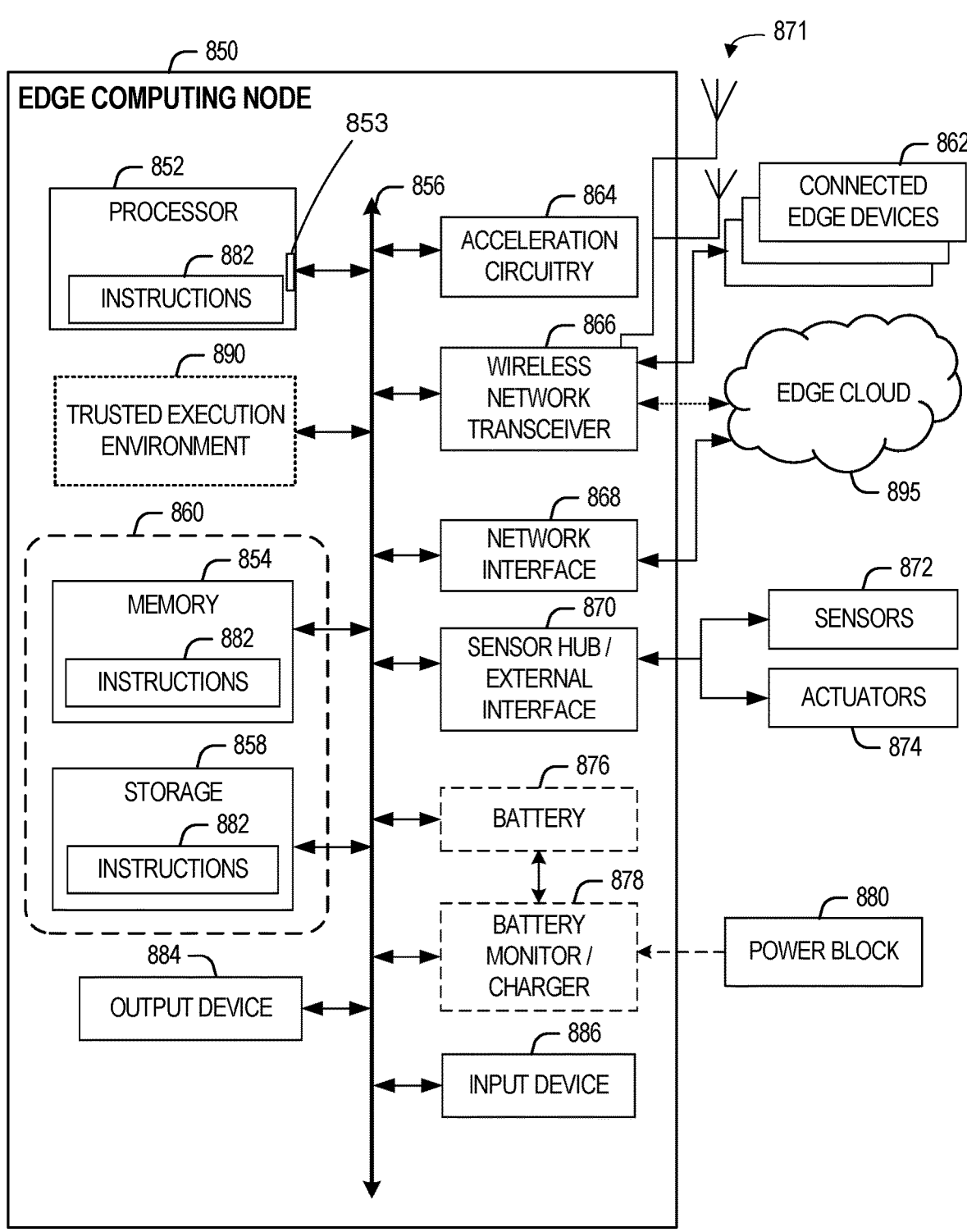
FIG. 8 provides a further overview of example components within a computing device in an edge computing system.

In a more detailed example, FIG. 8 illustrates a block diagram of an example of components that may be present in an edge computing node 850 for implementing the techniques (e.g., operations, processes, methods, and methodologies) described herein. The edge computing node 850 may include any combinations of the hardware or logical components referenced herein, and it may include or couple with any device usable with an edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the edge computing node 850, or as components otherwise incorporated within a chassis of a larger system.

The edge computing device 850 may include processing circuitry in the form of a processor 852, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 852 may be a part of a system on a chip (SoC) in which the processor 852 and other components are formed into a single integrated circuit, or a single package, such as the Edison™ or Galileo™ SoC boards from Intel Corporation, Santa Clara, California. As an example, the processor 852 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-13 processor from Apple® Inc., a Snapdragon™ processor from Qualcomm® Technologies, Inc., or an OMAP™ processor from Texas Instruments, Inc. The processor 852 and accompanying circuitry may be provided in a single socket form factor, multiple socket form factor, or a variety of other formats, including in limited hardware configurations or configurations that include fewer than all elements shown in FIG. 8.

The processor 852 may communicate with a system memory 854 over an interconnect 856 (e.g., a bus) through an interconnect interface 853 of the processor. The interconnect interface 853 may include any input/output connection of the processor 852 that allows the processor 852 to be connected through interconnect 856 to other components of the edge computing node 850. The processor 852 may include one or more processors and/or any type of processing circuitry. Any number of memory devices may be used to provide for a given amount of system memory. As examples, the memory 754 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples, the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or Mini-DIMMs.

To provide for persistent storage of information such as data, applications, operating systems and so forth, a storage 858 may also couple to the processor 852 via the interconnect 856. In an example, the storage 858 may be implemented via a solid-state disk drive (SSDD). Other devices that may be used for the storage 858 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 858 may be on-die memory or registers associated with the processor 852. However, in some examples, the storage 858 may be implemented using a micro hard disk drive (HDD). Further, any number of new technologies may be used for the storage 858 in addition to, or instead of, the technologies described, such resistance change memories, phase change memories, holographic memories, or chemical memories, among others.

The components may communicate over the interconnect 856. The interconnect 856 may include any number of technologies, including industry standard architecture (ISA), extended ISA (EISA), peripheral component interconnect (PCI), peripheral component interconnect extended (PCIx), PCI express (PCIe), or any number of other technologies. The interconnect 856 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 856 may couple the processor 852 to a transceiver 866, for communications with the connected edge devices 862. The transceiver 866 may be coupled to one or more antennas 871 of the edge computing node 850 to enable the edge computing node to wirelessly communicate with other edge computing nodes or other nodes in the wireless edge network. The transceiver 866 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 862. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 866 (or multiple transceivers) may communicate using multiple standards or radios for communications at a different range. For example, the edge computing node 850 may communicate with close devices, e.g., within about 10 meters, using a local transceiver based on Bluetooth Low Energy (BLE), or another low power radio, to save power. More distant connected edge devices 862, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 866 (e.g., a radio transceiver) may be included to communicate with devices or services in a cloud (e.g., an edge cloud 895) via local or wide area network protocols. The wireless network transceiver 866 may be a low-power wide-area (LPWA) transceiver that follows the IEEE 802.15.4, or IEEE 802.15.4g standards, among others. The edge computing node 850 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 866, as described herein. For example, the transceiver 866 may include a cellular transceiver that uses spread spectrum (SPA/SAS) communications for implementing high-speed communications. Further, any number of other protocols may be used, such as Wi-Fi® networks for medium speed communications and provision of network communications. The transceiver 866 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 868 may be included to provide a wired communication to nodes of the edge cloud 895 or to other devices, such as the connected edge devices 862 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 868 may be included to enable connecting to a second network, for example, a first NIC 868 providing communications to the cloud over Ethernet, and a second NIC 868 providing communications to other devices over another type of network.

Given the variety of types of applicable communications from the device to another component or network, applicable communications circuitry used by the device may include or be embodied by any one or more of components 864, 866, 868, or 870. Accordingly, in various examples, applicable means for communicating (e.g., receiving, transmitting, etc.) may be embodied by such communications circuitry.

The edge computing node 850 may include or be coupled to acceleration circuitry 864, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific edge computing tasks for service management and service operations discussed elsewhere in this document.

The interconnect 856 may couple the processor 852 to a sensor hub or external interface 870 that is used to connect additional devices or subsystems. The devices may include sensors 872, such as accelerometers, level sensors, flow sensors, optical light sensors, camera sensors, temperature sensors, global navigation system (e.g., GPS) sensors, pressure sensors, barometric pressure sensors, and the like. The hub or interface 870 further may be used to connect the edge computing node 850 to actuators 874, such as power switches, valve actuators, an audible sound generator, a visual warning device, and the like.

In some optional examples, various input/output (I/O) devices may be present within or connected to, the edge computing node 850. For example, a display or other output device 884 may be included to show information, such as sensor readings or actuator position. An input device 886, such as a touch screen or keypad may be included to accept input. An output device 884 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the edge computing node 850. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 876 may power the edge computing node 850, although, in examples in which the edge computing node 850 is mounted in a fixed location, it may have a power supply coupled to an electrical grid, or the battery may be used as a backup or for temporary capabilities. The battery 876 may be a lithium ion battery, or a metal-air battery, such as a zinc-air battery, an aluminum-air battery, a lithium-air battery, and the like.

A battery monitor/charger 878 may be included in the edge computing node 850 to track the state of charge (SoCh) of the battery 876, if included. The battery monitor/charger 878 may be used to monitor other parameters of the battery 876 to provide failure predictions, such as the state of health (SoH) and the state of function (SoF) of the battery 876. The battery monitor/charger 878 may include a battery monitoring integrated circuit, such as an LTC4020 or an LT7990 from Linear Technologies, an ADT7488A from ON Semiconductor of Phoenix Arizona, or an IC from the UCD90xxx family from Texas Instruments of Dallas, TX. The battery monitor/charger 878 may communicate the information on the battery 876 to the processor 852 over the interconnect 856. The battery monitor/charger 878 may also include an analog-to-digital (ADC) converter that enables the processor 852 to directly monitor the voltage of the battery 876 or the current flow from the battery 876. The battery parameters may be used to determine actions that the edge computing node 850 may perform, such as transmission frequency, mesh network operation, sensing frequency, and the like.

A power block 880, or other power supply coupled to a grid, may be coupled with the battery monitor/charger 878 to charge the battery 876. In some examples, the power block 880 may be replaced with a wireless power receiver to obtain the power wirelessly, for example, through a loop antenna in the edge computing node 850. A wireless battery charging circuit, such as an LTC4020 chip from Linear Technologies of Milpitas, California, among others, may be included in the battery monitor/charger 878. The specific charging circuits may be selected based on the size of the battery 876, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 858 may include instructions 882 in the form of software, firmware, or hardware commands to implement the techniques described herein. Although such instructions 882 are shown as code blocks included in the memory 854 and the storage 858, it may be understood that any of the code blocks may be replaced with hardwired circuits, for example, built into an application specific integrated circuit (ASIC).

In an example, the instructions 882 provided via the memory 854, the storage 858, or the processor 852 may be embodied as a non-transitory, machine-readable medium 860 including code to direct the processor 852 to perform electronic operations in the edge computing node 850. The processor 852 may access the non-transitory, machine-readable medium 860 over the interconnect 856. For instance, the non-transitory, machine-readable medium 860 may be embodied by devices described for the storage 858 or may include specific storage units such as optical disks, flash drives, or any number of other hardware devices. The non-transitory, machine-readable medium 860 may include instructions to direct the processor 852 to perform a specific sequence or flow of actions, for example, as described with respect to the flowchart(s) and block diagram(s) of operations and functionality depicted above. As used herein, the terms "machine-readable medium" and "computer-readable medium" are interchangeable.

Also in a specific example, the instructions 882 on the processor 852 (separately, or in combination with the instructions 882 of the machine readable medium 860) may configure execution or operation of a trusted execution environment (TEE) 890. In an example, the TEE 890 operates as a protected area accessible to the processor 852 for secure execution of instructions and secure access to data. Various implementations of the TEE 890, and an accompanying secure area in the processor 852 or the memory 854 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 850 through the TEE 890 and the processor 852.

E. Machine Readable Medium and Distributed Software Instructions

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., Hypertext Transfer Protocol (HTTP)).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Figure 9:
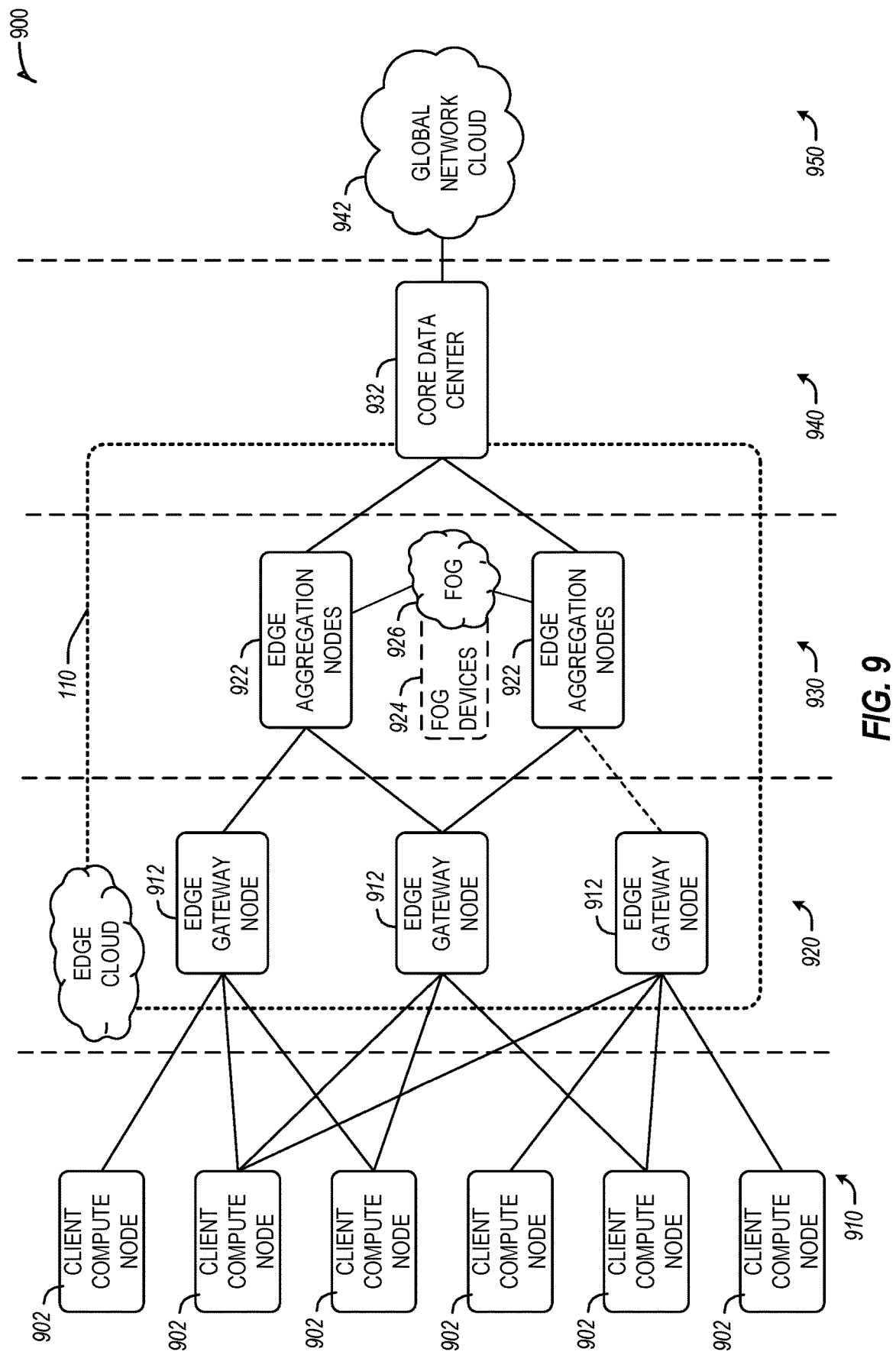
FIG. 9 illustrates an overview of layers of distributed compute deployed among an edge computing system, according to an example.

At a more generic level, an edge computing system may be described to encompass any number of deployments operating in an edge cloud 110, which provide coordination from client and distributed computing devices. FIG. 9 provides a further abstracted overview of layers of distributed compute deployed among an edge computing environment for purposes of illustration.

FIG. 9 generically depicts an edge computing system for providing edge services and applications to multi-stakeholder entities, as distributed among one or more client computing nodes 902, one or more edge gateway nodes 912, one or more edge aggregation nodes 922, one or more core data centers 932, and a global network cloud 942, as distributed across layers of the network. The implementation of the edge computing system may be provided at or on behalf of a telecommunication service provider ("telco", or "TSP"), internet-of-things service provider, cloud service provider (CSP), enterprise entity, or any other number of entities.

Each node or device of the edge computing system is located at a particular layer corresponding to layers 910, 920, 930, 940, 950. For example, the client computing nodes 902 are each located at an endpoint layer 910, while each of the edge gateway nodes 912 are located at an edge devices layer 920 (local level) of the edge computing system. Additionally, each of the edge aggregation nodes 922 (and/ or fog devices 924, if arranged or operated with or among a fog networking configuration 926) are located at a network access layer 930 (an intermediate level). Fog computing (or "fogging") generally refers to extensions of cloud computing to the edge of an enterprise's network, typically in a coordinated distributed or multi-node network. Some forms of fog computing provide the deployment of compute, storage, and networking services between end devices and cloud computing data centers, on behalf of the cloud computing locations. Such forms of fog computing provide operations that are consistent with edge computing as discussed herein; many of the edge computing aspects discussed herein are applicable to fog networks, fogging, and fog configurations. Further, aspects of the edge computing systems discussed herein may be configured as a fog, or aspects of a fog may be integrated into an edge computing architecture.

The core data center 932 is located at a core network layer 940 (e.g., a regional or geographically-central level), while the global network cloud 942 is located at a cloud data center layer 950 (e.g., a national or global layer). The use of "core" is provided as a term for a centralized network location-deeper in the network-which is accessible by multiple edge nodes or components; however, a "core" does not necessarily designate the "center" or the deepest location of the network. Accordingly, the core data center 932 may be located within, at, or near the edge cloud 110.

Although an illustrative number of client computing nodes 902, edge gateway nodes 912, edge aggregation nodes 922, core data centers 932, global network clouds 942 are shown in FIG. 9, it should be appreciated that the edge computing system may include more or fewer devices or systems at each layer. Additionally, as shown in FIG. 9, the number of components of each layer 910, 920, 930, 940, 950 generally increases at each lower level (i.e., when moving closer to endpoints). As such, one edge gateway node 912 may service multiple client computing nodes 902, and one edge aggregation node 922 may service multiple edge gateway nodes 912.

Consistent with the examples provided herein, each client computing node 902 may be embodied as any type of end point component, device, appliance, or "thing" capable of communicating as a producer or consumer of data. Further, the label "node" or "device" as used in the edge computing system 900 does not necessarily mean that such node or device operates in a client or agent/minion/follower role; rather, any of the nodes or devices in the edge computing system 900 refer to individual entities, nodes, or subsystems which include discrete or connected hardware or software configurations to facilitate or use the edge cloud 110.

As such, the edge cloud 110 is formed from network components and functional features operated by and within the edge gateway nodes 912 and the edge aggregation nodes 922 of layers 920, 930, respectively. The edge cloud 110 may be embodied as any type of network that provides edge computing and/or storage resources which are proximately located to radio access network (RAN) capable endpoint devices (e.g., mobile computing devices, IoT devices, smart devices, etc., which may be compatible with O-RAN specifications), which are shown in FIG. 9 as the client computing nodes 902. In other words, the edge cloud 110 may be envisioned as an "edge" which connects the endpoint devices and traditional mobile network access points that serves as an ingress point into service provider core networks, including carrier networks (e.g., Global System for Mobile Communications (GSM) networks, Long-Term Evolution (LTE) networks, 5G networks, etc.), while also providing storage and/or compute capabilities. Other types and forms of network access (e.g., Wi-Fi, long-range wireless networks) may also be utilized in place of or in combination with such 3GPP carrier networks.

In some examples, the edge cloud 110 may form a portion of or otherwise provide an ingress point into or across a fog networking configuration 926 (e.g., a network of fog devices 924, not shown in detail), which may be embodied as a system-level horizontal and distributed architecture that distributes resources and services to perform a specific function. For instance, a coordinated and distributed network of fog devices 924 may perform computing, storage, control, or networking aspects in the context of an IoT system arrangement. Other networked, aggregated, and distributed functions may exist in the edge cloud 110 between the cloud data center layer 950 and the client endpoints (e.g., client computing nodes 902). Some of these are discussed in the following sections in the context of network functions or service virtualization, including the use of virtual edges and virtual services which are orchestrated for multiple stakeholders.

The edge gateway nodes 912 and the edge aggregation nodes 922 cooperate to provide various edge services and security to the client computing nodes 902. Furthermore, because each client computing node 902 may be stationary or mobile, each edge gateway node 912 may cooperate with other edge gateway devices to propagate presently provided edge services and security as the corresponding client computing node 902 moves about a region. To do so, each of the edge gateway nodes 912 and/or edge aggregation nodes 922 may support multiple tenancy and multiple stakeholder configurations, in which services from (or hosted for) multiple service providers and multiple consumers may be supported and coordinated across a single or multiple compute devices.

F. Use Case: Satellite Edge Connectivity

Figure 10:
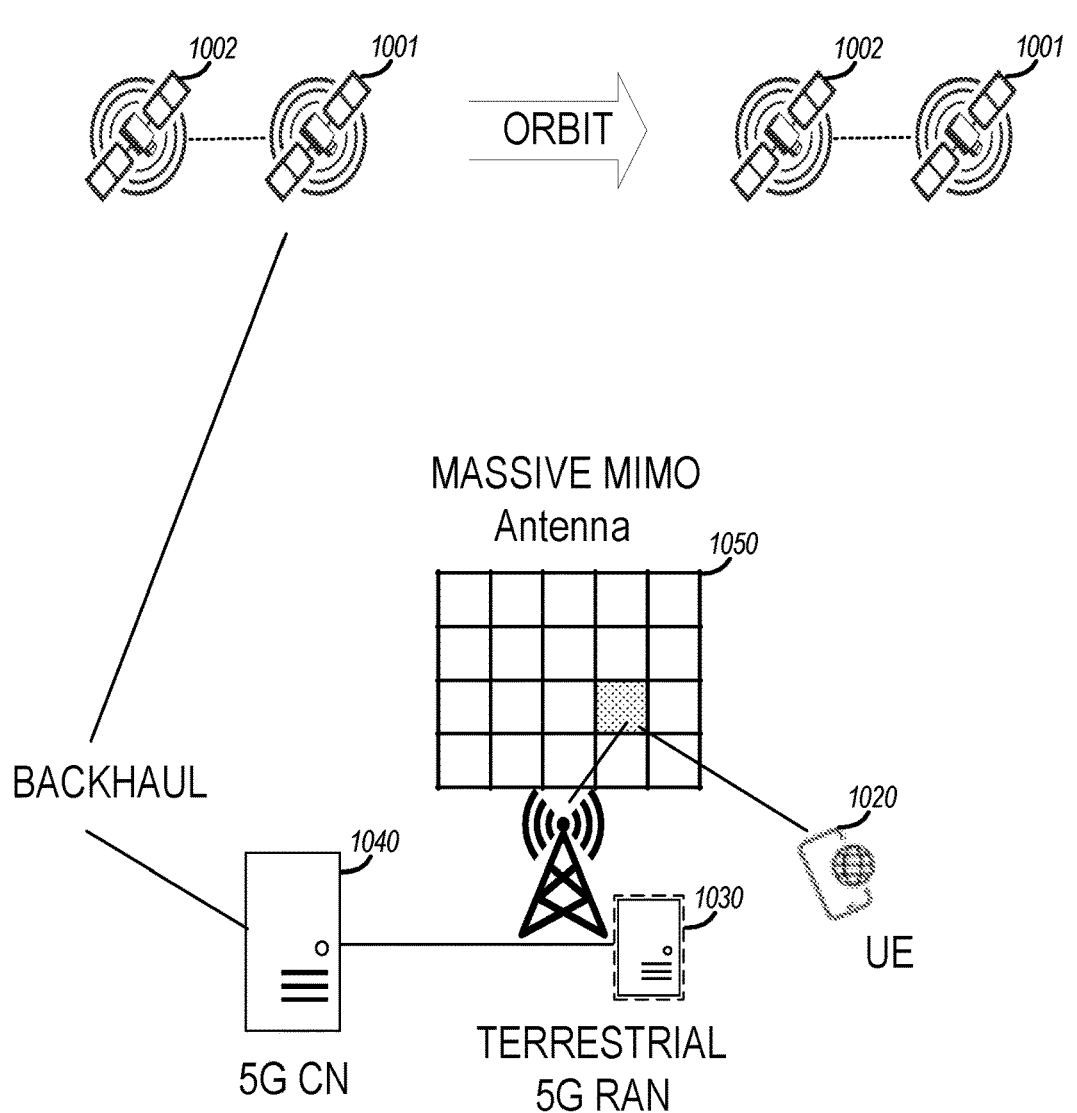
FIG. 10 illustrates network connectivity in non-terrestrial (satellite) and terrestrial (mobile cellular network) settings, according to an example.

FIG. 10 illustrates network connectivity in non-terrestrial (satellite) and terrestrial (mobile cellular network) settings, according to an example. As shown, a satellite constellation may include multiple satellites 1001, 1002, which are connected to each other and to one or more terrestrial networks. Specifically, the satellite constellation is connected to a backhaul network, which is in turn connected to a 5G core network 1040. The 5G core network is used to support 5G communication operations at the satellite network and at a terrestrial 5G radio access network (RAN) 1030. The RAN may be compatible with O-RAN specifications, in certain embodiments.

FIG. 10 also depicts the use of the terrestrial 5G RAN 1030, to provide radio connectivity to a user equipment (UE) 1020 via a massive MIMO antenna 1050. It will be understood that a variety of network communication components and units are not depicted in FIG. 10 for purposes of simplicity. With these basic entities in mind, the following techniques describe ways in which terrestrial and satellite networks can be extended for various edge computing scenarios.

Figure 11:
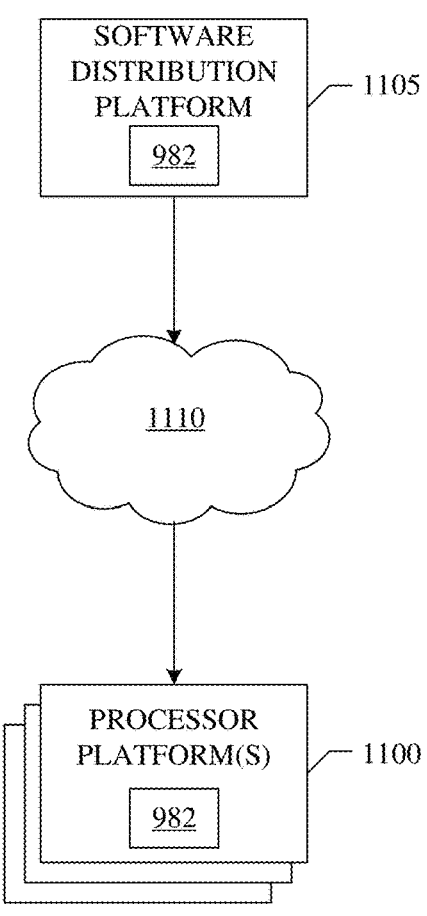
FIG. 11 illustrates an example software distribution platform to distribute software, such as the example computer readable instructions FIG. 8, to one or more devices.

G. Software Distribution:

FIG. 11 illustrates an example software distribution platform 1105 to distribute software, such as the example computer readable instructions 882 of FIG. 8, to one or more devices, such as example processor platform(s) 1100 and/or example connected edge devices 862. The example software distribution platform 1105 may be implemented by any computer server, data facility, cloud service, etc., capable of storing and transmitting software to other computing devices (e.g., third parties, the example connected edge devices 862 of FIG. 8). Example connected edge devices may be customers, clients, managing devices (e.g., servers), third parties (e.g., customers of an entity owning and/or operating the software distribution platform 1105). Example connected edge devices may operate in commercial and/or home automation environments. In some examples, a third party is a developer, a seller, and/or a licensor of software such as the example computer readable instructions 882 of FIG. 8. The third parties may be consumers, users, retailers, OEMs, etc. that purchase and/or license the software for use and/or re-sale and/or sub-licensing. In some examples, distributed software causes display of one or more user interfaces (UIs) and/or graphical user interfaces (GUIs) to identify the one or more devices (e.g., connected edge devices) geographically and/or logically separated from each other (e.g., physically separated IoT devices chartered with the responsibility of water distribution control (e.g., pumps), electricity distribution control (e.g., relays), etc.).

In the illustrated example of FIG. 11, the software distribution platform 1105 includes one or more servers and one or more storage devices. The storage devices store the computer readable instructions 882. The one or more servers of the example software distribution platform 1105 are in communication with a network 1110, which may correspond to any one or more of the Internet and/or any of the example networks described above. In some examples, the one or more servers are responsive to requests to transmit the software to a requesting party as part of a commercial transaction. Payment for the delivery, sale and/or license of the software may be handled by the one or more servers of the software distribution platform and/or via a third-party payment entity. The servers enable purchasers and/or licensors to download the computer readable instructions 882 from the software distribution platform 1105. For example, the software, which may correspond to the example computer readable instructions 882 of FIG. 8, may be downloaded to the example processor platform(s) 1100 (e.g., example connected edge devices), which is/are to execute the computer readable instructions 882 to implement the software instructions. In some examples, one or more servers of the software distribution platform 1105 are communicatively connected to one or more security domains and/or security devices through which requests and transmissions of the example computer readable instructions 882 must pass. In some examples, one or more servers of the software distribution platform 1105 periodically offer, transmit, and/or force updates to the software (e.g., the example computer readable instructions 882 of FIG. 8) to ensure improvements, patches, updates, etc. are distributed and applied to the software at the end user devices.

In the illustrated example of FIG. 11, the computer readable instructions 882 are stored on storage devices of the software distribution platform 1105 in a particular format. A format of computer readable instructions includes, but is not limited to a particular code language (e.g., Java, JavaScript, Python, C, C#, SQL, HTML, etc.), and/or a particular code state (e.g., uncompiled code (e.g., ASCII), interpreted code, linked code, executable code (e.g., a binary), etc.). In some examples, the computer readable instructions 882 stored in the software distribution platform 1105 are in a first format when transmitted to the example processor platform(s) 1100. In some examples, the first format is an executable binary in which particular types of the processor platform(s) 1100 can execute. However, in some examples, the first format is uncompiled code that requires one or more preparation tasks to transform the first format to a second format to enable execution on the example processor platform(s) 1100. For instance, the receiving processor platform(s) 1100 may need to compile the computer readable instructions 882 in the first format to generate executable code in a second format that is capable of being executed on the processor platform(s) 1100. In still other examples, the first format is interpreted code that, upon reaching the processor platform(s) 1100, is interpreted by an interpreter to facilitate execution of instructions.

H. Machine Learning in Edge Computing Networks

Machine learning (ML) involves computer systems using algorithms and/or statistical models to perform specific task(s) without using explicit instructions, but instead relying on patterns and inferences. ML algorithms build mathematical model(s) (referred to as "ML models" or the like) based on sample data (referred to as "training data" or the like) in order to make predictions or decisions without being explicitly programmed to perform such tasks. ML algorithms perform a training process on a relatively large dataset to estimate an underlying ML model. Generally, an ML algorithm may refer to a computer program that learns from experience with respect to some task and some performance measure, and an ML model may be any object or data structure created after an ML algorithm is trained with one or more training datasets. After training, an ML model may be used to make predictions on new datasets. Although the term "ML algorithm" refers to different concepts than the term "ML model," these terms as discussed herein may be used interchangeably for the purposes of the present disclosure. In some cases, an ML model may include an artificial neural network (NN), which is based on a collection of connected nodes ("neurons") and each connection ("edges") transmit information (a "signal") from one node to other nodes. A neuron that receives a signal processes the signal using an activation function and then signals other neurons based on the processing. Neurons and edges typically have weights that adjust as learning proceeds. The weights may increase or decrease the strength of a signal at a connection.

Linear regression is one type of supervised ML algorithm that is used for classification, stock market analysis, weather prediction, and the like. Gradient descent (GD) algorithms may be used in linear regression. Given a function defined by a set of parameters, a GD algorithm starts with an initial set of parameter values, and iteratively moves toward a set of parameter values that minimize the function. This iterative minimization is achieved by taking steps in the negative direction of the function gradient. In some GD implementations, a model is updated iteratively, where multiplication of large matrices and vectors is performed in each epoch. An epoch may refer to a round of machine learning that is performed in the iterative process of updating a model. Since the training phase for GD algorithms may involve a large amount of iterative computations, running GD algorithms can be computationally intensive. Additionally, computation time bottlenecks rapidly as the model order grows in size.

Distributed computing has been used to reduce training time by offloading GD computations to multiple secondary computing nodes. However, distributing GD computations to heterogeneous computing environments, such as those comprising multiple client or edge devices is difficult because, in most cases, the available edge devices have different configurations, capabilities, and operate under different conditions. Additionally, many of the edge devices communicate using wireless links, which have lower reliability (i.e., in terms of link quality and achievable data rates) when compared to wired links used in server farms. The heterogeneous nature of these computing environments may result in longer lag times at each round of training (or "epoch") due to slower computing devices and/or computing devices with low quality radio links. For these reasons, the conventional distributed ML training approach cannot be straightforwardly applied to heterogeneous computing environments. Recently, federated learning has been proposed for distributed GD computation, where learning takes place by a federation of client computing nodes (which may also be referred to herein as "client devices") that are coordinated by a central server (which may be referred to herein as a MEC server or controller node).

Federated learning, where a global model is trained with coordination with a federation of client computing nodes/client nodes/clients while keeping the training data local at the clients is one of the problems under consideration herein. The federated learning protocol iteratively allows clients to download a centrally trained artificial intelligence/machine-learning model (or model) from a server, such as a MEC server, an edge server or a cloud server, update it with their own data and upload the model updates (such as a gradient update) back to the server. The model updates may include updates weight values for nodes of the NN model, for instance. The server then aggregates updates from multiple clients to update the global model. Federated learning over wireless edge networks is highly desired since data can be maintained local at the clients while the edge server can utilize the compute capabilities of clients to speed up training.

In federated learning, training may be performed via a supervised machine learning problem (e.g., a GD algorithm) based on a dataset $\{(X_k, y_k)\}_{k=1, \ldots, m}$ to learn underlying model parameters $\beta \in R^d$, wherein $X_k$ is the total training data, k is a number of data points (or training symbols) in $X_k$ where k=k to m, and $y_k$ is an associated model level related to each of the data in $X_k$ (e.g., where the underlying model is a single or multi-level model). Each training label is a row vector of training symbols $X_k$ $[x_{k, 1}, \ldots, x_{k,d}] \in R^{1 \times d}$ and $y_k \in R$ is an associated scalar measurement. Under a linear model, the training data can be represented by Equation (A0).

$$Y = X\beta + n \qquad \#(A0)$$

In Equation (A0), $\beta$ is the model to be created, X is the input data, and Y is/are the output variables. In addition, for Equation (A0), $$X \triangleq \begin{pmatrix} X_1 \\ \vdots \\ X_m \end{pmatrix}$$

is an m×d training symbol matrix, $$\beta \triangleq \begin{pmatrix} \beta_1 \\ \vdots \\ \beta_d \end{pmatrix}$$

is a d×1 unknown model parameter matrix, $$n \triangleq \begin{pmatrix} n_1 \\ \vdots \\ n_m \end{pmatrix}$$

is an m×1 measurement noise (e.g., Gaussian) matrix, and $$Y \triangleq \begin{pmatrix} y_1 \\ \vdots \\ y_m \end{pmatrix}$$

is an m×1 measurement vector collected for training.

GD is an optimization algorithm used to minimize a target function by iteratively moving in the direction of a steepest descent as defined by a negative of the gradient. An objective of GD in ML is to utilize a training dataset D in order to accurately estimate the unknown model $\beta$ over one or more epochs r. In ML, GD is used to update the parameters of the unknown model $\beta$. Parameters refer to coefficients in linear regression and weights in an NN. These objectives are realized in an iterative fashion by computing $\beta^{(r)}$ at the r-th epoch, and evaluating a gradient associated with the squared-error cost function defined by $f(\beta^{(r)}) = \|X\beta^{(r)} - Y\|^2$. The cost function indicates how accurate the model $\beta$ is at making predictions for a given set of parameters. The cost function has a corresponding curve and corresponding gradients, where the slope of the cost function curve indicates how the parameters should be changed to make the model $\beta$ more accurate. In other words, the model $\beta$ is used to make predictions, and the cost function is used to update the parameters for the model $\beta$. The gradient of the aforementioned squared-error cost function is given by Equation (A1), and $\beta^{(r)}$ is updated at each epoch r according to Equation (A2).

$$\nabla_\beta f(\beta^{(r)}) = X'(X\beta^{(r)} - Y) \qquad \#(A\ 1)$$

$$\beta^{(r+1)} = \beta^{(r)} - \frac{\mu}{m}\nabla_\beta f(\beta^{(r)}) \qquad \#(A\ 2)$$

In Equation (A2), m is the total number of observations (i.e., data points), $\mu$ is a learning rate (also referred to as an update parameter or step size) for moving down a particular gradient, where $0 < \mu \leq 1$, and $\nabla_\beta f(\beta^{(r)})$ is a prediction based on the model $\beta^{(r)}$. GD involves computing Equations (A1) and (A2) in tandem until the model parameters converge sufficiently. The gradient in Equation (A1) involves multiplications involving matrices and vectors of large sizes. Therefore, GD becomes computationally prohibitive as dataset and model parameters become massive.

Figure 12:
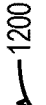
FIG. 12 depicts an example of federated learning in an edge computing network system.
Figure 12:
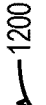

In order to meet computation demand of Equation (A1), edge computing nodes can locally compute partial gradients from their respective local data sets and communicate the computed partial gradients back to a central node for aggregation. FIG. 12 depicts an example of federated learning in an edge computing environment 1200. In the example shown, each client computing node 1202 fetches or otherwise obtains a global model 1204 from a central server 1208 (e.g., a MEC server) coupled to an access point 1210 (e.g., a base station), updates aspects of the global model (e.g., model parameters or weights used in the global model, e.g., NN node weights) using its local data or data provided by the central server (e.g., a subset of a large training dataset D), and communicates the updates to the global model to the central server 1208. The central server 1208 then aggregates (e.g., averages) the received updates and obtains a final global model based on the aggregated updates (e.g., updates the model weight values based on an average of the weight values received from the clients). Federated learning may be more efficient than asynchronous update methods as it avoids the prohibitive number of model updates both at the central server and worker computing nodes.

Model updates or updates to a global model, as described herein, may include a set of values that are used to construct the global model. For example, where the global model is a NN model, a client or server may perform machine learning to obtain updated values for various nodes of the NN. The values may be aggregated by a node, e.g., averaged by the server, and the aggregated node weight values may be used for future implementations of the NN.

A central server as described herein may refer to an edge compute node that acts as a server to other edge compute notes of an edge computing environment. In some embodiments, functions or operations described herein as being performed by a central server may be performed by multiple servers. For instance, some example embodiments described herein include clients providing capability data, model updates or other parameters to a central server, but such capability data, model updates, or parameters may be provided by the clients to different central servers. The central server(s) may be structurally formed as described further herein. For instance, the central server(s) may be configured to fit within a unit of a server rack (e.g., a 1 U or multiple unit rack device), or may be configured to fit within a sled. In some instances, the central server as described herein may be implemented as a "MEC server". However, it is to be understood that any type of server, such as an edge server, a cloud server, an on-premise server, etc. may be used in the alternative. A server, e.g., a MEC server, as described herein may be constructed to fit within any of the structural embodiments described herein. For example, a server such as a MEC server may be configured fit within a server rack or sled, e.g., as described in greater detail herein.

Further, a client (or client compute node) as described herein may refer to an edge compute node that is served, controlled, or otherwise commanded by one or more other edge compute nodes (e.g., central server(s) as described above). For instance, as described herein, the clients perform machine learning based on information and/or commands from another node(s) (i.e., a central server(s)). A client device may include a server device, such as a device structurally configured as described herein (e.g., to fit within a server rack or sled), a mobile computing device (e.g., tablet, smartphone, etc.), or may include another type of computing device.

With this technique, Equation (A1) can be decomposed into m partial sums as shown by Equation (A3).

$$\nabla_\beta f(\beta^{(r)}) = \sum_{k=1}^{m} X_k'(X_k\beta^{(r)} - y_k) \qquad \text{\#(A 3)}$$

More particularly, the training dataset $X^{(i)}$ and the associated label vector $y^{(i)}$ for the i-th device may be given by $$X^{(i)} = \begin{bmatrix} X_1^{(i)} \\ \vdots \\ X_{l_i^{initial}}^{(i)} \end{bmatrix}, \text{ and } y^{(i)} = \begin{bmatrix} y_1^{(i)} \\ \vdots \\ y_{l_i^{initial}}^{(i)} \end{bmatrix},$$

where $l_i^{initial}$ is the number of training data points available at the i-th device. Note that the dimension of $X^{(i)}$ is $l_i^{initial} \times d$, where d is the dimension of feature space. Each device may locally compute partial gradients in each epoch, say the r-th epoch, such as by $$\nabla_\beta f_i(\beta^{(r)}) = \sum_{k=1}^{l_i^{intial}} X_k^{(i)'}(X_k^{(i)}\beta^{(r)} - y_k^{(i)}), \qquad \text{\#(A 4)}$$

where $\beta^{(r)}$ is the estimate of the global model. The partial gradient is communicated to the central node for aggregation, and the global gradient may be given by $$\nabla_\beta f(\beta^{(r)}) = \sum_{i=1}^{n} \nabla_\beta f_i(\beta^{(r)}). \qquad \text{\#(A 5)}$$

The model may be updated by the central server as $$\beta^{(r+1)} = \beta^{(r)} - \frac{\mu}{m}\nabla_\beta f(\beta^{(r)}), \qquad \text{\#(A 6)}$$

where $m = \sum_{i=i}^{n} l_i^{initial}$ is the totality of training data points and y is the learning rate.

In Sections I.-S below, the client computing node corresponds to any edge computing node that is to train a model with the data available to it, such as data that the client computing node may wish to keep private.

In Sections I.-S. below, according to some embodiments, a message or communication between a first edge computing node and a second edge computing note, or between a client computing node and a central server, may be transmitted/received on an application programming interface (API), embedded in L1/L2/L3 layers of the protocol stack depending on the application, on a Physical (PHY) layer, or on a Medium Access Control (MAC) layer as set forth in wireless standards, such as the 802.11 family of standards, or the Third Generation Partnership Project (3GPP) Long Term Evolution (LTE) or New Radio (NR or 5G) family of technical specifications, by way of example only. The message or communication, according to some embodiments, may involve a parameter exchange to allow an estimation of wireless spectrum efficiency, and in such a case it may be transmitted/received on a L1 layer of a protocol stack. The message or communication, according to some embodiments, may involve a prediction of edge computing node sleep patterns, and in such a case it may be transmitted/received on a L2 layer of a protocol stack. The message or communication, according to some embodiments, may be transmitted or received on a transport network layer, an Internet Protocol (IP) transport layer, a General Radio Packet Service Tunneling Protocol User Plane (GTP-U) layer, a User Datagram Protocol (UDP) layer, an IP layer, on a layer of a control plane protocol stack (e.g. NAS, RRC, PDCP, RLC, MAC, and PHY), on a layer of a user plane protocol stack (e.g. SDAP, PDCP, RLC, MAC, and PHY).

I. Non-Linear Coding Techniques for Use in Coded Federated Learning

In certain instances, coded labels may not be linearly related to the corresponding training data. Thus, certain embodiments may generate training labels associated with coded data by first approximating the local non-linearity between the training data $X_k^{(i)}$ and label set $y_k^{(i)}$ using a Kernel-based technique, and then applying the learnt local Kernel to the generated coded data set $\tilde{X}_i$. In particular, the training data set stored at the i-th device may be referred to as $(X_k^{(i)}, y_k^{(i)})$. The overall objective of the learning method is to utilize the training data set from all client devices, i=1, ..., n, in order to accurately estimate a non-linear model $\beta$ that can be used for future inference. Typically, a NN is used for approximating $\beta$.

Backpropagation based on gradient descent. The output of a NN is compared to the true label to calculate the error from that training sample given by equation AQ1.

$$e = y_o - y \qquad \text{#Eq. (AQ1)}$$

and the gradient of the squared error is calculated with respect to all the weights and the biases involved. In this example, the gradients are given by equations AQ2a, AQ2b, AQ2c, and AQ2d.

$$\nabla_{w^{(2)}} e^2 = \begin{cases} z^T e & \text{if } |y_o| > 0 \\ 0 & \text{else} \end{cases} \qquad \text{#Eq. (AQ 2 a)}$$

$$\nabla_{b^{(2)}} e^2 = \begin{cases} e & \text{if } |y_o| > 0 \\ 0 & \text{else} \end{cases} \qquad \text{#Eq. (AQ 2 b)}$$

$$\nabla_{w_k^{(1)}} e^2 = \begin{cases} x^T g_k & \text{if } |z_k| > 0 \\ 0 & \text{else} \end{cases} \qquad \text{#Eq. (AQ 2 c)}$$

$$\nabla_{b_k^{(1)}} e^2 = \begin{cases} g_k & \text{if } |z_k| > 0 \\ 0 & \text{else} \end{cases} \qquad \text{#Eq. (AQ 2 d)}$$

where the gradient backpropagation is explicitly given by equation AQ3.

$$g_k = \begin{cases} w_k^{(2)} e & \text{if } |y_o| > 0 \\ 0 & \text{else} \end{cases} \qquad \text{#Eq. (AQ 3)}$$

In a mini-batch gradient descent algorithm, the gradients are accumulated over all the training data points in the mini-batch, and then NN weights and biases are updated as equations AQ4 and AQ5, where B is the mini-batch size.

$$w^{(2)} = w^{(2)} - \frac{\mu}{B} \sum \nabla_{w^{(2)}} e^2, \quad b^{(2)} = b^{(2)} - \frac{\mu}{B} \sum \nabla_{b^{(2)}} e^2 \qquad \text{Eq. (AQ 4)}$$

$$w_k^{(1)} = w_k^{(1)} - \frac{\mu}{B} \sum \nabla_{w_k^{(1)}} e^2, \quad b_k^{(1)} = b_k^{(1)} - \frac{\mu}{B} \sum \nabla_{b_k^{(1)}} e^2 \qquad \text{Eq. (AQ 5)}$$

Coding the local training data involves performing a random linear coding disjointly on the decentralized training data set available at each client device. Like in the linear case, the i-th device, uses a random generator matrix $G_i$ (which may also be referred to as a "coding matrix") of dimension $c \times l_i^{initial}$ with elements drawn independently from standard normal distribution or a Bernoulli (½) distribution, applies on the local training data set $X^{(i)}$ to obtain a coded training data set $\tilde{X}^{(i)}$, expressed by equation AQ6.

$$X^{(i)} = G_i X^{(i)} \qquad \text{#Eq. (AQ6)}$$

For purposes of discussion, the coding redundancy c is heuristically chosen in certain examples described. In addition, use of random linear codes is for simplicity of exposition to the benefits of coded computing in DNNs.

Coding the labels. Coding for labels may be quite challenging in the non-linear scenarios. As the raw training data set $X^{(i)}$ and its associated label set $Y^{(i)}$ have a non-linear relation, coded label set may not be generated by directly applying $G_i$ on the raw label set. This is one key difference from coding for linear models. To overcome this challenge, embodiments herein may implement a technique wherein the local non-linear function at each device is approximated using a Kernel based method. In particular, given a raw data set $(X^{(i)}, Y^{(i)})$, where there are $l_i^{initial}$ training data points, and a Kernel function $K(x_k, x_j)$, Kernel coefficients may be computed as given by equation AQ7.

$$\alpha_i^* = \min_{\alpha_i} \sum_{k=1}^{l_i^{initial}} \frac{1}{2} \left( y_k^{(i)} - \sum_{j=1}^{l_i^{initial}} \alpha_{i,j} K(x_k^{(i)}, x_j^{(i)}) \right)^2 \qquad \text{#Eq. (AQ 7)}$$

where a Kernel function may be, for example a Gaussian function as shown by equation AQ8.

$$K(x_k, x_j) = \exp\left( -\frac{\|x_k - x_j\|^2}{2\sigma^2} \right) \qquad \text{#Eq. (AQ 8)}$$

The above minimization can be reduced to equation AQ9.

$$\alpha_i^* = \min_{\alpha_i} \|K_i \alpha_i - Y^{(i)}\|^2 \qquad \text{#Eq. (AQ 9)}$$

where $K_i$ is a $l_i^{initial} \times l_i^{initial}$ Kernel matrix with its (k,j)-th element given as $K(x_k^{(i)}, x_j^{(i)})$. This can be solved using a gradient descent method where the gradient of the loss function is equation AQ10.

$$K_i(K_i \alpha_i - Y^{(i)}) \qquad \text{Eq. (AQ10)}$$

Once the Kernel coefficients are obtained, the coded label for the k-th coded data point at the i-th devices is generated by equation AQ11.

$$\tilde{y}_k^{(i)} = \sum_{j=1}^{l_i^{initial}} \alpha_{i,j}^* K(\tilde{x}_k^{(i)}, x_j^{(i)}) \qquad \text{#Eq. (AQ 11)}$$

Finally, the coded data set $(\tilde{X}^{(i)}, \tilde{Y}^{(i)})$ is communicated to the central server. The raw data, the generator matrix and the Kernel coefficients are not shared with the central server, thereby preserving security of the raw data.

In any of the embodiments discussed herein, exchange of partial gradient parameters can be intercepted from the protocol exchange involving any-preprocessing of the data across edge computing nodes. Computation of gradients (e.g., training data) at the central edge server/controller node can also be used for practicing the embodiments discussed herein, which is different than traditional ML techniques. In some implementations, dedicated hardware can be utilized to run training algorithms at the edge servers and/or the edge computing nodes. Further, the edge computing nodes may perform additional kernel-based based embedding on their local data, which may involve additional and/or alternative computations as compared to standard ML techniques. Training on coded data may also be done with MSE loss (e.g., coded labels can have negative entries) rather than cross-entropy loss (coded labels have to have positive entries.

In any of the embodiments discussed herein, the exchange of data between edge computing nodes and edge servers can be communicated according to the implemented edge system and/or communication protocols. Such communications and/or ML training techniques can be standardized or otherwise specified in a suitable edge computing standard, such as ETSI MEC or the like. Additionally or alternatively, the information (e.g., capability info) needed to utilize the embodiments discussed herein can also be inspected/intercepted from respective edge computing nodes and/or respective edge servers. In any of the embodiments discussed herein, computation of gradients (e.g., training) may take place at edge server, which is different than conventional/traditional federated learning approaches. In some implementations, dedicated hardware at the edge computing nodes and/or the edge servers can be utilized to run the training algorithms discussed herein.

Figure 13:
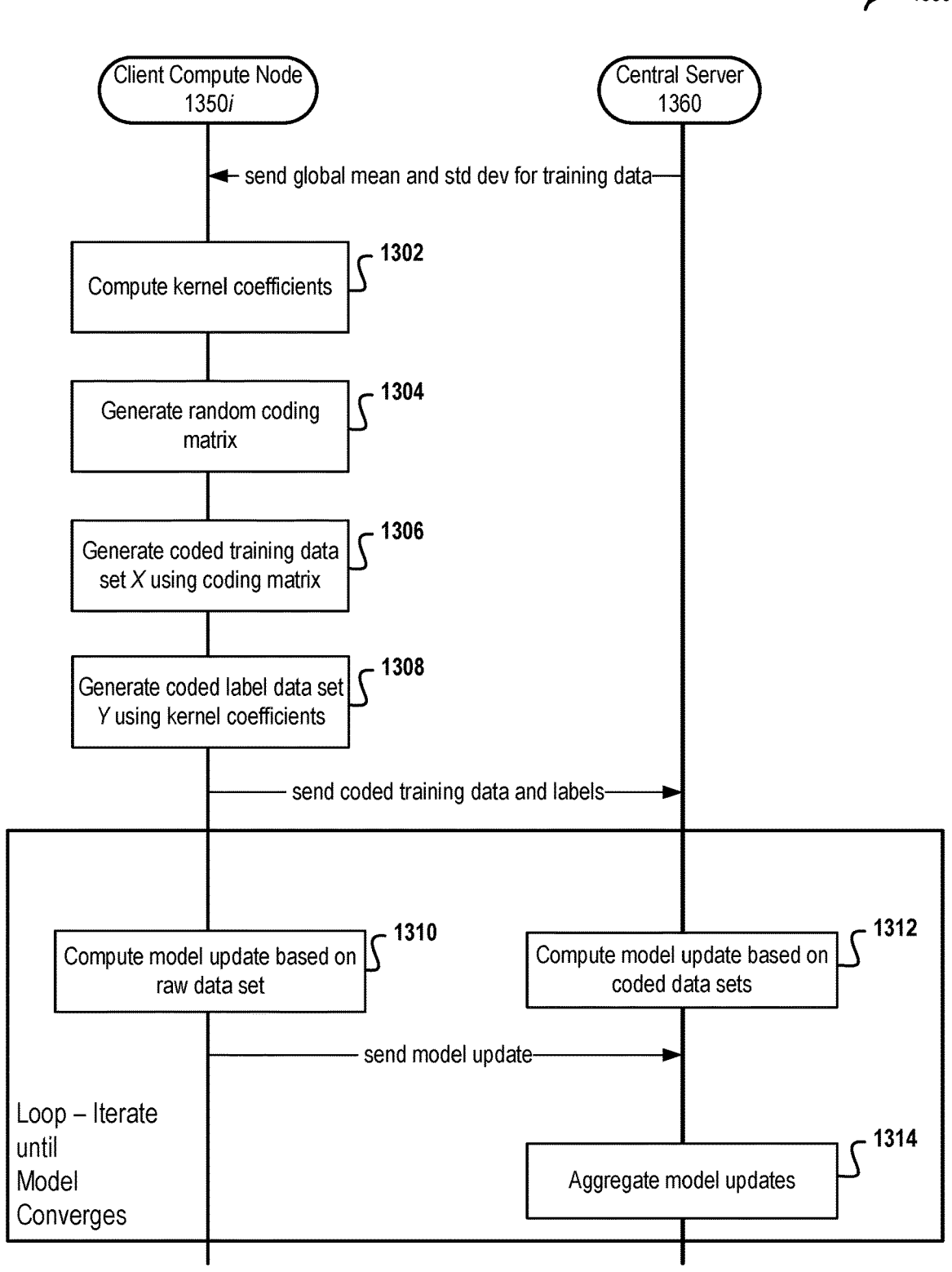
FIG. 13 is a flow diagram showing an example process of performing coded federated learning in accordance with certain embodiments.

FIG. 13 is a flow diagram showing an example process 1300 of performing coded federated learning in accordance with certain embodiments. The example process may be implemented in software, firmware, hardware, or a combination thereof. For example, in some embodiments, operations in the example process shown may be performed by one or more components of an edge computing node, such as processor(s) of a client device similar to client computing nodes 1202 of FIG. 12. In some embodiments, one or more computer-readable media may be encoded with instructions that implement one or more of the operations in the example process below when executed by a machine (e.g., a processor of a computing node). The example process may include additional or different operations, and the operations may be performed in the order shown or in another order. In some cases, one or more of the operations shown in FIG. 13 are implemented as processes that include multiple operations, sub-processes, or other types of routines. In some cases, operations can be combined, performed in another order, performed in parallel, iterated, or otherwise repeated or performed another manner.

At 1302, kernel coefficients are computed at a client computing node 1350. The kernel coefficients may be computed based on a kernel function as well as the raw training data set X) and its associated label set $Y^{(i)}$ as described above. In some instances, the kernel coefficients may be computed via a gradient descent method. The kernel function may be a Gaussian function. In some embodiments, the client computing node may obtain, from the central server 1360, a global mean and standard deviation for training data of all client computing nodes of the edge computing environment in which they reside. The client computing node may used the global mean and standard deviation information to normalize its local training data set, and may determine the kernel coefficients based on the normalized local training data set.

At 1304, a random coding matrix is generated, e.g., as described above. The coding matrix may be used to generate a coded training data set at 1306. For example, the coded training data set may be computed by multiplying the coding matrix with the local raw training data set. The coding matrix may be generated based on a standard or Bernoulli (½) distribution as described above. At 1308, a coded label set is generated based on the kernel coefficients computed at 1302, the kernel function, and the local raw label set. The client computing node 1350 then sends the coded training data set and coded label set to the central server 1360, and CFL techniques may be implemented from there.

In particular, at 1310, the client computing node 1350 computes a model update (e.g., partial gradients for the global ML model via a backpropagation technique as described above), and sends the model update to the central server. The central server 1360 uses the coded training data and label data to compute a model update (e.g., partial gradients) at 1312, and then aggregates the different model updates at 1314 to update the global ML model. The aggregation may include an averaging, e.g., a straight or weighted averaging, of the model updates. For example, where the model updates include model weight values, the aggregation may include averaging of the model weight values.

J. Privacy Preserving Non-Linear Model Estimation

Neural networks (NNs) have been used to learn the relationship between features and labels. Although NNs have been quite successful in estimating these non-linear relationships, they may involve non-linearities in training, making the training procedure computation intensive. Furthermore, the size of NNs is quite large which results in high memory footprint as well as high communication overhead for transmitting the model within an edge computing environment (e.g., environment 1200 of FIG. 12).

Accordingly, in certain embodiments, random feature mapping-based kernel embedding may be used for linearizing the training process, resulting in a drastic reduction in parameter count as well as communication overhead. Furthermore, training on the transformed features is a linear regression, which is simpler to carry out in comparison to NN based training. In particular, embodiments herein provide a novel distributed strategy to linearize the federated learning problem via data transformation using a kernel embedding method for speeding up federated learning from decentralized non-IID data available at the edge nodes. The central server sends the hyperparameter for kernel embedding and a common seed for random number generator. Each client device transforms the local data features using random feature mapping-based kernel embedding. Thereafter, in each communication round/epoch, the central server may sample a set of client computing nodes, send the current model to the selected client nodes, and each of the selected client computing nodes may independently run linear regression over its transformed data using the updated model and send the updated model to the central server. The central server then aggregates and averages the received models from the selected clients.

These techniques may provide one or more advantages. For example, because only model updates are shared by the client computing nodes, data privacy is preserved. In addition, the convergence rate for test accuracy may speed up significantly in comparison to NN training. Further, the model size may be reduced significantly in comparison to NN training, resulting in a lower memory footprint, and the linear regression over the transformed data results in faster processing than the complex non-linear operations in NN training, thus, providing superior performance to NNs in convergence vs time.

Data Pre-processing via Random Feature Mapping Based Kernel Embedding. In many instances, the relationship between a training data point $x_i$ at an i-th client computing node and the corresponding label $y_i$ is denoted as follows: $g(x_i) \approx y_i$, where $g(\cdot)$ is typically a non-linear function of $x_i$. In certain embodiments, the function $g(\cdot)$ is estimated using a linear function in higher dimension. To achieve this, each client computing node may map its input training data (e.g., $x_i$) to a higher dimension using Random Fourier Features Mapping (RFFM). RFFM maps an input vector $x_i \in R^{1 \times d}$ to $\hat{x}_i \in R^{1 \times s}$ using the following mapping:

$$\text{RFFM}(\cdot): R^{1 \times d} \to R^{1 \times s}, \text{RFFM}(x_i) = \cos(x_i \Omega + b) \qquad \text{#Eq. (AR1)}$$

where $\Omega \in R^{d \times s}$, $b \in R^{1 \times s}$ and the cosine is applied element-wise. The entries for $\Omega$ and b are sampled from distributions such that the following property is satisfied:

$$\text{RFFM}(x_i)\text{RFFM}(x_j)^T \approx K(x_i, x_j) = \exp\left(-\frac{\|x_i - x_j\|^2}{2\sigma^2}\right) \qquad \text{#Eq. (AR 2)}$$

where exp $$\left(-\frac{\|x_i - x_j\|^2}{2\sigma^2}\right)$$

denote the Gaussian kernel function with bandwidth parameter $\sigma^2$.

The Gaussian kernel function implicitly measures the similarity between the input data points in an infinite dimensional space, thus providing the capability to approximate any non-linear function. The above approximation holds if the columns in $\Omega$ are drawn IID from $$N\left(0, \frac{2}{(2\sigma^2)}I_d\right)$$

and the elements in b are drawn IID from Uniform$(0,2\pi]$. The label vectors are not modified.

The supervised learning problem is thus done with the modified training data set:

$$\hat{D} = \{(\hat{x}_k, y_k)\}_{k=1, \ldots, m},$$

where $$\hat{X} \triangleq \begin{pmatrix} \hat{x}_1 \\ \vdots \\ \hat{x}_m \end{pmatrix}$$

is the m×s modified training symbol matrix.

A linear regression model may be learned over $\hat{D}$ to approximate the non-linear function $g(\cdot)$ described above. Specifically, model parameters $\beta \in R^s$ may be learned such that the following objective function shown in equation AR3 is minimized iteratively:

$$f(\beta^{(r)}) = \|\hat{X}\beta^{(r)} - Y\|_F^2 \qquad \text{#Eq. (AR3)}$$

where $\|\cdot\|_F$ denotes the Frobenius norm. We use gradient descent for iterative minimization of the loss function above. The objective of gradient descent method is to utilize the training data set $\hat{D}$ in order to accurately estimate the unknown model $\beta$. This objective is realized in an iterative fashion by computing $\beta^{(r)}$ at the r-th epoch, evaluating a gradient associated to the squared-error cost function defined as follows. The gradient of the above cost function is given by equation AR4.

$$\nabla_\beta f(\beta^{(r)}) = \hat{X}^{\prime (\hat{X}\beta^{(r)} - Y)} \qquad \text{#Eq. (AR4)}$$

$\beta^{(r)}$ is updated at each epoch according to the equation AR5.

$$\beta^{(r+1)} = \beta^{(r)} - \frac{\mu}{m}\nabla_\beta f(\beta^{(r)}) \qquad \text{#Eq. (AR 5)}$$

where $0 < \mu$ is an update parameter and $\beta^{(0)}$ may be initialized arbitrarily.

Distributed Computation Methodology.

When training data set is distributed across edge devices, each device can locally compute partial gradients and communicate those to a central server that aggregates the received partial gradients to update the model and communicates the updated model back to the edge devices. More specifically, it is straightforward to observe that equation (1) can be decomposed into n partial sums as shown by equation AR6.

$$\nabla_\beta f(\beta^{(r)}) = \sum_{i=1}^{n} \sum_{k=1}^{l_i^{initial}} \hat{x}_k^{(i)\prime}(\hat{x}_k^{(i)}\beta^{(r)} - y_k^{(i)}) \qquad \text{#Eq. (AR 6)}$$

where, $(\hat{x}_k^{(i)}, y_k^{(i)})$ is the k-th element of the pre-processed training data set stored at the i-th device, $l_i^{initial}$ is the number of training data elements available at the i-th device, $$\hat{X}^{(i)} = \begin{bmatrix} \hat{x}_1^{(i)} \\ \vdots \\ \hat{x}_{l_i^{initial}}^{(i)} \end{bmatrix}, \text{ and } Y^{(i)} = \begin{bmatrix} y_1^{(i)} \\ \vdots \\ y_{l_i^{initial}}^{(i)} \end{bmatrix},$$

where $\Sigma_{i=1}^{n} l_i^{initial} = m$ is the total training data elements, and $$\left\{\hat{X} = \begin{bmatrix} \hat{X}^{(1)} \\ \vdots \\ \hat{X}^{(n)} \end{bmatrix}, y = \begin{bmatrix} Y^{(1)} \\ \vdots \\ Y^{(n)} \end{bmatrix}\right\} \overset{def}{=}$$

$\hat{D}$ is the entire pre-processed training data set distributed across n devices.

In light of the above data allocation, the update in equation AR5 can be re-written as equation AR7 as follows.

$$\beta^{(r+1)} = \beta^{(r)} - \frac{\mu}{m}\nabla_\beta f(\beta^{(r)}) \qquad \text{#Eq. (AR 7)}$$

$$= \beta^{(r)} - \frac{\mu}{m}\sum_{i=1}^{n} \hat{X}^{(i)\prime}(\hat{X}^{(i)}\beta^{(r)} - Y^{(i)})$$

$$= \frac{1}{m}\sum_{i=1}^{n} l_i\left(\beta^{(r)} - \frac{\mu}{l_i}\hat{X}^{(i)\prime}(\hat{X}^{(i)}\beta^{(r)} - Y^{(i)})\right)$$

$$= \sum_{i=1}^{n} \frac{l_i}{m}\beta^{(r+1)(i)}$$

Equation AR7 shows that the updated global model is effectively a weighted sum of the updated local models at the client computing nodes. This indicates a motivation behind one of the approaches in federated learning, where the central server randomly selects a subset of client nodes, which make multiple local updates using their local datasets, while the central server aggregates the local model updates to obtain a global update on the model. This helps in reducing the communication load as each of the clients can take multiple local steps before communicating the update to the central server. Furthermore, the training procedure may be performed via SGD due to large data set size, in which the process iterates over the entire data set in batches.

Figure 14:
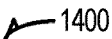
FIG. 14 illustrates a flow diagram of an example process for feature mapping, local training, and global aggregation in accordance with certain embodiments.
Figure 14:
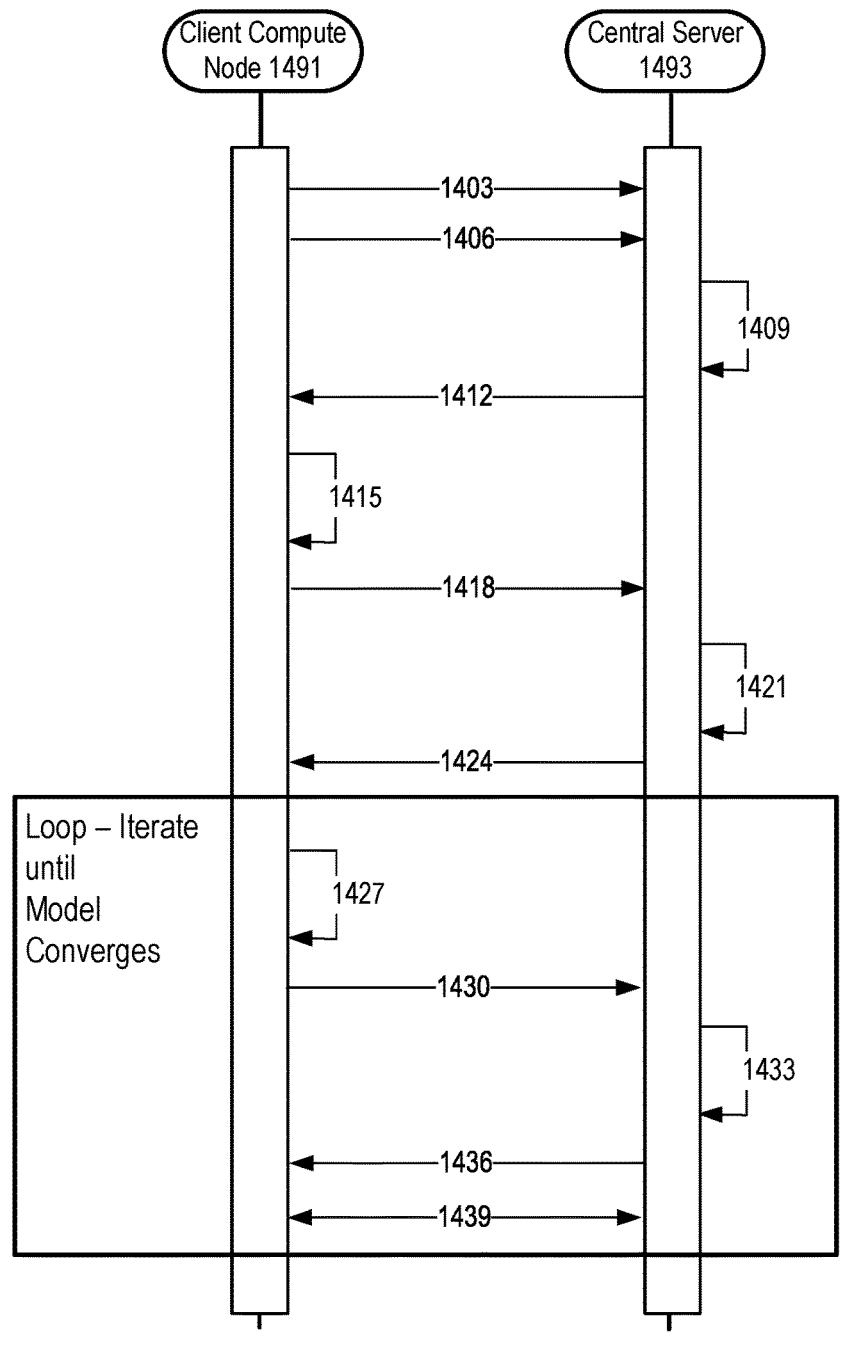

FIG. 14 illustrates a flow diagram of an example process 1400 for feature mapping, local training, and global aggregation in accordance with certain embodiments. The process 1400 involves exchange of link adaptation information, computing parameters, random feature mapping parameters, as well as local model updates and global model update between the infrastructure servers and wireless edge devices. The process 1400 may be integrated into the mobile/edge network architecture standards and/or specification development such ETSI MEC. Additionally or alternatively, process 1400 could also be an application-level exchange between the devices and servers. In some embodiments, operations in the example process shown may be performed by one or more components of an edge computing node, such as processor(s) of a client device similar to client computing nodes 1202 of FIG. 12. In some embodiments, one or more computer-readable media may be encoded with instructions that implement one or more of the operations in the example process below when executed by a machine (e.g., a processor of a computing node). The example process may include additional or different operations, and the operations may be performed in the order shown or in another order. In some cases, one or more of the operations shown in FIG. 14 are implemented as processes that include multiple operations, sub-processes, or other types of routines. In some cases, operations can be combined, performed in another order, performed in parallel, iterated, or otherwise repeated or performed another manner.

The example process 1400 begins at operation 1403 where the client computing nodes 1491 provide operational parameters to the central server 1493. The operational parameters may be the same or similar to the operational parameters discussed previously, and may be provided to the central server 1493 in a same or similar manner as discussed previously. The operational parameters are periodically updated at operation 1406. Operations 1403 and 1406 may repeat as necessary, for example, on a periodic basis, during procedure 1400 including during operation of the other operations of procedure 1400 discussed infra.

At operation 1409, the central server 1493 determines various ML compute parameters, such as the frequencies of local updates and global aggregation, local batchsize, bandwidth parameters, random number generator for random feature mapping, random feature dimensions, and/or other like parameters. At operation 1412, the central server 1493 provides the ML compute parameters to the client computing nodes 1491. At operation 1415, the client computing nodes 1491 embed the raw training data into a higher dimension using random feature mapping (e.g., by applying a Random Fourier Feature Mapping (RFFM) transform to the data). At operation 1418, the client computing nodes 1491 report respective times for generating the random features. At operation 1421, the central server 1493 initializes the global model, and at operation 1424, the central server 1493 sends the global model to the participating computing nodes 1491. At operation 1427, the client computing nodes 1491 compute model updates by training over the embedded training data 9) and raw labels $Y^{(i)}$. At operation 1430, the client computing nodes 1491 return the updated weights to the central server 1493. At operation 1433, the central server 1493 aggregates the received weights to obtain a new global weight. At operation 1436, the local weights and aggregated weights are shared between the client computing nodes 1491 and the central server 1493. Operations 1427-1436 are repeated until the model converges.

In embodiments, the exchange of kernel embedding parameters can be intercepted from the protocol exchange involving pre-processing of the data across computing nodes 1491. Additionally, computation of gradients (e.g., training) may be done at an edge server (e.g., central server/host), which is different than traditional federated learning techniques. In some implementations, dedicated hardware may be utilized to run training algorithm(s) as training with kernel embedding has no non-linearities as those involved in NN training. Further, computing nodes 1491 may perform additional kernel-methods based embedding on their local data. Training on coded data is done with MSE loss (e.g., coded labels can have negative entries) rather than cross-entropy loss (e.g., coded labels having positive entries).

In any of the embodiments discussed herein, exchange of kernel embedding parameters can be intercepted from the protocol exchange involving any-preprocessing of the data across client computing nodes. Computation of gradients (e.g., training data) at the central server can also be used for practicing the embodiments discussed herein, which is different than traditional federated learning techniques. In some implementations, dedicated hardware can be utilized to run training algorithms at the edge servers and/or the client computing nodes, as training with kernel embedding has no non-linearities as those involved in NN training. Further, the client computing nodes may perform additional kernel-method based embedding on their local data, which may involve additional and/or alternative computations as compared to standard federated learning approaches. Training on coded data may also be done with MSE loss (e.g., where coded labels can have negative entries) rather than cross-entropy loss (e.g., where coded labels have to have positive entries).

K. Data Encoding Techniques for Failure Mitigation

As described above, the relationship between a training data point $x_i$ and the corresponding label $y_i$ may be denoted as shown in Equation AS1

$$g(x_i) \approx y_i \qquad \qquad \text{\#(AS1)}$$

where $g(\cdot)$ is typically a non-linear function of $x_i$. DNNs are commonly used to approximate $g(\cdot)$. In embodiments herein, a coded training data set may be generated based on a kernel embedding technique, and corresponding labels may be generated for the coded training data that can be used by a central server to compute model updates in coded federated learning (CFL).

Random Feature Mapping Based Coded Data Generation. Consider the $i^{th}$ edge device, where $i \in \{1, \ldots, n\}$ having $l_i$ input-output pairs:

$$X^{(i)} = \begin{bmatrix} x_1^{(i)} \\ \vdots \\ x_{l_i}^{(i)} \end{bmatrix}, \text{ and } Y^{(i)} = \begin{bmatrix} y_1^{(i)} \\ \vdots \\ y_{l_i}^{(i)} \end{bmatrix},$$

The amount of coded data generated by the $i^{th}$ device is controlled by $\delta_i$ (which may be specified by the central server), which is the number of coded data points that the $i^{th}$ device should generate. Embodiments herein may perform a linear random coding on the local training data set $X^{(i)}$ to obtain the encoded training data set $\tilde{X}^{(i)}$. In certain embodiments, the $i^{th}$ device uses a random generator matrix $G_i$ (which may also be referred to as a coding matrix) of dimension $\delta_i \times l_i$ with elements drawn independently from the uniform $U(0,1)$ distribution and each row is normalized to have a sum equal to 1 so that each encoded feature is in the convex hull of the raw features. Thus, we have the following for the encoded training data:

$$\tilde{X}^{(i)}=G_iX^{(i)} \qquad \#(AS2)$$

For obtaining the corresponding coded labels for the coded training data, a kernel embedding approach may be used in which the raw and encoded training data are mapped to a higher dimension using Random Fourier Feature Mapping (RFFM), learning a linear model on kernel embedded raw features and labels, then using the learnt model to generate the labels for the encoded features. The details of each step are presented next.

The $i^{th}$ edge device maps its input features to a higher dimension using Random Fourier Feature Mapping (RFFM), which maps an input vector $x_k \in R^{1 \times d}$ to $\hat{x}_k \in R^{1 \times s}$ using the following mapping:

$$RFFM(\cdot): R^{1 \times d} \rightarrow R^{1 \times s}, RFFM(x_k)=\cos(x_k\Omega+b) \qquad \#(AS3)$$

where $\Omega \in R^{d \times s}$, $b \in R^{1 \times s}$ and the cosine is applied elementwise. The entries for $\Omega$ and b are sampled from distributions such that the following property is satisfied:

$$RFFM(x_i)RFFM(x_j)^T \approx K(x_i, x_j) = \exp\left(-\frac{\|x_i - x_j\|^2}{2\sigma^2}\right) \qquad \#Eq. \ (AS \ 4)$$

where exp $$\left(-\frac{\|x_i - x_j\|^2}{2\sigma^2}\right)$$

denotes the Gaussian kernel function with bandwidth parameter $\sigma^2$. The Gaussian kernel function implicitly measures the similarity between the input data points in a higher dimensional space. The above approximation holds if the columns in $\Omega$ are drawn IID from $$N\left(0, \frac{1}{(2\sigma^2)}I_d\right)$$

and the elements in b are drawn IID from Uniform(0, $2\pi$]. The label vectors are not modified. Another approach is to use random kitchen sinks.

The following represents the random feature map of the raw features:

$$\hat{X}^{(i)}=RFFM(X^{(i)}) \qquad \#(AS5)$$

Thereafter, the $i^{th}$ edge device carries out linear regression via gradient descent to estimate the model over its random features set and corresponding labels. Specifically, we learn model parameters $\beta^{(i)} \in R^s$ such that the following objective function is minimized iteratively:

$$f(\beta^{(r)^{(i)}}=\|X^{(i)}\beta^{(r)^{(i)}}-Y^{(i)}\|_F^2 \qquad \#(AS6)$$

where $\|\cdot\|_F$ denotes the Frobenius norm. We use gradient descent for iterative minimization of the loss function above. The objective of gradient descent method is to utilize the training data set $\hat{D}^{(i)}=(\hat{X}^{(i)}), Y^{(i)})$ in order to accurately estimate the unknown model $\beta^{(i)}$. This objective is realized in an iterative fashion by computing $\beta^{(r)^{(i)}}$ at the r-th epoch, evaluating a gradient associated to the squared-error cost function defined by equation AS7.

$$\nabla_\beta f(\beta^{(r)^{(i)}})=\hat{X}^{(i)}(\hat{X}^{(i)}\beta^{(r)^{(i)}}-Y^{(i)}) \qquad \#(AS7)$$

The iterative process is carried out until a pre-defined convergence criteria is met. Typical criteria include gradient norm reducing to a small value, the squared loss for the current model falling below a small value, among others. Let us refer to the final model as $\beta_f^{(i)}$.

Next the random feature mapping is carried out over the encoded data to obtain the kernel embedding for the encoded features:

$$\hat{\tilde{X}}^{(i)}=RFFM(\tilde{X}^{(i)}) \qquad \#(AS8)$$

Where the Fourier basis for RFFM is same as that for raw features. To obtain the labels for $\tilde{X}^{(i)}$, the $i^{th}$ edge device uses the trained model $\beta_f^{(i)}$ as follows:

$$\tilde{Y}^{(i)}=\hat{\tilde{X}}^{(i)}\beta_f^{(i)} \qquad \#(AS9)$$

The coded data set $(\tilde{X}^{(i)}, \tilde{Y}^{(i)})$ is sent to the central server, which can use it to approximate the NN update from $(X^{(i)}, Y^{(i)})$ whenever the local update from the $i^{th}$ edge device is not at the central server. The coded data set may then be used by the central server to compute global model updates as described herein, while maintaining data privacy for the training data of the client computing nodes.

Distributed Computation Methodology.

Implementation of the distributed NN training in the presence of edge device failures may assume that w represents the trainable parameters (e.g., weights, biases, etc.) in the NN that we are interested in learning. As is common in NN training, updates are made to the NN using gradient descent, where the partial gradient on each data point is obtained using a forward pass on the data followed by a backward pass. Additionally, we use the standard mean squared error (MSE) loss for training. Furthermore, a common strategy in NN training is stochastic gradient descent (SGD), where training is performed in batches of data and for each batch, the model is updated after a forward-backward pass on the batch.

At the start of training, each of the edge devices finds an encoded data set and sends to the controller central server using kernel embedding. During training, for a given global epoch r, only a subset of edge devices participate in the $r^{th}$ global epoch, which can, for example, be selected by the controller node at random to minimize bandwidth overhead. The controller node communicates the current global model to the clients and the clients carry out multiple local epochs of training on their local raw data. As mentioned earlier, the clients use SGD for local training by making one update to the model for each mini-batch. One local epoch at each client constitutes the full coverage of the local data at the edge node. Let $w^{(r)^{(i)}}$ denote the model obtained by the local NN training at the $i^{th}$ edge device after the $r^{th}$ global epoch. The MEC receives the locally updated models. However, some of the updates may not be received at the MEC due to channel failures or nodes exiting the training process. As the data across the edge devices is non-IID, it is important to account for the missing updates.

Let $A^{(r)} \subseteq \{1, \ldots, n\}$ be the set of client nodes from which the central server receives the updates. For each of the client devices in the remainder set $B^{(r)}=\{1, \ldots, n\} \backslash A^{(r)}$, the central server mimics the local training at the edge device by running the NN training on the corresponding coded data.

To obtain the global model $w^{(r)}$, the controller aggregates the model updates received from the edge devices with the model updates generated at the central server as shown by equation D2.

$$w^{(r)} = \frac{\left( \sum_{i \in A^{(r)}} l_i w^{(r)(i)} + \sum_{i \in B^{(r)}} \tilde{l}_i \tilde{w}^{(r)(i)} \right)}{\left( \sum_{i \in A^{(r)}} l_i + \sum_{i \in B^{(r)}} \tilde{l}_i \right)} \qquad \text{\#(AS10)}$$

where $\tilde{w}^{(r)(i)}$ denotes the model obtained by mimicking the local training at the missing $i^{th}$ device by training over the coded data set $(\tilde{X}^{(i)}, \tilde{Y}^{(i)})$. Here $\tilde{l}_i$ is the normalization factor for $\tilde{w}^{(r)(i)}$ during global weight aggregation. A larger $\tilde{l}_i$ denotes larger influence of updates from coded data while a smaller $\tilde{l}_i$ denotes a larger influence of updates from the raw data. As a heuristic, for our experiments, we take $\tilde{l}_i = \delta_i$.

Equation AS10 shows that the updated global model is effectively a weighted sum of the updated local models at the workers and the model updates at the edge system. Note that the edge system directly combines the update from the coded data, and no additional decoding complexity is present.

Figure 15:
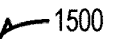
FIG. 15 illustrates a flow diagram of an example process for coding, load balancing and distributed computation of gradients in accordance with certain embodiments.
Figure 15:
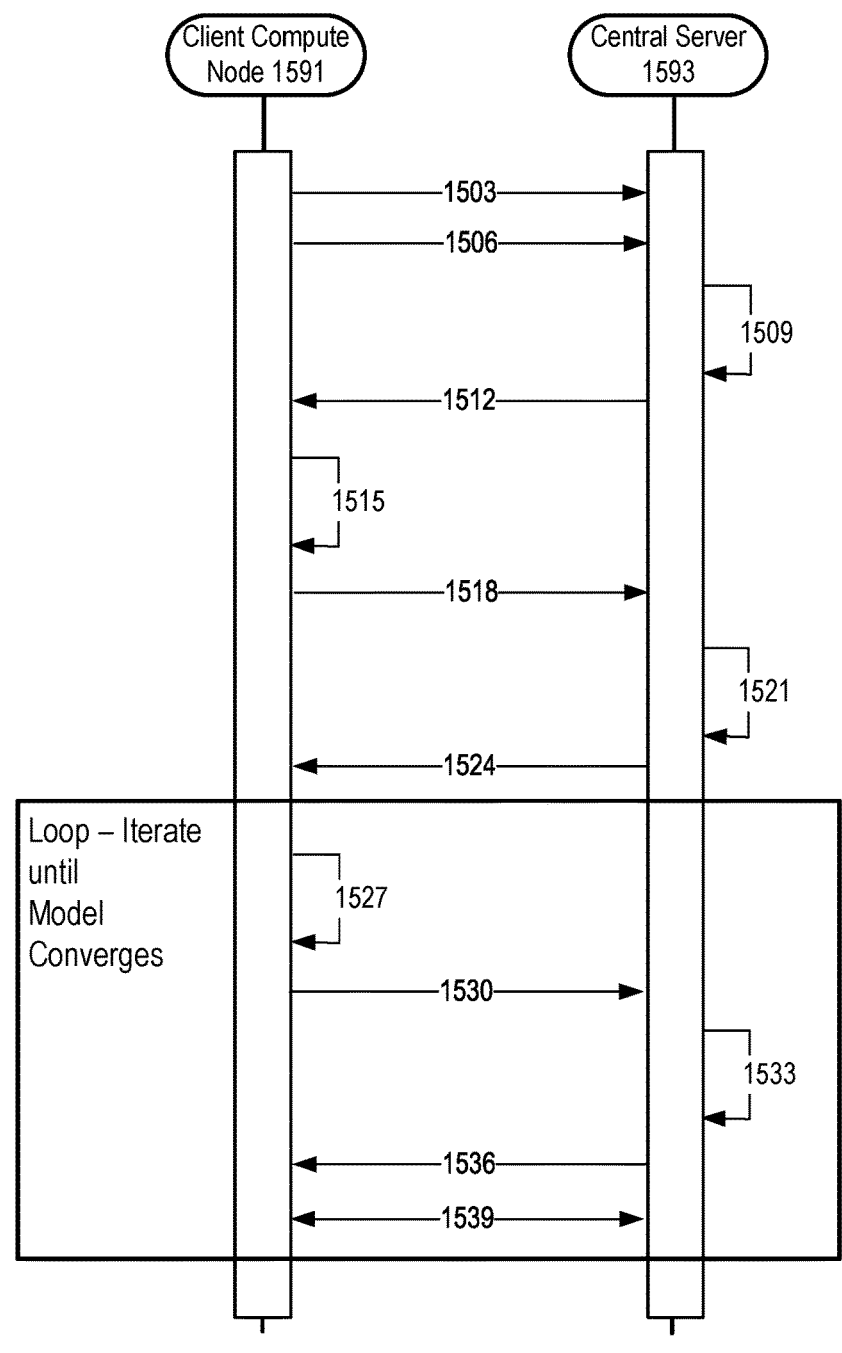

FIG. 15 illustrates a flow diagram of an example process 1500 for coding, load balancing and distributed computation of gradients in accordance with certain embodiments. The procedure 1500 involves exchange of link adaptation information, encoding parameters, computing parameters, coded dataset, as well as partial gradients and model updates between the edge system controller node 1593 and edge nodes 1591. The procedure 1500 may be integrated into the mobile/edge network architecture standards and/or specification development such ETSI MEC. Additionally or alternatively, procedure 1500 could also be an application-level exchange between the devices and servers. in some embodiments, operations in the example process shown may be performed by one or more components of an edge computing node, such as processor(s) of a client device similar to client computing nodes 1202 of FIG. 12. In some embodiments, one or more computer-readable media may be encoded with instructions that implement one or more of the operations in the example process below when executed by a machine (e.g., a processor of a computing node). The example process may include additional or different operations, and the operations may be performed in the order shown or in another order. In some cases, one or more of the operations shown in FIG. 15 are implemented as processes that include multiple operations, sub-processes, or other types of routines. In some cases, operations can be combined, performed in another order, performed in parallel, iterated, or otherwise repeated or performed another manner.

The example process 1500 begins at operation 1503 where the client computing nodes 1591 provide operational parameters to the controller node 1593. The operational parameters may be the same or similar to the operational parameters discussed previously, and may be provided to the controller node 1593 in a same or similar manner as discussed previously. The operational parameters are periodically updated at operation 1506. Operations 1503 and 1506 may repeat as necessary, for example, on a periodic basis, during procedure 1500 including during operation of the other operations of procedure 1500 discussed infra.

At operation 1509, the controller node 1593 determines various ML compute parameters, such as the frequencies of local updates and global aggregation, local batchsize, bandwidth parameters, random number generator for random feature mapping, random feature dimensions, coded data set size for each client computing node 1591, and/or other like parameters. At operation 1512, the controller node 1593 provides the ML compute parameters to the client computing nodes 1591 (e.g., assigning compute parameters).

At operation 1515, the client computing nodes 1591 privately encode their local training data using kernel embedding for label generation. At operation 1518, the client computing nodes 1591 transmit respective encoded data to the controller node 1593. At operation 1521, the controller node 1593 initializes the global model. At operation 1524, the controller node 1593 sends the global model (global updates) to the participating computing nodes 1591. At operation 1527, the client computing nodes 1591 compute model updates by training over the embedded features and raw labels. At operation 1530, the client computing nodes 1591 transmit the locally updated models to the controller node 1593.

At operation 1533, the controller node 1593 computes updates from the coded data for the missing client computing nodes 1591 (e.g., client computing nodes 1591 that were unable to provide updates, or for whose updates are otherwise missing). At operation 1533, the controller node 1593 also aggregates the received local updates and the updates from the coded data, and refines the model. At operation 1536, the controller node 1593 sends the refined model back to the client computing nodes 1591, and at operation 1539, the local weights and aggregated weights are shared between the client computing nodes 1591 and the controller node 1593. Operations 1527-1539 are repeated until the model converges.

In any of the embodiments discussed herein, utilizing the locally learnt kernel to generate labels for the local encoded data at devices is unique in comparison to existing ML techniques. In embodiments, the labels for the coded data may match when applying a learnt kernel on the coded feature data. Further, edge nodes may perform additional kernel-based training on their local data to obtain $\beta_f$. This involves additional or alternative computations compared to standard/conventional federated learning approaches. In embodiments, training on coded data is done with MSE loss (e.g., where coded labels can have negative entries) rather than cross-entropy loss (e.g., where coded labels can have positive entries).

In any of the embodiments discussed herein, the exchange of data between client computing nodes and central servers can be communicated according to the implemented edge system and/or communication protocols. Such communications and/or ML training techniques can be standardized or otherwise specified in a suitable edge computing standard, such as ETSI MEC or the like. Additionally or alternatively, the information (e.g., capability info) needed to utilize the embodiments discussed herein can also be inspected/intercepted from respective client computing nodes and/or respective central servers. In any of the embodiments discussed herein, computation of gradients (e.g., training) may take place at central server, which is different than conventional/traditional federated learning approaches. In some implementations, dedicated hardware at the client computing nodes and/or the central servers can be utilized to run the training algorithms discussed herein.

L. Coded Federated Learning with Non-Linear Models

Embodiments herein may consider the problem of distributed implementation of mini-batch GD algorithms for non-linear regression problems in heterogeneous computing environments, such as edge computing environments, where compute and storage resources are available at numerous edge computing nodes, while keeping the data at the nodes private. Specifically, embodiments herein may relate to the problem of non-linear regression over data with vector labels generated locally at edge or client devices.

One major challenge in implementing distributed ML using data available at different computing nodes is to ensure privacy, as users who collaborate for model computation want to keep their raw data secure on their device. Furthermore, wireless networks, such as edge computing networks, are inherently heterogeneous as computing nodes have disparate processing speeds, radio capabilities, and experience different channel qualities. Additionally, the wireless communication is characterized with time-varying link qualities that need to be taken into account in the design of distributed implementation of ML algorithms in edge computing environments. Unlike in cloud computing at server farms, the edge nodes in an edge network are non-dedicated computing devices running multiple processes concurrently. This leads to non-deterministic behavior of processing times for different tasks. Therefore, in order to minimize the overall training time, a data distribution policy should account for communication overhead associated with wireless data transmission as well as computing capabilities of the devices. Various edge computing usages are under consideration that may target usages with dense wireless infrastructure (e.g. V2X, ad-hoc drone/vehicular networks, IoT networks, Wireless Sensor Networks, etc.).

GD is a building block for many ML computations. The training phase proceeds iteratively, where in each epoch, processing of large data sets takes place to learn an underlying model. Model estimation for non-linear regression and classification problems have been widely used in modeling complex relationships between features and labels in problems such as text classification and image recognition. GD is used in many other ML algorithms, such as collaborative path planning via reinforcement learning and deep learning. Furthermore, due to compute limitations and for improving convergence, training in each epoch proceeds in mini-batches sequentially, where one model update takes place after GD on one mini-batch of data. Thus, in each epoch, there are as many model updates as the number of mini-batches. In a distributed setting, one global mini-batch constitutes the aggregate of the local mini-batches at the edge devices.

Embodiments herein provide an efficient strategy that efficiently transforms the distributed non-linear machine learning problem into a distributed linear regression problem using kernel embedding via Random Fourier Feature Mapping (RFFM) as described previously. In particular, dedicated computing capability available at central server's disposal may be utilized in the edge computing environment by offloading a part of computation for each mini-batch to the central server, while using coding to preserve privacy and also improve reliability. The proposed scheme is also efficient in estimating the near optimal size of the subset of local data that an edge node should process in each mini-batch of training, which builds on the embodiments discussed infra.

Embodiments herein include training a non-linear model over distributed data with vector labels across individual edge devices via mini-batch GD algorithm trained from decentralized data available at the edge devices. The embodiments exploit the statistical knowledge of operational parameters including, for example, link and processing delays. In embodiments, the problem is linearized via distributed kernel embedding. Linearization of the training procedure distributes federated learning over decentralized non-IID data. Transformation of the non-linear problem to linear regression enables efficient load balancing and coding schemes to speed up training in MEC environments.

Embodiments also include transformation of local data with vector labels via random Fourier feature mapping-based kernel embedding as previously described. Each edge device creates coded data and sends the coded data to the controller node for each mini-batch. In embodiments, a random coding method is used to encode the training data for mini-batch training disjointly by each edge device at near-optimal coding redundancy, and upload the coded training data to the edge server. Disjoint encoding of training data with vector labels at each edge device for each mini-batch, and sharing of only the coded training data to the edge server(s) ensures some level of data protection and alleviates privacy concerns. In each epoch, the edge nodes locally compute partial gradients from uncoded training data in mini-batches and upload the partial gradients to the MEC node after each mini-batch. In embodiments, the edge nodes do not share their coding coefficients with each other or with the edge server.

For each mini-batch in each epoch, the central server node aggregates partial gradients received from respective edge nodes and partial gradients computed from coded training data for the corresponding mini-batch available at the central server without incurring any decoding complexity. In embodiments, part of gradient computation is performed by a helper (secondary) edge server on coded data points received from edge devices, while majority of gradient computation is done privately by each edge device on its local uncoded data points and only corresponding partial gradients are shared to the edge server for each mini-batch. Here, the global mini-batch size can be selected depending on the local compute resources such as memory resources, processor resources, and/or other operational parameters. Generally, a smaller mini-batch helps to overcome the local minimas and increases the chance to reach a better convergence, but a larger mini-batch can be useful to reduce the variance in convergence during model updates. The central server combines the partial gradient obtained from coded data points to the partial gradient obtained from uncoded data points iteratively until the underlying model converges. The procedure is repeated until convergence.

In certain embodiments, the computation(s) is/are balanced across edge devices based on statistical knowledge of link quality, processing speed, battery life, and/or other operational parameters. The embodiments exploit the heterogeneity and stochastic behavior of computing and communication in edge/wireless environments to allocate near-optimal gradient computation tasks to edge devices. Training time may be significantly reduced compared to uncoded federated learning, while raw data is never shared which alleviates privacy concerns. The embodiments provide reduced parameter counts leading to lower memory footprint, processor resource efficiencies, and higher bandwidth utilization (e.g., lower signaling overhead) in comparison to conventional NN based training. In embodiments, coded training data at each edge node is weighted based on expected computing delay, signal quality of raw data, computing power budget, and/or other operational parameters, which enables the controller node to combat straggler effects. The embodiments herein may outperform uncoded systems in all heterogeneity regions without incurring decoding complexity.

According to various embodiments, a supervised learning problem in which training is performed based on a data set $D=\{(x_k,y_k)\}_{k=1,\ldots,m}$, is considered, where m is the total number of training data points, $$X \triangleq \begin{pmatrix} x_1 \\ \vdots \\ x_m \end{pmatrix}$$

is a m×d training symbol matrix, and $$Y \triangleq \begin{pmatrix} y_1 \\ \vdots \\ y_m \end{pmatrix}$$

is a m×c matrix containing the one-hot label vectors for c classes, corresponding to the training symbol matrix X.

The distribution of the data sets is non-IID across edge computing nodes. The relationship between a training data point $x_i$ and the corresponding label $y_i$ is denoted as follows: $g(x_i) \approx y_i$, where $g(\cdot)$ is typically a non-linear function of $x_i$.

Data Pre-processing via Random Feature Mapping Based Kernel Embedding. The function $g(\cdot)$ may be estimated using a linear function in higher dimension. To achieve this, each client computing node may map its input features/ training data to a higher dimension using Random Fourier Features Mapping (RFFM). RFFM maps an input vector $x_i \in R^{1 \times d}$ to $\hat{x}_i \in R^{1 \times S}$ using the following mapping: $RFFM(\cdot)$: $R^{1 \times d} \rightarrow R^{1 \times s}$, $RFFM(x_i) = \cos(x_i \Omega + b)$, where $\Omega \in R^{d \times s}$, $b \in R^{1 \times s}$ and the cosine is applied element-wise. The entries for $\Omega$ and b are sampled from distributions such that the following property is satisfied:

$$RFFM(x_i)RFFM(x_j)^T \approx K(x_i, x_j) = \exp\left(-\frac{\|x_i - x_j\|^2}{2\sigma^2}\right) \quad \#\text{Eq. (AT1)}$$

In the above equation, $$\exp\left(-\frac{\|x_i - x_j\|^2}{2\sigma^2}\right)$$

denotes the Gaussian kernel function with bandwidth parameter $\sigma^2$ which is specified by the controller node based on domain knowledge and transfer learning. The Gaussian kernel function implicitly measures the similarity between the input data points in an infinite dimensional space, thus providing the capability to approximate any non-linear function. The above approximation holds if the columns in $\Omega$ are drawn IID from $$N\left(0, \frac{1}{(2\sigma^2)}I_d\right)$$

and the elements in b are drawn IID from Uniform(0,2π]. The label vectors are not modified. Another approach for RFFM is called 'random kitchen sinks', where the supervised learning problem is done with the modified data set.

$$\hat{D}=\{(\hat{x}_k,y_k)\}_{k=1,\ldots,m} \quad \#\text{Eq. (AT2)}$$

where $$\hat{X} \triangleq \begin{pmatrix} \hat{x}_1 \\ \vdots \\ \hat{x}_m \end{pmatrix}$$

is the m×s modified training symbol matrix.

A goal is to learn a linear regression model over $\hat{D}$ to approximate the non-linear function $g(\cdot)$. Specifically, model parameters $\beta \in R^s$ are learned such that the following objective function is minimized iteratively:

$$f(\beta^{(r)})=\|\hat{X}\beta^{(r)}-Y\|_F^2 \quad \#\text{Eq. (AT3)}$$

In the above equation, $\|\cdot\|_F$ denotes the Frobenius norm, and $\lambda$ is a regularization parameter to avoid overfitting. Gradient descent may be used for iterative minimization of the loss function above. Typically, the data set is quite large due to which the procedure is carried out via SGD, in which the process iterates over the entire data set in batches.

An objective of mini-batch gradient descent method is to utilize the training data set $\hat{D}$ in order to accurately estimate the unknown model $\beta$. Assume that the data set is partitioned into B batches, with batches indexed using $b \in \{1, \ldots, B\}$. This objective is realized in an iterative fashion by computing $\beta^{(r,b)}$ at for the $b^{th}$ mini-batch in the $r^{th}$ epoch, evaluating a gradient associated to the squared-error cost function defined as follows:

$$f^{(b)}(\beta^{(r,b-1)})=\|\hat{X}^{(b)}\beta^{(r,b-1)}-Y^{(b)}\|^2 \quad \#\text{Eq. (AT4)}$$

In the above equation, $(\hat{X}^{(b)}, Y^{(b)})$ denotes the data subset in the $b^{th}$ mini-batch, and $\beta^{(r,b-1)}$ denotes the model at the end of $(b-1)^{th}$ mini-batch update for the $r^{th}$ epoch with $\beta^{(r,0)}$ denoting the estimated model at the end of $B^{th}$ mini-batch update of the $(r-1)^{th}$ epoch. The gradient of the above cost function is given by equation AT5, and $\beta^{(r,b)}$ is obtained according to equation AT6.

$$\nabla_\beta f^{(b)}\left(\beta^{(r,b-1)}\right) = \hat{X}^{(b)\prime}\left(\hat{X}^{(b)}\beta^{(r,b-1)} - Y^{(b)}\right) \quad \#\text{Eq. (AT5)}$$

$$\beta^{(r,b)} = \beta^{(r,b-1)} - \frac{\mu}{\left(\frac{m}{B}\right)}\nabla_\beta f^{(b)}\left(\beta^{(r,b-1)}\right) \quad \#\text{Eq. (AT6)}$$

In equations AT5 and AT6, $\mu$ is an update parameter and $\beta^{(1,0)}$ may be initialized arbitrarily. Mini-batch gradient descent method involves computing equations AT5 and AT6 in tandem for a sufficient number of epochs r until the model parameters converge sufficiently. Clearly, the gradient in equation AT5 involves multiplications involving large matrices and vectors. Thus, GD becomes computationally prohibitive as data set and model parameters become massive.

Distributed Computation Methodology. When training data set is distributed across edge devices, the $i^{th}$ device with $l_i^{initial}$ data points can locally compute partial gradients on its B mini-batches, with the $b^{th}$ mini-batch being of size $l_{(i,b)}^{initial}$ such that $\Sigma_{b=1}^{B}l_{(i,b)}^{initial}=l_i^{inital}$, and communicate those to a central edge server/controller node that aggregates the received partial gradients to update the model to emulate the mini-batch training globally on the entire data set across the edge devices, and communicates the updated model back to the edge devices. Motivated by this observation, we can re-write equation AT5 as an aggregate of n partial sums as equation AT7.

$$\nabla_\beta f^{(b)}\left(\beta^{(r,b-1)}\right) = \sum_{i=1}^{n}\sum_{k=1}^{l_{(i,b)}^{initial}} \hat{x}_k^{(i,b)\prime}\left(\hat{x}_k^{(i,b)}\beta^{(r,b-1)} - y_k^{(i,b)}\right) \quad \#\text{Eq. (AT7)}$$

In equation AT7, $(\hat{x}_k^{(i,b)}, y_k^{(i,b)})$ is the $k^{th}$ element of the $b^{th}$ mini-batch at the $i^{th}$ edge device, $$\hat{X}^{(i,b)} = \begin{bmatrix} \hat{x}_1^{(i,b)} \\ \vdots \\ \hat{x}_{l_{(i,b)}^{initial}}^{(i,b)} \end{bmatrix}, \text{ and } Y^{(i,b)} = \begin{bmatrix} y_1^{(i,b)} \\ \vdots \\ y_{l_{(i,b)}^{initial}}^{(i,b)} \end{bmatrix}, \sum_{i=i}^{n} l_i^{initial} = m$$

is the total training data elements, and $$\left\{ \hat{X}^{(b)} = \begin{bmatrix} \hat{X}^{(1,b)} \\ \vdots \\ \hat{X}^{(n,b)} \end{bmatrix}, Y^{(b)=} \begin{bmatrix} Y^{(1,b)} \\ \vdots \\ Y^{(n,b)} \end{bmatrix} \right\} \stackrel{def}{=} \hat{D}^{(b)}$$

is training data in the $b^{th}$ global mini-batch distributed across n devices.

In an uncoded distributed mini-batch gradient computing, the client computing nodes compute the partial sums corresponding to their respective data subsets in equation AT7 to evaluate partial gradients and send them back to the controller device for combining. The controller device can then use equation AT6 to update the model and communicate the updated model back to the working devices. The process is repeated until sufficient convergence is achieved.

In heterogeneous computing environments, such as edge computing systems/networks (e.g., MEC environments), non-dedicated computing devices are used for on-demand distributed gradient computing. Therefore, each device may have different processing rates, memory constraints, and active processes running on them. One way to statistically represent this heterogeneity is to model the computation time at each device for a given mini-batch as a shifted exponential random variable $T_k^{(b)}$ given as: $T_i^{(b)} = T_{i,1}^{(b)} + T_{i,2}^{(b)}$, where the deterministic component $T_{i,1}^{(b)}$ depends on the processing rate and the number of data points assigned to the $i^{th}$ device, and the random component $T_{i,2}^{(b)}$ models the randomness coming from memory read/write cycles involved during multiply-accumulate operations for computing the partial gradient at the $i^{th}$ device.

In addition, the wireless communication links between the controller node and edge (worker) nodes have stochastic fluctuations in link quality. In order to maintain reliable service, link adaptation becomes imperative where wireless links are periodically measured and achievable data rates are adjusted. In particular, the wireless link between the controller node and the $i^{th}$ worker device for the $b^{th}$ mini-batch update is given by: $(r_i^{(b)}, q_i^{(b)})$ where $r_i^{(b)}$ is the achievable bits per channel use in order to have an erasure probability smaller than $q_i^{(b)}$. The rate $r_i^{(b)}$ may be dynamically adapted with respect to the changing link quality in order to maintain a constant erasure probability q during the entire gradient computation.

Uncoded gradient computation methods carried out according to equation AT7 performs poorly due to the straggler effect coming from either the computation time or the link quality or both. As the data distributed across the nodes are non-IID, it may be necessary to combine the updates from all the workers for more accurate results. Next, a coding method to tackle this straggler effect with the use of a dedicated edge server and limiting the computation at the workers is provided. Such embodiments leverage the concepts discussed, e.g., in U.S. patent application Ser. No. 16/235,682, which is hereby incorporated by reference in its entirety.

Encoding the training data. In embodiments, edge server(s) with large processing and communication capabilities is/are used to aid the execution of the GD algorithm by executing partial gradient from encoded training data for each mini-batch to combat the straggling effects.

For each mini-batch $b \in \{1, \ldots, B\}$, linear random coding is performed on the global mini-batch training data set $\hat{D}^{(b)}$ that is distributed across all devices. For this, the $i^{th}$ device uses a random generator matrix $G^{(i,b)}$ of dimension $\delta^{(b)} \times l_{(i,b)}^{initial}$ with elements drawn independently from standard normal distribution, and applies on the weighted local training data set to obtain a coded mini-batch training data set $(\tilde{X}^{(i,b)}, \tilde{Y}^{(i,b)})$, where $\tilde{X}^{(i,b)} = G^{(i,b)} W^{(i,b)} \hat{X}^{(i,b)}$ and $\tilde{Y}^{(i,b)} = G^{(i,b)} W^{(i,b)} Y^{(i,b)}$.

The coding redundancy $\delta^{(b)}$ depends on heterogeneity in computing, communication and power budget observed across all the edge nodes and edge servers for the $b^{th}$ global mini-batch, and can be explicitly computed using load balancing algorithm discussed below. The matrix $W^{(i,b)}$ is a $l_{(i,b)}^{initial} \times l_{(i,b)}^{initial}$ diagonal matrix that weighs each training data point in $(\hat{X}^{(i,b)}, Y^{(i,b)})$ differently. The weight computation is also discussed infra.

The locally coded training data set $(\tilde{X}^{(i,b)}, \tilde{Y}^{(i,b)})$ is transmitted to the edge server, while the generator coefficients are not shared. Therefore, the encoding embodiments herein preserve the security of training data at each edge device. At the central server, the locally coded training data set received from all edge devices are combined to obtain the overall coded data set $(\tilde{X}^{(b)}, \tilde{Y}^{(b)})$, for example, according to equation AT8.

$$\tilde{X}^{(b)} = \sum_{i=1}^{n} \tilde{X}^{(i,b)} = \sum_{i=1}^{n} G^{(i,b)} W^{(i,b)} \hat{X}^{(i,b)} = G^{(b)} W^{(b)} \hat{X}^{(b)} \quad \#\text{Eq. (AT8)}$$

where, $$G^{(b)} = \begin{bmatrix} G^{(1,b)}, \ldots, G^{(n,b)} \end{bmatrix}, \text{ and } W^{(b)} = \begin{bmatrix} W^{(1,b)} & \cdots & 0 \\ \vdots & \ddots & \vdots \\ 0 & \cdots & W^{(n,b)} \end{bmatrix}.$$

In equation AT8, $G^{(b)}$ and $W^{(b)}$ are unknown at the edge system. Similarly, the overall coded label set for the $b^{th}$ mini-batch is expressed as equation AT9.

$$\tilde{Y}^{(b)} = \sum_{i=1}^{n} \tilde{Y}^{(i,b)} = G^{(b)} W^{(b)} Y^{(b)} \quad \#\text{Eq. (AT9)}$$

From equations AT8 and AT9, it can be observed that the distributed encoding across the entire global mini-batch b has been achieved. As this holds for any $b \in \{1, \ldots, B\}$, the distributed encoding across the entire data set has been achieved.

During every training epoch, for each global mini-batch b, each edge device computes a partial gradient from a subset of its uncoded $b^{th}$ mini-batch data set. The size of the data subset is obtained from the optimization embodiments discussed herein. Specifically, a given edge device i computes partial gradients from $l_{(i,b)}*$ number of uncoded data points that is available locally, where $l_{(i,b)}* \leq l_{(i,b)}^{initial}$. The partial gradients are then sent to the edge server.

The edge server also computes partial gradients from $\delta^{(b)}$ coded data points, which is always available assuming computing power at the edge servers is much larger than at the edge nodes. Therefore, in each training epoch, the controller node needs to wait for partial gradients corresponding to the first arriving $(m^{(b)}-\delta^{(b)})$ number of uncoded data points received from the edge devices, where $m^{(b)}=\Sigma_{i=1}^{n}l_{(i,b)}^{initial}$ denotes the size of the global mini-batch data set.

Encoding complexity. The encoding complexity is in the order of $\delta^{(b)}$, where it has been observed during simulations that at extreme heterogeneity, a large $\delta^{(b)}$ of the size around 30% of the global mini-batch data size can significantly improve the convergence time. For low complexity encoding using random linear codes, generator matrix coefficients may be taken from equi-probable Bernoulli distribution of +1 and −1, thereby avoiding multiplications during the encoding process. In recent years, research on sparse generator matrix has been an active field of study in itself.

What is next is a discussion of computation of near optimal coding redundancy $\delta^{(b)}$ for the global mini-batch b, load partitioning, weight matrix, and combining of the partial gradient computed from coded portion of the data to the partial gradient computed from uncoded portion of the data.

Coding redundancy computation and load partitioning. For a fixed time $t^{(b)}$, the aggregate return received from all edge devices including those computed at edge server till $t^{(b)}$ in any epoch is a random variable defined according to equation AT10.

$$R^{(b)}\left(t^{(b)}; l^{(b)}\right) = \sum_{i=1}^{n+1} R_{(i,b)}\left(t^{(b)}; l_{(i,b)}\right) = \sum_{i=1}^{n+1} l_{(i,b)} \mathbb{1}_{\left\{T_i^{(b)} \leq t^{(b)}\right\}} \qquad \text{\#Eq. (AT10)}$$

In equation AT10 $l_{(n+1,b)}$ is the partial gradients locally computed by the edge server using the coded training data. For a load allocation $l^{(b)}$, the expectation of the return $R_{(i,b)}(t^{(b)}; l_{(i,b)})$, i=1, . . . , n, denotes the average number of uncoded data points that have been processed at the i-th edge device and corresponding partial gradient have been received by the controller till $t^{(b)}$. Note that during each aggregation instance, partial gradient computed from the coded data is always available at the edge server(s), which means $T_{n+1}^{(b)}<\min(T_1^{(b)}, \ldots, T_n^{(b)})$.

For each edge device, i=1, . . . , n, $l_{(i,b)}^*(t^{(b)})$ is found according to equation AT11.

$$l_{(i,b)}^*(t^{(b)}) = \arg_{l_{(i,b)} \leq l_{(i,b)}^{initial}} \max E(R_{(i,b)}(t^{(b)}, l_{(i,b)})) \qquad \text{\#Eq. (AT11)}$$

Similarly, the coding redundancy required for a given time $t^{(b)}$ is given by equation AT12.

$$l_{(n+1,b)}^*(t^{(b)}) = \arg_{l_{(n+1,b)} \leq \delta^{up}} \max E(R_{(n+1,b)}(t^{(b)}, l_{(n+1,b)})) \qquad \text{\#Eq. (AT12)}$$

In equation AT12, $\delta^{up}$ denotes the maximum coded load the central server(s) is/are willing to receive from the client computing nodes for any global mini-batch. The above two steps maximize the expectation of the aggregate return defined in equation AT10.

The maximum expected aggregate return until time $t^{(b)}$ is denoted according to equation AT13.

$$E\left(R^{(b)}\left(t^{(b)}; l^{(b)*}\left(t^{(b)}\right)\right)\right) = \sum_{i=1}^{n+1} E\left(R_{(i,b)}\left(t^{(b)}; l_{(i,b)}^*\left(t^{(b)}\right)\right)\right) \qquad \text{\#Eq. (AT13)}$$

Finally, $t^{(b)}*$ is obtained, which is the solution to the optimization problem of equation AT14.

$$\min t^{(b)} \qquad \text{\#Eq. (AT14)}$$

such that $m^{(b)} \leq E (R^{(b)} (t^{(b)}; l^{(b)}*(t^{(b)}))) \leq m^{(b)}+\epsilon$ In equation AT14, e is a tolerance parameter. The near optimal load partitions are given by $l^{(b)}*(t^{(b)}*)$. Clearly, the minimal coding redundancy is $\delta^{(b)}=l_{(n+1,b)}*(t^{(b)*})$ Weight Matrix Computation. The weight matrix $W^{(i,b)}$ applied at each edge device is a $l_{(i,b)}^{initial}\times l_{(i,b)}^{initial}$ diagonal matrix. The $k^{th}$ diagonal coefficients is given by: $w_k^{(i,b)}=\sqrt{p_i^{(b)}}$, where $p_i^{(b)}$ is the probability of not returning the partial gradients associated to the $l_i*(t*)$ uncoded data points processed at the $i^{th}$ edge device for k=1, . . . , $l^{(i,b)}*(t^{(b)*})$. In particular, $p_i^{(b)}=\Pr\{T_i^{(b)}\leq t^{(b)*}\}$.

For a given load partition $l_{(i,b)}*(t^{(b)*})$, this probability can be directly computed by the $i^{th}$ edge device using the statistical property of computation time and communication links. Further, note that there are $(l_{(i,b)}^{intial}-l_{(i,b)}*(t^{(b)*}))$ uncoded data points that are never processed at the $i^{th}$ edge device. The diagonal coefficients corresponding to such data points are given by $w_k^{(i,b)}=1$, for k=1, . . . , $(l_{(i,b)}^{intial}-l_{(i,b)}*(t^{(b)*}))$. The $i^{th}$ edge device can decide any subset of uncoded initial data for the mini-batch b to process locally and correspondingly apply the weights before encoding. This gives another layer of data security as well.

Aggregation of partial gradients. In each epoch, there is a mixture of partial gradients available at the edge server. One set of partial gradients are computed entirely by the edge server from $\delta^{(b)}$ coded training data set $(\tilde{X}^{(b)},\tilde{Y}^{(b)})$ given by equations AT8 and AT9. The edge node computes the partial gradient from the coded data set as follows:

$$\tilde{X}(b)'(\tilde{X}^{(b)}\beta^{(r,b-1)}-\tilde{Y}^{(b)}) \qquad \text{\#Eq. (AT15)}$$

The other set of partial gradients are computed by the edge devices on their local uncoded data and transmitted to the controller node. The controller node only waits for receiving partial gradients corresponding to the first $(m^{(b)}-\delta^{(b)})$ data points. In particular, the controller node waits for the first N worker devices such that the allocated load satisfy $\Sigma_{i=1}^{N}l_{(i,b)}*(t^{(b)*})\geq(m^{(b)}-\delta^{(b)})$. The aggregated partial gradient from uncoded data set is given by:

$$\sum_{i=1}^{N} \hat{X}^{(i,b)'}\left(\hat{X}^{(i,b)}\beta^{r,b-1} - Y^{(i,b)}\right) \qquad \text{\#Eq. (AT16)}$$

The controller node then combines the two sets of partial gradients using equation AT17.

$$\frac{1}{\delta^{(b)}}\tilde{X}^{(b)'}\left(\tilde{X}^{(b)}\beta^{(r,b-1)} - \tilde{Y}^{(b)}\right) + \sum_{i=1}^{N} \hat{X}^{(i,b)'}\left(\hat{X}^{(i,b)}\beta^{(r,b-1)} - Y^{(i,b)}\right) \qquad \text{\#Eq. (AT17)}$$

The normalized partial gradient corresponding to the coded data for sufficiently large $\delta^{(b)}$ can can be approximated (using weak law of large numbers) as:

$$\frac{1}{\delta^{(b)}}\tilde{X}^{(b)'}\left(\tilde{X}^{(b)}\beta^{(r,b-1)} - \tilde{Y}^{(b)}\right) = \qquad \text{Eq. \#(AT18)}$$

$$\hat{X}^{(b)'} W^{(b)'}\left(\frac{1}{\delta^{(b)}} G^{(b)'} G^{(b)}\right)W^{(b)}\left(\hat{X}\beta^{(r,b-1)} - Y^{(b)}\right) \approx$$

-continued $$\hat{X}^{(b)'} W^{(b)'} W^{(b)} \left( \hat{X}^{(b)} \beta^{(r,b-1)} - Y^{(b)} \right)$$

$$= \sum_{i=1}^{n} \sum_{k=1}^{i_{(i,b)}^{initial}} \left( w_k^{(i,b)} \right)^2 x_k^{(i,b)'} \left( x_k^{(i,b)} \beta^{(r,b-1)} - y_k^{(i,b)} \right)$$

Eq. #(AT19)

The above relation shows that for sufficiently large $\delta^{(b)}$, the aggregate gradient from the coded data points probabilistically weighs equation AT7 that provides the full gradient over the entire distributed $b^{th}$ global mini-batch.

Basically incorporating the partial gradients computed over uncoded training data by edge devices along with the partial gradients computed over coded training data by edge servers as presented in equation AT15 can effectively be viewed as using a systematic code to encode the entire set of data, where the generator matrix is $$\begin{bmatrix} I^{(b)} \\ G^{(b)} W^{(b)} \end{bmatrix},$$

and performing full gradient computation on the entire coded set for the mini-batch b. The probabilistic weighing of the coded portion of the training data compensates for the probability of systematic portion of the data being unavailable at the edge server(s) by time $t^{(b)}*$ in each epoch. Due to the link delay and computing delays, each partial gradient computed from the uncoded dataset is available at time $t^{(b)}*$ only with probability $(1-(w_k^{(i,b)})^2)$. Therefore, the weight matrix ensures, on average, that the aggregated gradients converges to the full gradient of uncoded data in the $b^{th}$ global mini-batch. Further, there is zero decoding complexity using the embodiments discussed herein.

Figure 16:
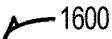
FIG. 16 illustrates a flow diagram of an example process of coding, load balancing and distributed computation of gradients in accordance with certain embodiments.
Figure 16:
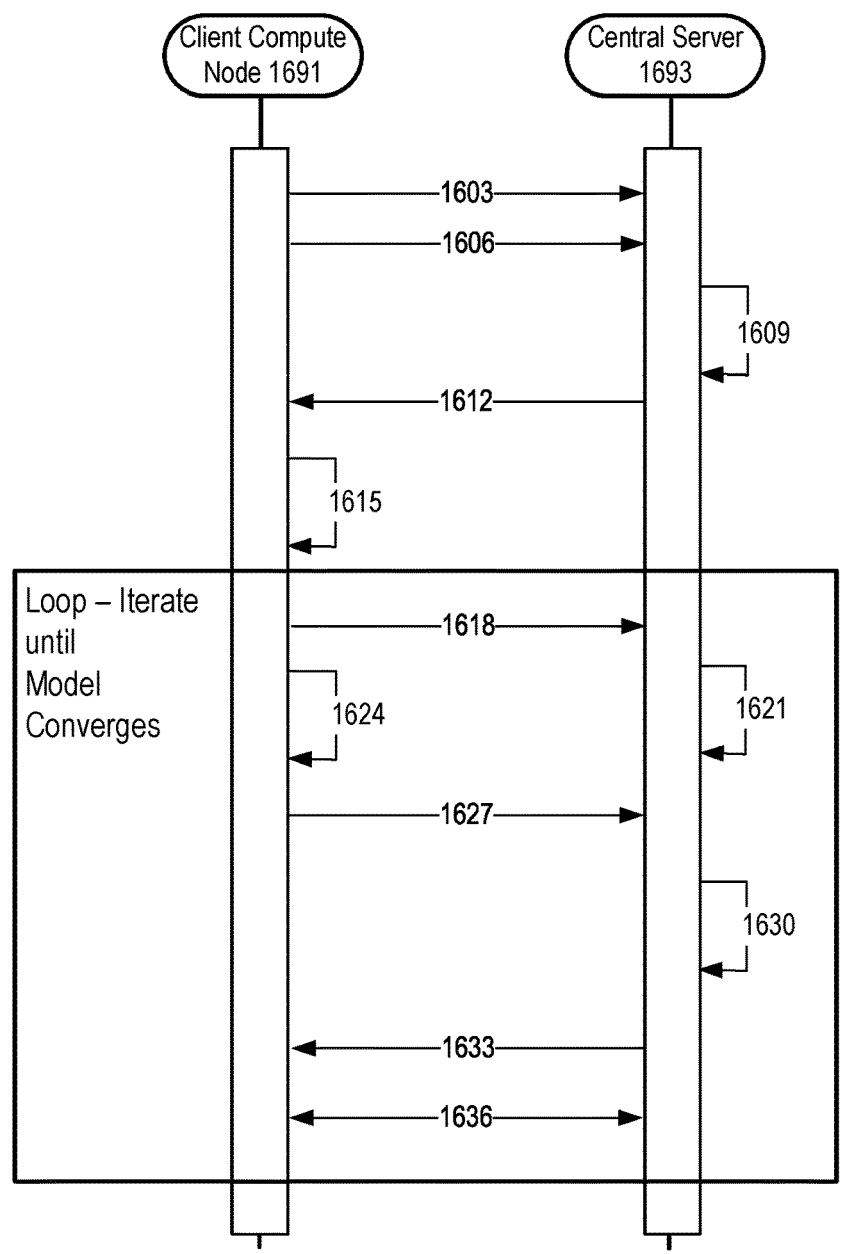

FIG. 16 illustrates a flow diagram of an example process 1600 of coding, load balancing and distributed computation of gradients in accordance with certain embodiments. The procedure 1600 involves exchange of link adaptation information, encoding parameters, computing parameters, coded dataset, as well as partial gradients and model updates between the edge system controller node 1693 and edge nodes 1691. The procedure 1600 may be integrated into the mobile/edge network architecture standards and/or specification development such ETSI MEC. Additionally or alternatively, procedure 1600 could also be an application-level exchange between the devices and servers. In some embodiments, operations in the example process shown may be performed by one or more components of an edge computing node, such as processor(s) of a client device similar to client computing nodes 1202 of FIG. 12. In some embodiments, one or more computer-readable media may be encoded with instructions that implement one or more of the operations in the example process below when executed by a machine (e.g., a processor of a computing node). The example process may include additional or different operations, and the operations may be performed in the order shown or in another order. In some cases, one or more of the operations shown in FIG. 16 are implemented as processes that include multiple operations, sub-processes, or other types of routines. In some cases, operations can be combined, performed in another order, performed in parallel, iterated, or otherwise repeated or performed another manner.

The example process 1600 begins at operation 1603 where the edge computing nodes 1691 provide operational parameters to the controller node 1693. The operational parameters may be the same or similar to the operational parameters discussed previously, and may be provided to the controller node 1693 in a same or similar manner as discussed previously. The operational parameters are periodically updated at operation 1606. Operations 1603 and 1606 may repeat as necessary, for example, on a periodic basis, during procedure 1600 including during operation of the other operations of procedure 1600 discussed infra.

At operation 1609, the controller node 1693 determines various ML compute parameters, such as the frequencies of local updates and global aggregation, local batchsize, bandwidth parameters, random number generator for random feature mapping, random feature dimensions, coded data set size for each edge computing node 1691, and/or other like parameters such as those discussed herein. At operation 1612, the controller node 1693 provides the ML compute parameters to the edge computing nodes 1691 (e.g., assigning compute parameters). At operation 1615, the edge computing nodes 1691 privately embed the raw features into a higher dimension using random feature mapping, and privately encode local training data in mini-batches. At operation 1618, the edge computing nodes 1691 transmit respective coded data to the controller node 1693. At operation 1621, the controller node 1693 computes partial gradients from the received coded private data.

At operation 1624, the edge computing nodes 1691 compute partial gradients from uncoded private data, and operation 1627, the edge computing nodes 1691 transmit the partial gradient updates to the controller node 1693. At operation 1630, the controller node 1693 aggregates the received partial updates to the locally computed gradients, when sufficient number are available to refine the model estimate. At operation 1633, the controller node 1693 sends the refined model update(s) to the edge computing nodes 1691. At operation 1636, the partial gradient and refined model are shared between the edge computing nodes 1691 and the controller node 1693 for global mini-batch training. Operations 1624-1636 are repeated until the model converges.

In any of the embodiments discussed herein, the exchange of coded redundancy from edge devices 1691 to edge server 1693 can be communicated according to the implemented edge system and/or communication protocols. Such communications can be standardized or otherwise specified in a suitable edge computing standard, such as ETSI MEC or the like. Additionally or alternatively, the information (e.g., capability info) needed to utilize the embodiments discussed herein can also be inspected/intercepted from respective edge computing nodes and/or respective edge servers. In any of the embodiments discussed herein, computation of gradients (e.g., training) may take place at edge server 1693, which is different than conventional/traditional federated learning approaches. This could be done using dedicated hardware utilized to run the training algorithm.

M. Joint Computing and Communication Aware Client Selection for Federated Learning Federated learning over wireless edge networks can face the following constraints:

a) compute rates and memory cycles available for federated learning can be heterogeneous across clients as well as over time;

b) the number of training examples at each client can be widely different leading to different compute requirements among clients; and c) communication rate/bandwidth available at clients can be heterogeneous and time-varying.

All the above constraints can lead to the following challenges:

A) when collecting weight updates with respect to the model from multiple clients, the time for a single update of the global model at the server is determined by the slowest client (or "straggler", based on an aggregate of compute time and upload time);

B) subsequent epochs need to stay on hold until all clients in the previous epoch have reported their weight updates. Asynchronous updates have been proposed to overcome this issue, but they have their own shortcomings. Therefore, asynchronous federated learning is not within the scope of embodiments; and C) there is a lack of adaptive approaches to address the straggler problem that can be varying with time.

Some embodiments propose methods and protocols that will ensure the server and clients can jointly determine the best set of clients to report weight updates in each epoch.

Methods to reduce the uplink communication costs have been proposed such as using structured updates and sketched updates. Control algorithms that determine the optimal schedules for performing parameter update to the global model have been proposed. These methods, however, do not regulate the users that participate in the global update in order to make the training process more efficient. A client selection approach was proposed in Nishio et al, Client Selection for Federated Learning with Heterogeneous Resources in Mobile Edge, arXiv: 1804.08333, 2018 (hereinafter "Client Selection for FL") that aimed to only select clients based on their resource capability and clients that can satisfy a certain delay deadline.

One major challenge in sub-sampling only the fast clients (in terms of upload time and compute time) is the issue of model divergence. The convergence of the global model is empirically conditioned on the clients' data being independently and identically distributed (i.i.d) from one client to the other. A dataset may be i.i.d. if each random variable has the same probability distribution as the others and all are mutually independent. In the absence of such distribution of data, skipping updates from several clients, such as from straggler clients, can lead to skewed updates and lead to model divergence/overfitting for only certain data distributions.

Instead, some embodiments provide a method that is flexible and achieves reduction in convergence time even in the presence of non-i.i.d data. An aspect of some embodiments concerns a set of protocols and algorithms to select a set of clients for each round of a global training epoch based on their computation and communication capabilities.

Some embodiments propose both a light-weight protocol exchange between a MEC server and clients, as well as adaptive algorithms that may significantly speed up the total training time of federated learning without impacting the training accuracy.

According to a first aspect of some embodiments, at the beginning of training, the server may poll all the clients to have the clients share the number of training examples available to them. This is a one-time transaction which allows the MEC server to estimate the time needed for the clients to compute and upload the model parameters.

Further, periodically, the MEC server may request the clients to share their respective compute rates and communication times in order to estimate the total update time from each client. Based on the above, the MEC server may perform a client set selection procedure by grouping the clients into sets for each training round. In a preferred embodiment, the group of client in a set is determined based on the time taken to return the computation, such that clients with similar return times are scheduled together, to avoid waiting on straggling computations. Also, some embodiments propose an adaptive mechanism wherein the statistical characteristic of the data (e.g. whether it is independent and identically distributed), and/or required accuracy are used to switch the algorithm to a more aggressive mode (e.g. picking clients with fastest response time), which can significantly reduce the convergence time.

Some contributions of embodiments are as follows:

a) compute-communication time aware client set and client selection such that the impact of the slow (or straggler) clients on the training time may be mitigated;

b) an adaptive client set selection algorithm that can adjust to variations in the computational and communication rates of the clients and reduce the overall training time with low overhead—as a preferred embodiment some embodiments propose a grouping procedure such that clients with similar completion times are scheduled together to avoid waiting for straggling nodes at each epoch; and/or c) a method to adapt the selection algorithm to a more aggressive client selection algorithm based on the statistical characteristic of the data and/or required accuracy of the computation—here, as one embodiment, a client selection algorithm based on the fastest completion time is proposed that can significantly speed up training; this feature can be turned on or off depending on the required training accuracy and statistical knowledge of client data.

The heterogeneity of compute, communication and availability of training data among the different clients participating in the distributed training requires an intelligent and adaptive approach to group the clients into sets that minimize the overall training time while not impacting the training accuracy performance.

According to some embodiments, we utilize information reported from clients to group the clients such that the overall update time for the training duration is minimized significantly. Further, we can achieve this without affecting the training accuracy of the federated learning. In addition, if the statistical property of client data is known, the MEC server is able to perform a more aggressive client selection that can reduce the convergence time. This approach can be turned on/off depending on the training accuracy requirement as well as the availability of statistical knowledge of client data.

Some embodiments are enabled even by way of a low-cost communication of client capabilities to MEC server. The MEC server may collect a one-time capability report from each client while implicitly estimating current client capabilities from previous reports. Further, we introduce periodic updates as needed.

According to some embodiments, the protocol exchange between the MEC server and the clients may be intercepted over the air and analyzed using tools such as Wireshark.

Federated learning may be summarized as follows:

federated learning may involve an MEC server that learns a global machine learning model from multiple clients each of which learn a local machine learning model from the dataset available to them;

instead of the clients sending all the data to a central MEC server to train a machine learning algorithm (such as a deep neural network, RNN, etc.), federated learning allows the clients to train a model on their data locally and share only the model weights (and not necessarily the data) to the MEC server;

the MEC server receives model updates from several clients and calculates the average of the model weights to form the global model; and for the next round of client training, the MEC server propagates the global model weights to clients as the current model.

Figures 25, 26:
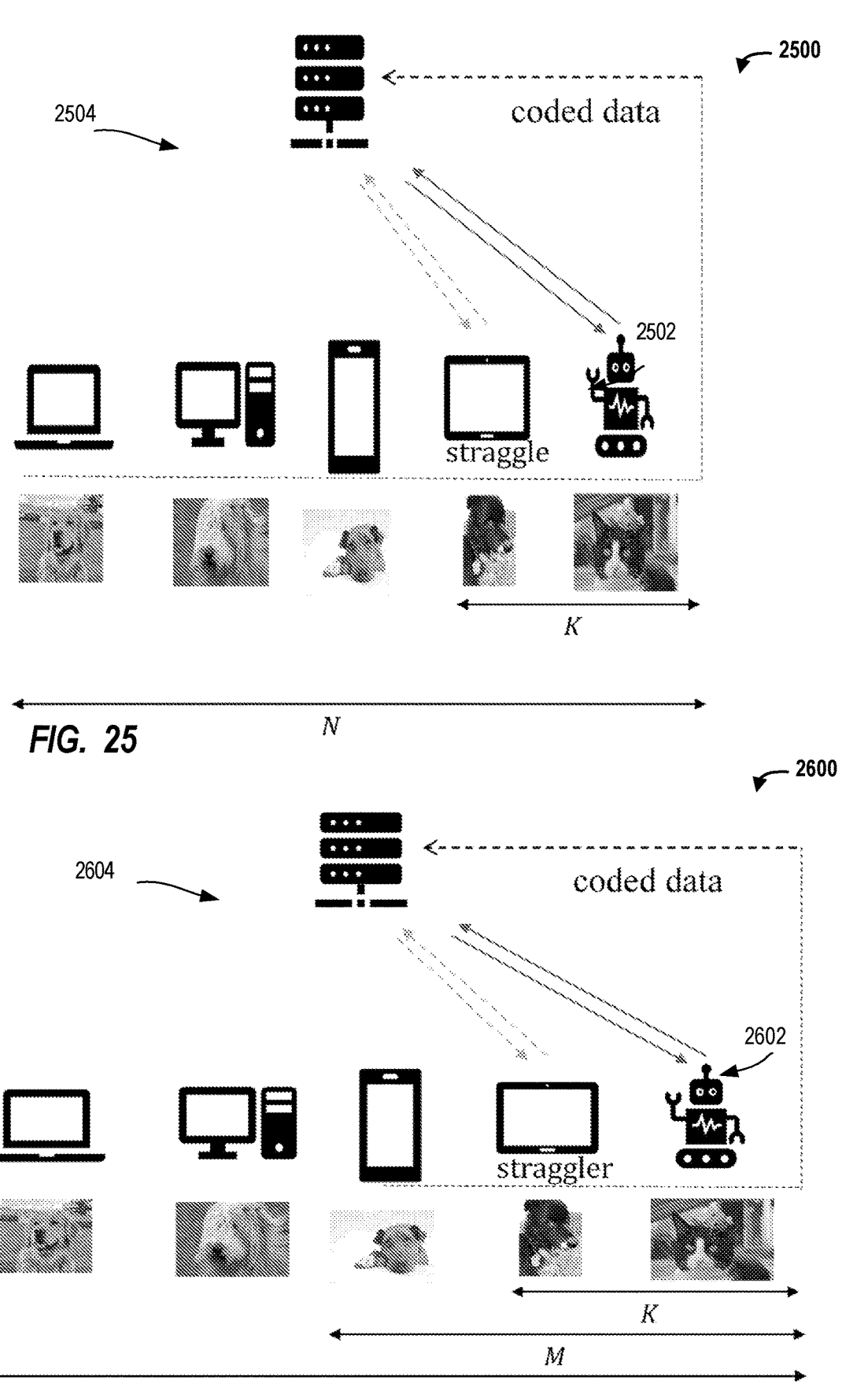
FIGS. 25-32 show similar edge learning environments including clients and a MEC server.
Figure 27:
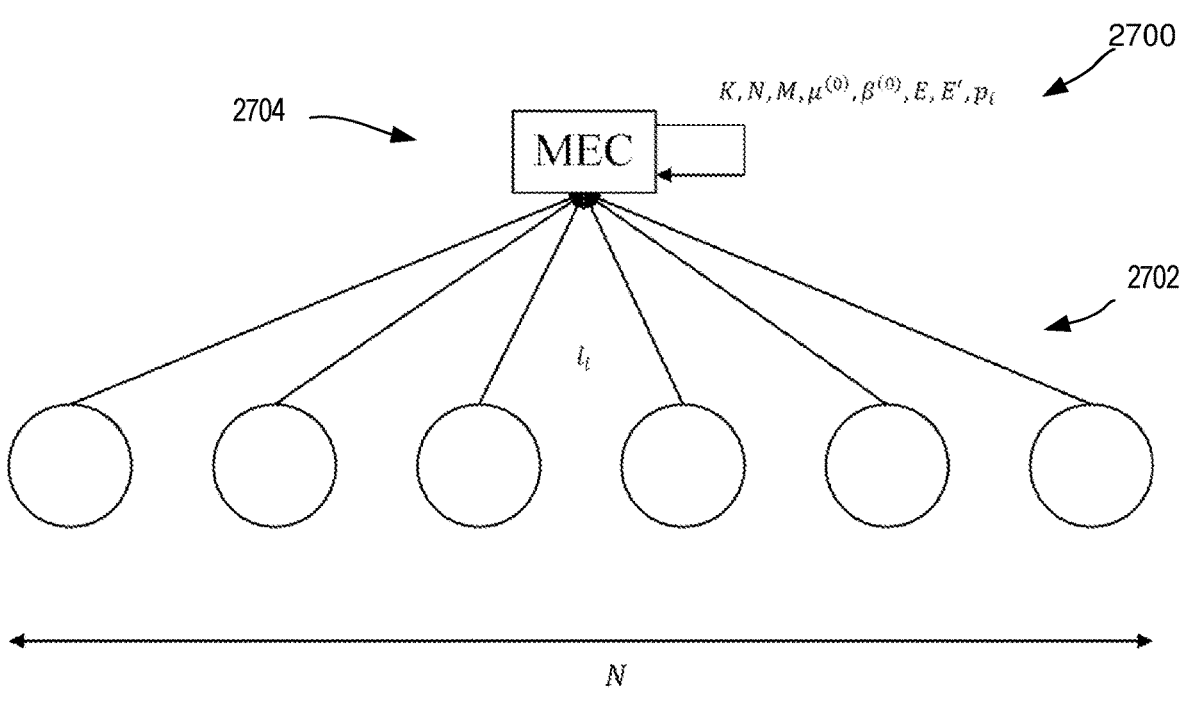

An example of a federated learning process may be described in relation to the edge cloud configuration 2600 of in FIG. 26. Here, the MEC server 2604 is to select K clients/client devices 2602 from a pool of N clients 2604 to perform federated learning in a next training round. The selection of K clients plays an important role in the overall federated learning performance.

This is because of the following:

1) Heterogeneous Computational capabilities: Each client device 2602 may have different computational capacities in terms of hardware and software with respect to one or more other client devices 2604. Further, the computational resources available may also be time-varying depending on the workloads at different times. This can result in different clients completing their local training at different times during each round.

2) Heterogeneous Communication rates: Each client may be connected to the MEC server differently (such as through WiFi, LTE, 5G in the case of wireless). The bandwidth available to users and their data rate can be dependent on the technology as well as their signal-to-noise ratio. The data rate and bandwidths are also time varying which can lead to different model upload times from different clients in each round.

3) Heterogeneous number of training examples: Each client may contain a different number of local training examples as compared with another client. This further leads to variability in the computing time of the local model weights at each client.

Due to the above challenges, some embodiments propose methods and apparatuses to enable the MEC server and clients to perform a light-weight exchange of information about their computational capability and communication rates periodically and utilize this information to lead to an intelligent grouping of the clients into sets and to minimize total training time.

Figure 17:
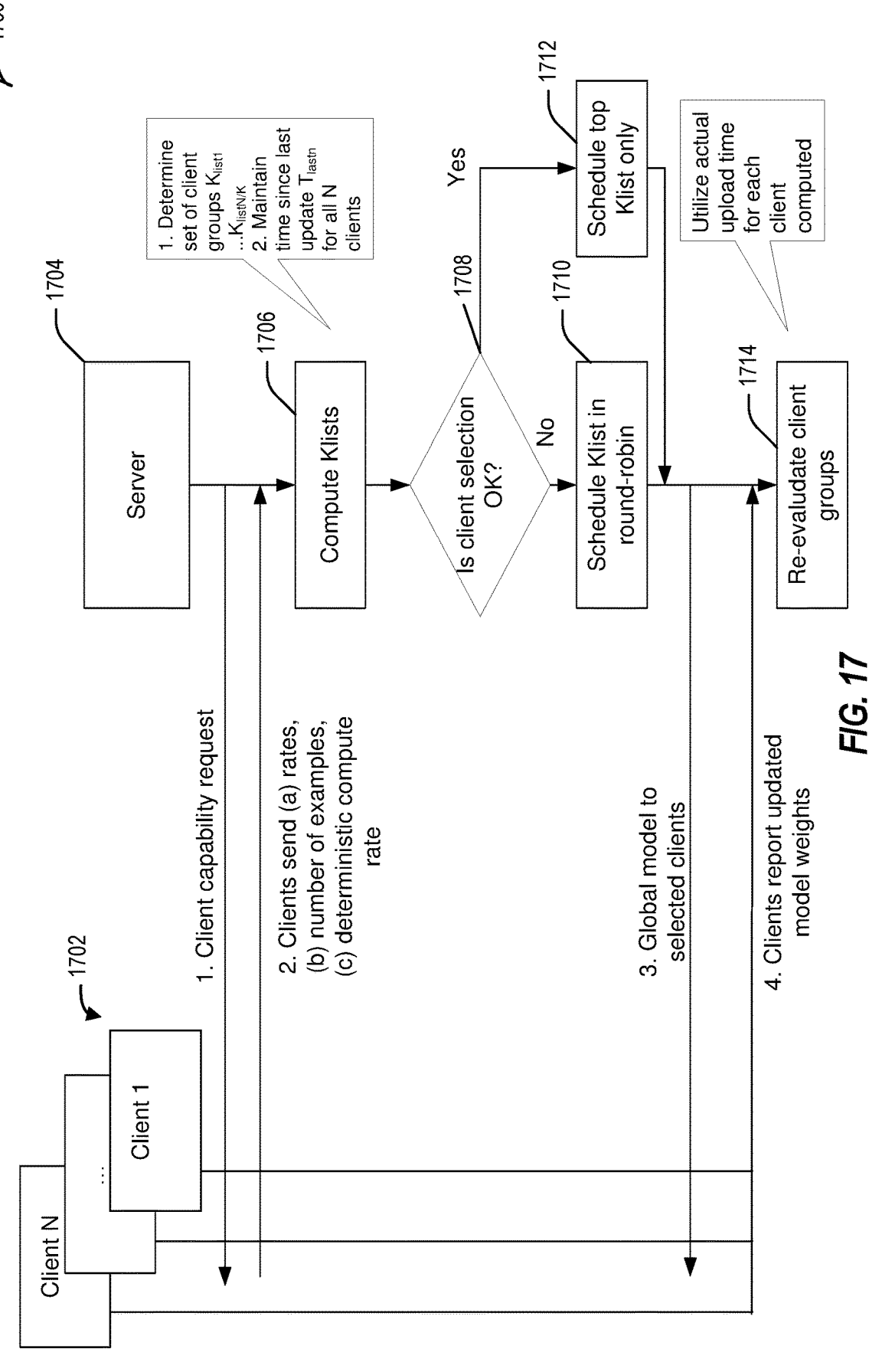
FIG. 17 illustrates a protocol flow for communication and computing aware client selection according to a first embodiment.
Figure 18:
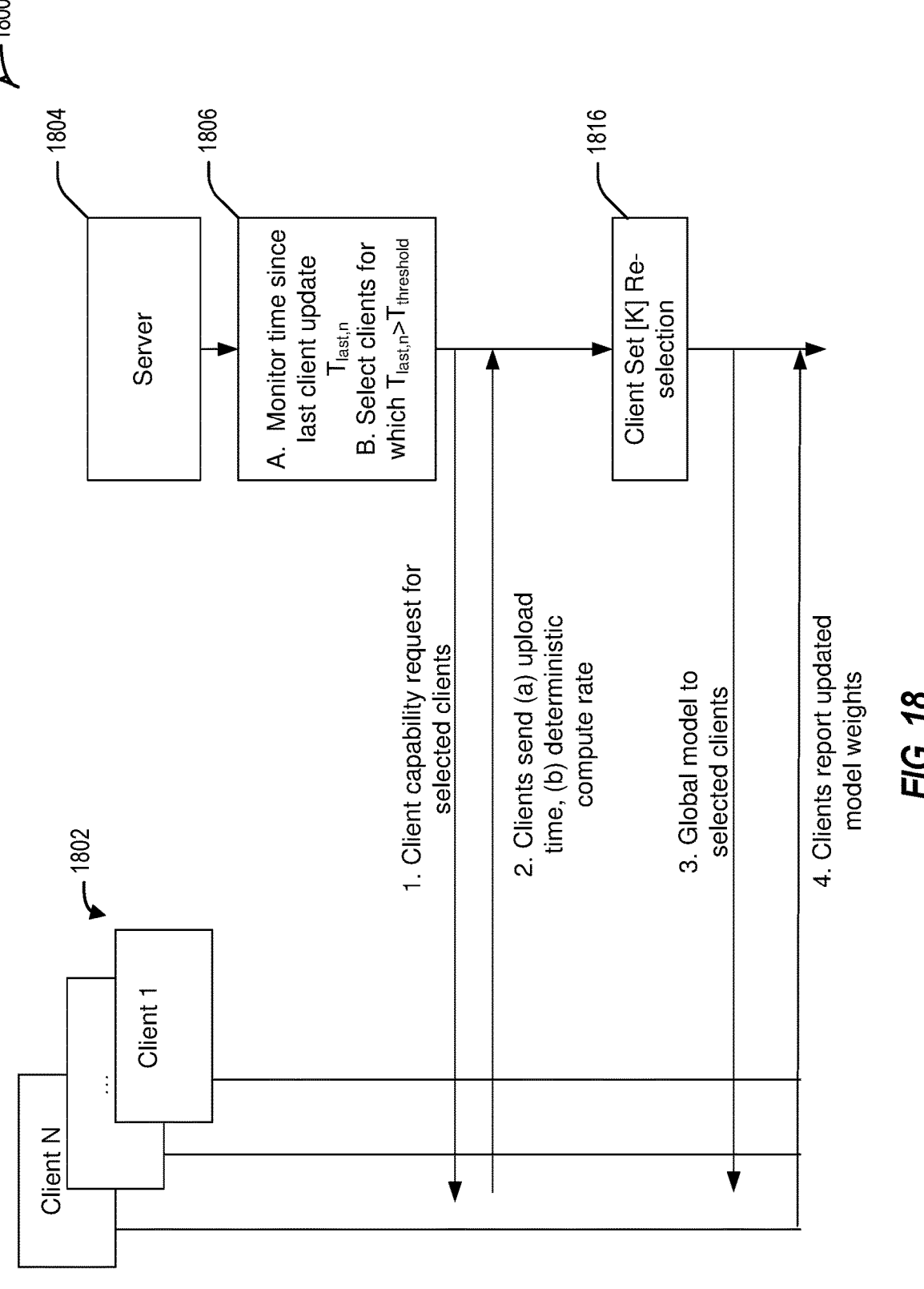
FIG. 18 illustrates a protocol flow for communication and computing aware client selection according to a second embodiment.

Communication and Computing Aware Client Selection:

The overall protocol flow according to some embodiments is described in relation to FIGS. 17 and 18, and may involve the following, referring first to FIG. 17:

1) At the beginning of training, the MEC server 1704 may send a Client Capability Request notification to all the clients 1702 that are part of the federated learning process.

2) The clients 1702 may respond with the following information:

a. Their Compute rate ($r_c$)—for example measured by the number of multi-and-add (MAC) operations the client can perform in one second.

b. Communication Time ($T_{up}$)—for example measured by the ratio of the bandwidth available to the client to the uplink communication rate ($r_{up}$).

c. Number of training examples ($n_{tr}$)—for example by measuring the size of the training set available at each client.

3) The MEC server may collect the above information and compute the total upload time for all the clients as set forth in Equation (BQ1) as follows:

$$T_{tot,n} = T_{up,n} + n_{tr,n} * 1/r_{c,n} \qquad \text{(BQ1)}$$

According to an embodiment, the MEC server may collect this information only periodically. However, it must be noted that this is a coarse estimate of the total update time from each client. To get a more accurate estimate of this update time, the MEC server may simply monitor the time between sending the global model and the time when model updates are received from each client. This can serve two purposes:

a) Adjust for any stale updates from clients; and/or b) Account for false updates from clients.

4) The MEC server may run a Client Selection algorithm to pick the client set for each training epoch. The algorithm is described as follows:

a. Greedy Client Set Selection Algorithm at operation 1706:

i. Sort clients in the increasing order of their update times;

ii. Cluster clients into N/K groups from the sorted list, with N being the number of clients 1702, and K being the number of client sets.

b. Greedy Client Selection Algorithm at operation 1708: if the MEC server has statistical knowledge of client data (such as their probability mass function of examples, or other statistics), the MEC server may select only the clients with the shortest completion times. Even when the clients may possess non-i.i.d data, this may be performed, for example, after the global model has reached a certain minimum accuracy threshold. The algorithm in such a case may be as follows:

i. Sort clients in the increasing order of their update times;

ii. Pick the K best clients from the list as the clients for each training epoch at operation 1712.

5) For each training epoch, the MEC server may select from one of the $\lceil N/K \rceil$ client sets in a round-robin fashion at operation 1710 as candidates for the epoch.

6) The selected clients in each client set may then respond with their local update.

7) The MEC server may also update the update time for the clients in the set to get a better estimate of the upload times at operation 1714.

Typically, the number of training examples (ntr) is unchanged over the training period. Hence, this may be a one-time report from the clients. Further, as noted above, the compute rates (rc,n) and upload time (Tup, n) can be computed indirectly from the actual reports received from clients. Further, an exponentially weighted filter may be utilized at the MEC server to update the average values of rc,n and Tup,n over time. Hence, this overhead is mainly significant at the beginning of training and minimal after.

Nevertheless, according to some embodiments, care must be taken to ensure that certain clients do not go for long time periods without model updates/capability reports. We ensure this as follows (also shown in FIG. 18).

Client Capability Update Procedure:

The MEC Server keeps a record of the client model/capability update time stamp (Tlast,n). If a client has exceeded the threshold for update, i.e., Tlast,n>Tthreshold, the server initiates a client capability update request command to the client. The client responds with the parameters Tup and rc. If necessary, the MEC server can re-compute at operation 1816 the client set selection algorithm to determine the new groups of clients as shown in protocol flow 1800 of FIG. 18.

Experiments and Performance Evaluation:

We have demonstrated the performance gain of our Client Set selection approach for a Federated Training problem on MNIST dataset for handwritten digit recognition. We are training a DNN with 2 hidden layers with 200 nodes each. Our environment contains N=100 clients with K=10 clients participating in each global training epoch. The training examples are equally split across the N clients (600 examples each). In each epoch, each of the K clients run 5 local training iterations.

The computational rates $(r_c)$ and communication rate $(r_{comm})$ of the clients are modeled using shifted exponential distributions. Further, in order to deal with federated learning on non-i.i.d. data, we have utilized a weight regularization term to the local loss functions at each client as proposed in A. K. Sahu, T. Li, M. Sanjabi, M. Zaheer, A. Talwalkar, V. Smith, "Federated Optimization for Heterogeneous Networks", arXiv:1812.06127 (hereinafter "FO for HetNets").

N TABLE TBQ1

| Techniques | | Test Accuracy | Test Accuracy Improvement | Training Time for 1000 Epochs (in seconds) | Training Time Improvement |
|---|---|---|---|---|---|
| i.i.d. Data | Random Client Selection | 98.53% | | 2.12e+11 | |
| | Greedy Client Set Selection | 98.58% | — | 6.881e+10 | 3.15× |
| | Greedy Client Selection | 96.46% | −2% | 6.883e+3 | 6 orders of magnitude |
| Non-i.i.d. Data | Random Selection with local loss regularization | 97.4% | | 2.08e+11 | |
| | Client Set Selection with local loss regularization | 96.66% | −0.7% | 6.62e+10 | 3.14× |

Some embodiments in this Section M concern compute and communication aware selection in a federated learning environment. An objective of federated learning is the training of a global model based on a fleet of clients while keeping data local to the clients. The clients can download a central model as an initialization for model parameters. Clients can perform updates on the model, e.g., using a gradient based model, and in this way update the model locally. They can then send the updated model weights to the server, which can aggregate these model parameter updates through policies such as averaging or weighed averaging.

Challenges with respect to federated learning arise on the one hand, based on the heterogeneity in the network, where memory cycles, compute rates, form factors if the various clients may be different. On the other hand, the amount of data can vary from client to client, which results in differing local training times, as well as resulting in disparate qualities of training. Connectivity can also be heterogeneous such as through 5G and WiFi, or one or more clients may be on or off. Therefore, the time required for each training epoch can be usually delayed for certain clients, which can lead to longer training time at the client and at the server, which can lead to poor performance.

One approach is to select the clients that have better compute and communication rates. Some embodiments in this Section M contemplate the latter, but also aim to take into account non-i.i.d. data (data not drawn from the same distribution as the overall data or target data). Non-i.i.d. data can lead to divergence in the global model at the server.

According to some embodiments, at each training round, the MEC server may schedule K out of N available clients, which perform the model weight updates in an iterative manner until convergence.

According to one aspect, a capability request may be caused to be sent from the server to the clients in terms of compute and communication rates. These rates can have a deterministic component or they can have a random component, with the deterministic option being preferred at least for being more practical to implement.

The MEC server may sort clients into sets based on their similar times to upload, which time to upload takes into consideration compute time and time to communicate the updated model weights back to the server. The MEC could therefore sort the clients based on the time to upload parameter for each client.

According to an optional embodiment, the MEC server may implement a more aggressive selection of clients after the clients have been sorted into sets. The MEC server may select for training only those clients with fastest upload times that also exhibit an i.i.d. data distribution. The MEC server may have information regarding the data distribution at each client based on statistics (e.g. probability mass function, other divergence parameters of the probability distribution of the data set at the client and the overall test data of interest (target data) at the server), or based on data distribution information sent to the MEC by the client. In such a case, the MEC server may ignore the non-i.i.d. clients for training. Thus, if the divergence between the data distribution at clients in a given set and the target data distribution is high, the MEC server may determine that it cannot perform fast client selection (the selection of only the fastest clients in terms of upload time). With low divergence, the distribution at the clients within a given set and the target data are closer to each other, in which case the MEC server can be more aggressive and schedule the fastest clients with the low divergence.

In the alternative, the MEC server may, after sorting the clients into sets based on their upload times, select the sets in a round robin fashion, such as based on upload times. Training using either of the above two approaches (aggressive or round robin) may involve an iterative process. The MEC server may further receive updated reports from clients regarding communication and compute rates and other information. For example, the MEC server may monitor to determine last instance of receipt of reports from clients and request additional reports based on the above, or may request additional reports based on training performance.

N. Data Quality and Computer Communication Aware Client Selection for Federated Learning Federated learning over wireless edge networks can face the following constraints:

a) heterogeneity of client data quality/characteristics—some clients contribute larger data sets to the learning compared to other clients. The importance of client data can also vary across the training iterations;

b) the number of training examples at each client can be widely different leading to different compute requirements;

c) compute rates and memory cycles available for federated learning can be heterogeneous across clients as well as over time;

d) communication rate/bandwidth available at clients can be heterogeneous and time-varying, such as by way of wireless or wired communication.

All the above constraints can lead to the following challenges:

A) random sub-sampling or the use of other approaches without considering client data quality can lead to poor training performance;

B) the compute and/or communication rates ("compute-communication rates) of clients can also affect the time to convergence of the global model at the MEC server.

Some embodiments in this Section N aim to account for the heterogeneity in data quality/characteristics including its time variability and propose methods to improve the speed-up of the convergence of the global model and accuracy of the same. At the same time, we also build on our solution in Section N above to simultaneously account for compute-communication rates in addition to the data quality/characteristics to reduce convergence time.

Some embodiments in this Section N propose a client selection approach in order to reduce the convergence time of the global model as explained in Section N above.

Referring to Y.Zhao et al, "Federated Learning with Non-i.i.d. Data" arXiv:1806.00582 (hereinafter "FL with Non-i.i.d Data," in order to deal with some clients having highly-skewed data for example in terms of the distribution of the data and/or its importance, it was proposed to share a small amount of training data with the central server and train a warm-up global model before clients perform federated learning. In "FO for HetNets," it has been proposed to have each client utilize a regularization parameter in their local loss functions that tries to reduce the impact of weight update from each client in each round.

One major challenge in sub-sampling only the fast clients, in terms of upload time and compute time, is the issue of model divergence. The convergence of the global model is empirically conditioned on the clients' data being independently and identically distributed ("i.i.d"). In the absence of such distribution of data, skipping updates from several clients, such as from straggler clients, can lead to skewed updates and lead to model divergence/overfitting for only certain data distribution profiles.

Further, the solution proposed in "FL with Non-i.i.d Data," depends on sharing training data with the server which may not always be possible due to privacy concerns (e.g., patient healthcare data, such as one of the use cases presented above). The regularization approach in "FO for HetNets" referred to above helps improve accuracy in the presence of non-i.i.d. data, but still hits a training accuracy performance ceiling while also resulting in slower convergence of the global model at the central server.

Some embodiments propose a robust method to improve training accuracy and convergence of a global machine-learning model at a MEC server when performing client selection for federated learning. One fundamental idea is the realization that the contribution of each client (i.e. each client owning a subset of the overall dataset) is different during each global federated training epoch and is time-varying. Given this, in order to maximize training speedup and reach higher training accuracy, a non-uniform sampling of clients is needed during each round according to some embodiments.

Some embodiments in this Section N present methods to sample clients at each federated client selection stage by observing the training loss incurred by the clients. The training loss may be a scalar quantity that can be reported by the clients at different time scales depending on the tradeoff for accuracy and efficiency. Experiments have to validated the above approach and show that observing the training loss at each epoch and performing client selection results provide higher accuracy than state-of-the-art solutions for federated learning under non-i.i.d. data conditions. Some embodiments may further account for the communication and compute rates at clients in order to achieve a tradeoff between training accuracy and convergence time.

Some contributions for some embodiments in this Section N are as follows:

1) clients may report their training losses to the MEC server;

2) the MEC server may select large loss clients at each training round;

3) in order to balance training accuracy and total training time, the training losses, client compute rates and communication rates may be jointly accounted for during client selection.

By selecting larger loss clients at each training round, some proposed embodiments herein achieve convergence in a smaller number of training rounds as compared with selecting all clients, while also reaching higher accuracy over state-of-the-art approaches. Further, by additionally accounting for the client compute rates and communication rates, the convergence time according to some embodiments herein may be reduced due to efficient communication rounds. By selecting clients based on larger losses, a solution according to some embodiments herein is sensitive against overfitting the model towards any single client.

Some embodiments in this Section N may use a light-weight exchange of scalar quantity from clients to server used towards client selection.

Exchanging training loss information between clients and MEC server may be needed for some embodiments. The exchange of this message may be intercepted over the air and analyzed using packet inspection tools.

New clients may be spawned and their loss function evolution may be observed over time. The algorithm will result in larger loss clients being scheduled. "Larger loss clients" refers to a subset of all clients exhibiting loss functions within any given epoch that are larger than loss functions of another different subset of said all clients.

In some federated learning setups, a subset of clients may be scheduled in each global training round. The most common approach is to sample the clients from a uniform distribution.

However, some embodiments in this Section N highlight that the training speed-up is not the same for all the clients, and also varies over different epochs. Consider the simpler case where a single client is selected in each round according to Equation (BR1):

$$h_{t+1} - h_t = \|w^{t+1} - w^*\|_2^2 - \|w^t - w^*\|_2^2 = -2\eta_t(w^t - w^*)\nabla\psi(D_t) + \eta_t^2(\nabla\psi_w(D_t))^2 \quad \text{(BR1)}$$

where $h_t$ denotes the distance of model weights at time t to optimal weights w*, $\psi$ is the loss objective, D represents the entire dataset, $D_t$ represents the dataset corresponding to the client selected at time t, and $\eta_t$ is the learning rate at time t. Equation (BR1) above shows at least that a change in the distance of model weights for a given client from one epoch to the next is a function of the client's data distribution and loss objective within each epoch.

The variance of the speed up is given as by Equation (BR2):

$$\mathrm{VAR}\{h_{t+1} - h_t\} \qquad (BR2)$$

$$= 4\eta_t^2 (w^j - w^*)^2 \mathrm{VAR}\{\nabla \psi_w(D_t)\} + \eta_t^4 \mathrm{VAR}\{(\nabla \psi_w(D_t))^2\}$$

$$- 2\eta_t^3 (w^j - w^*)\mathrm{COV}\{\nabla \psi_w(D_t), \ \nabla \psi_w(D_t)^2\}$$

We can note that the variance of the speed up is non-zero, implying that the weight updates from different clients is non-uniform, at least as a function of varying data distributions per client at each epoch. As a result, to increase the speed up, we have found that it is important to sample the clients non-uniformly from the client pool.

Equations (BR1) and (BR2) show among other things that the variance of training speed up is a function of data distribution D at each client. If you do uniform selection/sampling of data across clients, and the data is non-i.i.d., the training loss as a function of training time of each of the clients will be different, where training losses will all decrease, but at different rates. Therefore, uniform sampling where non-i.i.d. data is concerned does not address an overall goal to minimize expected loss across all clients in a uniform manner. Some embodiments in this Section N contemplate, in addition to clients sending compute rates and communication rate, the clients sending training losses to the MEC server.

If we define the federated learning as a stochastic process that gradually reduces the mean of the overall training loss, then we can redefine the goal of federated learning as to minimize $E[\psi_w(D_n)]$ where $D_n$ is the dataset (of a certain client n) sampled from the client pool. Therefore, it follows that for speed up, we sample at each epoch t, the client n* that minimizes the $E[\psi_w(D_n)]$. This can be easily extended for the case where the MEC server selects k clients for each epoch where n* is given by Equation (BR3):

$$n^* = \operatorname*{argmin}_n E[\psi_w(D_n)] \qquad (BR3)$$

Figure 19:
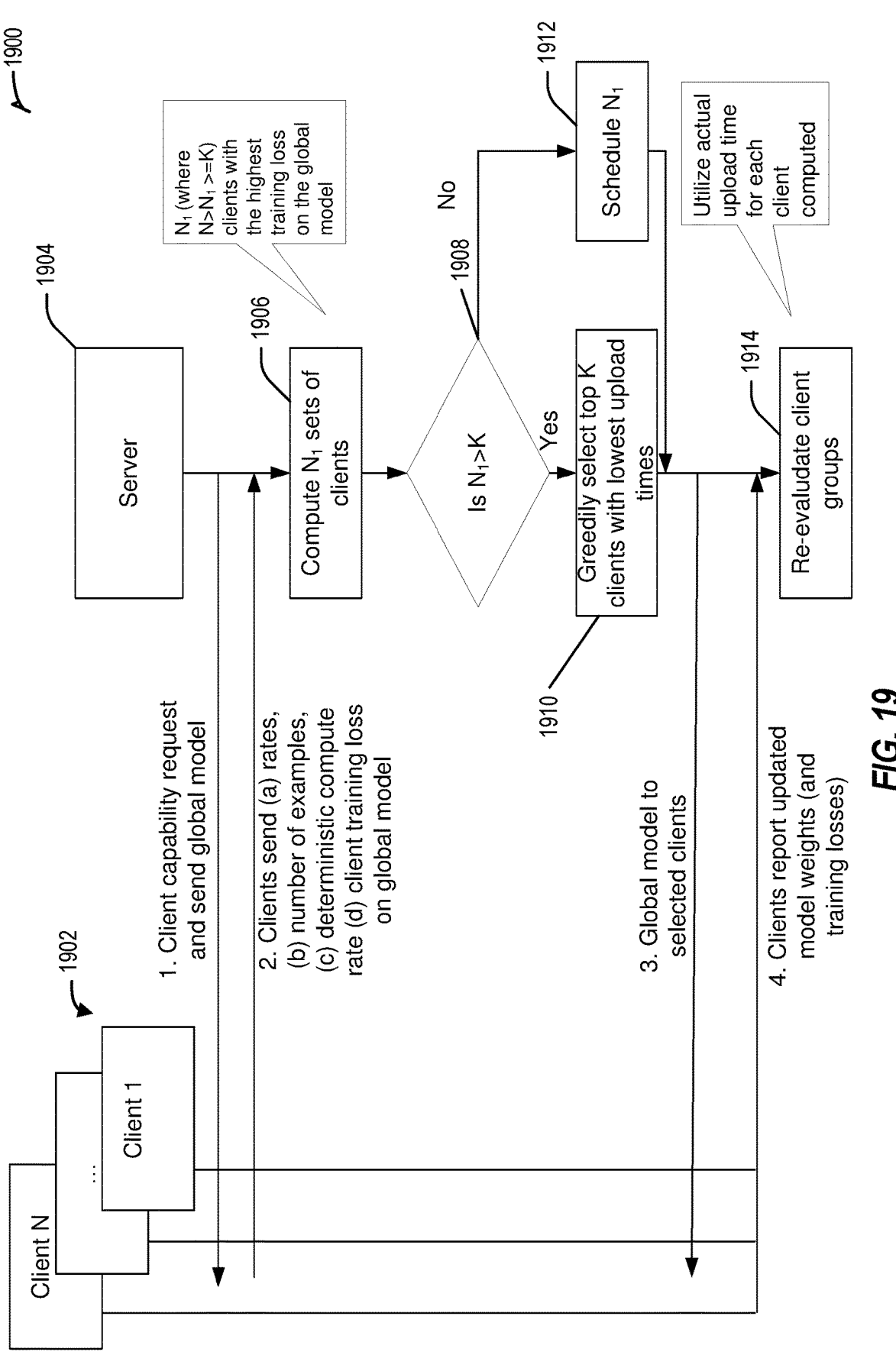
FIG. 19 illustrates a protocol flow for communication involving a joint loss and computer/communication time based client selection process.

Heuristic Approach for Client Selection:

In order to avoid solving the above optimization at each federated learning epoch for scheduling clients, some embodiments for this Section N use a simple heuristic that can empirically show higher training accuracy over other state-of-the-art approaches, particularly for the challenging case of non-i.i.d. data. We define our heuristic approach as shown by the flow 1900 of FIG. 19, which shows a joint loss and computer/communication time based client selection process.

Approach 1—Loss-Based Client Selection:

According to Approach 1 of some embodiments in this Section N:

1) the MEC server 1904 may disseminate the global model to the clients 1902;

2) during the capability exchange phase, the clients 1902 may respond with their communication rates and an estimate of their compute rates; in addition, each client i may report a scalar quantity indicating their training loss ip corresponding to the model using global weights at epoch t;

3) the MEC server 1904 during each epoch may rank orders the clients based on their training loss on the global model at time t;

4) the MEC server may perform scheduling of clients as follows:

a. in one embodiment (not shown), the server may schedule the top K out of the total N clients based on their training loss where K is a design choice;

b. in another embodiment, as shown in flow 1900, the MEC server may first select a first subset $N_1$ ($K<=N_1<N$) with the highest losses for consideration; as in the previous case a. immediately above, N1 can be a design choice that can determine the tradeoff between the accuracy and convergence time; in a second step, the server may select K out of $N_1$ clients based on client upload times, which can minimize the total upload time from clients.

5) the scheduled K clients may run E local epochs before reporting their updated model weights;

6) for the next training epoch with the MEC server, the clients may again report their loss values to the most recent global weights to aid with client selection; during each epoch, the K clients can simply piggyback the loss values along with their model updates.

In an ideal setting, the MEC server requires the loss values $\psi_t$ from each client at each training round to schedule the next set of clients. Alternatively, it is possible that the MEC server can utilize the past training loss values from clients. Through experiments, we have observed that utilizing $\psi_{t-1}$ instead of $\psi_t$ does not degrade the training performance by any significant margin.

It is also possible that the clients only report their loss information periodically (not every round), this can lead to longer convergence time, however.

The MEC Server keeps a record of the client model/capability update time stamp ($T_{last,n}$). If a client has exceeded the threshold for update, i.e., $T_{last,n}>T_{threshold}$, the server initiates a client capability update request command to the clients. The clients respond with the parameters $T_{up}$ and $r_c$. If necessary, the MEC server can re-run the Client selection algorithm.

According to this approach, each client has the model provided by the server for each training round. The client may compute the loss and share it with the MEC server. The server therefore has the loss across all the clients at each training round of the model to be trained. The MEC server may then select only clients with larger losses for the next round of iterations/training. More iterations for larger loss clients can bring losses of those clients lower, and then the MEC server can move onto the next set of larger loss clients.

Approach 2: Data-Distribution Based Client Selection:

Since clients can have different training data distributions with respect to one another as noted above, according to one embodiment, we utilize this information to determine the clients in the training rounds. According to this approach, Approach 2:

a) the MEC server may provide the target data distribution to the clients; the target data distribution may correspond to the cumulative density function $P(y<=i)$ or the probability mass function $P(y=i)$ for all i; and b) the data distribution at client k (i.e. the local data distribution at client k) may be given by $Q_k(y=i)$; the client may use the target distribution from the MEC server and local data distribution to compute the distance between the two distributions; this can be done in many ways and provided as below:

a. The Kullback-Leibler (KL) divergence which measures the directed divergence between two distributions and is given by Equation (BR4):

$$D_{KL,k}(P, Q_k) = -\sum_{y \in Y} P(y) \log\left(\frac{Q(y)}{P(y)}\right) \qquad \text{(BR4)}$$

or b. L2 distance of the probability distributions given by Equation (BR5):

$$D_{L2,k} = \|P(y) - Q(y)\|_2 \qquad \text{(BR5)}$$

Each of the clients may report their distances $D_k$ to the MEC server at the beginning of training.

The MEC server may perform weighted round-robin client selection where higher weights are given to clients with larger $D_k$ to allow the MEC server to train more for the more highly skewed clients.

This approach represents a weighted scheduling of training for clients by the server, with higher priority to clients with a larger distance of data distribution to the target distribution at the MEC server.

Approach 3—Gradient Norm Based Client Selection:

It is also possible and even more reliable to utilize the gradient norm as an indicator on the "importance" of each client during the client selection process. We have found that clients with the largest norm of their gradients carry higher importance compared to the clients with a smaller norm.

Computing the norm of the gradient for each client on the model is expensive and involves both forward and backward propagation at the clients before the actual training. Instead, the paper in A. Katharopoulos, F. Fleuret, "Not All Samples Are Created Equal: Deep Learning with Importance Sampling", ICML 2018, arXiv:1803.00942.s (hereinafter "DL with IS") derives an upper-bound for the gradient norm as the gradient of the loss with respect to the pre-activation outputs of a neural network (NN). This upper bound limits the gradient computation to only the last layer and avoids computing the gradients for each of the NN layers.

The client selection flow according to an embodiment of the third approach, Approach 3, may be as follows:

a) the MEC server may send the global model to the clients;

b) each client may compute their gradient with respect to their pre-activation outputs indicated by $\widehat{G_k}$ (t) and may return this to the MEC server; and c) the server may determine the clients with the K largest $\widehat{G_k}$ (t) as the clients for federated training with K being implementation-based.

The above method may incurs additional overhead due to the computation of partial gradients at the clients compared for example to Approach 1 or Approach 2, because here, the client is to calculate not only the loss function, but only the gradient for training before the training even begins for a given training round. However, the gradient calculation may be performed only at the last layer of the NN, and not for all layers of the NN.

Experiments and Performance Evaluation

Approach 1:

We have demonstrated the performance gain of our Client Set selection Approach 1 described above or a Federated Training problem on MNIST (Modified National Institute of Standards and Technology database) dataset for handwritten digit recognition. We are training a deep neural network (DNN) with 2 hidden layers with 200 nodes each. Our environment contains N=100 clients with K=10 clients participating in each global training epoch. We split the training data into i.i.d. and non-i.i.d. sets and assigned each batch of 600 examples to each client. In our setup, 20% of the clients have i.i.d. data while the other 80% clients have non-i.i.d. datasets where each client has examples from 1-6 labels. In each epoch, each of the K clients run 5 local training iterations.

The computational rates (re) and communication rate $(r_{comm})$ of the clients are modeled using shifted exponential distributions. We compared the performance of the proposed heuristic against the approach in Reference [3] where weight regularization component representing the L2 distance of the local weights from the global weights is utilized in the local loss objective.

TABLE TBR1

| Techniques | Test Accuracy | Test Accuracy Improvement | Training Time Improvement |
|---|---|---|---|
| Random Client Selection (with regularization) | 94.39% | | |
| Loss-based Client Selection (without regularization) | 97.65% | 3.26% | — |
| Loss and Time based Client Selection (select K clients from top 25% loss clients) | 97.58% | 3.19% | 2 orders of magnitude |
| Joint Loss and Time based Client Selection (select K clients from top 50% loss clients) | 97.26% | 2.87% | 4 orders of magnitude |
| Joint Loss and Time based Client Selection (select K clients from top 50% client loss at t-1) | 97.13% | 2.74% | 4 orders of magnitude |

Referring to some embodiments described in Section N above, where the data is not i.i.d. as between the given client sets, and the round robin selection approach is used to train the model, such a solution could lead to model divergence. This is because each gradient for the model is computed from clients with non-i.i.d. data, and therefore the updates are biased as opposed to the target data, and the MEC server may as a result be left with a bad model, even where clients of differing upload times are given equal opportunity for training purposes.

Some embodiments in this Section N are still aware of compute and communication heterogeneity as between clients, while also addressing of non-i.i.d. data issues.

O. Importance Sampling Methods for Communication Efficient Learning in Federated Learning In this Section O, we provide new methods beyond our earlier proposed solutions, such as in Sections N and O above, on accounting for data importance awareness when selecting clients that participate in federated learning.

Some embodiments in this Section O may be applied to a case where federated learning is performed over clients that have the following characteristics:

a. clients have wireless connections and may face heterogeneity in terms of the bandwidths available to them;

b. clients may have different compute rates and therefore may complete their local training at different times with respect to each other; and c. clients may have statistically differing datasets, i.e., not independent and identically distributed (non-i.i.d.).

Our earlier solutions as set forth in Section M above proposed a set of methods to perform client selection, some embodiments of which include:

a) prioritizing clients with large weighted local losses on their data;

b) prioritizing clients with larger compute and communication time;

c) weighted round robin scheduling based on the divergence of client's data distribution from the overall distribution, such as the KL divergence of their data distribution; and/or d) prioritizing clients based on the norm of the local gradients computed with respect to the last layer.

In other work, for example in "FL with Non-i.i.d Data," in order to deal with some clients having highly-skewed data, it was proposed to share a small amount of training data with the central server and train a warm-up global model before clients participate in federated learning.

The earlier proposed heuristic methods sample clients non-uniformly from the original distribution of data, and hence may introduce biased training. For the loss based client selection, it is possible the final trained global model may be skewed towards achieving a fair performance across clients at the expense of overall accuracy.

Some embodiments draw on principles from importance sampling theory to perform training by collecting gradient computations from a different data distribution q to the original distribution p, but with the ability to apply gradient correction to remove the bias.

Some embodiments according to this Section O may include the following:

a) some embodiments propose two importance sampling distributions that target accelerated training by focusing on importance regions in the client set based on statistically important data, clients' communication rates and compute rates;

b) some embodiments propose correct ways to implement importance sampling and bias correction to remove bias in the gradient computations due to importance sampling; and/or c) some embodiments propose a protocol to efficiently communicate this information between clients and the MEC server to achieve a) and b).

Some advantages of the proposed embodiments according to this Section O are provided below:

new distributions to sample clients more efficiently and to achieve higher model accuracy and improve convergence time; and/or methods to unbias the gradient estimates for federated learning when clients can run multiple local training epochs.

To compute the importance sampling distribution, the clients may report their weighted loss periodically to the MEC server which can be intercepted. Similarly, the MEC server, after computing the importance sampling distribution q, may send it to the clients to allow clients to apply the bias correction. This may also be in the protocol according to some embodiments, and either be standardized or intercepted.

The clients may also send their compute times and communication times to the server in order to compute the importance sampling distribution.

The cross entropy loss $L(x(i),y(i); w)$ for data $(x(i),y(i))$ using model weight $w$ provides a measure of the dissimilarity of the classifier from the true label $y$ and hence is utilized in approaches to accelerate learning. Specifically, sampling a training example based on the loss distribution of all examples has shown to provide training speed up in "PER" referred to above.

Some embodiments according to this Section O extend the above approach for the case of federated learning where, instead of looking at the loss over each example, we define a probability distribution q over the weighted loss function over the clients and sample clients from this distribution according to the below equation, which calculation at Equation (BS1) may be performed by each client k, and which calculation at Equation (BS2) may be performed at each client k or at the MEC server as set forth in Equations (BS1) and (BS2):

$$\overline{q_k} = n_k F_k(w_t) \tag{BS1}$$

$$q_k = \overline{q_k} / \sum_{k=1}^{N} \overline{q_k} \tag{BS2}$$

where $n_k$ refers to the amount of data at the client, $F_k$ refers to the loss function average across all data for the client, and $w_t$ is the weight parameter/matrix of a NN at the client.

However, the above introduces a sampling bias in the gradient estimates $g_k$ from the client k. Some embodiments propose correcting the gradient estimate for each client k before updating the weights to remove the bias. This may be performed by computing the importance sampling estimate according to one embodiment as set forth in Equation (BS3):

$$g_{k,t+1} * p_k / q_k \tag{BS3}$$

where $$p_k = \frac{n_k}{\sum_{k=1}^{N} n_k}$$

is the original sampling distribution of client k based on a total of N clients and q is the importance distribution (here, stochastic loss based). Although, this approach adjusts bias for the weight after 1 round, when the number of local computations or local rounds τ is greater than 1, the gradient estimate at each client after each local update is biased. Therefore, some embodiments propose to utilize stochastic loss based sampling and correction using the bias factor at the client after each local update. In other words, when each client performs T local updates before reporting the weight updates to the server, each client updates its local weight matrix as set forth in Equation (BS4):

$$w_{k,t+\tau} = w_{k,t+\tau-1} - \eta * g_{k,t+\tau} * p_k / q_k \tag{BS4}$$

where η is the learning rate. The local weight matrix of each client is therefore adjusted or biased based on the updated gradient estimate for each client k.

After the server receives K updates from the K selected clients out of the total N clients, the server computes the global weight as the average of these weights as set forth in Equation (BS5):

$$w_{t+\tau} = \sum_{k=1}^{K} w_{k,t+\tau} / K \tag{BS5}$$

However, this approach alone cannot result in accelerated training as K clients sampled using $q_k$ described above may have widely differing upload time given as set forth in Equation (BS6):

$$T_k^{up} = T_k^{comP} + T_k^{comm} \tag{BS6}$$

We define the compute model and communication model of the clients with respect to a wireless communication model or a compute model by way of example as described below.

Wireless Communication Model:

The clients may be wireless connected to their base stations (and assuming no additional latency from base stations to the MEC server). The uplink data rates of clients may be obtained with the help of the 5G deployment and channel model as described in the ITU-R M.2412 report in T. Li, A. K. Sahu, M. Zaheer, M. Sanjabi, A. Talwalkar, V.

Importance Sampling with Compute Communication Awareness:

The importance sampling distribution $q_k$ is computed as the ratio of the normalized weighted losses to the normalized upload times and is given by Equation (BS9)

$$q_k = \widehat{q_k}/\widehat{t_k^{up}} \tag{BS9}$$

This is due to the fact that the MEC server is not only interested in computing weight updates from the clients with large losses but also the ones with small upload times. The importance sampling bias correction may then be applied as $g_{k,t+1} * p_k / g_k$ for each local gradient step at each client.

The proposed algorithm is summarized in Algorithm 1 below.

---

Algorithm 1: Importance Sampling based Federated Learning.

---

S: MEC server, C: Clients

1: Initialize N, K, $\tau$, $\eta$, w1, original client sampling distribution p

2: Clients report a) Communication Time $T_k^{comm}$, b) Compute Time $T_k^{comp}$ to allow computation of upload time for the client $T_k^{up}$ 3: for all global epochs t = 1, $\tau$, ..., $\tau_T$ do S: Broadcasts global weight $w_t$ C: Share scalar weighted loss information $n_k F_k(w_t)$ to S (In the absence of $F_k(w_t)$, S utilizes the most recently reported $F_k(w)$)

S: Update $T_k^{comm}$ as well as receive any updated $T_k^{comp}$ from clients

S: Compute $q_k$ for all N clients using Equation (BS2) or Equation (BS9)

S: Select K clients from the N clients using $q_k$ for weight update for each client k = 1, 2,..., K do for each local epochs e = 1, 2,..., $\tau$ do Compute $w_{k;t+e} = w_{k;t+e-1} - \eta * g_{k;t+e} * p_k / q_k$ end for Report $w_{k;t+\tau}$ to server and scalar $n_k F_k(w_{t+\tau})$ end for S: Compute global weight at server as $w_{t+\tau} = \Sigma_{k=1}^{K} w_{k;t+\tau}/K$ 4: end for

---

Smith, "Federated Optimization for Heterogeneous Networks", Conference on Machine Learning and Systems (MLSys), 2020 (hereinafter "FO for HetNets"). Based on this, the average data rate $r_k$ for user k may be computed which determines the communication time for communication by client k as set forth in Equation (BS7):

$$T_k^{comm} = D_{size}/r_k \tag{BS7}$$

where $D_{size}$ can be computed as the size of all the weight matrices for the machine learning model and is the same for all clients for federated learning. For example, for the case of a fully connected neural network, $D_{size}$ indicates the sum of the sizes of all the weight matrices of all the layers of the neural network.

Compute Model:

The compute time for each client is the time needed to compute $\tau$ rounds of local gradient updates and is given by Equation (BS8):

$$T_k^{com} = \tau * num_k^{MAC} * T_k^{MAC} \tag{BS8}$$

where $\tau$ is the number local epochs required at the clients, $num_k^{MAC}$ is the number of multiply and add operations required at client k and $T_k^{MAC}$ is the average time required by client k to complete 1 MAC operation.

Experiments and Performance Evaluation

We have demonstrated the performance gain of our importance sampling based federated learning approach on MNIST dataset for handwritten digit recognition. We are training a DNN with 2 hidden layers with 200 nodes each. Our environment contains N=100 clients with K=10 clients participating in each global training epoch.

In our evaluation, all clients have one of the 10 labels. Hence, the client data is statistically very different and non-i.i.d. The number of local epochs is 5.

The computational rates (rc) are modeled using shifted exponential distribution. We compare the performance of the proposed heuristic against the approach in "FO for HetNets" where weight regularization component representing the L2 distance of the local weights from the global weights is utilized in the local loss objective. The results are averaged over 3 simulation random seeds as shown in Table TBS1 below:

TABLE TBS1

| Data Distribution | FL Algorithm | Test Accuracy (after 2000 epochs) | Time to complete 2000 epochs (in seconds) |
|---|---|---|---|
| Non-i.i.d. Data | Random Client Selection | 90.6% | 2.2e4 |
| | Random Selection with Prox | 90.7% | — |
| | Importance Sampling (eqn. 2) without bias correction | 93.3% | — |
| | Importance Sampling (eqn. 2) with bias correction | 93.8% | — |
| | Importance Sampling (eqn. 9) without bias correction | 92.3% | 1.45e3 |
| | Importance Sampling (eqn. 9) with bias correction | 95.1% | 1.5e3 |

In Section M above, reports of the losses from clients were to be sent to the MEC server. In this Section O, some embodiments concern creating a new distribution for the sampling for the clients. If p is taken as the distribution of data at a given client, it will be proportional to the amount of data that client has. If every client has the same amount of data, then the distribution as between clients is the same (p) for all clients. If not, p will be different for each client. We know that loss is a function of the data at a given client, parameterized by the model weight at time t. Some embodiments in this Section O aim to form a distribution $\overline{q_k}$ (Equation (BS1)) based on the loss function at each client k, basically skewing the client's data distribution as a function of its loss function within a given training period. The probability of selecting each client would be $q_k$ (Equation (BS2)). According to some embodiments, the MEC may compute the $q_k$ using the $\overline{q_k}$ of all the clients k. After sampling based on the new distribution $q_k$ within a training round, some embodiments contemplate applying a bias correction for computed gradients, which may be done by each client at each local training round before sending updated weights to the MEC server. The biasing correction corresponds to the multiplication by the pk/qk factor in Equation (BS4).

P. Differentially Privacy Guarantees in Coded Federated Learning

In heterogeneous computing environments, the client devices need to compute their partial gradients and communicate those partial gradients to a controller node. However, the wait time for each epoch at the controller node is dominated by the time needed to receive the partial gradients from computing nodes with relatively slow computational capabilities and/or with weak or low-quality links. For example, the wait time at the controller node for one or more training epochs may be prolonged by computing nodes with weak or low-quality links, which may require multiple retransmissions to overcome radio link failures. Computing nodes from which the controller node has to wait due to, for example, low quality links or slow processing capabilities, may be referred to as "stragglers." The issue of straggler nodes is especially relevant for computations that are distributed over wireless networks, where dynamic variations in wireless link quality can lead to loss of data. Accounting for such variations in distributed computing tasks is not well addressed by existing solutions.

Accordingly, embodiments of the present disclosure may incorporate coding mechanisms to address the issue of stragglers in heterogenous environments. The coding mechanisms may allow for data to be duplicated across computing nodes, e.g., for data located at client edge computing nodes (e.g., client computing nodes 1202 of FIG. 12) to be shared with a central server (e.g., central server 1208 of FIG. 12). However, when utilizing client device data, duplicating and sharing the data may involve user privacy issues. Ensuring user privacy protections for users who collaborate in distributed ML model computations may be quite important since some of these users may want to keep their raw data secure on their device. Failure to account for privacy concerns may result in underutilization of the processing capabilities of edge networks, including MEC networks, since some users may not opt-in to allowing their data to be used for collaborative unless these concerns can be alleviated.

Thus, the client data may be coded according to one or more techniques, such as those as described herein, prior to sharing with the central server or with other computing nodes of the computing environment. The coded data set may be referred to as a parity data set or parity data, and may include a version of the client device data sets that have been coded in a way to obfuscate or partially-obfuscate the actual raw data. The coding mechanism may be known only to the client device, and is not shared with the central server, maintaining some privacy in the coded data that is shared. In this way, the coded data sets may help to protect the privacy of the client data sets.

A coding redundancy c that indicates a number of coded data points to compute at each client device may be determined at the central server, and may be broadcast by the central server to each of the client devices. The coding redundancy c may depend on heterogeneity in computing, communication and/or power budgets observed across the client devices and central server. In some instances, the client data may be weighted using a weight matrix WL that probabilistically punctures the raw training data. The weighting values of the weight matrix may, in some embodiments, be determined based on how often data is received at the central server from a client device. For example, the weighting values may be higher (i.e., greater weight given) for devices with a poor connection to the central server, and may be lower for devices with a good connection to the central server. This may ensure that data sets from devices with poor connectivity are considered in the gradient computations in a similar manner to those with better connectivity. In some cases, the computation of coding redundancy c the weight matrix WL may be performed as described in U.S. Patent Application Publication No. US 2019/0138934, which is hereby incorporated by reference in its entirety.

The client devices may use the coding redundancy c and/or the weight matrix WL to generate the coded data. For example, in some embodiments, a linear random coding technique may be utilized and the coded data set may be constructed as follows. The i-th device may use a random generator matrix $G_i$ of dimension $c \times l_i^{initial}$ with elements drawn independently from a distribution (e.g., standard normal distribution or Bernoulli(½) distribution), and may apply the random generator matrix on a weighted raw data set to obtain a coded training data set $(\tilde{X}_i, \tilde{y}_i)$, such that $$\tilde{X}_i = G_i W_i X_i, \text{ and } \tilde{y}_i = G_i W_i y_i,$$

where the weight matrix $W_i$ is a $l_i^{initial} \times l_i^{initial}$ diagonal matrix that probabilistically punctures the raw training data. The coded training data $(\tilde{X}_i, \tilde{y}_i)$ may then be transmitted to the central server before training is performed, while the generator coefficients are kept private by each client device. At the central server, the locally-coded training data may be combined to obtain a composite coded data set given by $$\tilde{X} = \Sigma_{i=1}^{n} \tilde{X}_i, \tilde{y} = \Sigma_{i=1}^{n} \tilde{y}_i.$$

The central server may compute model updates (e.g., partial gradients in a gradient descent technique) based on the coded data shared by the client devices, and may use the computed updates in addition to or in lieu of model updates performed by the client devices using the corresponding uncoded data. For instance, in some embodiments, an overall gradient for the global model may be computed at the central server based on two sets of gradients: (1) partial gradients computed at client devices using their uncoded data sets; and (2) a partial gradient computed by the MEC server using a coded data set (which is based on the client data sets). In certain embodiments, during every training epoch, the central server computes partial gradients from c composite coded data set points, and waits for partial gradients corresponding to the first arriving (m−c) number of uncoded data points sent by the client devices. Therefore, the central server might not have to wait for the partial gradients from straggler nodes and/or links. This technique may be referred to herein as coded federated learning (CFL).

In many instances, distributed learning methods such as CFL may allow for exchange of aggregate statistics/information without revealing the underlying "raw" data. This may be of great importance in areas where the datasets used hold private information of individuals, e.g., healthcare or other types of personal or private information. Embodiments of the present disclosure include techniques, which may be referred to herein as the Differentially Private Coded Federated Learning (DP-CFL), provide formal end-to-end Differential Privacy (DP) guarantees to all participating client computing nodes. In particular, embodiments of the present disclosure may generate the coded data in a differentially private way at each client computing node, while preserving the utility of the coded data for training the global model.

Coded data may be generated by compressing the raw data privately at each client device (e.g., client computing nodes 1202). The amount of compression may be known at the central server, or at any other device participating in the CFL. The second order statistics of the raw data can be estimated from the coded data, and using this public information, differentiating attacks on the coded data can be designed to reveal the raw data of any device.

Accordingly, embodiments may include differential privacy constraints during coding redundancy computations, which can guarantee privacy of the generated coded data at each client computing node (e.g., the underlying raw data upon which the coded data is based may not be obtainable, or may not be obtainable without extraordinary work). Furthermore, embodiments of the present disclosure may utilize distortion of a covariance matrix and injection of additive noise in combination with data compression to achieve any privacy requirement, while preserving the utility of the coded data in the learning algorithm(s). These techniques may provide one or more advantages. For instance, in some cases, privacy may be included directly during the data encoding process along with heterogeneity in computing power, communication links, and data quality across devices. In addition, in some cases, each device can define its own privacy requirement. Further, in some cases, the utility of the coded data may be preserved, retaining faster convergence of the CFL-based model learning.

The coding mechanism used in CFL may be $(\epsilon_i, \delta_i)$-differentially private as:

$$Pr\left\{ \left| \ln \frac{p_{X_i}(\tilde{X}_i)}{p_{X_i'}(\tilde{X}_i)} \right| \le \epsilon_i \right\} \le \delta_i \qquad \#(CQ1)$$

where $X_i'$ is a row-perturbed version of data matrix $X_i$ at the i-th row, and $p_{X_i}(\tilde{X}_i)$ is the probability density function of observing $\tilde{X}_i$ under data matrix $X_i$. The $\epsilon_i$ parameter may indicate a metric of privacy loss based on the perturbation of the data matrix. In certain instances, CFL embodiments may be designed with a coding mechanism that guarantees that the above equation is true, based on a certain selected value for di. In particular, some embodiments may utilize one of the following example methods to ensure that the coding mechanism used for CFL is $(\epsilon_i, \delta_i)$-differentially private. It will be noted that the i-th device has $l_i^{initial}$ number of raw data points. In order to maintain $(\epsilon_i, \delta_i)$-differential privacy, the i-th device can generate only up to $c_i$ number of coded data points. With this in mind, the following example processes may be implemented to ensure $(\epsilon_i, \delta_i)$-differential privacy. The example processes below may be implemented in software, firmware, hardware, or a combination thereof. For example, in some embodiments, operations in the example process shown may be performed by one or more components of edge computing nodes, such as processors of client computing nodes similar to client computing nodes 1202 of FIG. 12 and central servers similar to central server 1208 of FIG. 12. In some embodiments, one or more computer-readable media may be encoded with instructions that implement one or more of the operations in the example process below when executed by a machine (e.g., a processor of a computing node). The example process may include additional or different operations, and the operations may be performed in the order shown or in another order. In some cases, one or more of the operations shown in the corresponding FIGS. are implemented as processes that include multiple operations, sub-processes, or other types of routines. In some cases, operations can be combined, performed in another order, performed in parallel, iterated, or otherwise repeated or performed another manner.

Figure 20:
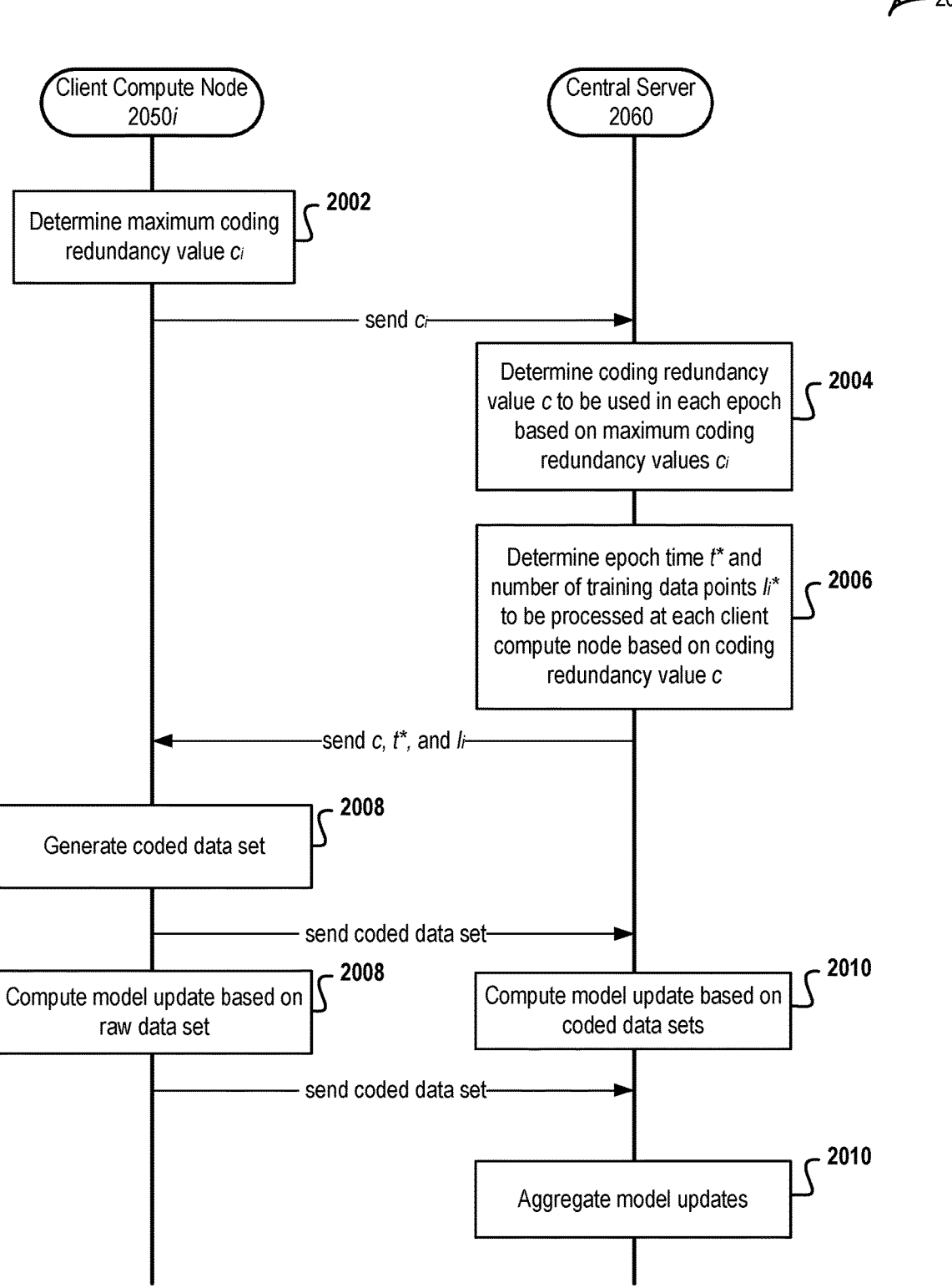
FIG. 20 is a flow diagram showing an example process of ensuring differential privacy in accordance with certain embodiments.

FIG. 20 is a flow diagram showing an example process 2000 of ensuring differential privacy in accordance with certain embodiments. At 2002, each i-th client computing node 2050 computes a maximum coding redundancy value $c_i$, which represents the maximum number of coded data points the client computing node can generate, and sends the value $c_i$ to the central server 2060. At 2004, the central server 2060 determines a coding redundancy value to be used in each epoch based on the $c_i$ values received from the client computing nodes. In some cases, this may be the minimum or maximum of the $c_i$ values received, according to (respectively):

$$c^{up} = \min_i c_i \qquad \#(CQ2)$$

$$c^{up} = \max_i c_i. \qquad \#(CQ3)$$

At 2006, the central server 2060 determines, using the new constraint given by $c^{up}$, an optimal coding redundancy c, an optimal epoch time t*, and an optimal number of data points to be processed locally at each device $l_i*(t*)$. In some embodiments, these values may be calculated using a load balancing algorithm, such as the one described in U.S. Patent Application Publication No. US 2019/0138934, which is hereby incorporated by reference in its entirety. The central server 2060 sends the values to each client computing node, and at 2008, the client computing nodes generate coded data sets based on the values (e.g., based on the coding redundancy c). The coded data sets may be sent thereafter to the central server 2060.

At 2008, the client computing nodes 2050 compute model updates based on their raw data sets (e.g., based on the epoch time t*, and the number of data points to be processed $l_i*(t*)$), and transmit the model updates to the central server 2060. The central server 2060, at 2010, computes model updates based on the coded data sets sent by the client computing nodes 2050, and at 2010, the central server 2060 aggregates the model updates.

Figure 21:
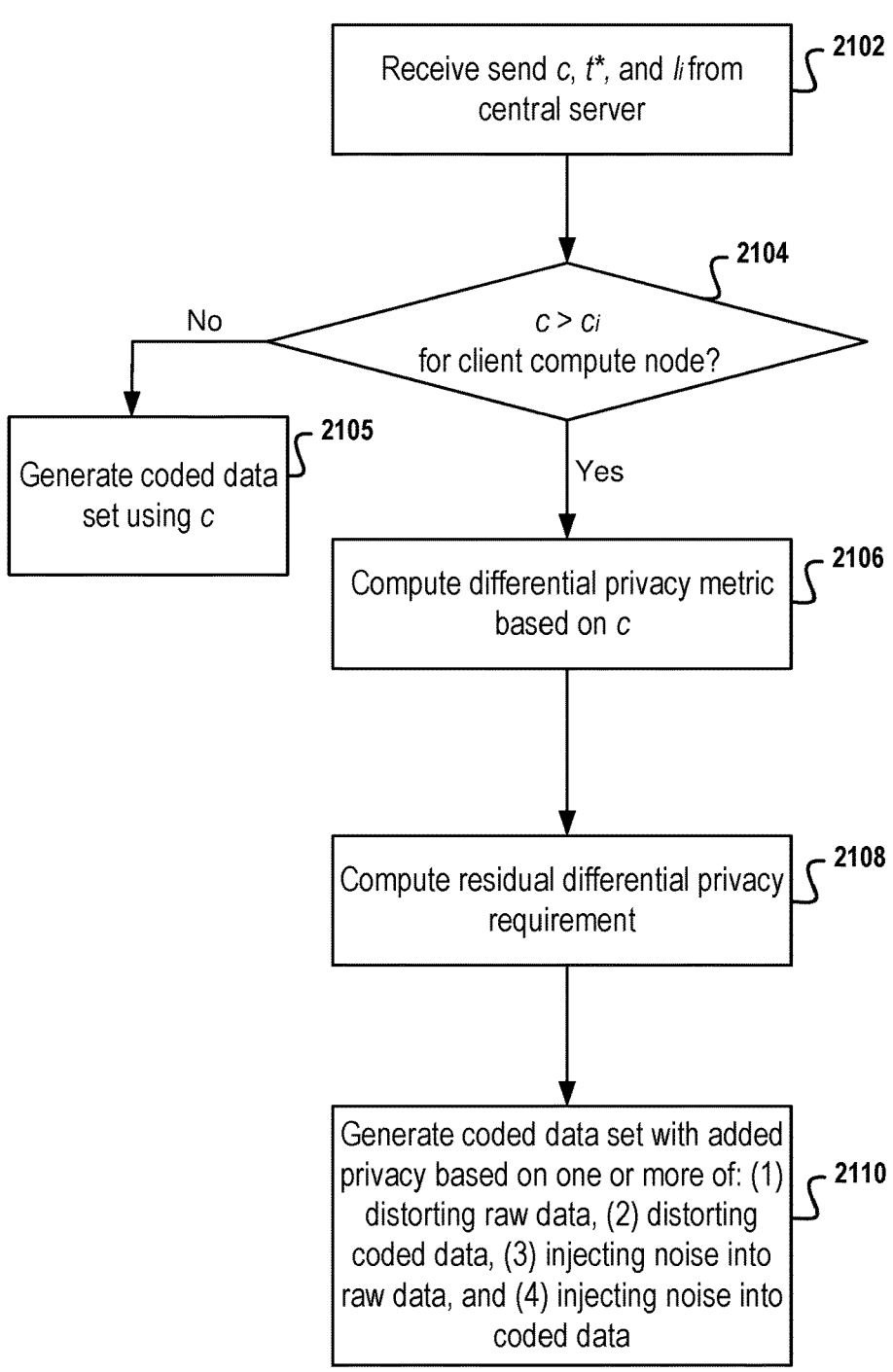
FIG. 21 is a flow diagram showing an example process of ensuring differential privacy at a client computing node in accordance with certain embodiments.

FIG. 21 is a flow diagram showing an example process 2100 of ensuring differential privacy at a client computing node in accordance with certain embodiments. Aspects of the process 2100 may be combined with the process 2000 above. At 2102, the client computing node receives the values $c^{up}$, $l_i*(t*)$, and $l_i^{initial}$ from a central server, and at 2104, determines whether the value $c^{up}$ is greater than its maximum coding redundancy value $c_i$. If not, then the client computing node generates the coded data set based on the value $c^{up}$ at 2105.

However, if the value $c^{up}$ is greater than its maximum coding redundancy value $c_i$, then the client computing node computes, at 2106, a differential privacy metric $\in_i^{(0)}$ that would be achieved freely through coding based on the coding redundancy value $c^{up}$ selected by the central server. At 2108 computes its residual differential privacy requirement $\in_i^{(res)}$ as:

$$\in_i^{(res)} = \in_i^{(0)} - \in_i \qquad \#(CQ4)$$

The residual privacy may refer to an amount of privacy that is "leaked" over the overall requirement $\in_i$ due to the selection of $c^{up}$ as the maximum value of all the $c_i$ values. This residual privacy may then be mitigated during the generation of coded data at 2110 by performing one or more of the following: (1) Distorting the raw data before encoding, e.g., by deleting one or more principal components of the raw data; (2) Distorting the coded data before sharing to the central server, e.g., by deleting one or more principal components of the coded data; (3) Injecting additive noise into the raw data before encoding; and (4) Injecting additive noise into the coded data before sharing to the central server.

Figure 22:
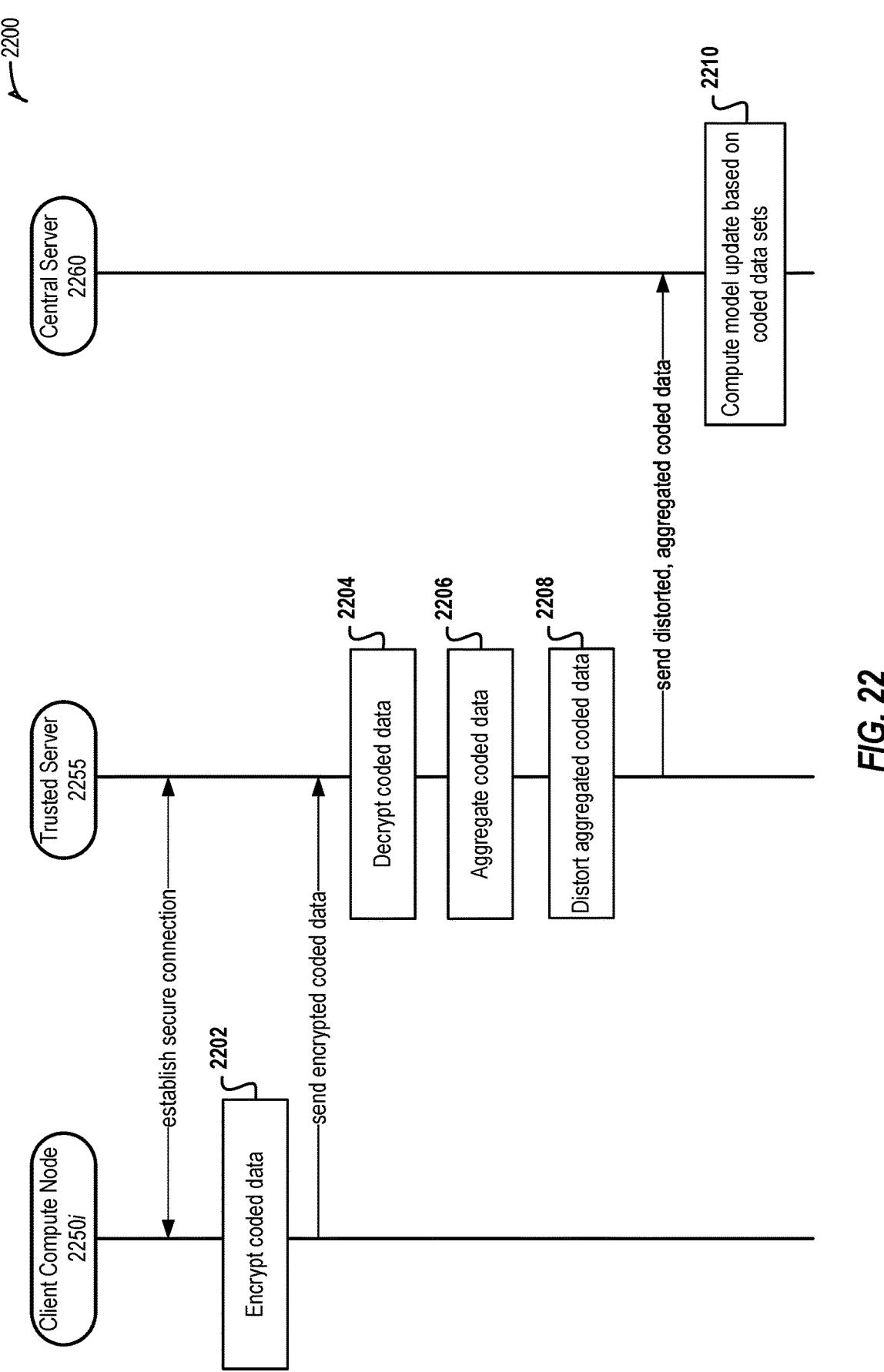
FIG. 22 is a flow diagram showing an example process of ensuring differential privacy using a trusted server or execution environment in accordance with certain embodiments.

FIG. 22 is a flow diagram showing an example process 2200 of ensuring differential privacy using a trusted server in accordance with certain embodiments. Aspects of the process 2200 may be combined with the process 2000 above. Although described below with respect to a trusted server 2255, aspects of the process 2200 may be used with a trusted execution environment in other embodiments. At 2202, after a secure channel is established between the client computing node 2250 and the trusted server 2255, the client computing node 2250 encrypts coded data it has generated (e.g., as described above) and sends the encrypted coded data to the trusted server 2255. At 2204, the trusted server 2255 decrypts the coded data and, at 2206, aggregates the decrypted coded data sets from each of the client computing nodes 2250. The trusted server 2255 then distorts the aggregated coded data at 2208. The distortion may be performed in one or more of the ways described above with respect to 2110 of FIG. 21. It should be noted that, to meet the same level of privacy, the amount of distortion performed on the aggregated coded data in the embodiment shown may be smaller than embodiments where the data is distorted at each client computing node. The trusted server 2255 then sends the distorted aggregated data to the central server 2260, which then computes model updates based on the distorted aggregated data (e.g., in the same manner as 2010 of FIG. 20) at 2210. The central server may then perform other steps in the CFL technique, e.g., other aspects of the process 2000 of FIG. 20.

Figure 23:
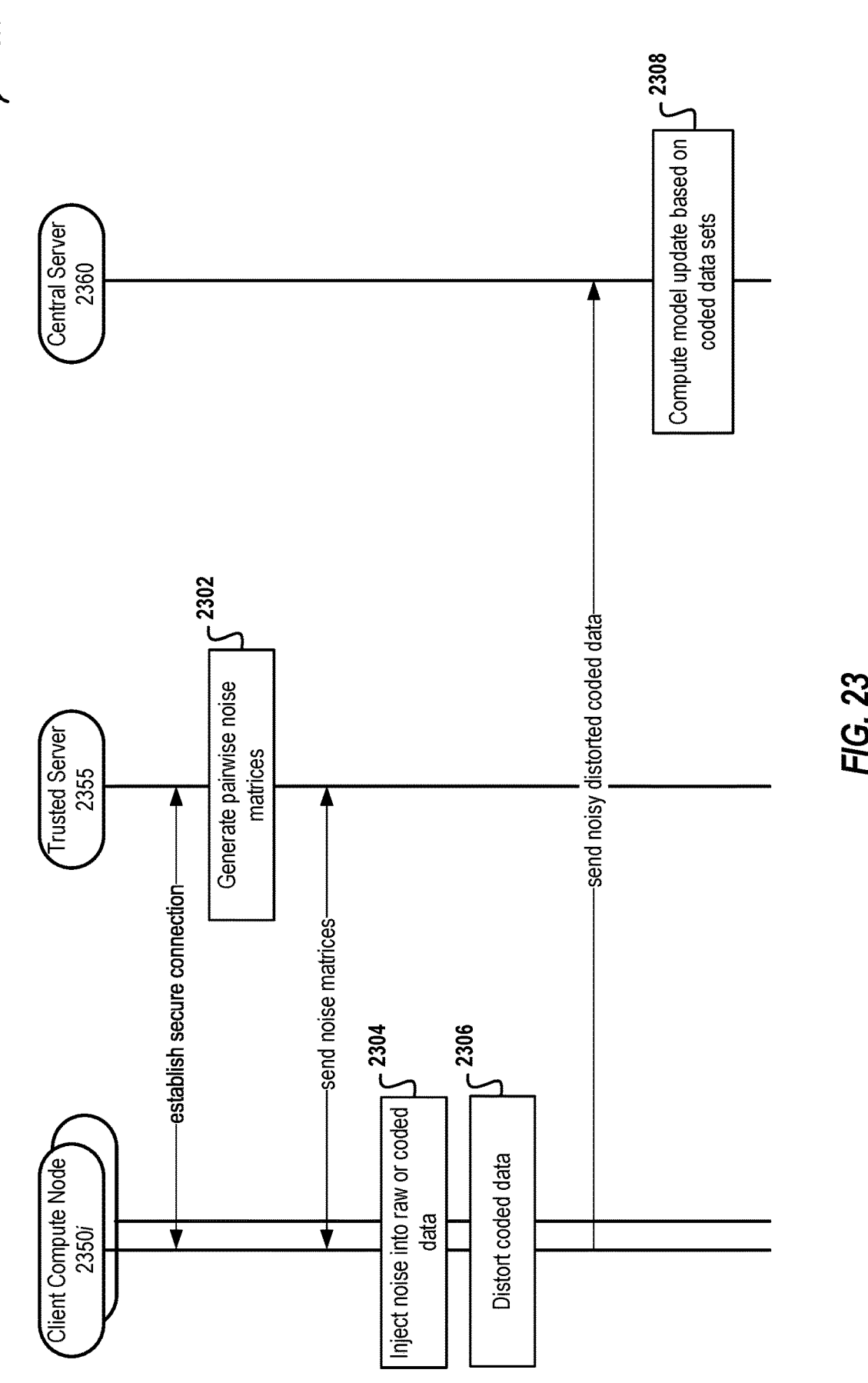
FIG. 23 is a flow diagram showing another example process of ensuring differential privacy using a trusted server or execution environment in accordance with certain embodiments.

FIG. 23 is a flow diagram showing another example process 2300 of ensuring differential privacy using a trusted server or execution environment in accordance with certain embodiments. Aspects of the process 2300 may be combined with the process 2000 above. At 2302, after a secure channel is established between the client computing node 2350 and the trusted server 2355, the trusted server 2355 generates a generates pairwise-complimentary (i.e., opposite or cancelling) high power noise matrices ($N^{(p)}$, $-N^{(p)}$), where the dimension of $N^{(p)}$ is c×d, for p=0, 1, . . . , $$\frac{n}{2},$$

and sends the pairwise matrices to a pair of randomly selected client computing nodes 2350 (i.e., with $N^{(p)}$ going to a first client computing node and $-N^{(p)}$ going to a second client computing node). At 2304, each client computing node 2350 injects (e.g., adds) the noise matrix to its coded data set ($\tilde{X}_i = \tilde{X}_i + N_i$, where $N_i$ is the noise matrix received by the i-th device) or to its raw data before generation of the coded data. At 2306, each client computing node further distorts the coded data $\tilde{X}_i$, e.g., as described above with respect to 2110 of FIG. 21. The client computing nodes then send their coded data to the central server 2360, which then computes model updates based on the distorted aggregated data (e.g., in the same manner as 2010 of FIG. 20) at 2308. The central server may then perform other steps in the CFL technique, e.g., other aspects of the process 2000 of FIG. 20.

Q. Coded and Uncoded Privacy Budgets to Guarantee Differential Privacy in Coded Federated Learning In certain embodiments, privacy budgets may be partitioned between generating coded data and the uncoded gradient updates federated learning. In particular, client compute devices may inject noise into one or both of the coded data that is sent to the central server or into the model updates that are sent to the central server to ensure differential privacy. The client compute may adjust the amount of noise injected into either instance based on an overall privacy guarantee by the central server. Because the central server performs weighted aggregation of the model updates performed by the client computing node using raw data and the model updates performed by the central server using the coded data, the amount of noise (and thus, privacy) injected into either process can be adjusted so that data is considered/ aggregated appropriately. For example, a client computing node with a poor connection to the central server may choose to place more of its privacy budget into the coded side versus the uncoded side (i.e., will inject more noise into the coded data than into the model updates), as the central server may weight the than the server's updates performed using the coded data higher than the client's model updates performed using raw data due to the poor connection. The opposite may be true for a client with a good connection, i.e., the client may place more of its privacy budget into the uncoded side versus the coded side.

Figure 24:
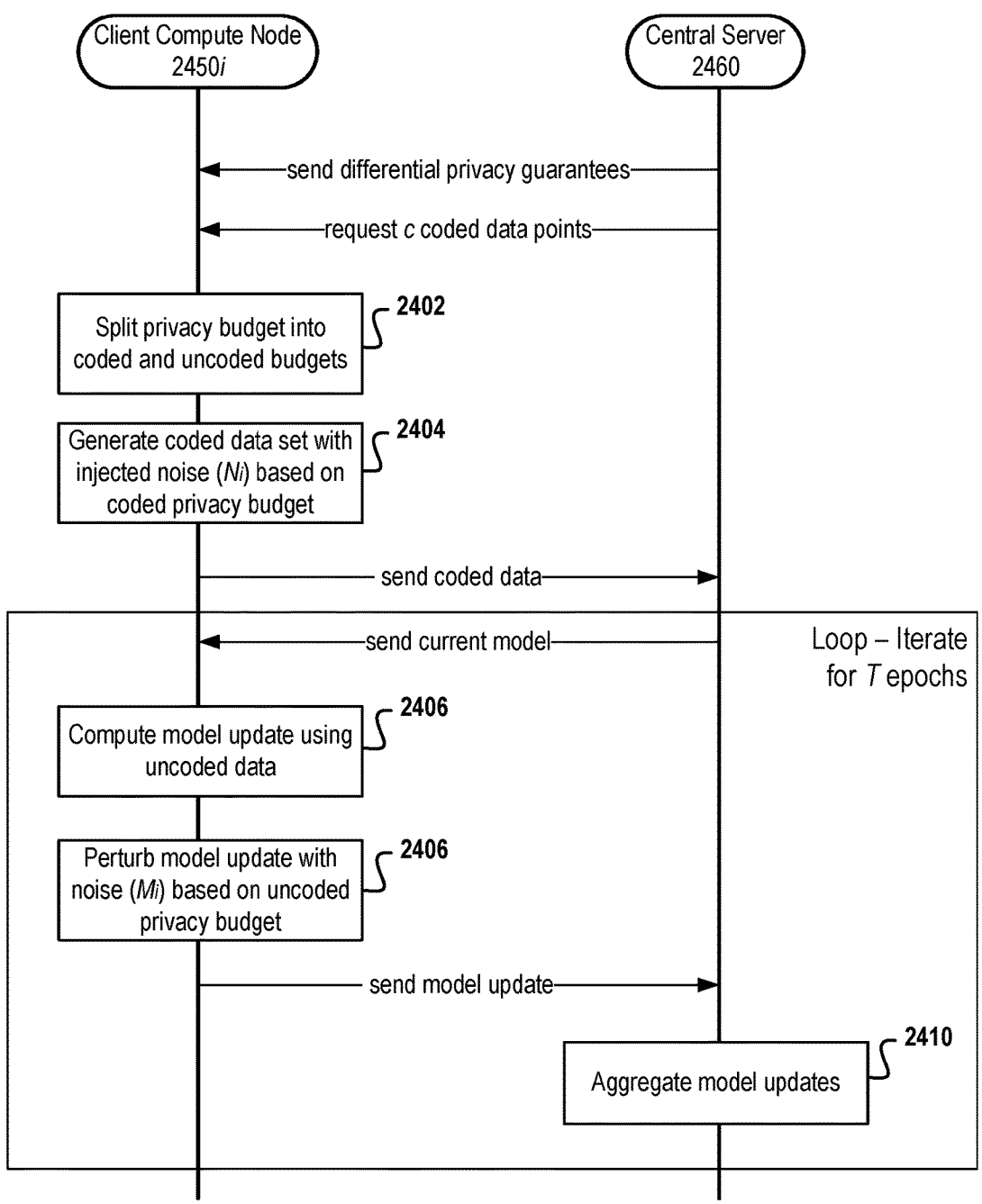
FIG. 24 is a flow diagram showing an example process of partitioning privacy budgets in accordance with certain embodiments.

FIG. 24 is a flow diagram showing an example process 2400 of partitioning privacy budgets in accordance with certain embodiments. The example process may be implemented in software, firmware, hardware, or a combination thereof. For example, in some embodiments, operations in the example process shown may be performed by one or more components of an edge computing node, such as processor(s) of a client device similar to client computing nodes 1202 of FIG. 12. In some embodiments, one or more computer-readable media may be encoded with instructions that implement one or more of the operations in the example process below when executed by a machine (e.g., a processor of a computing node). The example process may include additional or different operations, and the operations may be performed in the order shown or in another order. In some cases, one or more of the operations shown in FIG. 24 are implemented as processes that include multiple operations, sub-processes, or other types of routines. In some cases, operations can be combined, performed in another order, performed in parallel, iterated, or otherwise repeated or performed another manner.

After the central server 2460 has sent a differential privacy guarantee ($\epsilon_{total}$, $\delta_{total}$) to the client computing node 2450 (e.g., by broadcasting the guarantee to the nodes) and a request for the client computing nodes 2450 to compute c coded data points, at 2402, the client computing nodes 2450 split their privacy budgets into coded ($\epsilon_{coded}$, $\delta_{coded}$) and uncoded ($\epsilon_{uncoded}$, $\delta_{uncoded}$) portions based on its communication and compute capabilities, ensuring that ($\epsilon_{coded}$, $\delta_{coded}$)+($\epsilon_{uncoded}$, $\delta_{uncoded}$)=($\epsilon_{total}$, $\delta_{total}$). The privacy splits determined/made by the client computing nodes 2450 are not shared with the central server 2460.

At 2404, the client computing nodes 2450 generate coded data based on the coded privacy budget determined at 2402. In particular, each client computing node 2450 generates and transmits coded data $\tilde{X}_i = G_i X_i + N_i$ and $\tilde{Y}_i = G_i Y_i + N_i'$ where each entry of $G_i$ is sampled from standard normal distribution $N(0,1)$ and $N_i$ and $N_i'$ are sampled independently from a zero mean Gaussian distribution with $\sigma_i^2$. The matrices $G_i$, $N_i$, and $N_i'$ are private and not shared with the central server 2460. The noise power $\sigma_i^2$ that is added is also private and not shared with the central server. The noise matrices $N_i$, and $N_i'$ may be carefully calibrated such that the privacy leakage in generating the coded data is ($\epsilon_{coded}$, $\delta_{coded}$). The coded data is then sent to the central server 2460.

Thereafter, the central server 2460 sends a current model or current model parameter $\beta(t)$ to the client computing nodes 2450. At 2406, the client computing nodes 2450 compute model updates using their raw, uncoded data. This may be done as described above. Then, at 2406 the client computing nodes 2450 perturb the model updates with noise based on their uncoded privacy budget. This may be done as follows:

$$g_{i(t)} = X_i^T(X_i\beta(t) - Y_i) + M_i(t) \qquad \#(\text{CR1})$$

where $M_i(t)$ in epoch is also zero mean Gaussian noise carefully calibrated by the standard Gaussian method for DP to ensure privacy leakage in T epochs is bounded by ($\epsilon_{uncoded}$, $\delta_{uncoded}$). The client computing nodes 2450 may then send their model updates to the central server 2460, which, at 2408, aggregates the model updates. In some instances, the central server 2460 may waits for a fixed duration $T_{epoch}$ to collects all the model updates which it has received by that time. It assumes that all other model updates from the client computing nodes are lost. The central server may aggregate or combine the model updates as follows:

$$g(t) = \left(\sum_i w_i \tilde{X}_i\right)^T \left(\left(\sum_i w_i \tilde{X}_i\right)\beta(t) - \left(\sum_i w_i \tilde{Y}_i\right)\right) + \sum_i I_i(t) g_{i(t)} \qquad \#(\text{CR2})$$

where the first term is gradient generated from the coded data, and the second term is the gradient updates from uncoded data (where $I_i(t)$ is one if client i successfully transmits the gradient in round t to the MEC server, and 0 otherwise). The $w_i$ values may be chosen in such a manner that g(t) is an unbiased estimator or to minimize the variance of the gradient.

R. Scalable Methods for Performing Importance Sampling And Coded Federated Learning:

In federated learning, a goal is to learn a global model using data, as well as computation power, from other client computing nodes (or clients), while the data of the clients is not shared. See for example H. B. McMahan, E. Moore, D. Ramage, S. Hampson, and B. A. y Arcas. "*Communication-efficient learning of deep networks from decentralized data*", In Conference on Artificial Intelligence and Statistics, 2017 (hereinafter "Communication-Efficient Learning").

In federated learning, we might have a large number of clients, yet some may have more important data than others. Hence, some embodiments involve performing Importance Sampling (see for example Balakrishnan, R., Akdeniz, M., Dhakal, S., & Himayat, N. (2020, May), Resource Management and Fairness for Federated Learning over Wireless Edge Networks. In 2020 *IEEE 21st International Workshop on Signal Processing Advances in Wireless Communications* (*SPAWC*) (pp. 1-5). IEEE (hereinafter "Resource Management and Fairness for FL"), where clients are sampled based on the importance of their data. Some embodiments further include adding a layer of reliability to the above, as well as hastening the learning process. For the latter, some embodiments implement a Coded Federated Learning approach. See for example Prakash, S., Dhakal, S., Akdeniz, M., Avestimehr, A. S., & Himayat, N. (2020). Coded Computing for Federated Learning at the Edge. arXiv preprint arXiv: 2007.03273 (hereinafter "Coded Computing for FL").

In this Section, some embodiments provide new techniques, based on Importance Sampling and Coded Federated Learning. Some embodiments benefit from both solutions, while adding a few extra advantages: such as at least one of client scalability, reduction of computation complexity, or a smoother learning process.

"Resource Management in FL" showed how to perform Importance Sampling, while Coded Computing for FL" dealt with the coding part, which mitigates the effects of straggling clients. However, neither the solution in "Resource Management in FL" nor the one in "Coded Computing for FL" deals with issues presented in the concurrent implementation of Importance Sample and the mitigation of stragglers through Coded Federated Learning.

Some embodiments provide a novel two-step sampling approach that allows for feasible sampling out of a large number of clients. Some embodiments provide Bernoulli encoding of data, which reduces the computation associated with encoding the clients' data. Some further embodiments provide for per-client coding, which uses client-specific coded data, instead of a sum of coded data.

Advantageously, combining Importance Sampling with Coded Federated Learning allows for faster learning convergence, while reducing the learning time as well as wall clock time associated with the learning process. In addition, a novel sampling process according to some embodiments advantageously allows a feasible scaling of the number of clients involved in updating the global model. Some embodiments further advantageously reduce the complexity of encoding by reducing the number of floating-point multiplications to update a model. In addition, advantageously, embodiments involve the use of client-specific coded data reduce the learning gradient's variance.

Some embodiments involve the use of key message exchanges between clients and a MEC server, which can be intercepted using tools such as WireShark, etc. Some message exchanges according to embodiments may include:

1. clients i reporting the number of their data points it to the MEC server;
2. clients i periodically sharing the evaluated loss of their current model qt;
3. the MEC server selecting both a subsampled set of M clients, as well as K clients (out of M) for each training epoch; this subsampling is different from typical random sampling, and may, according to some embodiments, be observed from analyzing message exchanges between the MEC server and certain clients; and/or
4. some clients share their coded data with the MEC server periodically, where current approaches either do no share any coded data or share from the entire set of clients at the beginning of training.

Existing approaches utilize a fixed global epoch duration, and simply drop the client updates that are received after the fixed global epoch duration has elapsed. However, some embodiments implement a variable global epoch duration which may remain fixed for E' epochs and then may be recomputed. The same may hold for the number of training data points which may also change every E' epochs. Such a periodic variation of epoch duration can be tracked and attributed to the load balancing algorithm such as the one utilized according to some embodiments. Load balancing refers to deciding how many data samples (training examples) each client in the selected set is going to process (and for how long) at every epoch t at every E' epoch interval.

Embodiments advantageously eliminate the need for storing the coded data from all N clients that may participate in learning with the MEC server. Hence, a smaller amount of coded data (from M clients with M<N) may be stored at any time.

Some embodiments combine Importance Sampling and Coded Federated Learning. Embodiments encompass the two approaches to learn a linear regression model. That is, embodiments combine Importance Sampling (IS) and Coded Federated Learning (CFL) by having as one goal to arrive at a model $\beta$ that minimizes loss expressed as $\|X\beta - Y\|_F^2$ corresponding to the Mean Squared Error (MSE), where X, Y are the data points and their labels, respectively, and where $\| \|_F$ denotes the Frobenius norm. Some embodiments focus on learning the model using a Gradient Descent Algorithm (GDA) (see Ruder, S. (2016), An overview of gradient descent optimization algorithms, *arXiv preprint arXiv*:1609.04747 (hereinafter "An Overview of GDOA"), a commonly used algorithm for optimization problems, and learning linear regression models in particular. In GDA, a model is learned by taking small steps in a direction opposite of the gradient, a method which leads to convergence to a local minimum. In other words, in a GDA, the update to the model is given by Equation (DQ1) below:

$$\beta^{(t+1)} = \beta^{(t)} - \mu^{(t+1)} g^{(t+1)} \qquad \text{Eq. (DQ1)}$$

where $\mu^{(t+1)}$, $g^{(t+1)}$ are the gradient step, and the gradient at time t+1, respectively. This algorithm is especially suitable for federated learning, as different clients can compute their local gradients, and the MEC server may then aggregate all local gradients to produce the global updated model, since the gradient for the loss function for all clients through their datasets may be given by Equation (DQ2) below:

$$g = \frac{1}{m} \sum_i X_i^T (X_i^T \beta - Y_i) \qquad \text{Eq. (DQ2)}$$

where $X_i$, $Y_i$ are the data points and the labels available at client i respectively, and m is the total number of data points (across all clients).

In Importance Sampling, the clients evaluate the loss of the currently learned model based on the data they have, namely using Equation (DQ3) below:

$$F_i(\beta) = \frac{1}{l_i} F(X(i), Y(i); \beta) \qquad \text{Eq. (DQ3)}$$

where X(i), Y(i) are the data points and labels at the i-th client, $l_i$ is the number of data points client i has, and $\beta$ is the model or the global weight.

In linear regression, the loss function is the Mean Square Error (MSE) between the input and the predicted output. It was shown in "Resource Management and Fairness for FL" that clients should be sampled according to distribution given by Equation (DQ4):

$$q_i = \frac{l_i F_i(\beta)}{\sum_j l_j F_j(\beta)} \qquad \text{Eq. (DQ4)}$$

and later correct bias in the gradient update by multiplying the gradient update by $$\frac{p_i}{q_i},$$

where pi is given by Equation (DQ5):

$$p_i = \frac{l_i}{\sum_j l_j} \qquad \text{Eq. (DQ5)}$$

See for example Goodfellow, I., Bengio, Y., Courville, A., & Bengio, Y. (2016). Deep learning (Vol. 1). Cambridge: MIT press (hereinafter "Deep Learning"). In Equations (DQ4) and (DQ5) above, both j and i denote a client, with the difference being that j disappears due to the noted summations. Thus, $q_i$ is a normalized value of $l_i F_i$ across clients.

"Coded Computing for FL" showed how to learn a linear regression model, where all clients participate. According to some embodiments, instead of waiting for all clients, the MEC server may determine and implement a load-balancing policy, for example by deciding how much time is given for all clients to perform a GDA step (this time being referred to as t*), and how many data points 1 will be used by each client i. See "Coded Computing for FL." The rationale behind the above approach is that, since some clients have better connectivity and computation power than others, a mechanism ought to be used to avoid waiting until the slowest client ("straggler") of all clients N finishes its calculation, delaying the learning process. By sending coded data, i.e. when each client i sends to the MEC server coded data ($G_iW_iX_i$, $G_iW_iY_i$), noting that Gi is the encoding matrix and Wi the scaling matrix, prior to the learning process, the MEC server can compensate for straggling clients and missing data points, and arrive at an unbiased estimate of the true gradient at each step. The above mechanism can result in faster and more reliable learning. Note that $G_i$, the encoding matrix, and $W_i$, the scaling matrix, are, according to some embodiments, not to be shared with the MEC server. Furthermore, the above coding mechanism may also work for arriving at a kernel transformation, to allow learning linear models to data, which data is not linearly separable.

Some embodiments aim to benefit from Importance Sampling, as well as from Coded Federated Learning.

According to some embodiments, a baseline approach may involve having all N clients send their coded data beforehand, and at each learning epoch, the MEC server would sample K clients based on Importance Sampling. The learning epoch would then execute as a Coded Federated Learning epoch on those K clients. That is, the MEC server would perform load-balancing, gather gradients from non-straggling clients, and compensate for the stragglers using the coded data. This baseline approach is illustrated in the FIG. 25.

FIG. 25 shows an edge learning environment 2500 including clients 2502 and a MEC server 2504. In FIG. 25, the MEC server 2504 may sample K clients 2502 based on Importance Sampling, and the learning epoch would then executed as a Coded Federated Learning epoch on the K clients.

The baseline approach, an example of which is shown in FIG. 25, may present scalability problems. When the number of clients N K, that is, when there are a large number of clients N as compared with the sampled clients K, which is a common assumption in learning environments, the baseline approach as outlined above may suffers from significant overheads, such as in computation, communication and storage.

To overcome the above issues with overhead, some embodiments propose a novel approach, based on subsampling, as depicted in FIG. 26.

FIG. 26 shows an edge learning environment 2600 similar to that of FIG. 25, with N clients 2602 and a MEC server 2604, where Importance Sampling and Coded Federated Learning are performed together with subsampling. In particular, some embodiments include sampling M clients, where K<M<<N periodically (every E' epochs), according to the Importance Sampling distribution. Then, at each learning epoch, the MEC server may samples K clients (out of the M subsampled clients) uniformly. It has been shown, both analytically and empirically, that the sampling strategy described in the context of FIG. 26 achieves similar results as the baseline, while significantly reducing the overheads associated with Coded Federated Learning.

According to some further embodiments, a reduction in computation complexity may be achieved by encoding the data at the clients using a Bernoulli encoding matrix, rather than a Gaussian one.

It was shown in "Coded Computing for FL" that clients should encode their data using an encoding matrix, whose elements are drawn in an independent and identically distributed manner (i.i.d.) from a distribution with a zero mean and a variance of 1/c, with c representing the number of coded data points. When the encoding matrix elements are drawn from a Gaussian distribution, a large amount of floating-point multiplications are necessary, which are known to be costly. Instead, embodiments suggest drawing the elements of the matrix from a distribution that picks {−1,1} with probability half, and scaling the elements by multiplying the matrices by $\sqrt{1/c}$ later, at the server side.

Some further embodiments include using per-client coded data. In current mechanisms for Coded Federated Learning, the server sums the coded data from all clients, and uses the sum to compensate for missing data. It has been shown in "Coded Computing for FL" that the above mechanism results in an unbiased estimate of the gradient. However, the variance of the estimated gradient can pose problems, such as with respect to the learning rate. Some embodiments propose using coded data only from missing data points to decrease such variance, advantageously resulting in faster learning process.

Per Client Coded Data:

The proposed algorithm of achieving per client coded data is summarized below in the context of Algorithm 1 and FIGS. 27-32.

Referring to FIGS. 27-32, these figures are similar to FIGS. 25 and 26 in that they show an edge learning environment 2700, with N clients 2702 and a MEC server 2704.

A process according to Algorithm 1 may include the following operations:

1. the server initializes K, N, M, $\mu^{(O)}$, $\beta^{(O)}$, E, E' (see FIG. 27) where:
    a. K is the subsampling number representing the number of clients to undergo training during each epoch;
    b. N is the total number of clients;
    c. M is the sampling number representing the number of clients to be sampled from which K clients are to be subsequently subsampled;
    d. $\mu^{(O)}$ is the gradient step at time 0;
    e. $\beta^{(O)}$ is the gradient at time 0;
    f. E is the maximum number of epochs the algorithm is running;
    g. E' is the periodicity at which the operations 4.a.i to 4.a.v immediately below are performed, and thus operations 4.a.i to 4.a.v are not done at every epoch but once in E' epochs;
  2. The clients share $l_1$, . . . , $l_N$ with the server (see FIG. 27), where $l_i$ corresponds to the number of data points at client i;
  3. The server calculates $$p_i = \frac{l_i}{\sum_j l_j},$$

Figure 28:
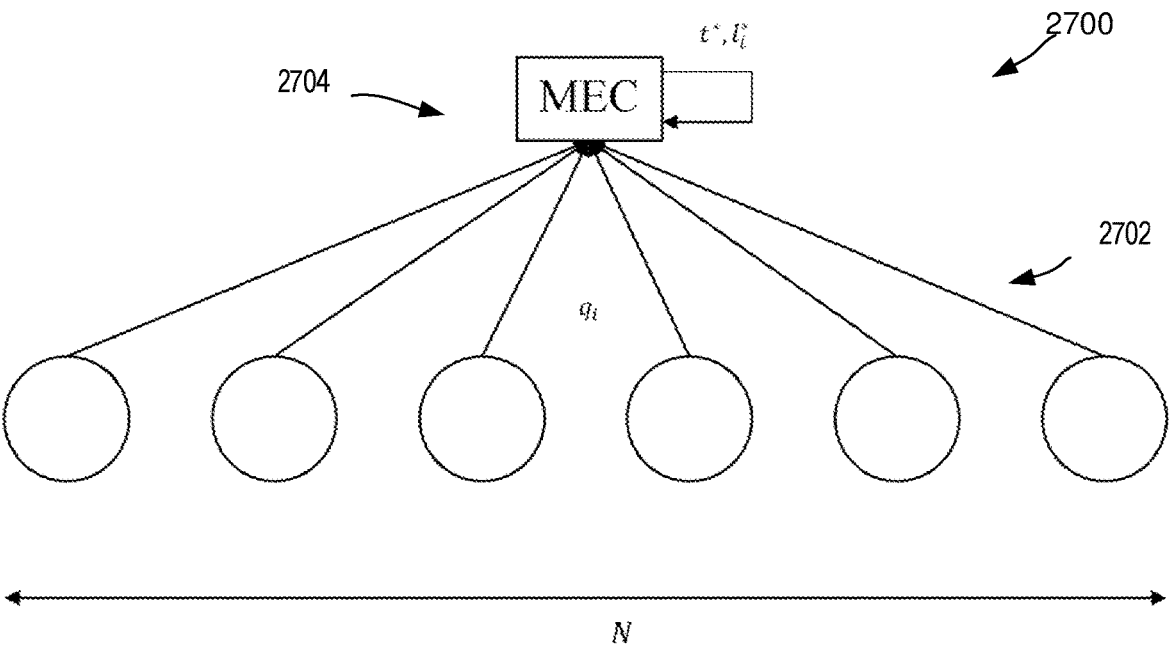
Figure 29:
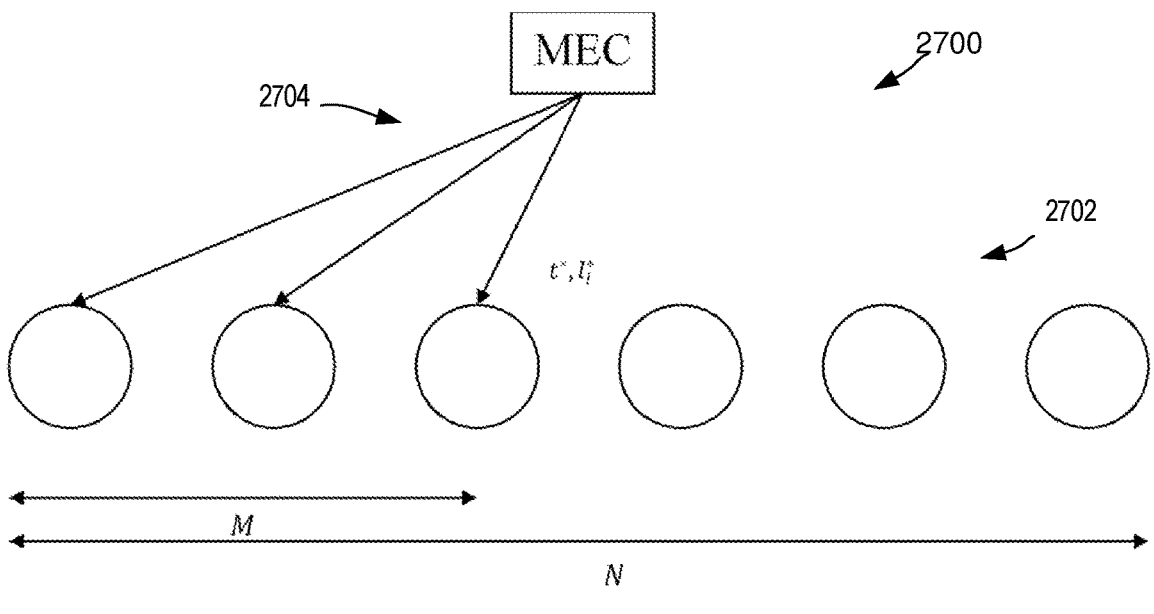
Figure 30:
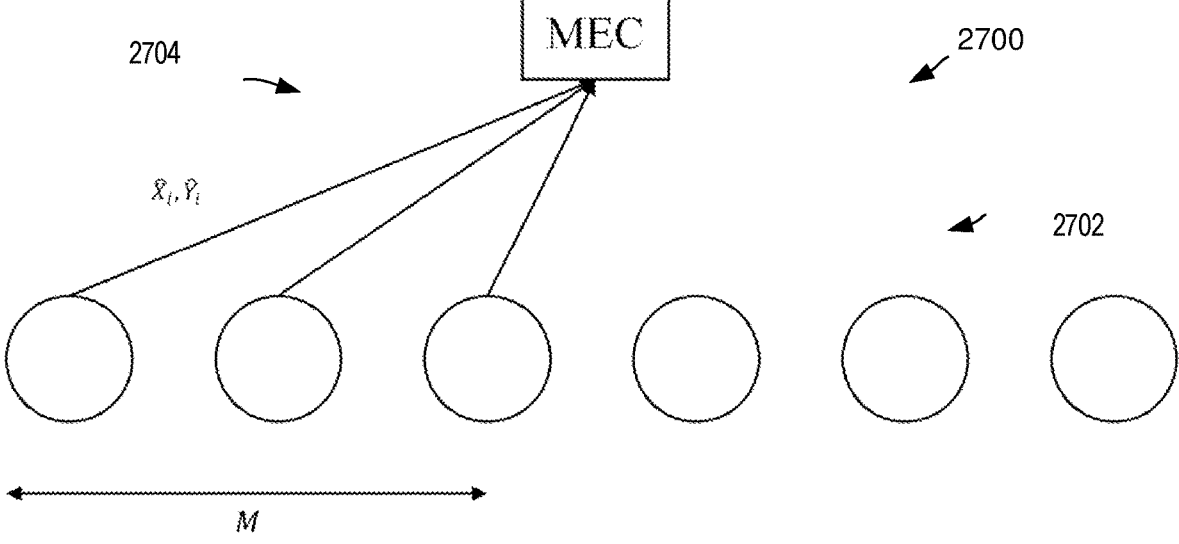
Figure 31:
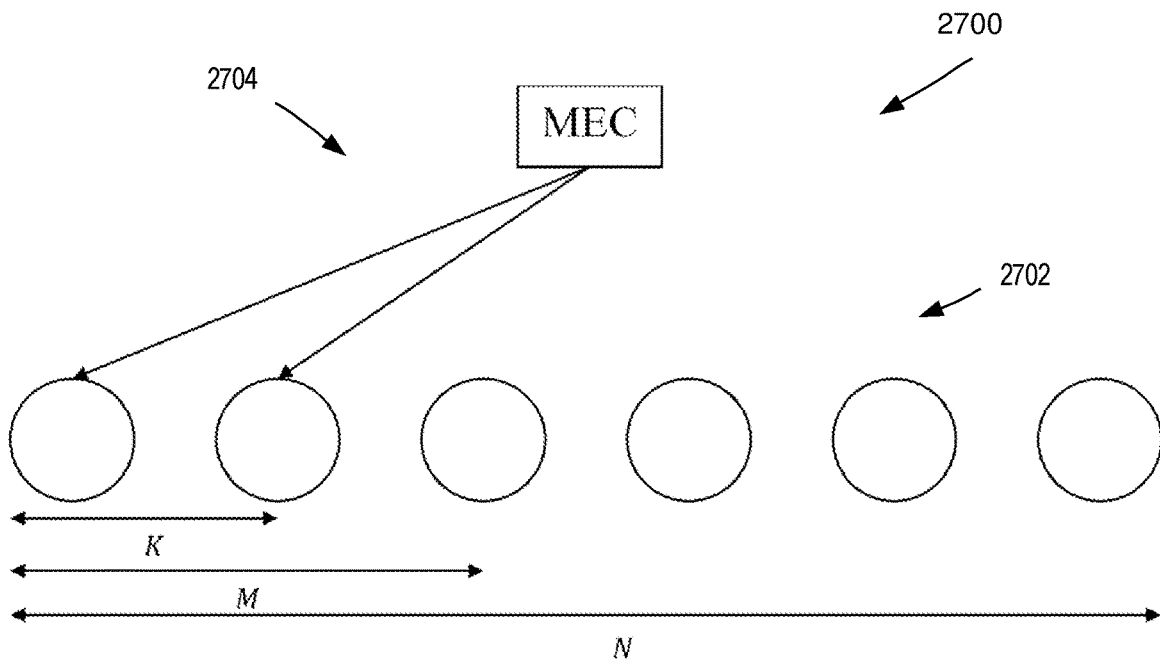
Figure 32:
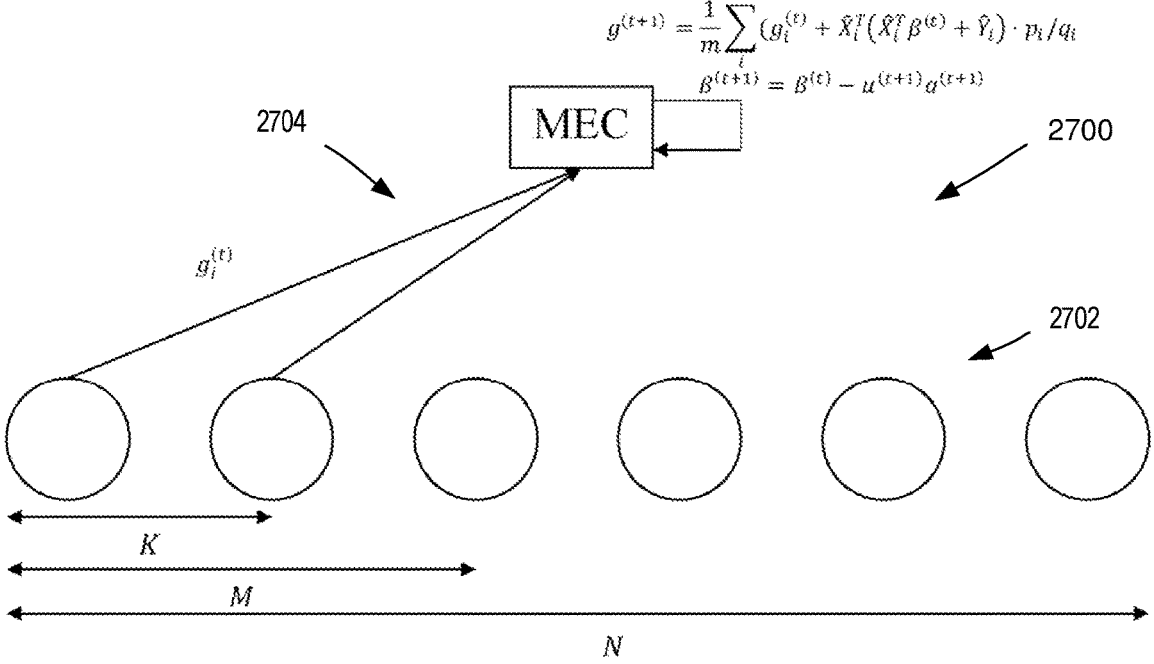

$\forall i=1, . . . , N$ where:
    a. $l_i$ is the number of data points at client i;
    b. $l_j$ is the number of data points at client i with the understanding that it will disappear by virtue of the summation in the calculation of pi; and
    c. $p_i$ is the ratio of the number of data points at client i over the number of data points at all clients.
  4. For all epochs (i.e. number of a specific epoch) t=0, . . . , E−1 do:
    a. If mod(t,E')==0 do:
      i. the server broadcasts global weight $\beta^{(t)}$ where $\beta^{(t)}$ is the global weight at epoch number t;

ii. the clients share $q_1, \ldots, q_N$ with the server for example using Equation (DQ4) (see FIG. 28);

iii. the server selects M clients out of all N clients using the q distribution (see FIG. 29)—$\vec{q}$ is similar to a look up and contains the probability for each client to be included in the selection of subset that is to be polled in the next E' epochs; it is also updated every E' epochs at ii. above; clients calculate $l_iF_i$ and they send it to the server. The server normalizes these values with the summation of $l_iF_i$ for all clients and divides it per Equation (DQ4) over i to obtain $\vec{q}$ for each client;

iv. the server performs load-balancing by determining t*, $l_i*\forall i$, where t* denotes the time for all clients to perform a gradient descent algorithm step and $l_i*$ is the number of data points to be used by client i (see FIG. 28)—t* is the duration of an epoch (versus t with denotes an epoch number), and refers to duration of time that the server is going to wait for clients to return their local gradients, in terms of seconds, corresponding to a time duration to be used by clients i to perform a gradient update operation as expected by the server. It is optimized once every E' epochs and used for the next E' epochs; it may pertain to all clients N or a sampling or subsampling of N;

v. the M clients share coded data $\hat{X}_i=G_iW_iX_i$, $\hat{Y}_i=G_iW_iY_i$ with the server, where $G_i$ is the encoding matrix, $W_i$ the scaling matrix, $X_i$ the datapoints at client i, and $Y_i$ the labels at client i (see FIG. 30);

b. End if 5. the server selects K clients out of M uniformly (such as without consideration of importance sampling or other sampling criteria) (See FIG. 31);

6. the server sends the K clients $\beta^{(t)}$ (see FIG. 32);

7. the K clients send $g_i^{(t)}=(X_i*)^T(X_i*\beta^{(t)}-Y_i*)$ to the server where $g_i^{(t)}$ is the gradient at client i at epoch number t (see FIG. 32); since t* is the time in seconds that the server is going to wait for this gradient update (a time duration to be used by clients i to perform a gradient update operation as expected by the server) and $l_i*$ is the total number of datapoints client i is going to use to calculate this update. Therefore, $(X_i*, Y_i*)$ is a subset of data set with dimension $l_i*$, sampled from the larger dataset $(X_i, Y_i)$.

8. the server calculates $$g^{(t+1)} = \frac{1}{m}\sum_i \left( g_i^{(t)} + \hat{X}_i^T \left( \hat{X}_i\beta^{(t)} + \hat{Y}_i \right) \right) \cdot p_i/q_i$$

where $g^{(t+1)}$ is the global gradient at epoch number t+1 (see FIG. 32);

9. The server updates the global weight at epoch number t+1 $\beta^{(t+1)}-\mu^{(t+1)}g^{(t+1)}$ (see FIG. 32); and 10. End for.

One challenge in the above algorithm is the sub-optimality of the calculation of optimal epoch duration (t*) and optimal number of datapoints $l_i*$ used by each client to calculate the local gradients, if K<M. This is because t*, $l_i*$ are calculated assuming all M clients will participate in federated learning in step 7 and that the expected return is maximized. When K<M, the optimal t*, $l_i*$ do not hold anymore. In such a case, we argue that if M is partitioned into subsets of size K such that each subset is statistically identical to the set M, then the previously chosen t*, $l_i*$ for the E' epochs could still perform well.

To this end, we propose to utilize a partitioning algorithm that can group the clients into clusters where each cluster contains "similar" clients, and where the similarity is determined by the clients' data distribution, average compute time and communication times. For example, according to this embodiment, each client may be indicated by a point in an M-dimensional space where M represents the feature space for the clustering algorithm. The features may include the data dimension, number of data points at client, compute time and communication time. Then, a clustering algorithm can be utilized to partition the space into K clusters by grouping nearby clients into a cluster. The complexity of such an algorithm is typically dependent on the number of clients M (e.g., O(M2)). However, since M<<N, this is not a major concern.

According to this embodiment, in each training round, within E', the MEC server may sample a client randomly from each of the K clusters to participate in federated learning with the pre-determined epoch duration t* and number of training data points $l_i*$.

Experiments and Performance Evaluation

We simulated the performance of our Importance Sampling and Coded Federated Learning approach on a MNIST dataset. See LeCun, Y., Bottou, L., Bengio, Y., & Haffner, P. (1998). Gradient-based learning applied to document recognition. Proceedings of the IEEE, 86(11), 2278-2324 (hereinafter "Gradient-Based Learning"). MNIST dataset contains hand-written digits, and is commonly used for benchmarking in the area of machine learning. We learned a regression model with N=100 clients, where every E' epochs, M=20 are selected according to Importance Sampling, and every epoch, K=10 are selected uniformly out of the group of M subsampled clients. The learning rate is $\mu^{(t+1)}=0.999\mu^{(t)}$, with $\mu^{(0)}=1$ or $\mu^{(0)}=0.1$. The encoding matrix is either Gaussian or Bernoulli. In order to simulate a non-i.i.d. case, each client contains different digits of (mostly) a single digit, e.g. some clients have (almost) only images of the digit 0, some of the digit 1, and so forth.

We compared the subsampling approach with the baseline approach, as well as to Coded Federated Learning without Importance Sampling. The results are shown in FIGS. 33 and 34.

Figure 33:
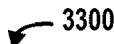
FIG. 33 is a graph plotting number of epochs E against Mean Square Error (MSE) for various federated learning mechanisms according to some embodiments.
Figure 33:
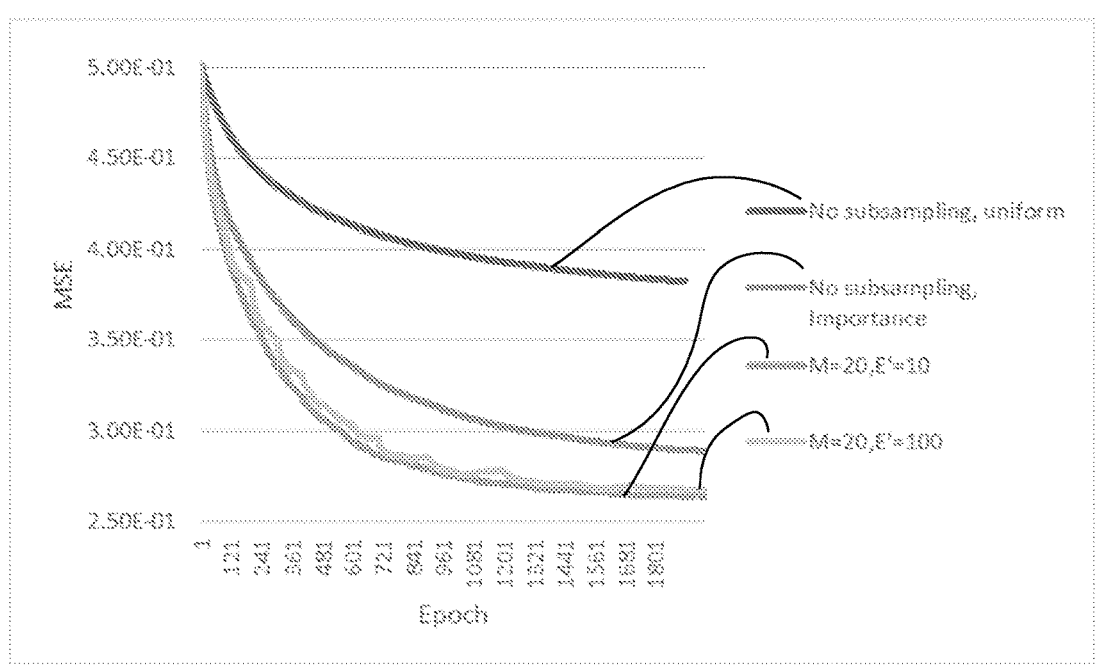

As shown in FIG. 33, graph 3300 plots number of epochs E against Mean Square Error (MSE). The graph 3300 shows among other things that while Importance Sampling has a measurable effect on reducing MSE for the same number of training epochs, combining Importance Sampling with Coded Federated Learning and using subsampling for example as noted in Algorithm 1 above has an even greater effect in reducing MSE for the same number of epochs, while, for the same sample size M, reducing the number of cycles E' of epoch duration change does not have a significant effect in reducing MSE.

Figure 34:
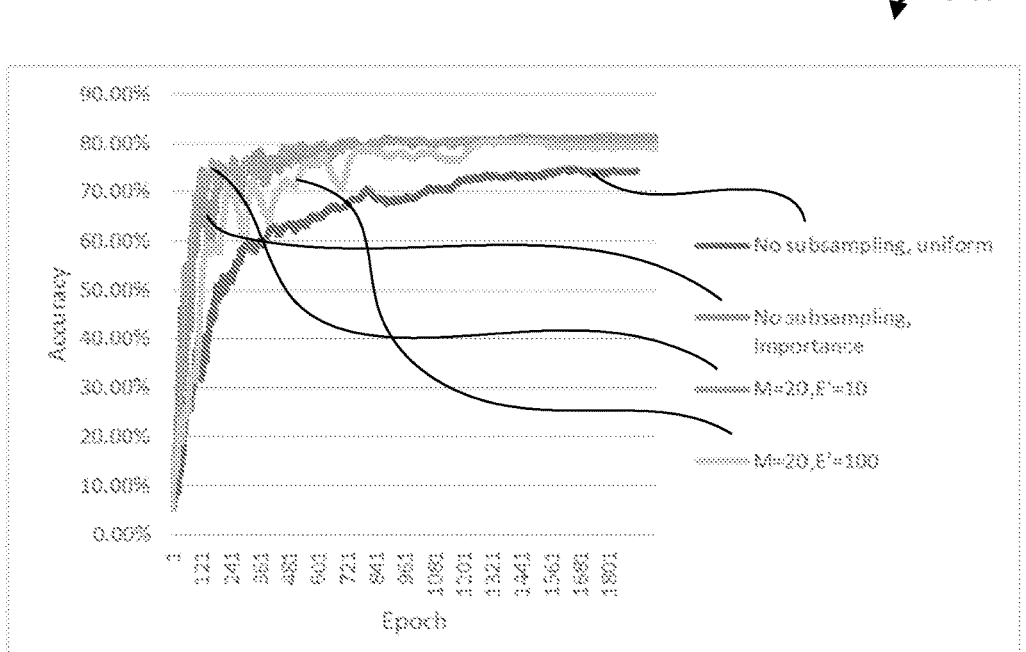
FIG. 34 is a graph plotting number of epochs E against percent accuracy for various federated learning mechanisms according to some embodiments.

As shown in FIG. 34, graph 3400 plots number of epochs E against percent accuracy. The graph 3400 shows among other things that Importance Sampling and subsampling according for example to Algorithm 1 are roughly on par with one another in terms of accuracy, and that they provide a significant improvement of the case of uniform sampling. In addition, reducing the number of cycles E' of epoch duration appears to provide enhanced accuracy.

Generalized Algorithm:

In previous sections we have proposed and investigated an algorithm and a framework for a federated learning system that performs Importance Sampling in order to reduce communication and compute overhead and power for clients, along with coding in order to mitigate stragglers. The performance of the algorithm depends on selection of hyper parameter E', which correlates with the periodicity (integer number of epochs) of updating the subsampled clients. A smaller E' therefore means more frequent updating of the epochs, yielding better performance at the cost of more communication overhead for coded data exchange. However, we may tackle this issue by keeping the number of clients we are replacing at each E' epoch small. In other words, instead of deciding on a fresh set of M clients at each E' epoch, we can discard L out of M clients from that set and add new set of L clients out of remaining set of N−M, resulting in N−M+L clients to form a new set of M clients that we perform coded learning. Discarding and resampling of these L clients may depend on the importance distribution $\vec{q}$. Note that this algorithm is the same as Algorithm 1 when L=M.

Even though we did not investigate the performance of this generalized algorithm, Algorithm 2 below, we do provide the framework as follows.

A process according to Algorithm 2 may include the following operations:

1. the server initializes K, N, M, $\mu^{(0)}$, $\beta^{(0)}$, E, E' (see FIG. 27) where:
   a. K is the subsampling number representing the number of clients to undergo training during each epoch;
   b. N is the total number of clients;
   c. M is the sampling number representing the number of clients to be sampled from which K clients are to be subsequently subsampled;
   d. $\mu^{(0)}$ is the gradient step at time 0;
   e. $\beta^{(0)}$ is the gradient at time 0;
   f. E is the maximum number of epochs the algorithm is running;
   g. E' is the periodicity at which the operations 4.a.i to 4.a.v immediately below are performed, and thus operations 4.a.i to 4.a.v are not done at every epoch but once in E' epochs;
2. The clients share $l_1, \ldots, l_N$ with the server (see FIG. 27), where $l_i$ corresponds to the number of data points at client i;
3. The server calculates $$p_i = \frac{l_i}{\sum_j l_j},$$

$\forall i=1, \ldots, N$ where:
   a. $l_i$ is the number of data points at client i;
   b. $l_j$ is the number of data points at client i with the understanding that it will disappear by virtue of the summation in the calculation of $p_i$; and
   c. $p_i$ is the ratio of the number of data points at client i over the number of data points at all clients.
4. For all epochs (i.e. number of a specific epoch) t=0, . . . , E−1, do:
   a. If mod(t, E')==0, coded data shared with server from a subsampling of the N clients:
      i. the server broadcasts global weight $\beta^{(t)}$ where $\beta^{(t)}$ is the global weight at epoch number t;

ii. the clients share $q_1, \ldots, q_N$ with the server for example using Equation (DQ4) (see FIG. 28);
      iii. the server selects L clients out of participating M clients out of all N clients using a function of the $\vec{q}$ distribution or using a uniform distribution, and discards them from the set of M clients;
      iv. the server selects L clients out of the remaining N−M or out of the remaining N−M+L (the L that was discarded) clients using a function of the $\vec{q}$ distribution and adds them to the M-L (the L that was discarded) clients;
      v. the server performs load-balancing for the newly determined L clients by determining t*, $l_i$*$\forall$i, where t* denotes the time for all clients in L to perform a gradient descent algorithm step and $l_i$* is the number of data points to be used by client i;
      vi. the L clients share coded data $\hat{X}_i=G_iW_iX_i$, $\hat{Y}=G_iW_iY_i$ with the server, where G, is the encoding matrix, W, the scaling matrix, $X_i$ the datapoints at client i, and $Y_i$ the labels at client i;
   b. End if
5. the server selects K clients uniformly out of M clients at epoch t=E−1 remaining from operation 4 above.
6. the server sends the K clients $\beta^{(t)}$ where $\beta^{(t)}$ is the global weight at epoch number t;
7. the K clients send $g_i^{(t)}=(X_i^*)^T(X_i^*\beta^{(t)}-Y_i^*)$ to the server where $g_i^{(t)}$ is the gradient at client i at epoch number t;
8. the server calculates $$g^{(t+1)} = \frac{1}{m}\sum_k \left(g_i^{(t)} + \hat{X}_i^T\left(\hat{X}_i\beta^{(t)} + \hat{Y}_i\right)\right)\cdot p_i/q_i$$

where $g^{(t+1)}$ is the global gradient at epoch number t+1;
9. The server updates the global weight at epoch number t+1 $\beta^{(t+1)}=\beta^{(t)}-\mu^{(t+1)}g^{(t+1)}$; and
10. End for.

S. System and Methods for Coded Federated Learning with Different Coding Redundancies for Clients As noted previously, federated learning environments involve clients collaboratively learning an underlying model by periodically exchanging model parameters with a central server, such as a MEC server. The convergence behavior of federated learning algorithms suffers from heterogeneities in computing power, communication links and data distribution across client devices. To mitigate the impact of these heterogeneities, some embodiments propose a coded computing method that enables each client to generate an optimal number of encoded data at a per-client redundancy level, and share the optimal number of encoded data with the MEC server.

In one previous coded computing solution a MEC server collects communication and compute parameters from clients and performs a global load balancing action that instructs all clients to share the equal number of encoded data to the server. See U.S. Patent Publication US-2019-0138934. In the latter solution, the server combines the received encoded data to form a composite encoded data. During training, the server computes a gradient from the composite encoded data in each epoch to probabilistically compensate for gradients sent by the clients that fail to arrive within an optimized epoch time, achieving model convergence up to four times faster than classical FL, while maintaining a certain level of privacy for clients by not exposing the raw data.

Some prior solutions however require all clients to generate an equal number of encoded data, and hence the global coding redundancy is dominated by the straggler clients. Therefore, it unfairly requires reliable clients to also generate and transmit large number of encoded data. This is an inefficient use of bandwidth and computation resources.

Some embodiments propose a coded federated learning framework, where the MEC performs load balancing to calculate: 1. optimal partitioning of each client's data into raw data (for client-side processing) and encoded data (for server-side processing), and 2. the optimal epoch time global to all clients. Under this framework, some embodiments propose two coded computing schemes for encoded data generation at a per client redundancy, and gradient computation.

Embodiments in this section advantageously enable per-client coding redundancy based on network and compute parameters of each client. The above enables each client to have a trade-off for their own privacy and performance. Embodiments outperforms uncoded federated learning in heterogeneity regions, and do not require decoding overhead for gradient computation.

Some embodiments in this section involve an exchange of encoded data between clients and the server in a systematic way, which may likely be standardized for Mobile Edge Computing. In such a case, standard compliance can be invoked to detect infringement. Controlled experiments in a laboratory can also be performed to create different levels of compute, communication and data heterogeneities to accurately predict the behavior of proposed algorithms herein. Background on Federated Learning for Linear Regression Workloads:

Raw data is located at edge devices. More specifically, the data matrix $X^{(i)}$ and the associated label vector $y^{(i)}$ located at the i-th device (i.e. client) may be given by $$X^{(i)} = \begin{bmatrix} X_1^{(i)} \\ \vdots \\ X_{l_i}^{(i)} \end{bmatrix}, \text{ and} \qquad \text{Eq. (DR1)}$$

$$y^{(i)} = \begin{bmatrix} y_1^{(i)} \\ \vdots \\ y_{l_i}^{(i)} \end{bmatrix} \qquad \text{Eq. (DR2)}$$

where $l_i$ is the number of training data points available. Note that the dimension of $X^{(i)}$ is $l_i \times d$, where d is the dimension of the feature space.

In federated learning, each client locally computes partial gradients in each epoch, say the r-th epoch, as follows in Equation (DR3):

$$\nabla_\beta f_i(\beta^{(r)}) = \Sigma_{k=1}^{l_i} X_k^{(i)}(X_k^{(i)}\beta^{(r)} - y_k^{(i)}) \qquad \text{Eq. (DR3)}$$

where, $\beta^{(r)}$ is the estimate of the global model. The partial gradient is communicated to the master server for aggregation. The global gradient is given by Equation (DR4):

$$\nabla_\beta f(\beta^{(r)}) = E_{i=1}^n \nabla_\beta f_i(\beta^{(r)}) \qquad \text{Eq. (DR4)}$$

and the model is updated as shown by way of Equation (DR5):

$$\beta^{(r+1)} = \beta^{(r)} - \frac{\mu}{M} \nabla_\beta f(\beta^{(r)}) \qquad \text{Eq. (DR5)}$$

where $M = \Sigma_{i=i}^n l_i$ is the totality of training data points and $\mu \geq 0$ is the learning rate.

Coded Federated Learning with Per-Client Coding Redundancy:

Some embodiments propose coded federated learning with a per-client redundancy algorithm comprising the features noted below:

1. Load balancing,
2. Encoded data generation
3. Gradient computation

The first two features may be performed once at the beginning of the training process. The third step may be performed every epoch. Each step is described below in detail.

Load Balancing:

In order to describe a load balancing module according to some embodiments, let us introduce a return metric $R_i(t; \tilde{l})$ that represents the event that a gradient computed over $\tilde{l} \geq 0$ data points by the i-th client is available at the server within the deadline time t. More precisely, the return metric $R_i$ may be given by Equation (DR6) below:

$$R_i(t; \tilde{l}_i) = \tilde{l}_i I_{\{T_i \leq t\}} \qquad \text{Eq. (DR6)}$$

where, $I_{\{A\}}$ is an indicator function for event A, $T_i$ is the time taken by the i-th client to download a model, compute gradient and upload the computed gradient to the server. Similarly, a return metric of MEC server is defined as given in Equation (DR7):

$$R_{MEC}(t; \tilde{c}) = \tilde{c} I_{\{T_{MEC} \leq t\}} \qquad \text{Eq. (DR7)}$$

where $R_{MEC}$ (t; $\tilde{c}$) represents the event that a gradient computed over $\tilde{c} \geq 0$ data points by the server is available at the server within the deadline time t, where $\tilde{c} \geq 0$ is the number of encoded data points used for gradient computation by the MEC server.

Optimization Parameters:

Definition 1: Deadline time t*:

The deadline time t* is the smallest epoch time window within which the MEC server and the i-th client can jointly compute gradient over, on average, $l_i$ number of data points for i=1, . . . , n clients. Here $l_i$ is the number of raw data points available at the i-th client.

Definition 2: Optimal load for the client $l_i^*(t)$:

The optimal load $l_i^*(t) \leq l_i$ it for an epoch time t is the number of raw data points used by the client to maximize its average return metric for the epoch time. More precisely, as set forth in Equation (DR8):

$$l_i^*(t) = \text{argmax}_{0 \leq \tilde{l}_i \leq l_i} E[R_i(t; \tilde{l}_i)] \qquad \text{Eq. (DR8)}$$

Observation 1:

Based on Definitions 1 and 2 above, the MEC server computes gradients from $(l_i - E[R_i(l_i^*(t^*))])^+$ number of data points for i=1, . . . , n clients. Therefore, each client must generate $(l_i - E[R_i(l_i^*(t^*))])^+$ number of encoded data once at the beginning of training and share it to the MEC server.

We assume that he MEC sever has storage constrained of $c_s$ number of data points.

Definition 3: Optimal Load for the MEC Server c*(t):

The optimal load $c^*(t) \leq c_s$ for an epoch time t is the number of encoded data points used by the MEC server to maximize its average return metric for the epoch time. More precisely, c*(t) may be given by Equation DR9):

$$c^*(t) = \text{argmax}_{0 \leq \tilde{c} \leq c_s} E[R_{MEC}(t; \tilde{c})] \qquad \text{Eq. (DR9)}$$

Coded Federated Learning Schemes:

Based on Definitions 1-3 and Observation 1 above, we propose the following two embodiments herein:

A protocol according to a first embodiment may involve the following:

1. as a one stage procedure, each client generates $(l_i - E[R_i(l_i^*(t^*))])^+$ number of coded data and uploads the data to the server;
2. the following operations may then be repeated every epoch:
   a. each client downloads the current model from the server, computes its local gradient from $l_i^*(t^*)$ raw data points and uploads the local gradient to the server;
   b. the server computes a gradient from the coded data of each client separately, and combines the computed per client gradients across all clients to obtain a global gradient;
   c. the server receives local gradients until the deadline time $t^*$; and combines all the received local gradients into the global gradient; and
   d. the server updates the model.

A protocol according to a second embodiment may involve the following:

1. as a one stage procedure:
   a. each client generates $(l_i - E[R_i(l_i^*(t^*))])^+$ number of coded data and uploads the data to the server; and
   b. the server oversamples the coded data of each client and combines the oversampled coded data to create a composite coded data.
2. the following operations may then be repeated every epoch:
   a. each client downloads the current model from the server, computes its local gradient from $l_i^*(t^*)$ raw data points and uploads the local gradient to the server;
   b. the server computes a gradient from the composite coded data of each client separately, and combines the computed per client gradients across all clients to obtain a global gradient;
   c. the server receives local gradients until the deadline time $t^*$; and combines all the received local gradients into the global gradient; and
   d. the server updates the model.

Both of the protocols of embodiments one and two above are implemented by finding $t^*$, $l_i^*(t^*)$, and $c^*(t^*)$ that satisfy the following inequality as provided by Equation (DR10) below:

$$\Sigma_{i=1}^{n}(l_i - E[R_i(l_i(t^*))])^+ \leq c^*(t^*) \qquad \text{Eq. (DR10)}$$

Before the training starts, in either embodiment, each client may provide statistics of its compute and communication delays to the server. The server may perform load balancing to solve the inequality in Equation (DR10) using a two-stage optimization method outlined below:

1. initialize time $t=0$;
2. operation 1: find an optimal load allocation $l_i^*(t)$, $c^*(t)$ by solving Eq. (DR8) and Eq. (DR9), respectively (note: it has been shown that for a shifted exponential distribution for compute delays and geometric distribution for communication delays, the average return metrics in Eq. (DR8) and Eq. (DR9) are piece-wise concave functions of $\tilde{l}_i$ and $\tilde{c}$. See "Coded Computing for FL")—therefore, operation 1 may be solved with a standard convex optimization tool;
3. operation 2: check for the following condition:

$$\Sigma_{i=1}^{n}(l_i - E[R_i(l_i^*(t))])^+ \leq c^*(t)$$

4. if the condition in operation 2 is satisfied, the deadline time $t^*=t$, and the end of the optimization method is reached;
5. but, if the condition in operation 2 is NOT satisfied, then set $t=t+\Delta t$, and go back to operation 1, and repeat.

Remark 1

In Equation (DR10), the storage constraint at the MEC is applied on the total amount of coded data shared by all the clients. In another implementation, per-client storage constraints may be used by finding $t^*$, $l_i(t^*)$, and $c^*(t^*)$ that satisfy the following set of inequalities as set forth in Equations (DR11a), (DR11b) and (DR11c):

$$\Sigma_{i=1}^{n}(l_i - E[R_i(l_i(t^*))])^+ \leq c^*(t^*) \qquad \text{Eq. (DR11a)}$$

$$(l_i - E[R_i(l_i(t^*))])^+ \leq c_s^{(i)} \qquad \text{Eq. (DR11b)}$$

$$c^*(t^*) \leq \Sigma_{i=1}^{n} c_s^{(i)} \qquad \text{Eq. (DR11c)}$$

where, $c_s^{(i)}$ is the storage constraint at the MEC for the i-th client.

Encoded Data Generation:

According to some embodiments, random linear coding may be utilized by each client to encode the data. The encoded data at the i-th client may then be given by Equation (DR12):

$$\tilde{X}^{(i)} = G_i X^{(i)}, \text{ and } \tilde{y}^{(i)} = G_i y^{(i)} \qquad \text{Eq. (DR12)}$$

where $G_i$ is a generator matrix of dimension $c_i^* \times l_i$, with elements drawn independently from a normal distribution with a mean of 0 and a variance $$\frac{w_i}{c_i^*},$$

where, as per Equations (DR13) and (DR14) below:

$$c_i^* = (l_i - E[R_i(l_i^*(t^*))])^+ \qquad \text{Eq. (DR13)}$$

and $$w_i = 1 - \frac{l_i^*(t^*)}{l_i} \cdot Pr\{T_i \leq t^*\} \qquad \text{Eq. (DR14)}$$

where $c_i^*$ is the number of coded data at each client, and where clearly, the scaling $w_i$ is the probability that the raw gradients from the i-th client fail to arrive within the deadline time $t^*$.

The encoded data $(\tilde{X}^{(i)}, \tilde{y}^{(i)})$ may be transmitted to the server, while the generator matrix $G_i$ is kept private. At the server, the encoded data may be stored in at least two different ways as set forth below.

Operations according to a first protocol scheme may involve storing encoded data $(\tilde{X}^{(i)}, \tilde{y}^{(i)})$ from each client separately at the server.

Operations according to a second protocol scheme may involve the following:

1. composite encoded data is formed as follows: let Equation (DR15) below hold:

$$l_{max}^* = \max_i (l_i - E[R_i(l_i^*(t^*))])^+ \qquad \text{Eq. (DR15)}$$

2. for each client use a discrete Fourier transform (DFT) matrix $F_i$ of dimension $1_{max}* \times c_i*$ to construct a over-sampled encoded data given by Equations (DR16a) and (DR16b) as:

$$\tilde{X}_u^{(i)} = F_i \tilde{X}^{(i)} \qquad \text{Eq. (DR16a)}$$

and $$\tilde{y}_u^{(i)} = F_i \tilde{y}^{(i)} \qquad \text{Eq. (DR16b)}$$

3. form a composite encoded data $(\tilde{X}, \tilde{y})$ as per Equations (DR17a) and (DR17b) as follows:

$$\tilde{X} = \Sigma_{i=1}^{n} \tilde{X}_u^{(i)} \qquad \text{Eq. (DR17a)}$$

and $$\tilde{y} = \Sigma_{i=1}^{n} \tilde{y}_u^{(i)} \qquad \text{(Eq. (DR17b)}$$

Gradient Computation:

In each r-th epoch, there may be two types of gradients computed: a client-gradient or local gradient, and a server-gradient or global gradient, which may, according to some embodiments, be used together to update the global model $\beta^{(r)}$.

Client-Gradient:

Each client may compute a local gradient from $1_i*(t*)$ number of raw data points. Therefore, in each epoch, each client randomly picks $1_i*(t*)$ raw data points out of $1_i$ raw data points available at the client, such that each data point has equal likelihood of selection given by $$\frac{l_i^*(t^*)}{l_i}.$$

The client computes its local gradient and uploads its local gradient to the server. The expected value of total local gradients received by the MEC server within the deadline time $t*$ is given by Equation (DR18):

$$E[\nabla_\beta^{client}(t^*)] = \Sigma_{i=1}^{n}(1-w_i)X^{(i)T}(X^{(i)}\beta^{(r)}-y^{(i)} \qquad \text{Eq. (DR18)}$$

where $w_i$ has been defined in Eq. (DR14) above.

According to a first scheme, Scheme 1, a server-gradient protocol is provided as described below. According to Scheme 1, in each epoch, the server computes a gradient from the encoded data. The server may compute this gradient from encoded data of each client $(\tilde{X}^{(i)}, \tilde{y}^{(i)})$ separately and add them together. The expected value of the server computed gradient in Scheme 1 may be given by Equation (DR19) below:

$$E[\nabla_\beta^{server}(t^*)] = \Sigma_{i=1}^{n}\tilde{X}^{(i)}(\tilde{X}^{(i)} \\ \beta^{(r)}-\tilde{y}^{(i)})\cdot Pr\{T_{MEC} \le t^*\} = \Sigma_{i=1}^{n} w_i X^{(i)T} \\ (X^{(i)}\beta^{(r)}-y^{(i)})\cdot Pr\{T_{MEC} \le t^*\} \qquad \text{Eq. (DR19)}$$

Assuming the server has much more computing power than the clients, we can approximate the probability $Pr\{T_{MEC} \le t^*\} \approx 1$ to obtain the expected value of the server computed gradient in Scheme 1 as set forth in Equation (DR20):

$$E[\nabla_\beta^{server}(t^*)] = \Sigma_{i=1}^{n} w_i X^{(i)T}(X^{(i)}\beta^{(r)}-y^{(i)}) \qquad \text{Eq. (DR20)}$$

The server may add the two types of gradients to obtain the overall gradient given by Equation (DR21) below:

$$\hat{\nabla}_\beta^{scheme1}(t^*) = \frac{\nabla_\beta^{client}(t^*) + \nabla_\beta^{server}(t^*)}{M} \qquad \text{Eq. (DR21)}$$

where $M = \Sigma_{i=i}^{n} l_i$.

Based on Equations (DR18) and (DR20), it is straightforward to note that $\hat{\nabla}_\beta^{scheme1}(t^*)$ is an unbiased estimate of the gradient computed from the entire M data points distributed across all the clients.

According to a second scheme, Scheme 2, the server computes a gradient from composite encoded data $(\tilde{X}, \tilde{y})$. The expected value of the server computed gradient in the Scheme 2 protocol, assuming that $Pr\{T_{MEC} \le t^*\} \approx 1$, is given by Equation (DR22):

$$E[\nabla_\beta^{server}(t^*)] = \tilde{X}^T(\tilde{X}\beta^{(r)}-\tilde{y}) = \Sigma_{i=1}^{n} X^T D(X\beta^{(r)}-y) \qquad \text{Eq. (DR22)}$$

where, as set forth in Equations (DR23a), (DR23b) and (DR23c) below:

$$X = \begin{pmatrix} X^{(1)} \\ \vdots \\ X^{(n)} \end{pmatrix} \qquad \text{Eq. (DR23a)}$$

$$y = \begin{pmatrix} y^{(1)} \\ \vdots \\ y^{(n)} \end{pmatrix} \qquad \text{Eq. (DR23b)}$$

and $$D = \begin{pmatrix} G_1^T F_1^T F_1 G_1 & \cdots & G_1^T F_1^T F_n G_n \\ \vdots & \ddots & \vdots \\ G_n F_n^T F_1 G_1 & \cdots & G_n F_n^T F_n G_n \end{pmatrix} \qquad \text{Eq. (DR23c)}$$

noting that, per Equation (DR23d):

$$F_i^T F_i = I_{c_i^*} \qquad \text{Eq. (DR23d)}$$

and $$\text{if } c_i^* \ge c_j^*: F_i^T F_j = \begin{pmatrix} I_{c_j^*} \\ 0_{(c_i^*-c_j^*)\times c_j^*} \end{pmatrix},$$

$$\text{and if } c_i^* < c_j^*: F_i^T F_j = \begin{pmatrix} I_{c_i^*} & 0_{c_i^* \times (c_j^*-c_i^*)} \end{pmatrix}.$$

Further, we invoke the weak law of large numbers to approximate as noted in Equations (DR24) and (DR25) below:

$$G_i^T G_i \approx w_i I_{l_i} \qquad \text{Eq. (DR24)}$$

and $$G_i^T G_j \approx 0_{l_i \times l_j} \qquad \text{Eq. (DR25)}$$

Using the above identities, we obtain D as provided in Equation (DR26) below:

$$D = \begin{pmatrix} w_i I_{l_i} & \cdots & 0_{l_i \times l_n} \\ \vdots & \ddots & \vdots \\ 0_{l_n \times l_i} & \cdots & w_n I_n \end{pmatrix} \qquad \text{Eq. (DR26)}$$

Therefore, the global gradient in the Scheme-2 protocol may be given by Equation (DR27):

$$E[\nabla_\beta^{server}(t^*)] \approx \Sigma_{i=1}^{n} w_i X^{(i)T}(X^{(i)}\beta^{(r)}-y^{(i)}) \qquad \text{Eq. (DR27)}$$

The server adds the two types of gradients to obtain the overall gradient given by Equation (DR28) below:

$$\hat{\nabla}_{\beta}^{scheme2}(t^*) = \frac{\nabla_{\beta}^{client}(t^*) + \nabla_{\beta}^{server}(t^*)}{M}, \text{ where } M = \sum_{i=i}^{n} l_i$$

Eq. (DR28)

Remark 2

Based on equations (DR18) and (DR22), it is straightforward to note that $\hat{\nabla}_{\beta}^{scheme2}(t^*)$ is approximately an unbiased estimate of the gradient computed from the entire M data points distributed across all the clients. The approximation comes from the fact that the matrix D will have small non-diagonal values, which only vanishes asymptotically with the number of coded data points.

Numerical Results

We now present numerical results for a MEC setup consisting of 24 client nodes and 1 server node.

We use an LTE network, where each client is assigned 3 resource blocks. To model heterogeneity in communication links, link throughput coefficients are generated using {1, kFac1, kFac1$^2$, . . . , kFac1$^{23}$}×a, where kFac1=0.8, a=0.4 bits per channel use, and a random permutation of these coefficients are assigned to the clients' communication links. Both the uplink and downlink channels are modeled with 10% erasure probability.

Similarly, to model heterogeneity in computation power, the average processing rates are generated using {1, kFac2, kFac2$^2$, . . . , kFac2$^{23}$}×b, where kFac2=0.8, b=1536 Kilo Multiply-Accumulate operations per second, and a random permutation of these coefficients are assigned to the clients' computation power. A shifted exponential statistical model for computation time as described in "Coded Computing for FL" is used.

Each client has $l_i$=360 training examples. The feature dimension d=500. The total storage constraint at MEC server is $c_s$=720.

The non-i.i.d. training examples at each client are generated using the following linear model as provided by Equation (DR29):

$$y^{(i)} = X^{(i)}\beta^{true} + n^{(i)}$$

Eq. (DR29)

Where each element of $X^{(i)}$ is independent and distributed as $$\sim N\left(0, \frac{1}{i}\right),$$

each element of additive noise $n^{(i)}$ is independent and distributed as $$\sim N\left(0, \frac{1}{SNR}\right),$$

SNR=0 dB, and each element of model $\beta^{true}$ is independent and distributed as ~N(0,1).

We have utilized normalized mean squared error (NMSE) as a performance metric, defined in the r-th epoch as set forth in Equation (DR30):

$$NMSE^{(r)} = \frac{\|\beta^r - \beta^{true}\|^2}{\|\beta^r-\|^2}$$

Eq. (DR30)

Figure 35:
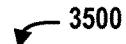
FIG. 35 is a graph plotting the NMSE performance with respect to total wall clock time for various federated learning mechanisms according to some embodiments.
Figure 35:
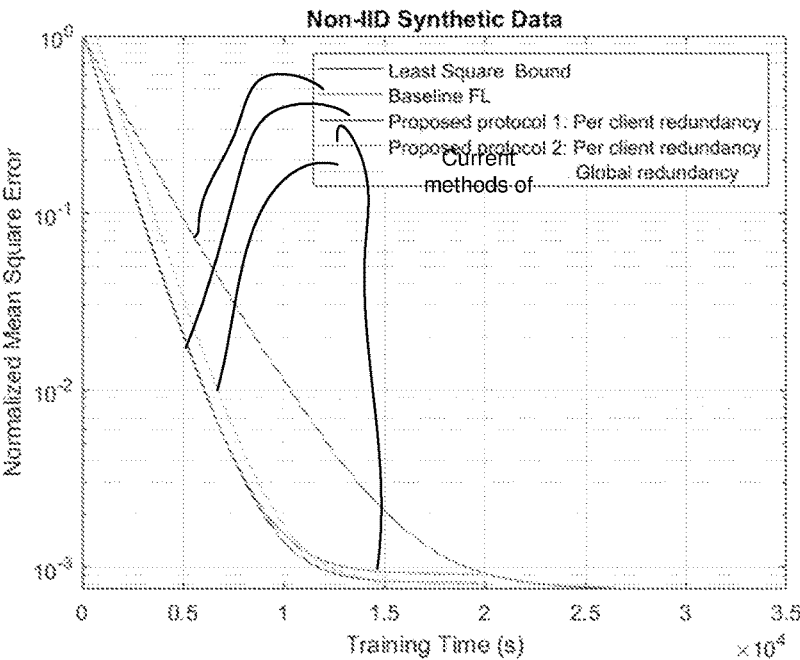

The numerical results provided herein compare the following algorithms:

1. The Scheme-1 protocol
2. The Scheme-2 protocol
3. Coded Federated Learning CFL with global coding redundancy
4. Baseline Federated Learning
5. Greedy Federated Learning In FIG. 35, the NMSE performance is shown by way of graph 3500 with respect to the total wall clock time. Clearly, proposed protocols-1 and 2, that is, Scheme 1 and Scheme 2, respectively, converge faster than the currently known global redundancy based Coded Federated Learning scheme. This is primarily due to a smaller initial cost incurred in encoding data at each client. Proposed protocol 2 has a slightly higher error floor due to coupling of coded data across the clients during composite data formation. Nonetheless, in proposed protocol 2 the MEC server computes gradient only once in each epoch whereas in proposed protocol 1, the MEC server needs to compute gradient from coded data of each client separately. Finally, all the methods converge much faster compared to the baseline federated learning solution that does not use any coding.

Figure 36:
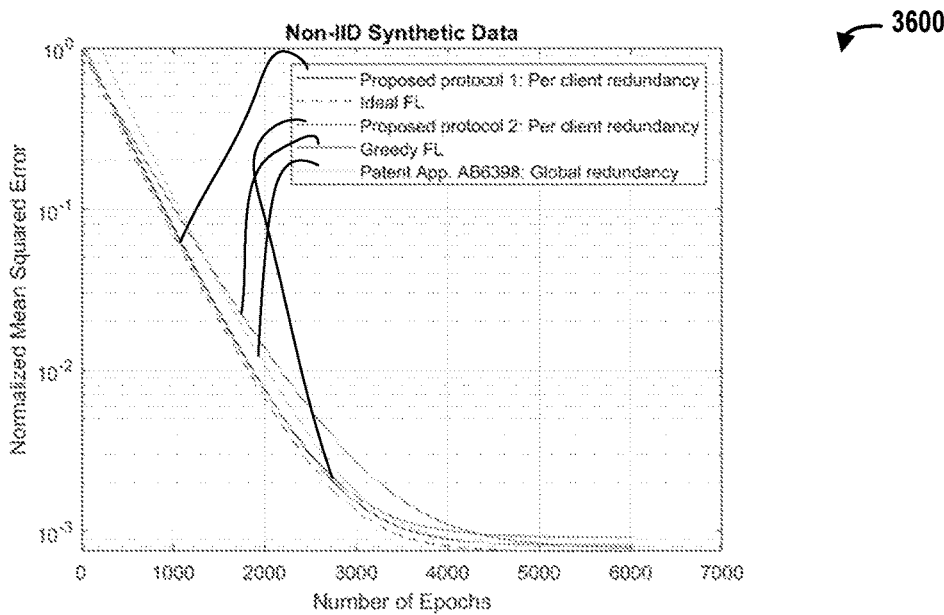
FIG. 36 is a graph showing the convergence rate of different algorithms in terms of number of epochs for various federated learning mechanisms according to some embodiments.

Next, in FIG. 36, we compare by way of graph 3600 the convergence rate of different algorithms in terms of number of epochs. To this end, we consider a greedy federated learning scheme that waits for the gradients from clients to arrive until the deadline time t* and updates the model. For reference, we have also shown an ideal federated learning scheme that waits for all the clients in each epoch. Therefore, all schemes except the ideal FL scheme consume the same amount of wall-clock time in each epoch. The ideal FL scheme will have variable epoch times based on variability of straggler effects in each epoch. Both the proposed protocols perform very close to ideal federated learning scheme, and significantly outperforms the greedy federated learning algorithm. In addition, the proposed embodiments converge faster than the global redundancy based coded federated learning scheme.

T. Example Edge Computing Implementations

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

As referred to below, an "apparatus of" an edge computing node is meant to refer to a "component' of "node," such as of a central node, central server, server, client node, client computing node, client device, client or user, as the component is defined above. A client, client node, or client compute/computing node may refer to an edge computing node that is serving as a client device and, in the examples below, may perform training of a global model using local data, which the client may wish to keep private (e.g., from other nodes). The "apparatus" as referred to herein may refer, for example, to a processor such as processor 852 of edge computing node 910/920/930 of FIG. 9, or to the processor 852 of FIG. 8 along with any other components of the edge computing nodes of FIG. 9, or, for example to circuitry corresponding to a computing node 515 or 523 with virtualized processing capabilities as described in FIG. 5.

EXAMPLES

Example AM1 includes a method to be performed at an apparatus of a client computing node in an edge computing environment to provide for coded federated learning (CFL) of a global machine learning (ML) model, the method comprising: accessing a local raw training data set of the client computing node and a raw label set corresponding to the local raw training data set; computing kernel coefficients based on a kernel function, the local raw training data set, and the raw label set; generating a coded training data set from the raw training data set; generating a coded label set based on the kernel coefficients, the kernel function, and the raw label set; and transmitting the coded training data set and coded label set to a central server of the edge computing environment.

Example AM2 includes the subject matter of Example AM1 and/or other Example(s) herein and, optionally, further comprising performing gradient descent to compute the kernel coefficients.

Example AM3 includes the subject matter of Example AM1 or AM2 and/or other Example(s) herein and, optionally, wherein the kernel function is a Gaussian function.

Example AM4 includes the subject matter of any one of Examples AM1-AM3 and/or other Example(s) herein and, optionally, wherein generating the coded training data set comprises generating a coding matrix based on a distribution, wherein the coded training data set is based on multiplying a matrix representing the raw training data set with the coding matrix.

Example AM5 includes the subject matter of Example AM4 and/or other Example(s) herein and, optionally, wherein the coding matrix is generated based on one of a standard normal distribution and a Bernoulli ($\frac{1}{2}$) distribution.

Example AM6 includes the subject matter of any one of Examples AM1-AM5 and/or other Example(s) herein and, optionally, further comprising: obtaining, from the central server, a global mean and standard deviation for training data of client computing nodes of the edge computing environment; and normalizing the raw local training data set based on the global mean and standard deviation.

Example AM7 includes the subject matter of Example AM6 and/or other Example(s) herein and, optionally, wherein the kernel coefficients are computed based on the normalized local training data set.

Example AM8 includes the subject matter of any one of Examples AM1-AM7 and/or other Example(s) herein and, optionally, further comprising: obtaining the global ML model from the central server; computing an update to the global ML model using the raw training data set and the raw label set; and transmitting the update to the global ML model to the central server.

Example AM9 includes the subject matter of Example AM8 and/or other Example(s) herein and, optionally, wherein computing the update to the global ML model comprises computing partial gradients to the global ML model via a backpropagation technique, and transmitting the update comprises transmitting the partial gradients to the central server.

Example AA1 includes an apparatus of an edge computing node, the apparatus comprising an interconnect interface to connect the apparatus to one or more components of the edge computing node, and a processor to: compute kernel coefficients based on a kernel function, a local raw training data set of the client computing node and a raw label set corresponding to the local raw training data set; generate a coded training data set from the raw training data set; generate a coded label set based on the kernel coefficients, the kernel function, and the raw label set; and cause the coded training data set and coded label set to be transmitted a central server of the edge computing environment.

Example AA2 includes the subject matter of Example AA1 and/or other Example(s) herein and, optionally, wherein the processor is to perform gradient descent to compute the kernel coefficients.

Example AA3 includes the subject matter of any one of Examples AA1-AA2 and/or other Example(s) herein and, optionally, wherein the kernel function is a Gaussian function.

Example AA4 includes the subject matter of any one of Examples AA1-AA3 and/or other Example(s) herein and, optionally, wherein the processor is to generate the coded training data set by generating a coding matrix based on a distribution, and wherein the coded training data set is based on multiplying a matrix representing the raw training data set with the coding matrix.

Example AA5 includes the subject matter of Example AA4 and/or other Example(s) herein and, optionally, wherein the processor is to generate the coding matrix based on one of a standard normal distribution and a Bernoulli ($\frac{1}{2}$) distribution.

Example AA6 includes the subject matter of any one of Examples AA1-AA5 and/or other Example(s) herein and, optionally, wherein the processor is further to: obtain, from the central server, a global mean and standard deviation for training data of client computing nodes of the edge computing environment; and normalize the raw local training data set based on the global mean and standard deviation.

Example AA7 includes the subject matter of Example AA6 and/or other Example(s) herein and, optionally, wherein the processor is to compute the kernel coefficients based on the normalized local training data set.

Example AA8 includes the subject matter of any one of Examples AA1-AA7 and/or other Example(s) herein and, optionally, wherein the processor is further to: obtain the global ML model from a central server of the edge computing environment; compute an update to the global ML model using the raw training data set and the raw label set; and cause the update to the global ML model to be transmitted to the central server.

Example AA9 includes the subject matter of Example AA8 and/or other Example(s) herein and, optionally, wherein the processor is to compute the update to the global ML model by computing partial gradients to the global ML model via a backpropagation technique, and transmitting the update comprises transmitting the partial gradients to the central server.

Example AA10 includes the subject matter of any one of Examples AA1-AA9 and/or other Example(s) herein and, optionally, wherein the apparatus further comprises a transceiver to provide wireless communication between the apparatus and other edge computing nodes of a wireless edge network.

Example AMM1 includes a method comprising: obtaining, at a central server node from each of a set of client compute nodes, a coded training data set and a coded label set; computing a gradient update to a global machine learning (ML) model based on the coded training data set and coded label set; obtaining, from at least a portion of the set of client compute nodes, gradient updates to the global ML model computed by the client compute nodes on local training data;

aggregating the gradient updates; and updating the global ML model based on the aggregated gradient updates.

Example AAA1 includes an apparatus of an edge computing node, the apparatus comprising an interconnect interface to connect the apparatus to one or more components of the edge computing node, and a processor to: obtain, at a central server node from each of a set of client compute nodes, a coded training data set and a coded label set; compute a gradient update to a global machine learning (ML) model based on the coded training data set and coded label set; obtain, from at least a portion of the set of client compute nodes, gradient updates to the global ML model computed by the client compute nodes on local training data; aggregate the gradient updates; and update the global ML model based on the aggregated gradient updates.

Example BM1 includes a method to be performed at an apparatus of a client computing node in an edge computing environment to provide for coded federated learning (CFL) of a global machine learning (ML) model, the method comprising: accessing a local training data set of the client computing node; applying a Random Fourier Feature Mapping (RFFM) transform to the training data set to yield a transformed training data set; obtaining the global ML model from a central server of the edge computing environment; and iteratively, until the global ML model converges: computing an update to the global ML model using the transformed data set and a raw label set corresponding to the training data set; and transmitting the global ML model update to the central server.

Example BM2 includes the subject matter of Example BM1 and/or another Example and, optionally, wherein the global ML model update comprises a partial gradient obtained via gradient descent.

Example BM3 includes the subject matter of Example BM2 and/or another Example and, optionally, further comprising transmitting operational parameters of the client computing node to the central server.

Example BM4 includes the subject matter of Example BM3 and/or another Example and, optionally, wherein the operational parameters include one or more of: processing capabilities for the client computing node and link quality for a network connection between the client computing node and the central server.

Example BM5 includes the subject matter of any one of Examples BM1-BM3 and/or another Example and, optionally, wherein applying the RFFM transform comprises applying a cosine function element-wise to the training data set.

Example BM6 includes the subject matter of Example BM5 and/or another Example and, optionally, wherein applying the RFFM transform comprises applying the cosine function according to $\cos(x_i\Omega+b)$, where $x_i$ represents the training data set, and $\Omega$ and b comprise entries sampled from distributions.

Example BM7 includes the subject matter of Example BM6 and/or another Example and, optionally, wherein 2 is sampled from the distribution $$N\left(0, \frac{1}{(2\sigma^2)}I_d\right)$$

and b is sampled from Uniform$(0,2\pi]$.

Example BM8 includes the subject matter of any one of Examples BM1-BM7, further comprising receiving, from the central server node, a random number generator for random feature mapping and random feature dimensions, wherein the RFFM transform is based on the random number generator for random feature mapping and random feature dimensions.

Example BA1 includes an apparatus of an edge computing node, the apparatus comprising an interconnect interface to connect the apparatus to one or more components of the edge computing node, and a processor to: access a local training data set of the client computing node; apply a Random Fourier Feature Mapping (RFFM) transform to the training data set to yield a transformed training data set; obtain the global ML model from a central server of the edge computing environment; and iteratively, until the global ML model converges: compute an update to the global ML model using the transformed data set and a raw label set corresponding to the training data set; and cause the global ML model update to be transmitted to the central server.

Example BA2 includes the subject matter of Example BA1 and/or another Example and, optionally, wherein the global ML model update comprises a partial gradient obtained via gradient descent.

Example BA3 includes the subject matter of Example BA2 and/or another Example and, optionally, wherein the processor is further to cause operational parameters of the client computing node to be transmitted to the central server.

Example BA4 includes the subject matter of Example BA3 and/or another Example and, optionally, wherein the operational parameters include one or more of: processing capabilities for the client computing node and link quality for a network connection between the client computing node and the central server.

Example BA5 includes the subject matter of any one of Examples BA1-BA3 and/or another Example and, optionally, wherein the processor is to apply the RFFM transform by applying a cosine function element-wise to the training data set.

Example BA6 includes the subject matter of Example BA5 and/or another Example and, optionally, wherein the processor is to apply the cosine function according to $\cos(x_i\Omega+b)$, where $x_i$ represents the training data set, and $\Omega$ and b comprise entries sampled from distributions.

Example BA7 includes the subject matter of Example BA6 and/or another Example and, optionally, wherein 2 is sampled from the distribution $$N\left(0, \frac{1}{(2\sigma^2)}I_d\right)$$

and b is sampled from Uniform$(0,2\pi]$.

Example BA8 includes the subject matter of any one of Examples BA1-BA7, wherein the processor is further to receive, from the central server node, a random number generator for random feature mapping and random feature dimensions, wherein the RFFM transform is based on the random number generator for random feature mapping and random feature dimensions.

Example BMM1 includes a method comprising: obtaining, from a set of client compute nodes, gradient updates to a global ML model computed by the client compute nodes on a dataset transformed via a Random Fourier Feature Mapping (RFFM) transform; aggregating the gradient updates; and updating the global ML model based on the aggregated gradient updates.

Example BAA1 includes an apparatus of an edge computing node, the apparatus comprising an interconnect interface to connect the apparatus to one or more components of the edge computing node, and a processor to: obtain, from a set of client compute nodes, gradient updates to a global ML model computed by the client compute nodes on a dataset transformed via a Random Fourier Feature Mapping (RFFM) transform; aggregate the gradient updates; and update the global ML model based on the aggregated gradient updates.

Example CM1 includes method to be performed at an apparatus of a client computing node in an edge computing environment to provide for coded federated learning (CFL) of a global machine learning (ML) model, the method comprising: accessing a local training data set of the client computing node and a label set corresponding to the local training data set; applying a Random Fourier Feature Mapping (RFFM) transform to the training data set to yield a transformed training data set; estimating a local machine learning (ML) model based on the transformed training data set and the label set; generating a coded training data set from the transformed training data set; generating a coded label set based on the coded training data set and the estimated local ML model; and transmitting the coded training data set and coded label set to a central server of the edge computing environment.

Example CM2 includes the subject matter of Example CM1 and/or another Example and, optionally, wherein estimating the local ML model comprises performing linear regression via gradient descent.

Example CM3 includes the subject matter of Example CM1 or CM2 and/or another Example and, optionally, wherein applying the RFFM transform comprises applying a cosine function element-wise to the training data set.

Example CM4 includes the subject matter of Example CM3 and/or another Example and, optionally, wherein applying the RFFM transform comprises applying the cosine function according to $\cos(x_i\Omega+b)$, where $x_i$ represents the training data set, and $\Omega$ and b comprise entries sampled from distributions.

Example CM5 includes the subject matter of Example CM4 and/or another Example and, optionally, wherein $\Omega$ is sampled from the distribution $$N\left(0, \frac{1}{(2\sigma^2)}I_d\right)$$

and b is sampled from Uniform$(0,2\pi]$.

Example CM6 includes the subject matter of any one of Examples CM1-CM5 and/or another Example and, optionally, wherein generating the coded data set comprises generating a coding matrix based on a distribution, wherein the coded data set is based on multiplying a matrix representing the raw data set with the coding matrix.

Example CM7 includes the subject matter of Example CM6 and/or another Example and, optionally, wherein the coding matrix is generated by sampling a uniform distribution U(0, 1).

Example CM8 includes the subject matter of any one of Examples CM1-CM7 and/or another Example and, optionally, further comprising iteratively, until the global ML model converges: computing an update to the global ML model based on the local training data set; and transmitting the update to the global ML model to the central server.

Example CA1 includes an apparatus of an edge computing node, the apparatus comprising an interconnect interface to connect the apparatus to one or more components of the edge computing node, and a processor to: access a local training data set of the client computing node and a label set corresponding to the local training data set; apply a Random Fourier Feature Mapping (RFFM) transform to the training data set to yield a transformed training data set; estimate a local machine learning (ML) model based on the transformed training data set and the label set; generate a coded training data set from the transformed training data set; generate a coded label set based on the coded training data set and the estimated local ML model; and cause the coded training data set and coded label set to be transmitted to a central server of the edge computing environment.

Example CA2 includes the subject matter of Example CA1 and/or another Example and, optionally, wherein the processor is to estimate the local ML model comprises performing linear regression via gradient descent.

Example CA3 includes the subject matter of Example CA1 or CA2 and/or another Example and, optionally, wherein the processor is to apply a cosine function element-wise to the training data set.

Example CA4 includes the subject matter of Example CA3 and/or another Example and, optionally, wherein the processor is to apply the cosine function according to $\cos(x_i\Omega+$ b), where $x_i$ represents the training data set, and $\Omega$ and b comprise entries sampled from distributions.

Example CA5 includes the subject matter of Example CA4 and/or another Example and, optionally, wherein $\Omega$ is sampled from the distribution $$N\left(0, \frac{1}{(2\sigma^2)}I_d\right)$$

and b is sampled from Uniform$(0,2\pi]$.

Example CA6 includes the subject matter of any one of Examples CA1-CA5 and/or another Example and, optionally, wherein the processor is to generate the coded data set by generating a coding matrix based on a distribution, wherein the coded data set is based on multiplying a matrix representing the raw data set with the coding matrix.

Example CA7 includes the subject matter of Example CA6 and/or another Example and, optionally, wherein the coding matrix is generated by sampling a uniform distribution U(0, 1).

Example CA8 includes the subject matter of any one of Examples CA1-CA7 and/or another Example and, optionally, wherein the processor is further to iteratively, until the global ML model converges: compute an update to the global ML model based on the local training data set; and cause the update to the global ML model to be transmitted to the central server.

Example CMM1 includes a method comprising: obtaining, at a central server node from each of a set of client compute nodes, a coded training data set and a coded label set; computing a gradient update to a global machine learning (ML) model based on the coded training data set and coded label set; obtaining, from at least a portion of the set of client compute nodes, gradient updates to the global ML model computed by the client compute nodes on local training data; aggregating the gradient updates; and updating the global ML model based on the aggregated gradient updates.

Example CAA1 includes an apparatus of an edge computing node, the apparatus comprising an interconnect interface to connect the apparatus to one or more components of the edge computing node, and a processor to: obtain, at a central server node from each of a set of client compute nodes, a coded training data set and a coded label set; compute a gradient update to a global machine learning (ML) model based on the coded training data set and coded label set; obtain, from at least a portion of the set of client compute nodes, gradient updates to the global ML model computed by the client compute nodes on local training data; aggregate the gradient updates; and update the global ML model based on the aggregated gradient updates.

Example DM1 includes a method to be performed at an apparatus of a client computing node in an edge computing environment to provide for coded federated learning (CFL) of a global machine learning (ML) model, the method comprising: accessing a subset of a local training data set of the client computing node; generating a transformed training data subset based on a Random Fourier Feature Mapping (RFFM) transform and the training data subset; generating a coding matrix based on a distribution; generating a weighting matrix; generating a coded training data mini-batch based on multiplying the transformed training data subset with the coding matrix and the weighting matrix; and transmitting the coded training data mini-batch to the central server; wherein the weighting matrix is based on a probability of whether the coded training data mini-batch will be received at the central server.

Example DM2 includes the subject matter of Example DM1 and/or another Example and, optionally, further comprising iteratively, until the global ML model converges: computing an update to the global ML model based on the training data subset; and transmitting the global ML model update to the central server.

Example DM3 includes the subject matter of Example DM1 and/or another Example and, optionally, wherein the coding matrix comprises elements drawn independently from a standard normal distribution or from an equi-probable Bernoulli distribution.

Example DM4 includes the subject matter of Example DM1 and/or another Example and, optionally, wherein a size of the coding matrix is based on a coding redundancy parameter obtained from the central server.

Example DM5 includes the subject matter of any one of Examples DM1-DM4 and/or another Example and, optionally, wherein applying the RFFM transform comprises applying a cosine function element-wise to the training data set.

Example DM6 includes the subject matter of Example DM5 and/or another Example and, optionally, wherein applying the RFFM transform comprises applying the cosine function according to $\cos(x_i\Omega+b)$, where $x_i$ represents the training data set, $\Omega$ is sampled from the distribution $$N\left(0, \frac{1}{(2\sigma^2)}I_d\right)$$

and b is sampled from Uniform$(0,2\pi]$.

Example DM7 includes the subject matter of any one of Examples DM1-DM6 and/or another Example and, optionally, wherein the probability is determined based on operational parameters of the client computing node.

Example DM8 includes the subject matter of Example DM7 and/or another Example and, optionally, wherein the operational parameters include one or more of computational capabilities of the client computing node and a communication link quality for the client computing node.

Example DM9 includes the subject matter of any one of Examples DM1-DM8 and/or another Example and, optionally, further comprising iteratively, until the global ML model converges: computing an update to the global ML model based on the local training data set; and transmitting the update to the global ML model to the central server.

Example DA1 includes an apparatus of an edge computing node, the apparatus comprising an interconnect interface to connect the apparatus to one or more components of the edge computing node, and a processor to: access a subset of a local training data set of the client computing node; generate a transformed training data subset based on a Random Fourier Feature Mapping (RFFM) transform and the training data subset; generate a coding matrix based on a distribution; generate a weighting matrix; generate a coded training data mini-batch based on multiplying the transformed training data subset with the coding matrix and the weighting matrix; and cause the coded training data mini-batch to be transmitted to the central server; wherein the weighting matrix is based on a probability of whether the coded training data mini-batch will be received at the central server.

Example DA2 includes the subject matter of Example DA1 and/or another Example and, optionally, wherein the processor is further to iteratively, until the global ML model converges: compute an update to the global ML model based on the training data subset; and cause the global ML model update to be transmitted to the central server.

Example DA3 includes the subject matter of Example DA1 and/or another Example and, optionally, wherein the coding matrix comprises elements drawn independently from a standard normal distribution or from an equi-probable Bernoulli distribution.

Example DA4 includes the subject matter of Example DA1 and/or another Example and, optionally, wherein a size of the coding matrix is based on a coding redundancy parameter obtained from the central server.

Example DA5 includes the subject matter of any one of Examples DA1-DA4 and/or another Example and, optionally, wherein the processor is to apply a cosine function element-wise to the training data set.

Example DA6 includes the subject matter of Example DA5 and/or another Example and, optionally, wherein the processor is to apply the cosine function according to $\cos(x_i\Omega+b)$, where $x_i$ represents the training data set, $\Omega$ is sampled from the distribution $$N\left(0, \frac{1}{(2\sigma^2)}I_d\right)$$

and b is sampled from Uniform$(0,2\pi]$.

Example DA7 includes the subject matter of any one of Examples DA1-DA6 and/or another Example and, optionally, wherein the processor is to determine the probability based on operational parameters of the client computing node.

Example DA8 includes the subject matter of Example DA7 and/or another Example and, optionally, wherein the operational parameters include one or more of computational capabilities of the client computing node and a communication link quality for the client computing node.

Example DA9 includes the subject matter of any one of Examples DA1-DA8 and/or another Example and, optionally, wherein the processor is further to iteratively, until the global ML model converges: compute an update to the global ML model based on the local training data set; and cause the update to the global ML model to be transmitted to the central server.

Example DA10 includes the subject matter of any one of Examples DA1-DA9 and/or another Example and, optionally, wherein the apparatus further comprises a transceiver to provide wireless communication between the apparatus and other edge computing nodes of a wireless edge network.

Example DMM1 includes a method comprising: obtaining, at a central server node from each of a set of client compute nodes, a coded training data mini-batch; computing a gradient update to a global machine learning (ML) model based on the coded training data mini-batch; obtaining, from at least a portion of the set of client compute nodes, gradient updates to the global ML model computed by the client compute nodes on local training data; aggregating the gradient updates; and updating the global ML model based on the aggregated gradient updates.

Example DAA1 includes an apparatus of an edge computing node, the apparatus comprising an interconnect interface to connect the apparatus to one or more components of the edge computing node, and a processor to: obtain, at a central server node from each of a set of client compute nodes, a coded training data mini-batch; compute a gradient update to a global machine learning (ML) model based on the coded training data mini-batch; obtain, from at least a portion of the set of client compute nodes, gradient updates to the global ML model computed by the client compute nodes on local training data; aggregate the gradient updates; and update the global ML model based on the aggregated gradient updates.

Example EA1 includes an apparatus of an edge computing node to be operated in an edge computing network, the apparatus including an interconnect interface to connect the apparatus to one or more components of the edge computing node, and a processor to perform rounds of a federated machine learning training within an edge computing network including: grouping clients from a plurality of available clients into respective sets of clients based on compute capabilities and communication capabilities of each of the available clients;

selecting a candidate set of clients to participate in said round of the federated machine learning training, the candidate set of clients being from the respective sets of clients and further being selected based on a round robin approach, or based at least on one of a data distribution of each client of the candidate set or a determination that a global model of the machine learning training at the edge computing node has reached a minimum accuracy threshold; causing the global model to be sent to the candidate set of clients; and processing information on updated model weights for the federated machine learning training, the information being from clients of the candidate set of clients; and updating the global model based on processing the information.

Example EA2 includes the subject matter of Example EA1, and optionally, wherein the compute capabilities include a compute rate and the communication capabilities include an uplink communication time to the edge computing node.

Example EA3 includes the subject matter of any one of Examples EA1-EA2, and optionally, the processor further to cause transmission of a client capability request to the available clients prior to grouping, and processing client capability reports from the available clients on the compute capabilities and the communication capabilities of each of the available clients, the client capability reports sent in response to the client capability request, processing client capability reports including computing a total upload time for the available clients.

Example EA4 includes the subject matter of Example EA3, and optionally, wherein the client capability reports further include information on a number of training examples at each of the available clients.

Example EA5 includes the subject matter of any one of Examples EA3-EA4, and optionally, the process to further maintain a time since a last processing of the information from the available clients, cause transmission of a client capability update request to the available clients based on the time since the last processing prior to a next grouping, and process updated client capability reports from the available clients in response to the update request on the compute capabilities and the communication capabilities of each of the available clients, processing client capability reports including computing a total updated upload time for the available clients.

Example EA6 includes the subject matter of any one of Examples EA3-EA4, and optionally, wherein the client capability reports from the available clients are one-time client capability reports, the processor further to estimate current client capabilities of the available clients based on the client capability reports.

Example EA7 includes the subject matter of any one of Examples EA1-EA6, and optionally, the processor to further select a candidate set of clients is based on a determination as to whether the data distribution of each client of the candidate set shows non-independent and identically distributed data (non-i.i.d.).

Example EA8 includes the subject matter of any one of Examples EA1-EA7, and optionally, wherein the edge computing node is a server, such as a MEC server.

Example EM1 includes a method to be performed at an apparatus of an edge computing node to be operated in an edge computing network, the method including performing a round of a federated machine learning training within the edge computing network including: grouping clients from a plurality of available clients into respective sets of clients based on compute capabilities and communication capabilities of each of the available clients; selecting a candidate set of clients to participate in said round of the federated machine learning training, the candidate set of clients being selected from the respective sets of clients and further being selected based on a round robin approach, or based at least on one of a data distribution of each client of the candidate set or a determination that a global model of the machine learning training at the edge computing node has reached a minimum accuracy threshold; causing the global model to be sent to the candidate set of clients; and processing information on updated model weights for the federated machine learning training, the information being from clients of the candidate set of clients; and updating the global model based on processing the information.

Example EM2 includes the subject matter of Example EM1, and optionally, wherein the compute capabilities include a compute rate and the communication capabilities include one of an uplink communication time to the edge computing node or an uplink communication time and a downlink communication time with the edge computing node.

Example EM3 includes the subject matter of any one of Examples EM1-EM2, and optionally, wherein the method further includes causing transmission of a client capability request to the available clients prior to grouping, and processing client capability reports from the available clients on the compute capabilities and the communication capabilities of each of the available clients, the client capability reports sent in response to the client capability request, processing client capability reports including computing a total upload time for the available clients.

Example EM4 includes the subject matter of Example EM3, wherein the client capability reports further include information on a number of training examples at each of the available clients.

Example EM5 includes the subject matter of any one of Examples EM3-EM4, and optionally, further including maintaining a time since a last processing of the information from the available clients, causing transmission of a client capability update request to the available clients based on the time since the last processing prior to a next grouping, and processing updated client capability reports from the available clients in response to the update request on the compute capabilities and the communication capabilities of each of the available clients, processing client capability reports including computing a total updated upload time for the available clients.

Example EM6 includes the subject matter of any one of Examples EM3-EM4, wherein the client capability reports from the available clients are one-time client capability reports, the method further including estimating current client capabilities of the available clients based on the client capability reports.

Example EM7 includes the subject matter of any one of Examples EM1-EM6, wherein selecting a candidate set of clients is based on a determination as to whether the data distribution of each client of the candidate set shows non-independent and identically distributed data (non-i.i.d.).

Example EM8 includes the subject matter of any one of Examples EM1-EM7, and/or some example(s) herein, and optionally, wherein the edge computing node is a server, such as a MEC server.

Example EAA1 includes an apparatus of an edge computing node to be operated in an edge computing network, the apparatus including an interconnect interface to connect the apparatus to one or more components of the edge computing node, and a processor to perform rounds of federated machine learning training including: processing a capability request from a second edge computing node of the edge computing network; generating a capability report on compute capabilities and communication capabilities of the edge computing node in response to the capability request; causing transmission of the capability report to the server;

after causing transmission, processing information on a global model from the second edge computing node to initialize training parameters of a federated machine learning training round with the second edge computing node; and reporting updated model weights based on the global model for the federated machine learning training round.

Example EAA2 includes the subject matter of Example EAA1, and optionally, wherein the compute capabilities include a compute rate and the communication capabilities include one of an uplink communication time to the second edge computing node or both an uplink communication time and a downlink communication time with the second edge computing node.

Example EAA3 includes the subject matter of any one of Examples EAA1-EAA2, and optionally, wherein the capability report further includes information on a number of training examples at the client.

Example EAA4 includes the subject matter of any one of Examples EAA1-EAA3, the processor further to: process a capability update request from the server; and generate an updated capability report in response to the update request on the compute capabilities and the communication capabilities of the first edge computing node.

Example EAA5 includes the subject matter of any one of Examples EAA1-EAA4, the process further to determine the updated model weights using a gradient-based approach.

Example EAA6 includes the subject matter of any one of Examples EAA1-EAA5, and optionally, wherein a data distribution of the first edge computing node corresponds to a non-independent and identically distributed (non-i.i.d.) data distribution.

Example EAA7 includes the subject matter of any one of Examples EAA1-EAA6, and optionally, wherein the first edge computing node is a client, and the second edge computing node is a server such as a MEC server.

Example EMM1 includes a method to be performed at an apparatus of a first edge computing node in an edge computing network, the method including performing a round of a federated machine learning training within the edge computing network including: processing a capability request from a second edge computing node of the edge computing network; generating a capability report on compute capabilities and communication capabilities of the edge computing node in response to the capability request; causing transmission of the capability report to the server; after causing transmission, processing information on a global model from the second edge computing node to initialize training parameters of a federated machine learning training round with the second edge computing node; and reporting updated model weights based on the global model for the federated machine learning training round.

Example EMM2 includes the subject matter of Example EMM1, and optionally, wherein the compute capabilities include a compute rate and the communication capabilities include an uplink communication time to the second edge computing node.

Example EMM3 includes the subject matter of any one of Examples EMM1 EMM2, and optionally, wherein the capability report further includes information on a number of training examples at the client.

Example EMM4 includes the subject matter of any one of Examples EMM1-EMM3, further including: processing a capability update request from the server; and generating an updated capability report in response to the update request on the compute capabilities and the communication capabilities of the first edge computing node.

Example EMM5 includes the subject matter of any one of Examples EMM1-EMM4, further including determining the updated model weights using a gradient-based approach.

Example EMM6 includes the subject matter of any one of Examples EMM1-EMM5, and optionally, wherein a data distribution of the first edge computing node corresponds to a non-independent and identically distributed (non-i.i.d.) data distribution.

Example EMM7 includes the subject matter of any one of Examples EMM1-EMM6, and optionally, wherein the first edge computing node is a client, and the second edge computing node is a server such as a MEC server.

Example FA1 includes an apparatus of an edge computing node to be operated in an edge computing network, the apparatus including an interconnect interface to connect the apparatus to one or more components of the edge computing node, and a processor to perform rounds of federated machine learning training including: processing capability reports from a plurality of clients of the edge computing network, the reports including at least one of information based on training losses of respective ones of said clients for an epoch of the training, or information based on gradients of respective ones of said clients with respect to a pre-activation output of respective ones of said clients; rank ordering the clients based on one of their training losses or their gradients; selecting a candidate set of clients from the plurality of clients for a next epoch of the federated machine learning training, selecting the candidate set including selecting a number of clients with highest training losses or highest gradients as the candidate set; causing an updated global model to be sent to the candidate set of clients for the next epoch; and performing the federated machine learning training on the candidate set of clients.

Example FA2 includes the subject matter of FA1, the processor to further, prior to processing the capability reports, cause dissemination, to the plurality of clients of the edge computing network, of a global model corresponding to an epoch of a federated machine learning training.

Example FA3 includes the subject matter of FA1-FA2, and optionally, wherein selecting a number of clients with highest training losses or highest gradients as the candidate set includes selecting a first number of clients with highest training losses or highest gradients as an intermediate set, and selecting a second number of clients from the intermediate set based on respective upload times of the first number of clients, the second number of clients corresponding to the candidate set.

Example FA4 includes the subject matter of any one of Examples FA1-FA3, and optionally, wherein the capability reports further include compute rates uplink communication times.

Example FA5 includes the subject matter of any one of Examples FA1-FA4, the processor to further cause transmission of a capability request to the available clients.

Example FA6 includes the subject matter of any one of Examples FA1-FA5, and optionally, wherein the capability reports further include information on a number of training examples at each of the available clients.

Example FA7 includes the subject matter of any one of Examples FA1-FA6, the processor to further maintain a time since a last processing of the information from the available clients, cause transmission of a capability update request to the available clients based on the time since the last processing prior to a next grouping, and process updated capability reports from the available clients in response to the update request on the compute capabilities and the communication capabilities of each of the available clients, processing capability reports including computing a total updated upload time for the available clients.

Example FA8 includes the subject matter of any one of Examples FA1-FA7, and optionally, wherein the capability reports from the available clients are one-time capability reports, the processor to further estimate current client capabilities of the available clients based on the capability reports.

Example FA9 includes the subject matter of any one of Examples FA1-FA8, and optionally, wherein selecting a candidate set of clients is based on a determination as to whether the data distribution of each client of the candidate set shows non-independent and identically distributed data (non-i.i.d.).

Example FA10 includes the subject matter of any one of Examples FA1-FA9, the processor to further select a candidate set of clients from the plurality of clients for one or more epochs subsequent to said next epoch based on the training losses.

Example FA11 includes the subject matter of any one of Examples FA1-FA10, and optionally, wherein the edge computing node includes a server, such as a MEC server.

Example FM1 includes a method to perform federated machine learning training at an apparatus of an edge computing node to be operated in an edge computing network, the method including: processing capability reports from a plurality of clients of the edge computing network, the reports including at least one of information based on training losses of respective ones of said clients for an epoch of the training, or information based on gradients of respective ones of said clients with respect to a pre-activation output of respective ones of said clients; rank ordering the clients based on one of their training losses or their gradients; selecting a candidate set of clients from the plurality of clients for a next epoch of the federated machine learning training, selecting the candidate set including selecting a number of clients with highest training losses or highest gradients as the candidate set; causing an updated global model to be sent to the candidate set of clients for the next epoch; and performing the federated machine learning training on the candidate set of clients.

Example FM2 includes the subject matter of Example FM1, further including, prior to processing the capability reports, causing dissemination, to the plurality of clients of the edge computing network, of a global model corresponding to an epoch of a federated machine learning training.

Example FM3 includes the subject matter of any one of Examples FM1-FM2, and optionally, wherein selecting a number of clients with highest training losses or highest gradients as the candidate set includes selecting a first number of clients with highest training losses or highest gradients as an intermediate set, and selecting a second number of clients from the intermediate set based on respective upload times of the first number of clients, the second number of clients corresponding to the candidate set.

Example FM4 includes the subject matter of any one of Examples FM1-FM3, and optionally, wherein the capability reports further include compute rates uplink communication times.

Example FM5 includes the subject matter of any one of Examples FM1-FM4, and optionally, wherein the method further includes causing transmission of a capability request to the available clients.

Example FM6 includes the subject matter of any one of Examples FM1-FM5, and optionally, wherein the capability reports further include information on a number of training examples at each of the available clients.

Example FM7 includes the subject matter of any one of Examples FM1-FM6, further including maintaining a time since a last processing of the information from the available clients, causing transmission of a capability update request to the available clients based on the time since the last processing prior to a next grouping, and processing updated capability reports from the available clients in response to the update request on the compute capabilities and the communication capabilities of each of the available clients, processing capability reports including computing a total updated upload time for the available clients.

Example FM8 includes the subject matter of any one of Examples FM1-FM7, and optionally, wherein the capability reports from the available clients are one-time capability reports, the method further including estimating current client capabilities of the available clients based on the capability reports.

Example FM9 includes the subject matter of any one of Examples FM1-FM8, and optionally, wherein selecting a candidate set of clients is based on a determination as to whether the data distribution of each client of the candidate set shows non-independent and identically distributed data (non-i.i.d.).

Example FM10 includes the subject matter of any one of Examples FM1-FM9, further including selecting a candidate set of clients from the plurality of clients for one or more epochs subsequent to said next epoch based on the training losses.

Example FM11 includes the subject matter of any one of Examples FM1-FM10, and optionally, wherein the edge computing node includes a server, such as a MEC server.

Example FAA1 includes an apparatus of a first edge computing node to be operated in an edge computing network, including an interconnect interface to connect to one or more components of the edge computing node, and a processor to: encode, for transmission to a second edge computing node of the edge computing network, a capability report, the second edge computing node to perform rounds of federated machine learning training, the report including at least one of information based on a training loss of the first edge computing node for an epoch of the training, or information based on a gradient of the first edge computing node with respect to a pre-activation output of the first edge computing node; cause transmission of the capability report; and for a next epoch of the federated machine learning training, decode an updated global model from the second edge computing node.

Example FAA2 includes the subject matter of Example FAA1, the processor to further, prior to causing transmission of the capability report, decode a global model corresponding to an epoch of the federated machine learning training.

Example FAA3 includes the subject matter of any one of Examples FAA1-FAA2, wherein the capability report further includes a compute rate, and at least one of an uplink communication time or a downlink communication time for communication with the second edge computing node.

Example FAA4 includes the subject matter of any one of Examples FAA1-FAA3, the processor to decode a capability request from the second edge computing node prior to encoding the capability report.

Example FAA5 includes the subject matter of any one of Examples FAA1-FAA4, wherein the capability report further includes information on a number of training examples at the first edge computing node.

Example FAA6 includes the subject matter of any one of Examples FAA1-FAA5, the processor to further: decode a capability update request from the second edge computing node; encode for transmission to the second edge computing node an updated capability report in response to the update request, the updated capability report including information on compute capabilities and communication capabilities of the first edge computing node; and cause transmission of the updated capability report to the second edge computing node.

Example FAA7 includes the subject matter of any one of Examples FA1-FA10, wherein the first edge computing node includes a mobile client computing node.

Example FMM1 includes a method to be performed at an apparatus of a first edge computing node in an edge computing network, including: encoding, for transmission to a second edge computing node of the edge computing network, a capability report, the second edge computing node to perform rounds of federated machine learning training, the report including at least one of information based on a training loss of the first edge computing node for an epoch of the training, or information based on a gradient of the first edge computing node with respect to a pre-activation output of the first edge computing node; causing transmission of the capability report; and for a next epoch of the federated machine learning training, decoding an updated global model from the second edge computing node.

Example FMM2 includes the subject matter of Example FMM1, including, prior to causing transmission of the capability report, decoding a global model corresponding to an epoch of the federated machine learning training.

Example FMM3 includes the subject matter of any one of Examples FMM1-FMM2, wherein the capability report further includes a compute rate, and at least one of an uplink communication time or a downlink communication time for communication with the second edge computing node.

Example FMM4 includes the subject matter of any one of Examples FMM1-FMM3, further including decoding a capability request from the second edge computing node prior to encoding the capability report.

Example FMM5 includes the subject matter of any one of Examples FMM1-FMM4, wherein the capability report further includes information on a number of training examples at the first edge computing node.

Example FMM6 includes the subject matter of any one of Examples FMM1-FMM5, further including: decoding a capability update request from the second edge computing node; encoding for transmission to the second edge computing node an updated capability report in response to the update request, the updated capability report including information on compute capabilities and communication capabilities of the first edge computing node; and causing transmission of the updated capability report to the second edge computing node.

Example FMM7 includes the subject matter of any one of Examples FA1-FA10, wherein the first edge computing node includes a mobile client computing node.

Example GA1 includes an apparatus of an edge computing node to be operated in an edge computing network, the apparatus including an interconnect interface to connect the apparatus to one or more components of the edge computing node, and a processor to perform rounds of federated machine learning training including: causing dissemination, to a plurality of clients of the edge computing network, of a target data distribution at the edge computing node for federated machine learning training; processing client reports from the clients, each of the respective reports being based on a divergence between a local data distribution of a respective one of the clients and the target data distribution; assigning a respective weight to each respective divergence based on a size of the divergence, with higher divergences having higher weights; selecting a candidate set of clients from the plurality of clients for an epoch of the federated machine learning training, selecting the candidate set including using a round robin approach based on the weights; causing a global model to be sent to the candidate set of clients; and performing the federated machine learning training on the candidate set of clients.

Example GA2 includes the subject matter of Example GA1, and optionally, wherein the divergence corresponding to each client is based on one of a Kullback-Leibler divergence or a distance of the probability distributions between a local data distribution of said each client and the target data distribution.

Example GA3 includes the subject matter of any one of Examples GA1-GA2, and optionally, wherein selecting a candidate set of clients is based on a determination as to whether the data distribution of each client of the candidate set shows non-independent and identically distributed data (non-i.i.d.).

Example GA4 includes the subject matter of any one of Examples GA1-GA3, and optionally, wherein the edge computing node is a server such as a MEC server.

Example GAA1 includes an apparatus of an edge computing node to be operated in an edge computing network, the apparatus including an interconnect interface to connect the apparatus to one or more components of the edge computing node, and a processor to, for each global epoch of a federated machine learning training within the edge computing network: cause dissemination, to a plurality of clients of the edge computing network, of a global model; process weighted loss information from each of the clients; determine a probability distribution q for each of the clients based on the weighted loss information from corresponding ones of said each of the clients, and optionally, wherein q is further based on an amount of data at said each of the clients, and a weight matrix for the federated machine learning training for said each of the clients for the global epoch; select a candidate set of clients from the plurality of clients for a next global epoch of the federated machine learning training, selecting the candidate set including selecting a number of clients with highest probability distribution q as the candidate set; processing, from each of the clients, for each local epoch of the global epoch, a local weight update $w_{k,t+e}=w_{k,t+e-1}-\eta*g_{k,t+e}*p_k/q_k$, where $w_{k,t+e}$ corresponds to a weight update of client k at global epoch t and local epoch e, $\eta$ is a learning rate, $g_{k,t+e}$ corresponds to a gradient estimate for client k at global epoch t and local epoch e, $P_k$ corresponds to an original sampling distribution of client k, and q is the probability distribution for client k; and determining a global weight based on local weight updates from each of the clients.

Example GAA2 includes the subject matter of Example GAA1, further including processing capability reports from the clients, the reports including at least one of communication time or compute time for the epoch, and determining update times for each of the clients based on respective ones of the reports.

Example GAA3 includes the subject matter of any one of Examples GAA1-GAA2, and optionally, wherein the edge computing node includes a server, such as a MEC server.

Example GM1 includes method to be performed at an apparatus of a edge computing node in an edge computing network, the method including performing rounds of federated machine learning training including: causing dissemination, to a plurality of clients of the edge computing network, of a target data distribution at the edge computing node for federated machine learning training; processing client reports from the clients, each of the respective reports being based on a divergence between a local data distribution of a respective one of the clients and the target data distribution; assigning a respective weight to each respective divergence based on a size of the divergence, with higher divergences having higher weights; selecting a candidate set of clients from the plurality of clients for an epoch of the federated machine learning training, selecting the candidate set including using a round robin approach based on the weights; causing a global model to be sent to the candidate set of clients; and performing the federated machine learning training on the candidate set of clients.

Example GM2 includes the subject matter of Example GM1, and optionally, wherein the divergence corresponding to each client is based on one of a Kullback-Leibler divergence or a distance of the probability distributions between a local data distribution of said each client and the target data distribution.

Example GM3 includes the subject matter of any one of Examples GM1-GM2, and optionally, wherein selecting a candidate set of clients is based on a determination as to whether the data distribution of each client of the candidate set shows non-independent and identically distributed data (non-i.i.d.).

Example GM4 includes the subject matter of any one of Examples GM1-GM2, and optionally, wherein the edge computing node is a server such as a MEC server.

Example GMM1 includes a method to be performed at an apparatus of an edge computing node to be operated in an edge computing network, the method including, for each global epoch of a federated machine learning training within the edge computing network: causing dissemination, to a plurality of clients of the edge computing network, of a global model; processing weighted loss information from each of the clients; determining a probability distribution q for each of the clients based on the weighted loss information from corresponding ones of said each of the clients, and optionally, wherein q is further based on an amount of data at said each of the clients, and a weight matrix for the federated machine learning training for said each of the clients for the global epoch; selecting a candidate set of clients from the plurality of clients for a next global epoch of the federated machine learning training, selecting the candidate set including selecting a number of clients with highest probability distribution q as the candidate set; processing, from each of the clients, for each local epoch of the global epoch, a local weight update $w_{k,t+e}=w_{k,t+e-1}-\eta*g_{k,t+e}*p_k/q_k$, where $w_{k,t+e}$ corresponds to a weight update of client k at global epoch t and local epoch e, $\eta$ is a learning rate, $g_{k,t+e}$ corresponds to a gradient estimate for client k at global epoch t and local epoch e, $p_k$ corresponds to an original sampling distribution of client k, and q is the probability distribution for client k; and determining a global weight based on local weight updates from each of the clients.

Example GMM2 includes the subject matter of Example GMM1, further including processing capability reports from the clients, the reports including at least one of communication time or compute time for the epoch, and determining update times for each of the clients based on respective ones of the reports.

Example GMM3 includes the subject matter of any one of Examples GMM1-GMM2, and optionally, wherein the edge computing node includes a server, such as a MEC server.

Example GAAA1 includes the subject matter of An apparatus of a first edge computing node to be operated in an edge computing network, the apparatus including an interconnect interface to connect the apparatus to one or more components of the first edge computing node, and a processor to: decode a first message from a second edge computing node, the first message including information on a target data distribution for federated machine learning training; determine the target data distribution from the first message; encode a client report for transmission to the second edge computing node based on a divergence between a local data distribution of the first edge computing node and the target data distribution; cause transmission of the client report to the second computing node; decode a second message from the second edge computing node, the second message including information on a global model for the federated machine learning training; and update a local gradient at the first edge computing node based on the global model.

Example GAAA2 includes the subject matter of Example GAAA1, wherein a data distribution at the apparatus corresponds to non-independent and identically distributed data (non-i.i.d.).

Example GAAA3 includes the subject matter of any one of Examples GAAA1-GAAA2, wherein the first edge computing node is a mobile client computing node.

Example GAAAA1 includes an apparatus of a first edge computing node to be operated in an edge computing network, the apparatus including an interconnect interface to connect the apparatus to one or more components of the first edge computing node, and a processor to: decode a message from a second edge computing node including information on a global model associated with each global epoch of a federated machine learning training performed by a second edge computing node in the edge computing network; encode weighted loss information for transmission to the second edge computing node; cause transmission of the weighted loss information to the second edge computing node; encode for transmission to the second edge computing node a local weight update $w_{k,t+e}=w_{k,t+e-1}-\eta^*g_{k,t+e}^*p_k/q_k$, where $w_{k,t+e}$ corresponds to a weight update of the first edge computing node at global epoch t and local epoch e, it is a learning rate, $g_{k,t+e}$ corresponds to a gradient estimate for the first edge computing node at global epoch t and local epoch e, $p_k$ corresponds to an original sampling distribution of the first edge computing node, and q is the probability distribution for the first edge computing node; and cause transmission of the local weight update to the second edge computing node.

Example GAAAA2 includes the subject matter of Example GAAAA1, further including encoding for transmission to the second client computing node a capability report, the report including at least one of communication time or compute time for the local epoch.

Example GAAAA3 includes the subject matter of any one of Examples GAAAA1-GAAAA2, wherein first the edge computing node is a mobile client computing node.

Example GMMM1 includes a method to be performed at an apparatus of a first edge computing node in an edge computing network, the method including: decoding a first message from a second edge computing node, the first message including information on a target data distribution for federated machine learning training; determining the target data distribution from the first message; encoding a client report for transmission to the second edge computing node based on a divergence between a local data distribution of the first edge computing node and the target data distribution; causing transmission of the client report to the second computing node; decoding a second message from the second edge computing node, the second message including information on a global model for the federated machine learning training; and updating a local gradient at the first edge computing node based on the global model.

Example GMMM2 includes the subject matter of Example GMMM1, wherein a data distribution at the apparatus corresponds to non-independent and identically distributed data (non-i.i.d.).

Example GMMM3 includes the subject matter of any one of Examples GMMM1-GMMM2, wherein the first edge computing node is a mobile client computing node.

Example GMMMM1 includes a method to be performed at an apparatus of a first edge computing node in an edge computing network, the method including: decoding a message from a second edge computing node including information on a global model associated with each global epoch of a federated machine learning training performed by a second edge computing node in the edge computing network; encoding weighted loss information for transmission to the second edge computing node; causing transmission of the weighted loss information to the second edge computing node; encoding for transmission to the second edge computing node a local weight update $w_{k,t+e}=W_{k,t+e-1}-\eta^*g_{k,t+e}^*p_k/q_k$, where $w_{k,t+e}$ corresponds to a weight update of the first edge computing node at global epoch t and local epoch e, $\eta$ is a learning rate, $g_{k,t+e}$ corresponds to a gradient estimate for the first edge computing node at global epoch t and local epoch e, $p_k$ corresponds to an original sampling distribution of the first edge computing node, and q is the probability distribution for the first edge computing node; and causing transmission of the local weight update to the second edge computing node.

Example GMMMM2 includes the subject matter of the Example GMMMM1, further including encoding for transmission to the second client computing node a capability report, the report including at least one of communication time or compute time for the local epoch.

Example GMMMM3 includes the subject matter of any one of Examples GMMMM1-GMMMM2, wherein the first edge computing node is a mobile client computing node.

Example HM1 includes a method to be performed at an apparatus of central server node in an edge computing environment to provide for coded federated learning (CFL) of a global machine learning (ML) model, the method comprising: obtaining, from each of a set of client computing nodes of the edge computing environment, a maximum coding redundancy value for the CFL; determining a coding redundancy value based on the maximum coding redundancy values received from the edge computing devices; determining an epoch time and a number of data points to be processed at each edge computing device during each coded federated learning epoch based on the selected coding redundancy value; and transmitting the determined coding redundancy value, epoch time, and number of data points to be processed at each edge computing device to the set of edge computing devices.

Example HM2 includes the subject matter of Example HM1 and/or other Example(s) herein and, optionally, wherein determining the coding redundancy value comprises selecting a minimum value of the set of maximum coding redundancy values received from the edge computing devices.

Example HM3 includes the subject matter of Example HM1 and/or other Example(s) herein and, optionally, wherein determining the coding redundancy value comprises selecting a maximum value of the set of maximum coding redundancy values received from the edge computing devices.

Example HM4 includes the subject matter of any one of Examples HM1-HM3 and/or other Example(s) herein and, optionally, further comprising: receiving one or more coded data sets based on the transmitted determined epoch time and number of data points to be processed at each edge computing device, the coded data sets based on raw data sets of the edge computing devices; determining a gradient update to a global machine learning model based on the coded data sets; and updating the global ML model based on the gradient update.

Example HM5 includes the subject matter of Example HM4 and/or other Example(s) herein and, optionally, wherein the one or more coded data sets includes coded data sets obtained from the edge computing devices.

Example HM6 includes the subject matter of Example HM4 and/or other Example(s) herein and, optionally, wherein the one or more coded data sets includes a coded data set received from a trusted server of the edge computing environment.

Example HM7 includes the subject matter of any one of Examples HM4-HM6 and/or other Example(s) herein and, optionally, further comprising receiving gradient updates to the global ML model from the edge computing devices, wherein updating the global model is further based on the gradient updates received from the edge computing devices.

Example HA1 includes an apparatus of an edge computing node, the apparatus comprising an interconnect interface to connect the apparatus to one or more components of the edge computing node, and a processor to: obtain, from each of a set of client computing nodes of the edge computing environment, a maximum coding redundancy value for a coded federated learning (CFL) cycle to be performed on a global machine learning (ML) model; determine a coding redundancy value based on the maximum coding redundancy values received from the edge computing devices; determine an epoch time and a number of data points to be processed at each edge computing device during each epoch of the CFL cycle based on the selected coding redundancy value; and cause the determined coding redundancy value, epoch time, and number of data points to be processed at each edge computing device to be transmitted to the set of edge computing devices.

Example HA2 includes the subject matter of Example HA1 and/or other Example(s) herein and, optionally, wherein the processor is to determine the coding redundancy value by selecting a minimum value of the set of maximum coding redundancy values received from the edge computing devices.

Example HA3 includes the subject matter of Example HA1 and/or other Example(s) herein and, optionally, wherein the processor is to determine the coding redundancy value by selecting a maximum value of the set of maximum coding redundancy values received from the edge computing devices.

Example HA4 includes the subject matter of any one of Examples HA1-HA3 and/or other Example(s) herein and, optionally, wherein the processor is further to: access one or more coded data sets based on the transmitted determined epoch time and number of data points to be processed at each edge computing device, the coded data sets based on raw data sets of the edge computing devices; determine a gradient update to a global machine learning model based on the coded data sets; and update the global ML model based on the gradient update.

Example HA5 includes the subject matter of Example HA4 and/or other Example(s) herein and, optionally, wherein the one or more coded data sets includes coded data sets obtained from the edge computing devices.

Example HA6 includes the subject matter of Example HA4 and/or other Example(s) herein and, optionally, wherein the one or more coded data sets includes a coded data set received from a trusted server of the edge computing environment.

Example HA7 includes the subject matter of Example HA4-HA6 and/or other Example(s) herein and, optionally wherein the processor is further to access gradient updates to the global ML model obtained from the edge computing devices, and update the global model based on the gradient updates received from the edge computing devices.

Example HA8 includes the subject matter of any one of Examples HA1-HA7 and/or other Example(s) herein and, optionally, wherein the apparatus further comprises a transceiver to provide wireless communication between the apparatus and other edge computing nodes of a wireless edge network.

Example HMM1 includes a method to be performed at an apparatus of client computing node in an edge computing environment to provide for coded federated learning (CFL) of a global machine learning (ML) model, the method comprising: determining a maximum coding redundancy value for the client computing node; transmitting the maximum coding redundancy value to a central server of the edge computing environment; receiving, from the central server based on transmitting the maximum coding redundancy value, a coding redundancy value for performing the CFL, an epoch time, and a number of data points to be processed in each CFL epoch; determining a differential privacy parameter based on the received coding redundancy value, an epoch time, and a number of data points to be processed; generating a coded data set from a raw data set of the edge computing device based on the determined differential privacy parameter; and transmitting the coded data set to the central server.

Example HMM2 includes the subject matter of Example HMM1 and/or other Example(s) herein and, optionally, wherein transmitting the coded data set to the central server comprises transmitting the coded data set directly to the central server.

Example HMM3 includes the subject matter of Example HMM1 and/or other Example(s) herein and, optionally, wherein transmitting the coded data set to the central server comprises transmitting the coded data set to a trusted server of the edge computing environment.

Example HMM4 includes the subject matter of any one of Examples HMM1-HMM3 and/or other Example(s) herein and, optionally, wherein generating the coded data set from the raw data set comprises: generating a coding matrix based on a distribution; and generating a weighting matrix; wherein the coded data set is based on multiplying a matrix representing the raw data set with the coding matrix and the weighting matrix.

Example HMM5 includes the subject matter of any one of Examples HMM1-HMM4 and/or other Example(s) herein and, optionally, wherein generating the coded data set from the raw data set comprises deleting a portion of the raw data set before generating the coded data set.

Example HMM6 includes the subject matter of any one of Examples HMM1-HMM4 and/or other Example(s) herein and, optionally, wherein generating the coded data set from the raw data set comprises deleting a portion of the coded data set after generation.

Example HMM7 includes the subject matter of any one of Examples HMM1-HMM4 and/or other Example(s) herein and, optionally, wherein generating the coded data set from the raw data set comprises injecting noise into the raw data set before generating the coded data set.

Example HMM8 includes the subject matter of any one of Examples HMM1-HMM4 and/or other Example(s) herein and, optionally, wherein generating the coded data set from the raw data set comprises injecting noise into the coded data set after generation.

Example HMM9 includes the subject matter of any one of Examples HMM7-HMM8 and/or other Example(s) herein and, optionally, wherein the injected noise is based on a noise matrix received from a trusted server of the edge computing network.

Example HMM10 includes the subject matter of any one of Examples HMM7-HMM8 and/or other Example(s) herein and, optionally, wherein the injected noise is based on a coded privacy budget, the coded privacy budget determined from an overall privacy budget obtained from the central server.

Example HMM11 includes the subject matter of any one of Examples HMM1-HMM10 and/or other Example(s) herein and, optionally, The method of any one of claims [0668]-[0677][0679], further comprising: determining a gradient update to a global machine learning model based on the raw data set; and transmitting the gradient update to the central server.

Example HMM12 includes the subject matter of Example HMM11 and/or other Example(s) herein and, optionally, further comprising injecting noise into the gradient update, wherein the noise injected to the raw data set is based on an uncoded privacy budget determined from an overall privacy budget obtained from the central server.

Example HAA1 includes an apparatus of an edge computing node, the apparatus comprising an interconnect interface to connect the apparatus to one or more components of the edge computing node, and a processor to: determine a maximum coding redundancy value for the client computing node; cause the maximum coding redundancy value to be transmitted to a central server of an edge computing environment; obtain, from the central server based on transmitting the maximum coding redundancy value, a coding redundancy value for performing the CFL, an epoch time, and a number of data points to be processed in each CFL epoch; determine a differential privacy parameter based on the received coding redundancy value, an epoch time, and a number of data points to be processed; generate a coded data set from a raw data set of the edge computing device based on the determined differential privacy parameter; and cause the coded data set to be transmitted to the central server.

Example HAA2 includes the subject matter of Example HAA1 and/or other Example(s) herein and, optionally, wherein the processor is to cause the coded data set to be directly transmitted to the central server.

Example HAA3 includes the subject matter of Example HAA1 and/or other Example(s) herein and, optionally, wherein the processor is to cause the coded data set to be transmitted to a trusted server of the edge computing environment.

Example HAA4 includes the subject matter of any one of Examples HAA1-HAA3 and/or other Example(s) herein and, optionally, wherein the processor is to generate the coded data set from the raw data set by: generating a coding matrix based on a distribution; generating a weighting matrix; and multiplying a matrix representing the raw data set with the coding matrix and the weighting matrix.

Example HAA5 includes the subject matter of any one of Examples HAA1-HAA4 and/or other Example(s) herein and, optionally, wherein the processor is to generate the coded data set from the raw data set by deleting a portion of the raw data set before generating the coded data set.

Example HAA6 includes the subject matter of any one of Examples HAA1-HAA4 and/or other Example(s) herein and, optionally, wherein the processor is to generate the coded data set from the raw data set by deleting a portion of the coded data set after generation.

Example HAA7 includes the subject matter of any one of Examples HAA1-HAA4 and/or other Example(s) herein and, optionally, wherein the processor is to generate the coded data set from the raw data set by injecting noise into the raw data set before generating the coded data set.

Example HAA8 includes the subject matter of any one of Examples HAA1-HAA4 and/or other Example(s) herein and, optionally, wherein the processor is to generate the coded data set from the raw data set by injecting noise into the coded data set after generation.

Example HAA9 includes the subject matter of any one of Examples HAA7-HAA8 and/or other Example(s) herein and, optionally, wherein the processor is to inject a noise matrix received from a trusted server of the edge computing network.

Example HAA10 includes the subject matter of any one of Examples HAA7-HAA8 and/or other Example(s) herein and, optionally, wherein the processor is to inject a noise matrix that is based on a coded privacy budget, the coded privacy budget determined from an overall privacy budget obtained from the central server.

Example HAA11 includes the subject matter of any one of Examples HAA1-HAA10 and/or other Example(s) herein and, optionally, wherein the processor is further to: determining a gradient update to a global machine learning model based on the raw data set; and transmitting the gradient update to the central server.

Example HAA12 includes the subject matter of Example HAA11 and/or other Example(s) herein and, optionally, wherein the processor is further to inject noise into the gradient update, wherein the noise injected to the raw data set is based on an uncoded privacy budget determined from an overall privacy budget obtained from the central server.

Example HAA13 includes the subject matter of any one of Examples HAA1-HAA12 and/or other Example(s) herein and, optionally, wherein the apparatus further comprises a transceiver to provide wireless communication between the apparatus and other edge computing nodes of a wireless edge network.

Example HMMM1 includes a method comprising: receiving, at a trusted server of an edge computing environment, raw data sets from each of a plurality of client computing nodes of the edge computing environment; generating a coded data set based on the raw data sets; transmitting the coded data set to a central server of the edge computing environment for use in a coded federated learning epoch.

Example HMMM2 includes the subject matter of Example HMMM1 and/or other Example(s) herein and, optionally, wherein generating the coded data set based on the raw data set comprises: generating a coding matrix based on a distribution; and generating a weighting matrix; wherein the coded data set is based on multiplying a matrix representing the raw data set with the coding matrix and the weighting matrix.

Example HMMM3 includes the subject matter of Example HMMM1 or HMMM2 and/or other Example(s) herein and, optionally, wherein generating the coded data set from the raw data set comprises deleting a portion of the raw data set before generating the coded data set.

Example HMMM4 includes the subject matter of Example HMMM1 or HMMM2 and/or other Example(s) herein and, optionally, wherein generating the coded data set from the raw data set comprises deleting a portion of the coded data set after generation.

Example HMMM5 includes the subject matter of Example HMMM1 or HMMM2 and/or other Example(s) herein and, optionally, wherein generating the coded data set from the raw data set comprises injecting noise into the raw data set before generating the coded data set.

Example HMMM6 includes the subject matter of Example HMMM1 or HMMM2 and/or other Example(s) herein and, optionally, wherein generating the coded data set from the raw data set comprises injecting noise into the coded data set after generation.

Example HMMM7 includes the subject matter of any one of Examples HMMM1-HMMM6 and/or other Example(s) herein and, optionally, wherein the raw data sets received from the client computing nodes are encrypted, and the method further comprises decrypting the raw data sets before generating the coded data set.

Example HAAA1 includes an apparatus of an edge computing node, the apparatus comprising an interconnect interface to connect the apparatus to one or more components of the edge computing node, and a processor to: obtain raw data sets from each of a plurality of client computing nodes of the edge computing environment; generating a coded data set based on the raw data sets; transmitting the coded data set to a central server of the edge computing environment for use in a coded federated learning epoch.

Example HAAA2 includes the subject matter of Example HAAA1 and/or other Example(s) herein and, optionally, wherein the processor is to generate the coded data set based on the raw data set by: generating a coding matrix based on a distribution; generating a weighting matrix; and multiplying a matrix representing the raw data set with the coding matrix and the weighting matrix.

Example HAAA3 includes the subject matter of Example HAAA1 or HAAA2 and/or other Example(s) herein and, optionally, wherein the processor is to generate the coded data set from the raw data set by deleting a portion of the raw data set before generating the coded data set.

Example HAAA4 includes the subject matter of Example HAAA1 or HAAA2 and/or other Example(s) herein and, optionally, wherein the processor is to generate the coded data set from the raw data set by deleting a portion of the coded data set after generation.

Example HAAA5 includes the subject matter of Example HAAA1 or HAAA2 and/or other Example(s) herein and, optionally, wherein the processor is to generate the coded data set from the raw data set by injecting noise into the raw data set before generating the coded data set.

Example HAAA6 includes the subject matter of Example HAAA1 or HAAA2 and/or other Example(s) herein and, optionally, wherein the processor is to generate the coded data set from the raw data set comprises injecting noise into the coded data set after generation.

Example HAAA7 includes the subject matter of any one of Examples HAAA1-HAAA6 and/or other Example(s) herein and, optionally, wherein the raw data sets received from the client computing nodes are encrypted, and the processor is further to decrypt the raw data sets before generating the coded data set.

Example HAAA8 includes the subject matter of any one of Examples HAAA1-HAAA7 and/or other Example(s) herein and, optionally, wherein the apparatus further comprises a transceiver to provide wireless communication between the apparatus and other edge computing nodes of a wireless edge network.

Example IM1 includes a method to be performed at an apparatus of a client computing node in an edge computing environment to provide for coded federated learning (CFL) of a global machine learning (ML) model, the method comprising: receiving, from a central server of an edge computing environment, a differential privacy guarantee for a CFL cycle and a global ML model on which to perform the CFL cycle; determining a coded privacy budget and an uncoded privacy budget based on the differential privacy guarantee; generating a coded data set from a raw data set of the client computing node based on the coded privacy budget; transmitting the coded data set to the central server; performing a CFL cycle on the global ML model, wherein performing the CFL cycle comprises: computing an update to the global ML model based on the raw data set and the uncoded privacy budget; and transmitting the update to the global ML model to the central server.

Example IM2 includes the subject matter of Example IM1 and/or other Example(s) herein and, optionally, wherein generating the coded data set comprises injecting noise into the coded data set.

Example IM3 includes the subject matter of Example IM2 and/or other Example(s) herein and, optionally, wherein injecting noise into the coded data set comprises adding a noise matrix to the coded data set, the noise matrix based on the coded privacy budget.

Example IM4 includes the subject matter of Example IM3 and/or other Example(s) herein and, optionally, wherein the noise matrix comprises values sampled independently from a zero mean Gaussian distribution.

Example IM5 includes the subject matter of Example IM1 and/or other Example(s) herein and, optionally, wherein computing the update to the global ML model comprises injecting noise into the update to the global ML model.

Example IM6 includes the subject matter of Example IM5 and/or other Example(s) herein and, optionally, wherein injecting noise into the update to the global ML model comprises adding a noise matrix to the update to the global ML model, the noise matrix based on the uncoded privacy budget.

Example IM7 includes the subject matter of Example IM6 and/or other Example(s) herein and, optionally, wherein the noise matrix comprises values sampled independently from a zero mean Gaussian distribution.

Example IM8 includes the subject matter of any one of Examples IM1-IM7 and/or other Example(s) herein and, optionally, wherein generating the coded data set comprises generating a coding matrix based on a distribution, wherein the coded data set is based on multiplying a matrix representing the raw data set with the coding matrix.

Example IM9 includes the subject matter of Example IM8 and/or other Example(s) herein and, optionally, wherein the coding matrix is generated by sampling a standard normal distribution $N(0, 1)$.

Example IM10 includes the subject matter of any one of Examples IM1-IM9 and/or other Example(s) herein and, optionally, wherein computing the update to the global ML model comprises computing a gradient to the global ML model via gradient descent.

Example IA1 includes an apparatus of an edge computing node, the apparatus comprising an interconnect interface to connect the apparatus to one or more components of the edge computing node, and a processor to: determine a coded privacy budget and an uncoded privacy budget based on a differential privacy guarantee for a coded federated learning (CFL) cycle and a global machine learning (ML) model on which to perform the CFL cycle; generate a coded data set from a raw data set of the edge computing node based on the coded privacy budget; cause the coded data set to be transmitted the central server; perform a CFL cycle on the global ML model, wherein the processor is to perform the CFL cycle by: computing an update to the global ML model based on the raw data set and the uncoded privacy budget; and transmitting the update to the global ML model to the central server.

Example IA2 includes the subject matter of Example IA1 and/or other Example(s) herein and, optionally, wherein the processor is further to inject noise into the coded data set.

Example IA3 includes the subject matter of Example IA2 and/or other Example(s) herein and, optionally, wherein the processor is to inject noise into the coded data set by adding a noise matrix to the coded data set, the noise matrix based on the coded privacy budget.

Example IA4 includes the subject matter of Example IA3 and/or other Example(s) herein and, optionally, wherein the processor is to generate the noise matrix by independently sampling a zero mean Gaussian distribution.

Example IA5 includes the subject matter of Example IA1 and/or other Example(s) herein and, optionally, wherein the processor is further to inject noise into the update to the global ML model.

Example IA6 includes the subject matter of Example IA5 and/or other Example(s) herein and, optionally, wherein the processor is to inject noise into the update to the global ML model by adding a noise matrix to the update to the global ML model, the noise matrix based on the uncoded privacy budget.

Example IA7 includes the subject matter of Example IA6 and/or other Example(s) herein and, optionally, wherein the processor is to generate the noise matrix by independently sampling a zero mean Gaussian distribution.

Example IA8 includes the subject matter of any one of Examples IA1-IA7 and/or other Example(s) herein and, optionally, wherein the processor is to generate the coded data set by generating a coding matrix based on a distribution, wherein the coded data set is based on multiplying a matrix representing the raw data set with the coding matrix.

Example IA9 includes the subject matter of Example IA8 and/or other Example(s) herein and, optionally, wherein the processor is to generate the coding matrix by sampling a standard normal distribution $N(0, 1)$.

Example IA10 includes the subject matter of any one of Examples IA1-IA9 and/or other Example(s) herein and, optionally, wherein the processor is to compute the update to the global ML model by computing a gradient to the global ML model via gradient descent.

Example IA11 includes the subject matter of any one of Examples IA1-IA10 and/or other Example(s) herein and, optionally, wherein the apparatus further comprises a transceiver to provide wireless communication between the apparatus and other edge computing nodes of a wireless edge network.

IMMI1 includes a method comprising: obtaining, at a central server node from each of a set of client compute nodes, a coded data set; computing a gradient update to a global machine learning (ML) model based on the coded data set; obtaining, from at least a portion of the set of client compute nodes, gradient updates to the global ML model computed by the client compute nodes on local training data; aggregating the gradient updates; and updating the global ML model based on the aggregated gradient updates.

IAA1 includes an apparatus of an edge computing node, the apparatus comprising an interconnect interface to connect the apparatus to one or more components of the edge computing node, and a processor to: obtain, at a central server node from each of a set of client compute nodes, a coded data set; compute a gradient update to a global machine learning (ML) model based on the coded data set; obtain, from at least a portion of the set of client compute nodes, gradient updates to the global ML model computed by the client compute nodes on local training data; aggregate the gradient updates; and update the global ML model based on the aggregated gradient updates.

Example JA1 includes an apparatus of an edge computing node, the apparatus including an interconnect interface to connect the apparatus to one or more components of the edge computing node, and a processor to perform rounds of a federated machine learning training within an edge computing network, each round including: for a number of cycles E' of epoch number t: discarding an initial L clients from M clients sampled from N available clients, and optionally, wherein the initial L≤M and is based on one of a sampling distribution q, for datapoints at each client i within the M clients, or is based on a uniform sampling; selecting a subsequent L clients from remaining clients N−M or N−M+initial L clients, and optionally, wherein the subsequent L≤M and is based on an importance sampling distribution q, for datapoints at each client i of the remaining clients; determining load balancing parameters for the subsequent L clients; receiving coded data $\hat{X}_t$ from each client i of the subsequent L clients; after the number of cycles E', calculating a global weight $\beta^{(t+1)}$ corresponding to epoch number t+1, $\beta^{(t+1)}$ based on gradient $g_i^{(t)}$ for each client i of the K clients at epoch number t and further based on gradient $g_i^{(t+1)}$ for each client i of the K clients at epoch number t+1, and optionally, wherein $g_i^{(t)}$ is calculated using data points based on the load balancing parameters, and $g_i^{(t+1)}$ is calculated using $g_i^{(t)}$ and the coded data $\hat{X}_t$.

Example JA2 includes the subject matter of Example JA1, and optionally, wherein the load balancing parameters include t* and $l_i^*$ for all clients i of the subsequent L clients, and optionally, wherein t* is a time duration to be used by clients i to perform a gradient update operation, and $l_i^*$ is a number of datapoints to be used by each client i in the gradient update operation.

Example JA3 includes the subject matter of any one of Examples JA1-JA2, the processor to further, after the number of cycles E', cause the edge computing node to send a global weight $\beta^{(t)}$ corresponding to epoch number t to K clients selected from a last M clients, and optionally, wherein $g_i^{(t)}$ is further based on a global weight corresponding to epoch number t, $\beta^{(t)}$.

Example JA4 includes the subject matter of any one of Examples JA1-JA3, the processor to further, prior to the number of cycles E', receive $l_i$ from each client i of the N available clients, and optionally, wherein $l_i$ corresponds to a number of data points at each client i, calculate $p_i$ based on $l_i$, and optionally, wherein $p_i$ corresponds to a ratio of the number of data points at each client i divided by a number of data points for all clients i, and calculate $g_i^{(t+1)}$ based on $p_i/q_i$.

Example JA5 includes the subject matter of any one of Examples JA1-JA4, and optionally, wherein the coded data is based on one of a Gaussian coding matrix or a Bernoullian coding matrix.

Example JA6 includes the subject matter of any one of Examples JA1-JA5, the processor to further one of receive $q_i$ from each client i of the N clients prior to selecting the initial L clients, or calculate $q_i$.

Example JA7 includes the subject matter of any one of Examples JA1-JA6, and optionally, wherein the processor is to select K out of M uniformly.

Example JA8 includes the subject matter of any one of Examples JA1-JA7, and optionally, wherein receiving coded data from each client i includes receiving a number of coded data from each client i of N of available clients, the number of coded data based on $l_i$, $l_i^*$ and t*, and optionally, wherein $l_i$ corresponds to the number of raw datapoints at client i, $l_i^*$ corresponds to an optimal load representing a number of raw datapoints used by client i to maximize its average return metric, and t* corresponds to a time duration to be used by clients i to perform a gradient update operation.

Example JA9 includes the subject matter of Example JA8, and optionally, wherein coded data from each client i corresponds to data coded using random linear coding using a Gaussian generator matrix based on a number of coded data $c_i^*$ at each client i during time duration $t^*$, and optionally, wherein the Gaussian generator matrix is kept private from the apparatus.

Example JA10 includes the subject matter of any one of Examples JA1-JA9, and optionally, wherein the edge network is a wireless edge network.

Example JM1 includes a method to be performed at an apparatus of an edge computing node to be operated in an edge computing network, the method including performing rounds of a federated machine learning training within the edge computing network, including: for a number of cycles E' of epoch number t: discarding an initial L clients from M clients sampled from N available clients, and optionally, wherein the initial L≤M and is based on one of a sampling distribution $q_i$ for datapoints at each client i within the M clients, or is based on a uniform sampling; selecting a subsequent L clients from remaining clients N–M or N–M+ initial L clients, and optionally, wherein the subsequent L≤M and is based on an importance sampling distribution $q_i$ for datapoints at each client i of the remaining clients; determining load balancing parameters for the subsequent L clients; receiving coded data $\hat{X}_L$ from each client i of the subsequent L clients; after the number of cycles E', calculating a global weight $\beta^{(t+1)}$ corresponding to epoch number t+1, $\beta^{(t+1)}$ based on gradient $g_i^{(t)}$ for each client i of the K clients at epoch number t and further based on gradient $g_i^{(t+1)}$ for each client i of the K clients at epoch number t+1, and optionally, wherein $g_i^{(t)}$ is calculated using data points based on the load balancing parameters, and $g_i^{(t+1)}$ is calculated using $g_i^{(t)}$ and the coded data $\hat{X}_L$.

Example JM2 includes the subject matter of Example JM1, and optionally, wherein the load balancing parameters include $t^*$ and $l_i^*$ for all clients i of the subsequent L clients, and optionally, wherein $t^*$ is a time duration to be used by clients i to perform a gradient update operation, and $l_i^*$ is a number of datapoints to be used by each client i in the gradient update operation.

Example JM3 includes the subject matter of any one of Examples JM1-JM2, further including, after the number of cycles E', causing the edge computing node to send a global weight $\beta^{(t)}$ corresponding to epoch number t to K clients selected from a last M clients, and optionally, wherein $g_i^{(t)}$ is further based on a global weight corresponding to epoch number t, $\beta^{(t)}$.

Example JM4 includes the subject matter of any one of Examples JM1-JM3, further including, prior to the number of cycles E', receiving $l_i$ from each client i of the N available clients, and optionally, wherein $l_i$ corresponds to a number of data points at each client i, calculating $p_i$ based on $l_i$, and optionally, wherein p, corresponds to a ratio of the number of data points at each client i divided by a number of data points for all clients i, and calculating $g_i^{(t+1)}$ based on $p_i/q_i$.

Example JM5 includes the subject matter of any one of Examples JM1-JM4, and optionally, wherein the coded data is based on one of a Gaussian coding matrix or a Bernoullian coding matrix.

Example JM6 includes the subject matter of any one of Examples JM1-JM5, further including one of receiving $q_i$ from each client i of the N clients prior to selecting the initial L clients, or calculating $q_i$.

Example JM7 includes the subject matter of any one of Examples JM1-JM6, further including selecting K out of M uniformly.

Example JM8 includes the subject matter of any one of Examples JM1-JM7, and optionally, wherein receiving coded data from each client i includes receiving a number of coded data from each client i of N of available clients, the number of coded data based on $l_i$, $l_i^*$ and $t^*$, and optionally, wherein $l_i$ corresponds to the number of raw datapoints at client i, $l_i^*$ corresponds to an optimal load representing a number of raw datapoints used by client i to maximize its average return metric, and $t^*$ corresponds to a time duration to be used by clients i to perform a gradient update operation.

Example JM9 includes the subject matter of Example JM8, and optionally, wherein coded data from each client i corresponds to data coded using random linear coding using a Gaussian generator matrix based on a number of coded data $c_i^*$ at each client i during time duration $t^*$, and optionally, wherein the Gaussian generator matrix is kept private from the apparatus.

Example JM10 includes the subject matter of any one of Examples JM1-JM9, and optionally, wherein the edge network is a wireless edge network.

Example KA1 includes an apparatus of an edge computing node, the apparatus including an interconnect interface to connect the apparatus to one or more components of the edge computing node, and a processor to perform rounds of a federated machine learning training within an edge computing network, each round including: as a one stage operation, receiving a number of coded data from each client i of N available clients or of L clients, wherein L≤N, the number of coded data based on $l_i$, $l_i^*$ and $t^*$, wherein $l_i$ corresponds to the number of raw datapoints at client i, $l_i^*$ corresponds to an optimal load representing a number of raw datapoints used by client i to maximize its average return metric, and $t^*$ corresponds to a deadline time duration representing a smallest epoch time window within which the apparatus and the client i can jointly calculate a gradient; for every epoch number t and until time $t^*$: receiving local gradients $g_i(t)$ from $L_i^*(t^*)$ raw data points, wherein $l_i^*(t^*)$ corresponds to an optimal load representing a number of raw datapoints used by client i to maximize its average return metric during time $t^*$; calculating a global gradient based on a per client gradient from the coded data of each client i; on or after time $t^*$, calculating an updated global gradient from the global gradient calculated at each epoch number t.

Example KA2 includes the subject matter of Example KA1, and optionally, wherein coded data from each client i corresponds to data coded using random linear coding using a Gaussian generator matrix based on a number of coded data $c_i^*$ at each client i during time duration $t^*$, and optionally, wherein the Gaussian generator matrix is kept private from the apparatus.

Example KA3 includes the subject matter of any one of Examples KA1-KA2, and optionally, wherein calculating the global gradient includes calculating a per client gradient from the coded data of each client i separately, and combining calculated per client gradients for all clients i to obtain a global gradient.

Example KA4 includes the subject matter of Example KA3, the processor to further oversample the coded data of each client i to obtain oversampled coded data for each client i, and combine the oversampled coded data to compute composite coded data, and optionally, wherein calculating the per client gradient from the coded data of each client i separately includes calculating, for each client i separately, the per client gradient from the composite coded data.

Example KA5 includes the subject matter of any one of Examples KA1-KA2, the process to further oversample the coded data of each client i to obtain oversampled coded data for each client i, and to combine the oversampled coded data to compute composite coded data, and optionally, wherein calculating the global gradient includes calculating the global gradient from the composite coded data for all clients i.

Example KA6 includes the subject matter of any one of Examples KA4-KA5, and optionally, wherein the processor is to compute the composite coded data by: computing an over-sampled encoded data for each client i using, for each client i: a Fourier transform matrix Fi having a dimension based on a maximum number of coded data from client i; and a coded data $c_i*$ at client i; computing the composite coded data by summing the over-sampled encoded data for each client i across all clients i.

Example KA7 includes the subject matter of Example KA1, the processor to further, for a number of cycles E' of epoch number t: select and discarding an initial L clients from M clients sampled from N available clients, and optionally, wherein the initial L≤M and is based on one of a sampling distribution $q_i$ for datapoints at each at each client i within the M clients, or is based on a uniform sampling; select a subsequent L clients from remaining clients N–M or N–M+ initial L, and optionally, wherein the subsequent L≤M and is based on a sampling distribution $q_i$ for datapoints at each client i within the remaining clients; determine load balancing parameters for the subsequent L clients; as a one stage operation, receive a number of coded data from each client i of the subsequent L clients, the number of coded data based on $l_i$, $l_i*$ and t*.

Example KM1 includes a method to be performed at an apparatus of an edge computing node to be operated in an edge computing network, the method including performing rounds of a federated machine learning training within the edge computing network, including: as a one stage operation, receiving a number of coded data from each client i of N available clients or of L clients, and optionally, wherein L≤N, the number of coded data based on $l_i$, $l_i*$ and t*, and optionally, wherein $l_i$ corresponds to the number of raw datapoints at client i, $l_i*$ corresponds to an optimal load representing a number of raw datapoints used by client i to maximize its average return metric, and t* corresponds to a deadline time duration representing a smallest epoch time window within which the apparatus and the client i can jointly calculate a gradient; for every epoch number t and until time t*: receiving local gradients $g_i(t)$ from $L_i*(t*)$ raw data points, and optionally, wherein $l_i*(t*)$ corresponds to an optimal load representing a number of raw datapoints used by client i to maximize its average return metric during time t*; calculating a global gradient based on a per client gradient from the coded data of each client i; on or after time t*, calculating an updated global gradient from the global gradient calculated at each epoch number t.

Example KM2 includes the subject matter of Example KM1, and optionally, wherein coded data from each client i corresponds to data coded using random linear coding using a Gaussian generator matrix based on a number of coded data $c_i*$ at each client i during time duration t*, and optionally, wherein the Gaussian generator matrix is kept private from the apparatus.

Example KM3 includes the subject matter of any one of Examples KM1-KM2 wherein calculating the global gradient includes calculating a per client gradient from the coded data of each client i separately, and combining calculated per client gradients for all clients i to obtain a global gradient.

Example KM4 includes the subject matter of Example KM3, further including oversampling the coded data of each client i to obtain oversampled coded data for each client i, and combining the oversampled coded data to compute composite coded data, and optionally, wherein calculating the per client gradient from the coded data of each client i separately includes calculating, for each client i separately, the per client gradient from the composite coded data.

Example KM5 includes the subject matter of any one of Examples KM1-KM2, further including oversampling the coded data of each client i to obtain oversampled coded data for each client i, and combining the oversampled coded data to compute composite coded data, and optionally, wherein calculating the global gradient includes calculating the global gradient from the composite coded data for all clients i.

Example KM6 includes the subject matter of any one of Examples KM4-KM5, and optionally, wherein the composite coded data is computed by: computing an over-sampled encoded data for each client i using, for each client i: a Fourier transform matrix Fi having a dimension based on a maximum number of coded data from client i; and a coded data $c_i*$ at client i; computing the composite coded data by summing the over-sampled encoded data for each client i across all clients i.

Example KM7 includes the subject matter of Example KM1, further including, for a number of cycles E' of epoch number t: selecting and discarding an initial L clients from M clients sampled from N available clients, and optionally, wherein the initial L≤M and is based on one of a sampling distribution $q_i$ for datapoints at each at each client i within the M clients, or is based on a uniform sampling; selecting a subsequent L clients from remaining clients N–M or N–M+ initial L, and optionally, wherein the subsequent L≤M and is based on a sampling distribution $q_i$ for datapoints at each client i within the remaining clients; determining load balancing parameters for the subsequent L clients; as a one stage operation, receiving a number of coded data from each client i of the subsequent L clients, the number of coded data based on $l_i$, $l_i*$ and t*.

Example PCA1 includes an apparatus of a first edge computing node to be operated in an edge computing network, the apparatus including an interconnect interface to connect the apparatus to one or more components of the first edge computing node, and a processor to: decode a first message from a second edge computing node, the first message including information on a target data distribution for federated machine learning training; determine the target data distribution from the first message; encode a client report for transmission to the second edge computing node based on a divergence between a local data distribution of the first edge computing node and the target data distribution; cause transmission of the client report to the second computing node; decode a second message from the second edge computing node, the second message including information on a global model associated with a global epoch of the federated machine learning training; and update a local gradient at the first edge computing node based on the global model.

Example PCA2 Includes the subject matter of Example PCA1, the processor further to: encode weighted loss information for transmission to the second edge computing node; cause transmission of the weighted loss information to the second edge computing node; encode for transmission to the second edge computing node a local weight update $w_{k,t+e}$ = $W_{k,t+e-1}$ − η*$g_{k,t+e}$*$p_k/q_k$, where $w_{k,t+e}$ corresponds to a weight update of the first edge computing node at global epoch t and local epoch e, η is a learning rate, $g_{k,t+e}$ corresponds to a gradient estimate for the first edge computing node at global epoch t and local epoch e, $P_k$ corresponds to an original sampling distribution of the first edge computing node, and q is the probability distribution for the first edge computing node; and cause transmission of the local weight update to the second edge computing node.

Example PCA3 Includes the subject matter of any one of Examples PCA1-PCA2, wherein a data distribution at the first edge computing node corresponds to non-independent and identically distributed data (non-i.i.d.).

Example PCA4 Includes the subject matter of any one of Example PCA1-PCA3, the processor to perform rounds of federated machine learning training including: processing a capability request from the second edge computing node; generating a capability report on compute capabilities and communication capabilities of the edge computing node in response to the capability request; causing transmission of the capability report to the server; after causing transmission of the capability report, decoding the second message from the second edge computing node to initialize training parameters of a federated machine learning training round with the second edge computing node; and reporting updated model weights based on the global model for the federated machine learning training round.

Example PCA5 Includes the subject matter of Example PCA4, wherein the compute capabilities include a compute rate and the communication capabilities include an uplink communication time to the second edge computing node.

Example PCA6 Includes the subject matter of any one of Examples PCA4-PCA5, wherein the capability report further includes information on a number of training examples at the client.

Example PCA7 Includes the subject matter of any one of Examples PCA1-PCA3, the processor to: encode, for transmission to the second edge computing node, a capability report including at least one of information based on a training loss of the first edge computing node for a global epoch of a federated machine learning training by the second edge computing node training, or information based on a gradient of the first edge computing node with respect to a pre-activation output of the first edge computing node; cause transmission of the capability report; and for a next global epoch of the federated machine learning training, decode an updated global model from the second edge computing node.

Example PCA8 Includes the subject matter of Example PCA7, the processor to further decode the second message prior to causing transmission of the capability report.

Example PCA9 Includes the subject matter of any one of Examples PCA7-PCA8, wherein the capability report further includes a compute rate, and at least one of an uplink communication time or a downlink communication time for communication with the second edge computing node.

Example PCA10 Includes the subject matter of Example PCA1, the processor to: compute kernel coefficients based on a kernel function, a local raw training data set of the first edge computing node, and a raw label set corresponding to the local raw training data set; generate a coded training data set from the raw training data set; generate a coded label set based on the kernel coefficients, the kernel function, and the raw label set; and cause the coded training data set and coded label set to be transmitted to the second edge computing node.

Example PCA11 Includes the subject matter of Example PCA1, the processor to further:

access a local training data set of the first edge computing node; apply a Random Fourier Feature Mapping (RFFM) transform to the training data set to yield a transformed training data set; after decoding the second message, iteratively, until the global model converges: compute an update to the global model using the transformed data set and a raw label set corresponding to the training data set to obtain an updated global model; and cause the update to be transmitted to the second edge computing node.

Example PCA12 Includes the subject matter of Example PCA1, the processor to: access a local training data set of the first edge computing node and a label set corresponding to the local training data set; apply a Random Fourier Feature Mapping (RFFM) transform to the training data set to yield a transformed training data set; estimate a local machine learning (ML) model based on the transformed training data set and the label set; generate a coded training data set from the transformed training data set; generate a coded label set based on the coded training data set and the estimated local ML model; and cause the coded training data set and coded label set to be transmitted to the second edge computing node.

Example PCA13 Includes the subject matter of Example PCA1, the processor to: access a subset of a local training data set of the first edge computing node; generate a transformed training data subset based on a Random Fourier Feature Mapping (RFFM) transform and the training data subset; generate a coding matrix based on a distribution; generate a weighting matrix;

generate a coded training data mini-batch based on multiplying the transformed training data subset with the coding matrix and the weighting matrix; and cause the coded training data mini-batch to be transmitted to the second edge computing node; wherein the weighting matrix is based on a probability of whether the coded training data mini-batch will be received at the second edge computing node.

Example PCA14 Includes the subject matter of Example PCA1, the processor to: obtain, from each of a set of first edge computing nodes of the edge computing network, a maximum coding redundancy value for a coded federated learning (CFL) cycle to be performed on a global machine learning (ML) model of the federated ML training; determine a coding redundancy value based on the maximum coding redundancy values received from the edge computing devices; determine an epoch time and a number of data points to be processed at each edge computing device during each epoch of the CFL cycle based on the selected coding redundancy value; and cause the determined coding redundancy value, epoch time, and number of data points to be processed at each edge computing device to be transmitted to the set of edge computing devices.

Example PCA15 Includes the subject matter of Example PCA1, the processor to: determine a coded privacy budget and an uncoded privacy budget based on a differential privacy guarantee for a cycle of the federated machine learning; generate a coded data set from a raw data set of the first edge computing node based on the coded privacy budget; cause the coded data set to be transmitted to the second edge computing node; perform a round of the federated machine learning on the global model including: after receiving the second message, computing an update to the global model based on the raw data set and the uncoded privacy budget; and causing transmission of the update to the global model to the second edge computing node.

Example PCA16 Includes the subject matter of any one of Examples PCA1-Example PCA15, wherein the first edge computing node is a mobile client computing node.

Example PCM1 A method to be performed at an first edge computing node in an edge computing network, the method including: decoding a first message from a second edge computing node, the first message including information on a target data distribution for federated machine learning training; determining the target data distribution from the first message; encoding a client report for transmission to the second edge computing node based on a divergence between a local data distribution of the first edge computing node and the target data distribution; causing transmission of the client report to the second computing node; decoding a second message from the second edge computing node, the second message including information on a global model associated with a global epoch of the federated machine learning training; and updating a local gradient at the first edge computing node based on the global model.

Example PCM2 Includes the subject matter of Example PCM1, the method including:
encoding weighted loss information for transmission to the second edge computing node; causing transmission of the weighted loss information to the second edge computing node; encoding for transmission to the second edge computing node a local weight update $w_{k,t+e}=w_{k,t+e-1}-\eta*g_{k,t+e}*p_k/q_k$, where $w_{k,t+e}$ corresponds to a weight update of the first edge computing node at global epoch t and local epoch e, $\eta$ is a learning rate, $g_{k,t+e}$ corresponds to a gradient estimate for the first edge computing node at global epoch t and local epoch e, $P_k$ corresponds to an original sampling distribution of the first edge computing node, and q is the probability distribution for the first edge computing node; and causing transmission of the local weight update to the second edge computing node.

Example PCM3 Includes the subject matter of any one of Examples PCM1-PCM2, wherein a data distribution at the first client computing node corresponds to non-independent and identically distributed data (non-i.i.d.).

Example PCM4 Includes the subject matter of any one of Example PCM1-PCM3, the method including performing rounds of federated machine learning training including: processing a capability request from the second edge computing node; generating a capability report on compute capabilities and communication capabilities of the edge computing node in response to the capability request; causing transmission of the capability report to the server; after causing transmission of the capability report, decoding the second message from the second edge computing node to initialize training parameters of a federated machine learning training round with the second edge computing node; and reporting updated model weights based on the global model for the federated machine learning training round.

Example PCM5 Includes the subject matter of Example PCM4, wherein the compute capabilities include a compute rate and the communication capabilities include an uplink communication time to the second edge computing node.

Example PCM6 Includes the subject matter of any one of Examples PCM4-PCM5, wherein the capability report further includes information on a number of training examples at the client.

Example PCM7 Includes the subject matter of any one of Examples PCM1-PCM3, the method including: encoding, for transmission to the second edge computing node, a capability report including at least one of information based on a training loss of the first edge computing node for a global epoch of a federated machine learning training by the second edge computing node training, or information based on a gradient of the first edge computing node with respect to a pre-activation output of the first edge computing node; causing transmission of the capability report; and for a next global epoch of the federated machine learning training, decoding an updated global model from the second edge computing node.

Example PCM8 Includes the subject matter of Example PCM7, the method including decoding the second message prior to causing transmission of the capability report.

Example PCM9 Includes the subject matter of any one of Examples PCM7-PCM8, wherein the capability report further includes a compute rate, and at least one of an uplink communication time or a downlink communication time for communication with the second edge computing node.

Example PCM10 Includes the subject matter of Example PCM1, the method including:
computing kernel coefficients based on a kernel function, a local raw training data set of the first edge computing node, and a raw label set corresponding to the local raw training data set; generating a coded training data set from the raw training data set; generating a coded label set based on the kernel coefficients, the kernel function, and the raw label set; and causing the coded training data set and coded label set to be transmitted to the second edge computing node.

Example PCM11 Includes the subject matter of Example PCM1, the method including further:
accessing a local training data set of the first edge computing node; applying a Random Fourier Feature Mapping (RFFM) transform to the training data set to yield a transformed training data set; after decoding the second message, iteratively, until the global model converges: computing an update to the global model using the transformed data set and a raw label set corresponding to the training data set to obtain an updated global model; and causing the update to be transmitted to the second edge computing node.

Example PCM12 Includes the subject matter of Example PCM1, the method including:
accessing a local training data set of the first edge computing node and a label set corresponding to the local training data set; applying a Random Fourier Feature Mapping (RFFM) transform to the training data set to yield a transformed training data set; estimating a local machine learning (ML) model based on the transformed training data set and the label set; generating a coded training data set from the transformed training data set; generating a coded label set based on the coded training data set and the estimated local ML model; and causing the coded training data set and coded label set to be transmitted to the second edge computing node.

Example PCM13 Includes the subject matter of Example PCM1, the method including:
accessing a subset of a local training data set of the first edge computing node; generating a transformed training data subset based on a Random Fourier Feature Mapping (RFFM) transform and the training data subset; generating a coding matrix based on a distribution; generating a weighting matrix; generating a coded training data mini-batch based on multiplying the transformed training data subset with the coding matrix and the weighting matrix; and causing the coded training data mini-batch to be transmitted to the second edge computing node; wherein the weighting matrix is based on a probability of whether the coded training data mini-batch will be received at the second edge computing node.

Example PCM14 Includes the subject matter of Example PCM1, the method including:

obtaining, from each of a set of first edge computing nodes of the edge computing network, a maximum coding redundancy value for a coded federated learning (CFL) cycle to be performed on a global machine learning (ML) model of the federated ML training; determining a coding redundancy value based on the maximum coding redundancy values received from the edge computing devices; determining an epoch time and a number of data points to be processed at each edge computing device during each epoch of the CFL cycle based on the selected coding redundancy value; and causing the determined coding redundancy value, epoch time, and number of data points to be processed at each edge computing device to be transmitted to the set of edge computing devices.

Example PCM15 Includes the subject matter of Example PCM1, the method including: determining a coded privacy budget and an uncoded privacy budget based on a differential privacy guarantee for a cycle of the federated machine learning; generating a coded data set from a raw data set of the first edge computing node based on the coded privacy budget; causing the coded data set to be transmitted to the second edge computing node; performing a round of the federated machine learning on the global model including: after receiving the second message, computing an update to the global model based on the raw data set and the uncoded privacy budget; and causing transmission of the update to the global model to the second edge computing node.

Example PSA1 relates to an apparatus of an edge computing node to be operated in an edge computing network, the apparatus including an interconnect interface to connect the apparatus to one or more components of the edge computing node, and a processor to perform rounds of federated machine learning training including: processing client reports from a plurality of clients of the edge computing network; selecting a candidate set of clients from the plurality of clients for an epoch of the federated machine learning training; causing a global model to be sent to the candidate set of clients; and performing the federated machine learning training on the candidate set of clients.

Example PSA2 includes the subject matter of Example PSA1, wherein the processor is to perform rounds of federated machine learning training further including: causing dissemination, to a plurality of clients of the edge computing network, of a target data distribution at the edge computing node for federated machine learning training, wherein each of the respective reports is based on a divergence between a local data distribution of a respective one of the clients and the target data distribution; assigning a respective weight to each respective divergence based on a size of the divergence, with higher divergences having higher weights; and selecting the candidate set including using a round robin approach based on the weights.

Example PSA3 includes the subject matter of Example PSA2, wherein the divergence corresponding to each client is based on one of a Kullback-Leibler divergence or a distance of the probability distributions between a local data distribution of said each client and the target data distribution.

Example PSA4 includes the subject matter of any one of Examples PSA2-PSA3, wherein selecting a candidate set of clients is based on a determination as to whether the data distribution of each client of the candidate set shows non-independent and identically distributed data (non-i.i.d.).

Example PSA5 includes the subject matter of Example PSA1, wherein the processor is to perform rounds of federated machine learning training further including: processing weighted loss information from each of the clients; determining a probability distribution q for each of the clients based on the weighted loss information from corresponding ones of said each of the clients, wherein q is further based on an amount of data at said each of the clients, and a weight matrix for the federated machine learning training for said each of the clients for the global epoch; and selecting the candidate set including selecting a number of clients with highest probability distribution q as the candidate set.

Example PSA6 includes the subject matter of Example PSA1, wherein the reports include at least one of information based on training losses of respective ones of said clients for an epoch of the training, or information based on gradients of respective ones of said clients with respect to a pre-activation output of respective ones of said clients; and the processor is to perform rounds of federated machine learning training further including: rank ordering the clients based on one of their training losses or their gradients; and selecting the candidate set including selecting a number of clients with highest training losses or highest gradients as the candidate set.

Example PSA7 includes the subject matter of Example claim PSA6, wherein selecting a number of clients with highest training losses or highest gradients as the candidate set includes selecting a first number of clients with highest training losses or highest gradients as an intermediate set, and selecting a second number of clients from the intermediate set based on respective upload times of the first number of clients, the second number of clients corresponding to the candidate set.

Example PSA8 includes the subject matter of Example PSA1, wherein the processor is to perform rounds of federated machine learning training further including: grouping clients from a plurality of available clients into respective sets of clients based on compute capabilities and communication capabilities of each of the available clients; and selecting a candidate set of clients based on a round robin approach, or based at least on one of a data distribution of each client of the candidate set or a determination that a global model of the machine learning training at the edge computing node has reached a minimum accuracy threshold.

Example PSA9 includes the subject matter of Example PSA8, wherein the compute capabilities include a compute rate and the communication capabilities include an uplink communication time to the edge computing node.

Example PSA10 includes the subject matter of any one of Examples PSA1-PSA9, wherein the processor is further to cause dissemination, to the plurality of clients of the edge computing network, of a global model corresponding to an epoch of a federated machine learning training.

Example PSA11 includes the subject matter of any one of Examples PSA1-PSA10, wherein the processor is further to perform rounds of federated machine learning training including: obtaining coded training data from each of the selected clients; and performing machine learning training on the coded training data.

Example PSA12 includes the subject matter of Example PSA11, wherein the processor is further to: determine a coding redundancy value to use in the machine learning training on the coded training data based on maximum coding redundancy values from each of the clients, the maximum coding redundancy values indicating a maximum number of coded training data points a respective client may provide; determine an epoch time and a number of data points to be processed at each client during each round federated machine learning based on the selected coding redundancy value; and cause the determined coding redundancy value, epoch time, and number of data points to be processed at each client to be transmitted to the selected clients.

Example PSA13 includes the subject matter of Example PSA1, wherein the processor is further to, for a number of cycles E' of epoch number t: discard an initial L clients from M clients sampled from N available clients; select a subsequent L clients from remaining clients N−M or N−M+initial L clients; determine load balancing parameters for the subsequent L clients; receive coded data $\hat{X}_i$ from each client i of the subsequent L clients; after the number of cycles E', calculate a global weight $\beta^{(t+1)}$ corresponding to epoch number t+1, $\beta^{(t+1)}$ based on gradient gi(t) for each client i of the K clients at epoch number t and further based on gradient gi(t+1) for each client i of the K clients at epoch number t+1, wherein gi(t) is calculated using data points based on the load balancing parameters, and gi(t+1) is calculated using gi(t) and the coded data $\hat{X}_i$.

Example PSA14 includes the subject matter of Example PSA1, wherein the processor is further to: as a one stage operation, receiving a number of coded training data points from each client i of N available clients or of L clients, wherein L≤N, the number of coded data points based on li, li* and t*, wherein li corresponds to the number of raw datapoints at client i, li* corresponds to an optimal load representing a number of raw datapoints used by client i to maximize its average return metric, and t* corresponds to a deadline time duration representing a smallest epoch time window within which the apparatus and the client i can jointly calculate a gradient; for every epoch number t and until time t*: receive local gradients gi(t) from Li*(t*) raw data points, wherein li*(t*) corresponds to an optimal load representing a number of raw datapoints used by client i to maximize its average return metric during time t*; calculate a global gradient based on a per client gradient from the coded data of each client i; on or after time t*, calculate an updated global gradient from the global gradient calculated at each epoch number t.

Example PSM1 relates to a method to perform federated machine learning training at an apparatus of an edge computing node in an edge computing network, the method including: processing client reports from a plurality of clients of the edge computing network; selecting a candidate set of clients from the plurality of clients for an epoch of the federated machine learning training; sending a global model to the candidate set of clients; and performing the federated machine learning training on the candidate set of clients.

Example PSM2 includes the subject matter of Example PSM1, further comprising: disseminating, to a plurality of clients of the edge computing network, a target data distribution at the edge computing node for federated machine learning training, wherein each of the respective reports is based on a divergence between a local data distribution of a respective one of the clients and the target data distribution; assigning a respective weight to each respective divergence based on a size of the divergence, with higher divergences having higher weights; and selecting the candidate set including using a round robin approach based on the weights.

Example PSM3 includes the subject matter of Example PSM2, wherein the divergence corresponding to each client is based on one of a Kullback-Leibler divergence or a distance of the probability distributions between a local data distribution of said each client and the target data distribution.

Example PSM4 includes the subject matter of any one of Examples PSM2-PSM3, wherein selecting a candidate set of clients is based on a determination as to whether the data distribution of each client of the candidate set shows non-independent and identically distributed data (non-i.i.d.).

Example PSM5 includes the subject matter of Example PSM1, further comprising: processing weighted loss information from each of the clients; determining a probability distribution q for each of the clients based on the weighted loss information from corresponding ones of said each of the clients, wherein q is further based on an amount of data at said each of the clients, and a weight matrix for the federated machine learning training for said each of the clients for the global epoch; and selecting the candidate set including selecting a number of clients with highest probability distribution q as the candidate set.

Example PSM6 includes the subject matter of Example PSM1, wherein the reports include at least one of information based on training losses of respective ones of said clients for an epoch of the training, or information based on gradients of respective ones of said clients with respect to a pre-activation output of respective ones of said clients; and the method further comprises: rank ordering the clients based on one of their training losses or their gradients; and selecting the candidate set including selecting a number of clients with highest training losses or highest gradients as the candidate set.

Example PSM7 includes the subject matter of Example PSM6, wherein selecting a number of clients with highest training losses or highest gradients as the candidate set includes selecting a first number of clients with highest training losses or highest gradients as an intermediate set, and selecting a second number of clients from the intermediate set based on respective upload times of the first number of clients, the second number of clients corresponding to the candidate set.

Example PSM8 includes the subject matter of Example PSM1, further comprising: grouping clients from a plurality of available clients into respective sets of clients based on compute capabilities and communication capabilities of each of the available clients; and selecting a candidate set of clients based on a round robin approach, or based at least on one of a data distribution of each client of the candidate set or a determination that a global model of the machine learning training at the edge computing node has reached a minimum accuracy threshold.

Example PSM9 includes the subject matter of Example PSM8, wherein the compute capabilities include a compute rate and the communication capabilities include an uplink communication time to the edge computing node.

Example PSM10 includes the subject matter of Example PSM1, further comprising disseminating, to the plurality of clients of the edge computing network, a global model corresponding to an epoch of a federated machine learning training.

Example PSM11 includes the subject matter of any one of Examples PSM1-PSM10, further comprising: obtaining coded training data from each of the selected clients; and performing machine learning training on the coded training data.

Example PSM12 includes the subject matter of Example PSM11, further comprising: determining a coding redundancy value to use in the machine learning training on the coded training data based on maximum coding redundancy values from each of the clients, the maximum coding redundancy values indicating a maximum number of coded training data points a respective client may provide; determining an epoch time and a number of data points to be processed at each client during each round federated machine learning based on the selected coding redundancy value; and sending the determined coding redundancy value, epoch time, and number of data points to be processed at each client to the selected clients.

Example PSM13 includes the subject matter of Example PSM1, further comprising, for a number of cycles E' of epoch number t: discarding an initial L clients from M clients sampled from N available clients; selecting a subsequent L clients from remaining clients N–M or N–M+initial L clients; determining load balancing parameters for the subsequent L clients; receiving coded data $\hat{X}_{L}$ from each client i of the subsequent L clients; after the number of cycles E', calculating a global weight $\beta^{(t+1)}$ corresponding to epoch number t+1, $\beta^{(t+1)}$ based on gradient gi(t) for each client i of the K clients at epoch number t and further based on gradient gi(t+1) for each client i of the K clients at epoch number t+1, wherein gi(t) is calculated using data points based on the load balancing parameters, and gi(t+1) is calculated using gi(t) and the coded data $\hat{X}_{L}$.

Example PSM14 includes the subject matter of Example PSM1, further comprising: as a one stage operation, receiving a number of coded training data points from each client i of N available clients or of L clients, wherein L≤N, the number of coded data points based on li, li* and t*, wherein li corresponds to the number of raw datapoints at client i, li* corresponds to an optimal load representing a number of raw datapoints used by client i to maximize its average return metric, and t* corresponds to a deadline time duration representing a smallest epoch time window within which the apparatus and the client i can jointly calculate a gradient; for every epoch number t and until time t*: receive local gradients gi(t) from Li*(t*) raw data points, wherein li*(t*) corresponds to an optimal load representing a number of raw datapoints used by client i to maximize its average return metric during time t*; calculate a global gradient based on a per client gradient from the coded data of each client i; on or after time t*, calculate an updated global gradient from the global gradient calculated at each epoch number t.

ADDITIONAL EXAMPLES

Example L1 includes an apparatus comprising means to perform one or more elements of a method of any one of Examples AM1-AM9, BM1-BM7, CM1-CM8, DM1-DM9, EM1-EM8, EMM1-EMM7, FM1-FM11, FMM1-FMM7, GM1-GM4, GMM1-GMM3, GMMM1-GMMM3, GMMMM1-GMMMM3, HM1-HM7, HMM1-HMM12, HMMM1-HMMM7, IM1-IM10, JM1-JM10, KM1-KM7, PCM1-PCM15 and PSM1-PSM14.

Example L2 includes one or more non-transitory computer-readable media comprising instructions to cause an electronic device, upon execution of the instructions by one or more processors of the electronic device, to perform one or more elements of a method of any one of Examples AM1-AM9, BM1-BM7, CM1-CM8, DM1-DM9, EM1-EM8, EMM1-EMM7, FM1-FM11, FMM1-FMM7, GM1-GM4, GMM1-GMM3, GMMM1-GMMM3, GMMMM1-GMMMM3, HM1-HM7, HMM1-HMM12, HMMM1-HMMM7, IM1-IM10, JM1-JM10, KM1-KM7, PCM1-PCM15 and PSM1-PSM14.

Example L3, includes a machine-readable storage including machine-readable instructions which, when executed, implement the method of any one of Examples AM1-AM9, BM1-BM7, CM1-CM8, DM1-DM9, EM1-EM8, EMM1-EMM7, FM1-FM11, FMM1-FMM7, GM1-GM4, GMM1-GMM3, GMMM1-GMMM3, GMMMM1-GMMMM3, HM1-HM7, HMM1-HMM12, HMMM1-HMMM7, IM1-IM10, JM1-JM10, KM1-KM7, PCM1-PCM15 and PSM1-PSM14.

Example L4 includes an apparatus comprising: one or more processors and one or more computer-readable media comprising instructions that, when executed by the one or more processors, cause the one or more processors to perform the method of any of one of Examples AM1-AM9, BM1-BM7, CM1-CM8, DM1-DM9, EM1-EM8, EMM1-EMM7, FM1-FM11, FMM1-FMM7, GM1-GM4, GMM1-GMM3, GMMM1-GMMM3, GMMMM1-GMMMM3, HM1-HM7, HMM1-HMM12, HMMM1-HMMM7, IM1-IM10, JM1-JM10, KM1-KM7, PCM1-PCM15 and PSM1-PSM14.

Example L5 includes the apparatus of Example L1, further including a transceiver coupled to the processor, and one or more antennas coupled to the transceiver, the antennas to send and receive wireless communications from other edge computing nodes in the edge computing network.

Example L6 includes the apparatus of claim L5, further including a system memory coupled to the processor, the system memory to store instructions, the processor to execute the instructions to perform the training.

Example L7 includes an apparatus comprising logic, modules, or circuitry to perform one or more elements of a method described in or related to any of Examples AM1-AM9, BM1-BM7, CM1-CM8, DM1-DM9, EM1-EM8, EMM1-EMM7, FM1-FM11, FMM1-FMM7, GM1-GM4, GMM1-GMM3, GMMM1-GMMM3, GMMMM1-GMMMM3, HM1-HM7, HMM1-HMM12, HMMM1-HMMM7, IM1-IM10, JM1-JM10, KM1-KM7, PCM1-PCM15 and PSM1-PSM14, or any other method or process described herein.

Example L8 includes a method, technique, or process as described in or related to any of Examples AM1-AM9, BM1-BM7, CM1-CM8, DM1-DM9, EM1-EM8, EMM1-EMM7, FM1-FM11, FMM1-FMM7, GM1-GM4, GMM1-GMM3, GMMM1-GMMM3, GMMMM1-GMMMM3, HM41-HM7, HMM1-HMM412, HMMM1-HMMM7, IM1-IM10, JM1-JM10, KM1-KM7, PCM1-PCM15 and PSM1-PSM14, or portions or parts thereof.

Example L9 includes an apparatus comprising: one or more processors and one or more computer-readable media comprising instructions that, when executed by the one or more processors, cause the one or more processors to perform the method, techniques, or process as described in or related to any of Examples AM1-AM9, BM1-BM7, CM1-CM8, DM1-DM9, EM1-EM8, EMM1-EMM7, FM1-FM11, FMM1-FMM7, GM1-GM4, GMM1-GMM3, GMMM1-GMMM3, GMMMM1-GMMMM3, HM41-HM7, HMM41-HMM12, HMMM1-HMMM7, IM1-IM10, JM1-JM10, KM1-KM7, PCM1-PCM15 and PSM1-PSM14, or portions thereof.

Example L10 includes a signal as described in or related to any of the examples herein, or portions or parts thereof.

Example L11 includes a datagram, packet, frame, segment, protocol data unit (PDU), or message as described in or related to any of the examples herein, or portions or parts thereof, or otherwise described in the present disclosure.

Example L12 includes a signal encoded with data as described in or related to any of the examples herein, or portions or parts thereof, or otherwise described in the present disclosure.

Example L13 includes a signal encoded with a datagram, packet, frame, segment, protocol data unit (PDU), or message as described in or related to any of the examples herein, or portions or parts thereof, or otherwise described in the present disclosure.

Example L14 includes an electromagnetic signal carrying computer-readable instructions, wherein execution of the computer-readable instructions by one or more processors is to cause the one or more processors to perform the method, techniques, or process as described in or related to any of Examples AM1-AM9, BM1-BM7, CM1-CM8, DM1-DM9, EM1-EM8, EMM1-EMM7, FM1-FM11, FMM1-FMM7, GM1-GM4, GMM1-GMM3, GMMM1-GMMM3, GMMMM1-GMMMM3, HM1-HM7, HMM1-HMM12, HMMM1-HMMM7, IM1-IM10, JM1-JM10, KM1-KM7, PCM1-PCM15 and PSM1-PSM14, or portions thereof.

Example L15 includes a computer program comprising instructions, wherein execution of the program by a processing element is to cause the processing element to carry out the method, techniques, or process as described in or related to any of Examples AM1-AM9, BM1-BM7, CM1-CM8, DM1-DM9, EM1-EM8, EMM1-EMM7, FM1-FM11, FMM1-FMM7, GM1-GM4, GMM1-GMM3, GMMM1-GMMM3, GMMMM1-GMMMM3, HM1-HM7, HMM1-HMM12, HMMM1-HMMM7, IM1-IM10, JM1-JM10, KM1-KM7, PCM1-PCM15 and PSM1-PSM14, or portions thereof.

Example L15.5 includes a message or communication between a first edge computing node and a second edge computing note, or between a client computing node and a central server, substantially as shown and described herein, wherein the message or communication is to be transmitted/received on an application programming interface (API), or, especially when used to enhance a wireless network, embedded in L1/L2/L3 layers of the protocol stack depending on the application.

Example 15.6 includes a message or communication between a first edge computing node and a second edge computing note, or between a client computing node and a central server, substantially as shown and described herein, wherein the message or communication is to be transmitted/received on a Physical (PHY) layer, or on a Medium Access Control (MAC) layer as set forth in wireless standards, such as the 802.11 family of standards, or the Third Generation Partnership Project (3GPP) Long Term Evolution (LTE) or New Radio (NR or 5G) family of technical specifications.

Example 15.7 includes a message or communication between a first edge computing node and a second edge computing note, or between a client computing node and a central server, substantially as shown and described herein, wherein the message or communication involves a parameter exchange as described above to allow an estimation of wireless spectrum efficiency, and is to be transmitted/received on a L1 layer of a protocol stack.

Example 15.8 includes a message or communication between a first edge computing node and a second edge computing node, or between a client computing node and a central server, substantially as shown and described herein, wherein the message or communication involves a prediction of edge computing node sleep patterns, and is to be transmitted/received on a L2 layer of a protocol stack.

Example 15.9 includes a message or communication between a first edge computing node and a second edge computing node, or between a client computing node and a central server, substantially as shown and described herein, wherein the message or communication is to be transmitted or received on a transport network layer, an Internet Protocol (IP) transport layer, a General Radio Packet Service Tunneling Protocol User Plane (GTP-U) layer, a User Datagram Protocol (UDP) layer, an IP layer, on a layer of a control plane protocol stack (e.g. NAS, RRC, PDCP, RLC, MAC, and PHY), on a layer of a user plane protocol stack (e.g. SDAP, PDCP, RLC, MAC, and PHY).

Example L16 includes a signal in a wireless network as shown and described herein.

Example L17 includes a method of communicating in a wireless network as shown and described herein.

Example L18 includes a system for providing wireless communication as shown and described herein.

Example NODE1 includes an edge compute node comprising the apparatus of any one of claims AA1-AA10, BA1-BA7, CA1-CA8, DA1-DA10, EA1-EA8, EAA1-EAA7, FA1-FA11, FAA1-FAA7, GA1-GA4, GAA1-GAA3, GAAA1-GAAA3, GAAAA1-GAAAA3, HA1-HA8, HAA1-HAA13, HAAA1-HAAA8, IA1-IA11, JA1-JA10, KA1-KA7, PCA1-PCA16 and PSA1-PSA14, and further comprising a transceiver coupled to the processor, and one or more antennas coupled to the transceiver, the antennas to send and receive wireless communications from other edge computing nodes in the edge computing network.

Example NODE2 includes the subject matter of Example NODE1, further comprising a system memory coupled to the processor, the system memory to store instructions, the processor to execute the instructions to perform the training.

Example NODE3 includes the subject matter of Example NODE1 or NODE 2, wherein the apparatus is the apparatus of any one of Examples EA1-EA8, EAA1-EAA7, FA1-FA11, GA1-GA4, GAA1-GAA3, HA1-HA8, HAAA1-HAAA8, JA1-JA10, KA1-KA7, and PSA1-PSA14, and the edge compute node further comprises: a network interface card (NIC) to provide the apparatus wired access to a core network; and a housing that encloses the apparatus, the transceiver, and the NIC.

Example NODE4 includes the subject matter of Example NODE3, wherein the housing further includes power circuitry to provide power to the apparatus.

Example NODE5 includes the subject matter of any one of Examples NODE3-NODE4, wherein the housing further includes mounting hardware to enable attachment of the housing to another structure.

Example NODE6 includes the subject matter of any one of Examples NODE3-NODE5, wherein the housing further includes at least one input device.

Example NODE6 includes the subject matter of any one of Examples NODE3-NODE6, wherein the housing further includes at least one output device.

An example implementation is an edge computing system, including respective edge processing devices and nodes to invoke or perform the operations of Examples AM1-AM9, BM1-BM7, CM1-CM8, DM1-DM9, EM1-EM8, EMM1-EMM7, FM1-FM11, FMM1-FMM7, GM1-GM4, GMM1-GMM3, GMMM1-GMMM3, GMMMM1-GMMMM3, HM1-HM7, HMM1-HMM12, HMMM1-HMMM7, IM1-IM10, JM1-JM10, KM1-KM7, PCM1-PCM15 and PSM1-PSM14, or other subject matter described herein.

Another example implementation is a client endpoint node, operable to invoke or perform the operations of Examples AM1-AM9, BM1-BM7, CM1-CM8, DM1-DM9, EM1-EM8, EMM1-EMM7, FM1-FM11, FMM1-FMM7, GM1-GM4, GMM1-GMM3, GMMM1-GMMM3, GMMMM1-GMMMM3, HM1-HM7, HMM1-HMM12, HMMM1-HMMM7, IM1-IMN10, JM1-JM10, KM1-KM7, PCM1-PCM15 and PSM1-PSM14, or other subject matter described herein.

Another example implementation is an aggregation node, network hub node, gateway node, or core data processing node, within or coupled to an edge computing system, operable to invoke or perform the operations of Examples AM1-AM9, BM1-BM7, CM1-CM8, DM1-DM9, EM1-EM8, EMM1-EMM7, FM1-FM11, FMM1-FMM7, GM1-GM4, GMM1-GMM3, GMMM1-GMMM3, GMMMM1-GMMMM3, HM1-HM7, HMM1-HMM12, HMMM1-HMMM7, IM1-IM10, JM1-JM10, KM1-KM7, PCM1-PCM15 and PSM1-PSM14, or other subject matter described herein.

Another example implementation is an access point, base station, road-side unit, street-side unit, or on-premise unit, within or coupled to an edge computing system, operable to invoke or perform the operations of Examples AM1-AM9, BM1-BM7, CM1-CM8, DM1-DM9, EM1-EM8, EMM1-EMM7, FM1-FM11, FMM1-FMM7, GM1-GM4, GMM1-GMM3, GMMM1-GMMM3, GMMMM1-GMMMM3, HM1-HM7, HMM1-HMM12, HMMM1-HMMM7, IM1-IM10, JM1-JM10, KM1-KM7, PCM1-PCM15 and PSM1-PSM14, or other subject matter described herein.

Another example implementation is an edge provisioning node, service orchestration node, application orchestration node, or multi-tenant management node, within or coupled to an edge computing system, operable to invoke or perform the operations of Examples AM1-AM9, BM1-BM7, CM1-CM8, DM1-DM9, EM1-EM8, EMM1-EMM7, FM1-FM11, FMM1-FMM7, GM1-GM4, GMM1-GMM3, GMMM1-GMMM3, GMMMM1-GMMMM3, HM1-HM7, HMM1-HMM12, HMMM1-HMMM7, IM1-IM10, JM1-JM10, KM1-KM7, PCM1-PCM15 and PSM1-PSM14, or other subject matter described herein.

Another example implementation is an edge node operating an edge provisioning service, application or service orchestration service, virtual machine deployment, container deployment, function deployment, and compute management, within or coupled to an edge computing system, operable to invoke or perform the operations of Examples AM1-AM9, BM1-BM7, CM1-CM8, DM1-DM9, EM1-EM8, EMM1-EMM7, FM1-FM11, FMM1-FMM7, GM1-GM4, GMM1-GMM3, GMMM1-GMMM3, GMMMM1-GMMMM3, HM1-HM7, HMM1-HMM12, HMMM1-HMMM7, IM1-IM10, JM1-JM10, KM1-KM7, PCM1-PCM15 and PSM1-PSM14, or other subject matter described herein.

Another example implementation is an edge computing system operable as an edge mesh, as an edge mesh with side car loading, or with mesh-to-mesh communications, operable to invoke or perform the operations of Examples AM1-AM9, BM1-BM7, CM1-CM8, DM1-DM9, EM1-EM8, EMM1-EMM7, FM1-FM11, FMM1-FMM7, GM1-GM4, GMM1-GMM3, GMMM1-GMMM3, GMMMM1-GMMMM3, HM1-HM7, HMM1-HMM12, HMMM1-HMMM7, IM1-IM10, JM1-JM10, KM1-KM7, PCM1-PCM15 and PSM1-PSM14, or other subject matter described herein.

Another example implementation is the apparatus of any one of claims AA1-AA10, BA1-BA7, CA1-CA8, DA1-DA10, EA1-EA8, EAA1-EAA7, FA1-FA11, FAA1-FAA7, GA1-GA4, GAA1-GAA3, GAAA1-GAAA3, GAAAA1-GAAAA3, HAA1-HAA13, IA1-IA11, JA1-JA10, KA1-KA7, PCA1-PCA16 and PSA1-PSA14 further including a transceiver coupled to the processor, and one or more antennas coupled to the transceiver, the antennas to send wireless communications to and to receive wireless communications from other edge computing nodes in the edge computing network.

Another example includes an apparatus substantially as shown and described herein.

Another example includes a method substantially as shown and described herein.

Another example implementation is the apparatus of the Example of the paragraph above, further including a system memory coupled to the processor, the system memory to store instructions, the processor to execute the instructions to perform the training.

Another example implementation is an edge computing system including aspects of network functions, acceleration functions, acceleration hardware, storage hardware, or computation hardware resources, operable to invoke or perform the use cases discussed herein, with use of the examples herein, or other subject matter described herein.

Another example implementation is an edge computing system adapted for supporting client mobility, vehicle-to-vehicle (V2V), vehicle-to-everything (V2X), or vehicle-to-infrastructure (V2I) scenarios, and optionally operating according to ETSI MEC specifications, operable to invoke or perform the use cases discussed herein, with use of the examples herein, or other subject matter described herein.

Another example implementation is an edge computing system adapted for mobile wireless communications, including configurations according to an 3GPP 4G/LTE or 5G network capabilities, operable to invoke or perform the use cases discussed herein, with use of the Examples above, or other subject matter described herein.

Any of the above-described Examples may be combined with any other example (or combination of examples), unless explicitly stated otherwise. Aspects described herein can also implement a hierarchical application of the scheme for example, by introducing a hierarchical prioritization of usage for different types of users (e.g., low/medium/high priority, etc.), based on a prioritized access to the spectrum e.g. with highest priority to tier-1 users, followed by tier-2, then tier-3, etc. users, etc. Some of the features in the present disclosure are defined for network elements (or network equipment) such as Access Points (APs), eNBs, gNBs, core network elements (or network functions), application servers, application functions, etc. Any embodiment discussed herein as being performed by a network element may additionally or alternatively be performed by a UE, or the UE may take the role of the network element (e.g., some or all features defined for network equipment may be implemented by a UE).

Although these implementations have been described with reference to specific exemplary aspects, it will be evident that various modifications and changes may be made to these aspects without departing from the broader scope of the present disclosure. Many of the arrangements and processes described herein can be used in combination or in parallel implementations to provide greater bandwidth/throughput and to support edge services selections that can be made available to the edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

What is claimed is:

1. An apparatus of a first edge computing node to be operated in an edge computing network, the apparatus including an interconnect interface to connect the apparatus to one or more components of the first edge computing node, and a processor to:

decode a first message from a second edge computing node, the first message including information on a target data distribution for federated machine learning training;

determine the target data distribution from the first message;

encode a client report for transmission to the second edge computing node based on a divergence between a local data distribution of the first edge computing node and the target data distribution;

cause transmission of the client report to the second edge computing node;

decode a second message from the second edge computing node, the second message including information on a global model associated with a global epoch of the federated machine learning training; and update a local gradient at the first edge computing node based on the global model.

2. The apparatus of claim 1, the processor further to:

encode weighted loss information for transmission to the second edge computing node;

cause transmission of the weighted loss information to the second edge computing node;

encode for transmission to the second edge computing node a local weight update $w_{k,t+e} = w_{k,t+e-1} - \eta * g_{k,t+e} * p_k / q_k$, where $w_{k,t+e}$ corresponds to a weight update of the first edge computing node at global epoch t and local epoch e, $\eta$ is a learning rate, $g_{k,t+e}$ corresponds to a gradient estimate for the first edge computing node at global epoch t and local epoch e, $p_k$ corresponds to an original sampling distribution of the first edge computing node, and q is a probability distribution for the first edge computing node; and cause transmission of the local weight update to the second edge computing node.

3. The apparatus of claim 1, wherein a data distribution at the first edge computing node corresponds to non-independent and identically distributed data (non-i.i.d.).

4. The apparatus of claim 1, the processor to perform rounds of federated machine learning training including:

processing a capability request from the second edge computing node;

generating a capability report on compute capabilities and communication capabilities of the first edge computing node in response to the capability request;

causing transmission of the capability report to the second edge computing node;

after causing transmission of the capability report, decoding the second message from the second edge computing node to initialize training parameters of a federated machine learning training round with the second edge computing node; and reporting updated model weights based on the global model for the federated machine learning training round.

5. The apparatus of claim 4, wherein the compute capabilities include a compute rate and the communication capabilities include an uplink communication time to the second edge computing node.

6. The apparatus of claim 4, wherein the capability report further includes information on a number of training examples at the first edge computing node.

7. The apparatus of claim 1, the processor to:

encode, for transmission to the second edge computing node, a capability report including at least one of information based on a training loss of the first edge computing node for a global epoch of a federated machine learning training by the second edge computing node training, or information based on a gradient of the first edge computing node with respect to a pre-activation output of the first edge computing node;

cause transmission of the capability report; and for a next global epoch of the federated machine learning training, decode an updated global model from the second edge computing node.

8. The apparatus of claim 7, the processor to further decode the second message prior to causing transmission of the capability report.

9. The apparatus of claim 7, wherein the capability report further includes a compute rate, and at least one of an uplink communication time or a downlink communication time for communication with the second edge computing node.

10. The apparatus of claim 1, the processor to:

compute kernel coefficients based on a kernel function, a local raw training data set of the first edge computing node, and a raw label set corresponding to the local raw training data set;

generate a coded training data set from the raw training data set;

generate a coded label set based on the kernel coefficients, the kernel function, and the raw label set; and cause the coded training data set and coded label set to be transmitted to the second edge computing node.

11. The apparatus of claim 1, the processor to further:

access a local training data set of the first edge computing node;

apply a Random Fourier Feature Mapping (RFFM) transform to the training data set to yield a transformed training data set;

after decoding the second message, iteratively, until the global model converges:

compute an update to the global model using the transformed training data set and a raw label set corresponding to the training data set to obtain an updated global model; and cause the update to be transmitted to the second edge computing node.

12. The apparatus of claim 1, the processor to:

access a local training data set of the first edge computing node and a label set corresponding to the local training data set;

US 12,591,804 B2

141 apply a Random Fourier Feature Mapping (RFFM) transform to the training data set to yield a transformed training data set;

estimate a local machine learning (ML) model based on the transformed training data set and the label set;

generate a coded training data set from the transformed training data set;

generate a coded label set based on the coded training data set and the estimated local ML model; and cause the coded training data set and coded label set to be transmitted to the second edge computing node.

13. The apparatus of claim 1, the processor to:

access a subset of a local training data set of the first edge computing node;

generate a transformed training data subset based on a Random Fourier Feature Mapping (RFFM) transform and the training data subset;

generate a coding matrix based on a distribution;

generate a weighting matrix;

generate a coded training data mini-batch based on multiplying the transformed training data subset with the coding matrix and the weighting matrix; and cause the coded training data mini-batch to be transmitted to the second edge computing node;

wherein the weighting matrix is based on a probability of whether the coded training data mini-batch will be received at the second edge computing node.

14. The apparatus of claim 1, the processor to:

obtain, from each of a set of first edge computing nodes of the edge computing network, a maximum coding redundancy value for a coded federated learning (CFL) cycle to be performed on a global machine learning (ML) model of the federated ML training;

determine a coding redundancy value based on the maximum coding redundancy values received from the edge computing devices;

determine an epoch time and a number of data points to be processed at each edge computing device during each epoch of the CFL cycle based on the determined coding redundancy value; and cause the determined coding redundancy value, epoch time, and number of data points to be processed at each edge computing device to be transmitted to the set of edge computing devices.

15. The apparatus of claim 1, the processor to:

determine a coded privacy budget and an uncoded privacy budget based on a differential privacy guarantee for a cycle of the federated machine learning;

generate a coded data set from a raw data set of the first edge computing node based on the coded privacy budget;

cause the coded data set to be transmitted to the second edge computing node;

perform a round of the federated machine learning on the global model including:

after receiving the second message, computing an update to the global model based on the raw data set and the uncoded privacy budget; and causing transmission of the update to the global model to the second edge computing node.

16. The apparatus of claim 1, further comprising a transceiver coupled to the processor, and one or more antennas coupled to the transceiver, the antennas to send and receive wireless communications from other edge computing nodes in the edge computing network.

17. The apparatus of claim 16, further comprising a system memory coupled to the processor, the system memory to store instructions, the processor to execute the instructions to perform the training.

18. A non-transitory computer-readable storage medium comprising instructions to cause a first edge computing node, upon execution of the instructions by one or more processors of the first edge computing node, to perform operations including:

decoding a first message from a second edge computing node, the first message including information on a target data distribution for federated machine learning training;

determining the target data distribution from the first message;

encoding a client report for transmission to the second edge computing node based on a divergence between a local data distribution of the first edge computing node and the target data distribution;

causing transmission of the client report to the second edge computing node;

decoding a second message from the second edge computing node, the second message including information on a global model associated with a global epoch of the federated machine learning training;

encoding for transmission to the second edge computing node a local weight update corresponding to a weight update of the first edge computing node at global epoch t and local epoch e, the local weight update based on a gradient estimate for the first edge computing node at global epoch t and local epoch e; and updating a local gradient at the first edge computing node based on the global model.

19. The storage medium of claim 8, the operations including:

encoding weighted loss information for transmission to the second edge computing node;

causing transmission of the weighted loss information to the second edge computing node;

encoding for transmission to the second edge computing node a local weight update $w_{k,t+e} = w_{k,t+e-1} - \eta \ast g_{k,t+e} \ast p_k / q_k$, where $w_{k,t+e}$ corresponds to a weight update of the first edge computing node at global epoch t and local epoch e, $\eta$ is a learning rate, $g_{k,t+e}$ corresponds to a gradient estimate for the first edge computing node at global epoch t and local epoch e, $P_k$ corresponds to an original sampling distribution of the first edge computing node, and q is a probability distribution for the first edge computing node; and causing transmission of the local weight update to the second edge computing node.

20. The storage medium of claim 18, wherein a data distribution at the first edge computing node corresponds to non-independent and identically distributed data (non-i.i.d.).

21. The storage medium of claim 18, the method including performing rounds of federated machine learning training including:

processing a capability request from the second edge computing node;

generating a capability report on compute capabilities and communication capabilities of the first edge computing node in response to the capability request;

causing transmission of the capability report to the second edge computing node;

after causing transmission of the capability report, decoding the second message from the second edge computing node to initialize training parameters of a federated machine learning training round with the second edge computing node; and

143 reporting updated model weights based on the global model for the federated machine learning training round.

22. A method to be performed at an first edge computing node in an edge computing network, the method including:

decoding a first message from a second edge computing node, the first message including information on a target data distribution for federated machine learning training;

determining the target data distribution from the first message;

encoding a client report for transmission to the second edge computing node based on a divergence between a local data distribution of the first edge computing node and the target data distribution;

causing transmission of the client report to the second edge computing node;

decoding a second message from the second edge computing node, the second message including information on a global model associated with a global epoch of the federated machine learning training; and updating a local gradient at the first edge computing node based on the global model.

23. The method of claim 22, the method including:

encoding weighted loss information for transmission to the second edge computing node;

causing transmission of the weighted loss information to the second edge computing node;

encoding for transmission to the second edge computing node a local weight update $w_{k,t+e}=w_{k,t+e-1}-\eta^*g_{k,t+e}^*p_k/q_k$, where $w_{k,t+e}$ corresponds to a weight update of the first edge computing node at global epoch t and local epoch e, $\eta$ is a learning rate, $g_{k,t+e}$ corresponds to a gradient estimate for the first edge computing node at global epoch t and local epoch e, $P_k$ corresponds to an original sampling distribution of the first edge computing node, and q is a probability distribution for the first edge computing node; and causing transmission of the local weight update to the second edge computing node.

24. The method of claim 22, the method including performing rounds of federated machine learning training including:

processing a capability request from the second edge computing node;

generating a capability report on compute capabilities and communication capabilities of the first edge computing node in response to the capability request;

causing transmission of the capability report to the second edge computing node;

after causing transmission of the capability report, decoding the second message from the second edge computing node to initialize training parameters of a federated machine learning training round with the second edge computing node; and reporting updated model weights based on the global model for the federated machine learning training round.

25. The method of claim 24, wherein the capability report further includes information on a number of training examples at the first edge computing node.

* * * * *